US012641447B2

(12) United States Patent
Boccuzzi et al.

(10) Patent No.: US 12,641,447 B2
(45) Date of Patent: *May 26, 2026

(54) APPLICATION PROGRAMMING INTERFACE TO INDICATE A DEVICE IN A CORE NETWORK TO SHARE INFORMATION WITH A DEVICE IN AN ACCESS NETWORK

(71) Applicant: NVIDIA Corporation, Santa Clara, CA (US)

(72) Inventors: Joseph Boccuzzi, Kingwood, TX (US); Lopamudra Kundu, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 332 days.

This patent is subject to a terminal disclaimer.

(21) Appl. No.: 17/960,764

(22) Filed: Oct. 5, 2022

(65) Prior Publication Data

US 2024/0121631 A1    Apr. 11, 2024

(51) Int. Cl.
*H04W 24/02* (2009.01)
*H04W 28/02* (2009.01)
(52) U.S. Cl.
CPC ....... *H04W 24/02* (2013.01); *H04W 28/0215* (2013.01)
(58) Field of Classification Search
CPC .......................... H04W 24/02; H04W 28/0215
USPC .... 370/229, 230, 230.1, 236, 241, 252, 254, 370/328, 349, 389, 392, 471, 474, 475
See application file for complete search history.

(56) References Cited

U.S. PATENT DOCUMENTS

| | | | |
|---|---|---|---|
| 11,063,705 B2 | 7/2021 | Chou | |
| 11,140,695 B1 | 10/2021 | Eyuboglu et al. | |
| 11,212,033 B2 | 12/2021 | Iwabuchi et al. | |
| 11,252,655 B1 | 2/2022 | Gupta et al. | |
| 11,375,527 B1 | 6/2022 | Eyuboglu et al. | |
| 11,470,168 B2 | 10/2022 | Ly et al. | |
| 11,764,980 B2 | 9/2023 | Sun et al. | |
| 11,991,255 B2 | 5/2024 | Ly et al. | |
| 12,368,785 B2 | 7/2025 | Boccuzzi et al. | |

(Continued)

FOREIGN PATENT DOCUMENTS

| | | |
|---|---|---|
| CN | 207117617 U | 3/2018 |
| CN | 117480802 A | 1/2024 |

(Continued)

OTHER PUBLICATIONS

U.S. Appl. No. 17/960,751, filed Oct. 5, 2022.

(Continued)

*Primary Examiner* — Nguyen H Ngo
(74) *Attorney, Agent, or Firm* — Davis Wright Tremaine LLP

(57) ABSTRACT

Apparatuses, systems, and techniques including APIs, subscription services, and controllers to enable one or more fifth generation new radio (5G-NR) networks to share information. For example, a processor comprising one or more circuits can perform an API or subscription service to cause a device in a radio access network (RAN) to share its analytic data with a device in a transport network, and said device in said transport network can use said analytic data to adjust its network settings to improve performance.

17 Claims, 73 Drawing Sheets

(56) References Cited

U.S. PATENT DOCUMENTS

| | | |
|---|---|---|
| 2013/0028172 A1 | 1/2013 | Lim et al. |
| 2016/0249228 A1* | 8/2016 | Zhao .................... H04W 48/08 |
| 2019/0327619 A1 | 10/2019 | Altintas et al. |
| 2019/0380037 A1 | 12/2019 | Lifshitz et al. |
| 2019/0386783 A1 | 12/2019 | Chou |
| 2019/0394655 A1 | 12/2019 | Rahman et al. |
| 2020/0052963 A1 | 2/2020 | Kim et al. |
| 2020/0204477 A1 | 6/2020 | Rahman |
| 2020/0231121 A1 | 7/2020 | Dudekula et al. |
| 2020/0259896 A1 | 8/2020 | Sachs et al. |
| 2020/0275506 A1 | 8/2020 | Niemi et al. |
| 2020/0404069 A1 | 12/2020 | Li et al. |
| 2021/0105338 A1 | 4/2021 | Oyman et al. |
| 2021/0120540 A1 | 4/2021 | Lo et al. |
| 2021/0135733 A1 | 5/2021 | Huang et al. |
| 2021/0176649 A1* | 6/2021 | Rahman .................. H04L 41/40 |
| 2021/0184787 A1 | 6/2021 | Iwabuchi et al. |
| 2021/0258861 A1 | 8/2021 | Wang et al. |
| 2021/0400533 A1* | 12/2021 | Kwok .............. H04W 72/1268 |
| 2022/0014887 A1 | 1/2022 | Bartolome Rodrigo et al. |
| 2022/0019380 A1 | 1/2022 | Bartolomé Rodrigo et al. |
| 2022/0086035 A1 | 3/2022 | Devaraj et al. |
| 2022/0240145 A1 | 7/2022 | Kulkarni et al. |
| 2022/0247678 A1 | 8/2022 | Atwal et al. |
| 2022/0247792 A1 | 8/2022 | Verma et al. |
| 2022/0286307 A1 | 9/2022 | Thompson et al. |
| 2022/0311837 A1 | 9/2022 | Gupta et al. |
| 2022/0337531 A1 | 10/2022 | Abhigyan et al. |
| 2022/0338156 A1 | 10/2022 | Long |
| 2022/0360453 A1 | 11/2022 | Sun et al. |
| 2022/0413928 A1 | 12/2022 | Banuli Nanje Gowda |
| 2023/0007097 A1 | 1/2023 | Ly et al. |
| 2023/0018000 A1 | 1/2023 | Abhigyan et al. |
| 2023/0090225 A1 | 3/2023 | Thantharate et al. |
| 2023/0164641 A1 | 5/2023 | Purkayastha et al. |
| 2023/0188519 A1 | 6/2023 | Hu et al. |
| 2023/0239680 A1 | 7/2023 | Park et al. |
| 2023/0281053 A1 | 9/2023 | Kundu et al. |
| 2023/0284323 A1 | 9/2023 | Saha et al. |
| 2023/0300728 A1 | 9/2023 | Kundu et al. |
| 2023/0379985 A1 | 11/2023 | De Foy et al. |
| 2023/0388888 A1* | 11/2023 | Zhu ........................ H04W 36/32 |
| 2024/0095100 A1 | 3/2024 | Pateromichelakis et al. |
| 2024/0114567 A1 | 4/2024 | Tayal et al. |
| 2024/0121598 A1 | 4/2024 | Boccuzzi et al. |
| 2024/0205710 A1 | 6/2024 | Luo et al. |
| 2024/0205712 A1 | 6/2024 | Zhang et al. |
| 2025/0055902 A1 | 2/2025 | Pateromichelakis et al. |
| 2025/0056263 A1 | 2/2025 | Chenumolu et al. |

FOREIGN PATENT DOCUMENTS

| | | | |
|---|---|---|---|
| EP | 0822692 A2 * | 4/1998 | |
| EP | 4387308 A1 | 6/2024 | |
| EP | 4320813 B1 | 7/2025 | |
| JP | 2022554053 A | 12/2022 | |
| WO | 2019049212 A1 | 3/2019 | |
| WO | 2019245662 A1 | 12/2019 | |
| WO | 2021034906 A1 | 2/2021 | |
| WO | 2021052761 A1 | 3/2021 | |
| WO | 2022115010 A1 | 6/2022 | |
| WO | 2022128125 A1 | 6/2022 | |
| WO | 2022228155 A1 | 11/2022 | |
| WO | 2022235997 A1 | 11/2022 | |
| WO | 2023028791 A1 | 3/2023 | |
| WO | 2023029276 A1 | 3/2023 | |
| WO | 2023085092 A1 | 5/2023 | |
| WO | 2024077164 A1 | 4/2024 | |
| WO | 2024077171 A1 | 4/2024 | |
| WO | 2024077172 A1 | 4/2024 | |
| WO | 2024077176 A1 | 4/2024 | |
| WO | 2024077178 A1 | 4/2024 | |
| WO | 2024077182 A1 | 4/2024 | |
| WO | 2024077183 A1 | 4/2024 | |
| WO | 2024077186 A1 | 4/2024 | |
| WO | 2024077188 A1 | 4/2024 | |
| WO | 2024077190 A1 | 4/2024 | |
| WO | 2024077192 A1 | 4/2024 | |
| WO | 2024077195 A1 | 4/2024 | |
| WO | 2025131331 A1 | 6/2025 | |

OTHER PUBLICATIONS

U.S. Appl. No. 17/960,754, filed Oct. 5, 2022.
U.S. Appl. No. 17/960,762, filed Oct. 5, 2022.
U.S. Appl. No. 17/960,763, filed Oct. 5, 2022.
U.S. Appl. No. 17/960,796, filed Oct. 5, 2022.
U.S. Appl. No. 17/960,770, filed Oct. 5, 2022.
U.S. Appl. No. 17/960,774, filed Oct. 5, 2022.
U.S. Appl. No. 17/960,777, filed Oct. 5, 2022.
U.S. Appl. No. 17/960,784, filed Oct. 5, 2022.
U.S. Appl. No. 17/960,788, filed Oct. 5, 2022.
U.S. Appl. No. 17/960,793, filed Oct. 5, 2022.
3GPP TS 23.501, "3rd Generation Partnership Project: Technical Specification Group Services and Sytem Aspects," System Architecture for the 5G System (5GS), Stage 2 (release 17), retrieved from https://ftp.3gpp.org/Specs/archive/23_series/23.501/23501-h60. zip 23501-h60.docx, Sep. 22, 2022, 574 pages.
3GPP TS 29.500, "3rd Generation Partnership Project: Technical Specification Group Core Network and Terminals," 5G System, Technical Realization of Service Based Architecture, Stage 3, (Release 17), retrieved from https://ftp.3gpp.org/Specs/archives/29_series/29.500/29500-h80.zip 29500-h80.docx, Sep. 22, 2022, 131 pages.
International Search Report and Written Opinion for Application No. PCT/US2023/076123, mailed Feb. 5, 2024, 20 pages.
International Search Report and Written Opinion for Application No. PCT/US2023/076132, mailed Feb. 5, 2024, 19 pages.
International Search Report and Written Opinion for Application No. PCT/US2023/076135, mailed Feb. 5, 2024, 20 pages.
International Search Report and Written Opinion for Application No. PCT/US2023/076141, mailed Feb. 5, 2024, 18 pages.
International Search Report and Written Opinion for Application No. PCT/US2023/076143, mailed Feb. 5, 2024, 18 pages.
International Search Report and Written Opinion for Application No. PCT/US2023/076147, mailed Feb. 5, 2024, 19 pages.
International Search Report and Written Opinion for Application No. PCT/US2023/076148, mailed Feb. 5, 2024, 19 pages.
International Search Report and Written Opinion for Application No. PCT/US2023/076152, mailed Feb. 5, 2024, 22 pages.
International Search Report and Written Opinion for Application No. PCT/US2023/076154, mailed Feb. 5, 2024, 19 pages.
International Search Report and Written Opinion for Application No. PCT/US2023/076156, mailed Feb. 5, 2024, 18 pages.
International Search Report and Written Opinion for Application No. PCT/US2023/076158, mailed Feb. 5, 2024, 17 pages.
International Search Report and Written Opinion for Application No. PCT/US2023/076161, mailed Feb. 5, 2024, 21 pages.
IEEE "IEEE Standard for Floating-Point Arithmetic", Microprocessor Standards Committee of the IEEE Computer Society, IEEE Std 754-2008, dated Jun. 12, 2008.
Society of Automotive Engineers On-Road Automated Vehicle Standards Committee "Taxonomy and Definitions for Terms Related to Driving Automation Systems for On-Road Motor Vehicles", Standard No. J3016-201806, dated Jun. 15, 2018.
Society of Automotive Engineers On-Road Automated Vehicle Standards Committee, "Taxonomy and Definitions for Terms Related to Driving Automation Systems for On-Road Motor Vehicles," Standard No. J3016-201609, issued Jan. 2014, revised Sep. 2016, 30 pages.
Wikipedia, "IEEE 802.11," Wikipedia the Free Encyclopedia, https://en.wikipedia.org/wiki/IEEE_802.11, most recent edit Sep. 20, 2020 [retrieved Sep. 22, 2020], 15 pages.
3GPP TS 23.502, "3rd Generation Partnership Project; Technical Specification Group Services and System Aspects; Procedures for the 5G System; Stage 2, Release 16", Jun. 2019, 495 pages.

(56) References Cited

OTHER PUBLICATIONS

3GPP TS 29.122 V16.2.0, "3rd Generation Patrnership Project; Techical Specification Group Core Network and Terminals; T8 Reference point for Northbound API's", Release 16, 2019, 309 pages.
3GPP TS 23.501 V16.1.0, 3Rd Generation Partnership Project; Technical Specification Gorup Services and System Aspects; System Architecture for the 5G System; Stage 2 (Release 16), Jun. 2019, 368 pages.

* cited by examiner

DATA CENTER
2000

APPLICATION LAYER 2040

APPLICATION(s) 2042

SOFTWARE LAYER 2030

SOFTWARE 2032

FRAMEWORK LAYER 2020

JOB SCHEDULER 2032

CONFIGURATION MANAGER 2034

DISTRIBUTED FILE SYSTEM 2038

RESOURCE MANAGER 2036

DATA CENTER INFRASTRUCTURE LAYER 2010

RESOURCE ORCHESTRATOR 2012

GROUPED COMPUTING RESOURCES 2014

NODE C.R. 2016(1)

NODE C.R. 2016(2)

● ● ●

NODE C.R. 2016(N)

GRAPHICS
PROCESSOR
2810

FROM
PIPELINE MANAGER
3132

APPLICATION PROGRAMMING INTERFACE TO INDICATE A DEVICE IN A CORE NETWORK TO SHARE INFORMATION WITH A DEVICE IN AN ACCESS NETWORK

TECHNICAL FIELD

Apparatuses, systems, and techniques including application programming interfaces (APIs), subscription services, and/or controllers to enable one or more fifth generation new radio (5G-NR) networks to share and use information. For example, a processor comprising one or more circuits can perform an API or subscription service to cause a device in a radio access network (RAN) to share analytic data for said radio access network with a device in a transport network, and said device in said transport network can use said analytic data to adjust its network settings to improve overall performance for a device using said radio access and transport networks.

BACKGROUND

Providing reliable and high-quality service for devices accessing the internet through 5G-NR and other wireless technologies can be challenging. For example, if many devices are using 5G-NR technology, including one of its networks to access the internet at the same time to play an online hosted video game, the network can become congested and, as a result, video game performance can slow down. Also, challenges in providing reliable and high-quality service for devices using 5G-NR technology can be exacerbated for applications that have requests that include large amounts of data (e.g., megabytes, gigabytes) because it can further congest a network in 5G-NR technology. Accordingly, there exists a need to improve 5G-NR technology to provide better service.

BRIEF DESCRIPTION OF THE DRAWINGS

FIG. 33 illustrates a graphics processor, according to at least one embodiment;

DETAILED DESCRIPTION

Figure 1:
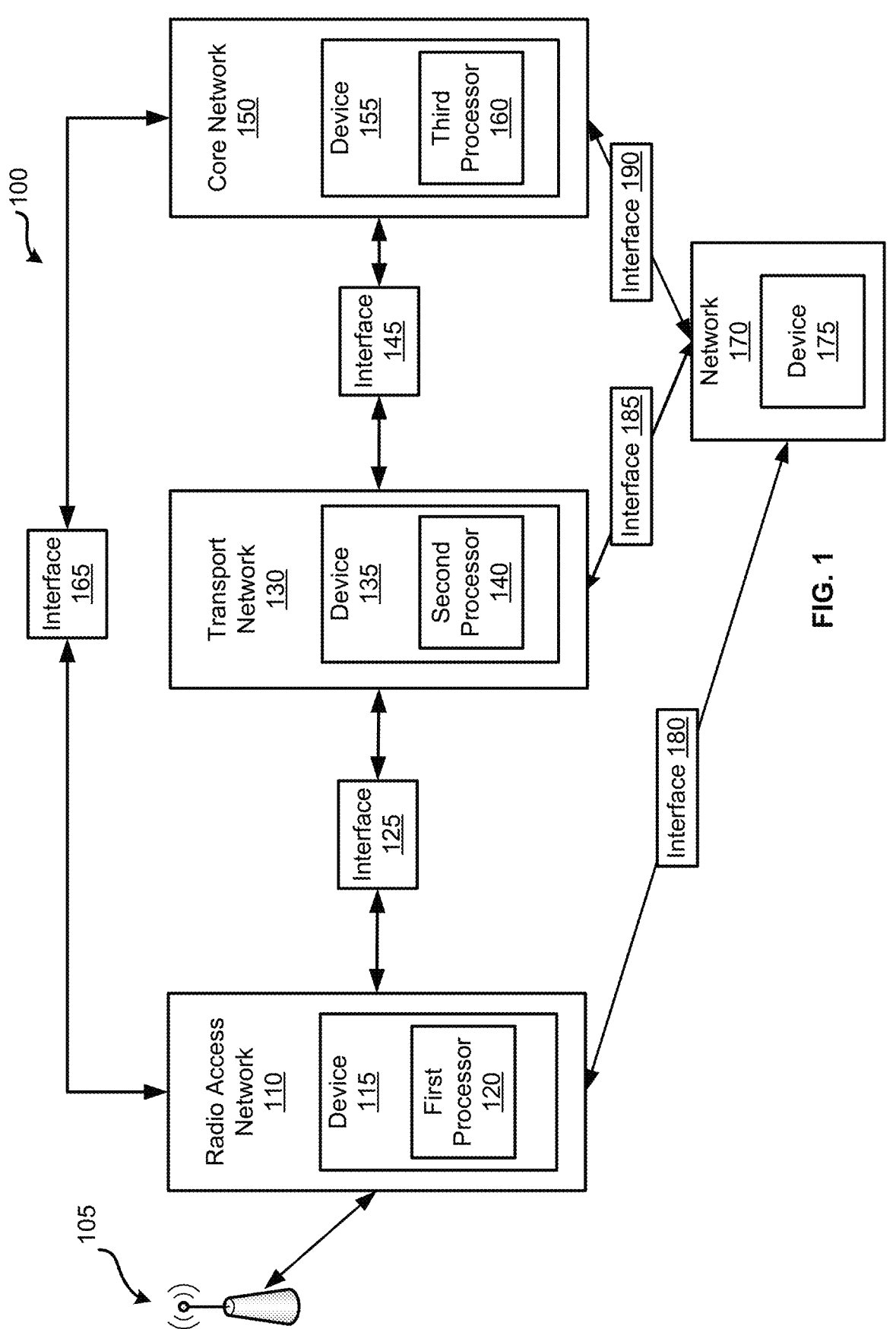
FIG. 1 illustrates a computing environment including networks that provide wireless access, transport, and performance of applications, according to at least one embodiment.

In at least one embodiment, 5G-NR technology includes three networks: a radio access network that provides wireless access to end user devices; a transport network that manages connections and routes packets; and a core network that performs applications (e.g., software for virtual reality, augmented reality, and machine learning for autonomous vehicles). In at least one embodiment, apparatuses, systems, and techniques including APIs or subscription services enable one or more 5G-NR networks, including radio access networks, transport networks, and core networks, to share information. For example, a device in a radio access network can perform an API or subscription service to cause said device to share analytic data for said radio access network with another device in a transport network. In such an example, said other device in said transport network can use received analytic data to adjust its network settings to improve (e.g., optimize) transport network performance. As another example, a device in a radio access network can perform an API or subscription service to cause said device to receive analytic data from a device in a core network, where said device in a radio access network can use said analytic data to improve its network performance (e.g., selecting a different modulation scheme to reduce latency). Note that, while the present disclosure focuses on 5G-NR technology for purposes of illustration, techniques described herein can be utilized with other wireless technologies, including but not limited to technologies that use similar different networks and/or successor technologies to 5G-NR.

In at least one embodiment, a controller that is external, outside, or otherwise not in one of said 5G-NR networks (e.g., radio access, transport, and core networks) receives analytic information from one or more 5G-NR networks, uses that analytic information to generate, determine, or otherwise compute settings for one or more 5G-NR networks (e.g., optimal settings to improve end-to-end performance for radio access, transport, and core networks collectively providing service to an end user device), and transmits control signals to one or more 5G-NR networks to cause said one or more networks (e.g., devices inside said one or more networks) to adjust their network settings or settings of devices within a network. For example, an external controller that has collected analytic data from different 5G-NR networks and generated optimal settings for each network can transmit control signals to devices in each network to cause those networks to adjust network settings that optimize performance based on analytic data (e.g., changing a modulation scheme, changing a routing algorithm or path, or changing parameters of an application when performed in a core network by a CPU or GPU).

In at least one embodiment, shared information includes analytic data. In at least one embodiment, analytic data includes performance data for a network. For example, analytic data includes quality of service parameters provided by a network, bandwidth, latency, throughput, average workload, processing time, frame rates (e.g., for a video game provided by a network), resolution of images (e.g., provided by a network hosting a video game), connectivity strength, downtime, number of network or device errors, user experience data (e.g., data from a user's device related to performance of an application that is hosted on 5G-NR), and quality of service provided to a user's device. In at least one embodiment, information can include raw data, e.g., raw measures or performance data for a radio access network, transport network, and/or core network. In at least one embodiment, information can include metadata, e.g., data about data. For example, metadata can include data about raw data for a network, e.g., average performance rate or average throughput or latency. In at least one embodiment, information includes feedback such as a feedback signal or feedback data from one network to another network (e.g., from radio access network to transport network or vice versa, from transport network to core network or vice versa, and/or from radio access network to core network or vice versa).

In at least one embodiment, inside of a network refers to a device with a network address (e.g., internet protocol (IP) addresses) that is under control of a network administrator for said network (e.g., administrator can be an organization that controls routers or devices for a network). In at least one embodiment, a device inside of a network is an example of a device within a network. In at least one embodiment, outside of a network refers to a device or network with a network address (e.g., IP address) that is outside of said network, such that its address is not under control of a network administrator. In at least one embodiment, a device inside of a network has a network address that does not need to be translated or changed when other devices within said network communicate with said device. In at least one embodiment, a device outside of a network has a network address that needs to be translated or changed when a device in another network communicates with it. In at least one embodiment, external is an example of outside of a network, e.g., an external controller is a controller outside of a network. For example, an external controller for a radio access network is a controller outside of a radio access network.

FIG. 1 illustrates a computing environment 100 in accordance with at least one embodiment. FIG. 1 includes base station 105, radio access network 110 including a device 155 with first processor 120, interface 125, transport network 130 including a device 135 with second processor 140, interface 145, core network 150 including a device 155 with third processor 160, interface 165, network 170, device 175, interface 180, interface 185, and interface 190. In at least one embodiment, one or more devices in computing environment 100 use APIs and/or subscription services to enable one or more 5G-NR networks (e.g., radio access network 110, transport network 130, core network 150) to share information. In at least one embodiment, sharing information includes sharing analytic data. In at least one embodiment, a network is also referred to as a computing network, where a computing network or network includes interconnected computing devices (e.g., virtual or physical) that can exchange information and share resources with each other. In at least one embodiment, these networks or portions of these networks can also be referred to as "layers." In at least one embodiment, a layer is software performed by one or more devices comprising one or more processors that include functional software components that interact in a sequential or hierarchical way, where each layer can have an interface to another layer (e.g., an interface to a layer above and below). In at least one embodiment, layers can also refer a different portions of a wireless communication protocol stack. In at least one embodiment, a layer refers to an abstraction of hardware (e.g., one or more CPUs) that performs functions or operations for a network, system in a network, or a computer.

In at least one embodiment, using interface 125, interface 145, and interface 165, devices share analytic data to adjust network settings or settings of devices in radio access network 110, transport network 130, and core network 150. In at least one embodiment, network settings include latency, bandwidth, packet loss, jitter, and throughput of a network. In at least one embodiment, to adjust settings of a network, one or more devices including one or more processors change a mode, settings, or operation of a device such that a device within a network and/or devices collectively in a network are adjusted to change latency, bandwidth, packet loss, jitter, and throughput of a network. In at least one embodiment, network settings include modulation schemes (e.g., for a radio access network), routing settings (e.g., routing table, routing path, and/or routing protocol for devices in a transport network), policies (e.g., security, routing policy, priority), and application settings (e.g., resolution of images, size of workloads, capacity of processors available to perform operations in a core network). In at least one embodiment, network settings can also include selecting different devices (e.g., a virtual machine versus hardware, a device with a CPU versus a device with several GPUs) to perform operations in a network. In at least one embodiment, radio access network 110 includes devices that share information within radio access network 110 and other networks, including transport network 130 and core network 150.

In at least one embodiment, radio access network 110 includes devices that share information within radio access network 110 and other networks including transport network 130 and core network 150. For example, radio access network 110 includes device 115 that can share information with transport network 130 via interface 125 or core network 150 via interface 165. In at least one embodiment, radio access network 110 is a network of devices including one or more processors to perform software to provide wireless access to end user devices. While computing environment 100 illustrates one radio access network 110, computing environment 100 can include one or more radio access networks 110, e.g., 2, 3, 10, or more radio access networks, which all provide wireless access to end users. In at least one embodiment, radio access network is a 5G-NR radio access network, and it can be referred to as a "5G access network" or a "5G-NR RAN." In at least one embodiment, radio access network 110 includes radio access network 4800 illustrated in FIG. 48.

In at least one embodiment, radio access network 110 includes or communicates with base station 105. In at least one embodiment, base station 105 includes a component (or collection of components) that provide wireless access to a network, such as an enhanced base station (eNB), a macro-cell, a femtocell, a Wi-Fi access point (AP), or other wirelessly enabled devices. In at least one embodiment, base station 105 establishes uplink and/or downlink wireless connections with computing devices. In at least one embodiment, data carried over uplink/downlink connections includes data communicated between computing devices, as well as data communicated to/from a remote-end (not shown) by way of backhaul network. In at least one embodiment, base station 105 receives modulated wireless signals from devices and transmits modulated wireless signals to devices (e.g., mobile devices, tablets, computers, autonomous vehicles, headsets, watches). For example, base station 105 includes an antenna, processors, and software performed by one or more processors (e.g., CPUs, GPUs) to convert a modulated signal into a packet of information that is transmitted to radio access network 110. In at least one embodiment, radio access network 110 includes a device that manages which modulation scheme is used, and said device can change that modulation scheme based on using analytic data that determines performance can be improved (e.g., single-sideband, vestigial-side band, self-phase modulation).

In at least one embodiment, radio access network 110 comprises nodes. In at least one embodiment, radio access network 110 includes nodes for a radio unit (RU), distributed unit (DU), and centralized unit (CU). In at least one embodiment, each node is performed and/or managed by device 115. In at least one embodiment, radio access network exposes its node-specific analytics through a radio access network analytics information exposure (RAIE) function hosted by service management and orchestrator (SMO).

In at least one embodiment, device 115 is a computing device in radio access network 110. In at least one embodiment, devices 115 are virtual machines, which include a processor performing a hypervisor to provide a virtualization of a computing device. In at least one embodiment, device 115 includes a radio unit (RU), a distributed unit (DU), centralized unit (CU), a near-real time RAN intelligent controller (Near-RT RIC), a non-real time RAN intelligent controller (non-RT RIC), or other 5G-NR related device to provide radio access. In at least one embodiment, device 115 includes first processor 120. In at least one embodiment, first processor 120 is a processor that performs functions and operations for device 115, e.g., a CPU or other a CPU coupled to another processing unit to form a system-on-chip (SoC). For example, said SoC can include a field programmable gate array (FPGA), an application specific integrated circuit (ASIC), a graphics processing unit (GPU), or a parallel processing unit (PPU). While FIG. 1 illustrates a single device 115, radio access network 110 can include many (e.g., 10, 100, or 1,000) devices that provide or assist in providing wireless access for application with 5G-NR.

In at least one embodiment, interface 125 includes software performed by one or more processors that causes information to be shared between radio access network 110 and core network 150. In at least one embodiment, interface 125 is circuitry or logic that causes information to be shared between two or more networks. In at least one embodiment, interface 125 includes an API such as those disclosed in FIGS. 6-7. Interface 125 includes software performed by one or more processors that causes analytic data to be shared between radio access network 110 and core network 150.

For example, a device in radio access network 110 can call interface 125 to request, receive, or otherwise cause analytic data from transport network 130 to be shared with a device (e.g., device 115) in radio access network 110. In at least one embodiment, when device 115 calls an API (e.g., interface 125), device 135 in transport network 130 to receive said API call and, to perform said API, registers an address of device 115 (e.g., by storing an address of device 115 in a table). In at least one embodiment, when analytic data is generated in transport network 130, device 135 in transport network 130 sends analytic data to every device, including device 115 in radio access network 110, that has registered using said API. In at least one embodiment, when a device calls an API, a device in radio access network 110 receives said API call and, to perform said API, registers an address of said device (e.g., by storing an IP address of said device in a table). In at least one embodiment, when analytic data is generated in radio access network 110, said same device in radio access network 110 sends analytic data to every device that has registered using said API. In at least one embodiment, inputs to interface 125 can be IP address of device that requests to receive information, an event or trigger that causes an API to be performed, a type of information to be requested (e.g., latency performance, bandwidth performance, user experience data for workloads performed by network), or other information to cause two networks to exchange information. In at least one embodiment, outputs from interface 125 can be IP address of a device, a confirmation that information (e.g., analytic data) will be shared, information (e.g., analytic data), indications of where information is stored (e.g., memory address), a function or code to be performed, a subscription service, or other outputs to cause an exchange of information between two networks.

In at least one embodiment, interface 125 is software performed by one or more processors that enables a subscription service to be performed that causes radio access network 110 and transport network 130 to share information, e.g., analytic information. In at least one embodiment, a subscription service includes a function or software module that, when performed by one or more devices, causes information to transmit from one network to another using interface 125. In at least one embodiment, a device can use a subscription service periodically, when it is triggered (e.g., startup event, error event, user request), or otherwise to share information.

In at least one embodiment, transport network 130 manages connections and routes packets of information (e.g., from a device within transport network 130 to another network, or to a device outside of transport network 130). In at least one embodiment, transport network 130 includes infrastructure such cables and wires. In at least one embodiment, transport network 130 includes device 135 with second processor 140. In at least one embodiment, transport network 130 includes device 135 with processor 140 to perform protocols such as wavelength-division multiplexing (WDM) and pulse amplitude modulation technology (PAM4), tunneling protocols, including multiprotocol label switching (MPLS) and segment routing (SR) MPLS, virtual extensible local area network (VXLAN), and/or routing algorithms including Open Shortest Path First (OSPF) and Border Gateway Protocol (BGP).

In at least one embodiment, transport network 130 includes device 135 that performs operations to route packets of information including headers to other networks or devices, both inside and outside of said transport network 130. In at least one embodiment, second processor 140 is a processor that performs functions and operations for device 135, e.g., a CPU or other a CPU coupled to another processing unit to form a SoC. For example, said SoC can include a FPGA, an ASIC, a GPU, or a PPU. While FIG. 1 illustrates a single device 135, transport network 130 can include many (e.g., 10, 100, or 1,000) devices that provide or assist in supporting application using 5G-NR. In at least one embodiment, transport network is a 5G-NR transport network, and it can be referred to as a "5G transport network."

In at least one embodiment, interface 145 includes software performed by one or more processors that causes information to be shared between transport network 130 and core network 150. In at least one embodiment, interface 145 is circuitry or logic that causes information to be shared between two or more networks. In at least one embodiment, interface 145 includes an API that enables device 135 transport network 130 to share information with device 155 in core network 150. For example, device 135 has a processor including one or more circuits to perform API to indicate one or more devices within one or more fifth generation new radio (5G-NR) access networks, with which one or more devices within one or more 5G transport networks is to share information. For example, a device in transport network 130 can call interface 145 to request, receive, or otherwise cause analytic data from core network 150 to be shared with a device (e.g., device 115) in radio access network 110. In at least one embodiment, when device 115 calls an API (e.g., interface 125), device 135 in transport network 130, in order to receive said API call and to perform said API, registers an address of device 115 (e.g., by storing an address of device 115 in a table). In at least one embodiment, when analytic data is generated in transport network 130, device 135 in transport network 130 sends analytic data to every device, including device 115 in radio access network 110, that has registered using said API. In at least one embodiment, when a device calls an API, a device in a radio access network receives said API call and, to perform an API, registers an address of a device (e.g., by storing an address of a device in a table). When analytic data is generated in a radio access network, same device in a radio access network sends analytic data to every device that has registered using an API. In at least one embodiment, interface 145 includes an API such as those disclosed in FIGS. 8-9. In at least one embodiment, inputs to interface 145 can be IP address of device that requests to receive information, an event or trigger that causes an API to be performed, a type of information to be requested (e.g., latency performance, bandwidth performance, user experience data for workloads performed by network), or other information to cause two networks to exchange information. In at least one embodiment, outputs from interface 145 can be IP address of a device, a confirmation that information (e.g., analytic data) will be shared, information (e.g., analytic data), indications of where information is stored (e.g., memory address), a function or code to be performed, a subscription service, or other outputs to cause an exchange of information between two networks.

In at least one embodiment, core network 150 includes one or more devices that perform applications. In at least one embodiment, applications include software for virtual reality, augmented reality, drones, remote control, health care, internet of things (IoT), video games, wireless communication, machine learning for autonomous vehicles, and other applications that can be performed through a wireless network. In at least one embodiment, core network 150 includes device 155 with third processor 160 (e.g., CPU, GPU, FGPA, ASIC, or a combination thereof). In at least one embodiment, device 155 is a server that includes a CPU, which is an example of third processor 160. In at least one embodiment, device 155 includes a SoC including a CPU and one or more GPUs, where said one or more GPUs are used to accelerate performance of operations for 5G-NR. In at least one embodiment, core network 150 communicates directly or indirectly with transport network 130 and radio access network 110. In at least one embodiment, core network 150 is a mobile edge computing network because it is close (e.g., less than 5 miles) to end user devices in radio network 110 such that it performs applications related to processing tasks closer to an end user. In at least one embodiment, device 155 is an internal controller that is software performed by one or more processors to control, monitor, or otherwise operate core network 150. In at least one embodiment, core network 150 provides its node specific analytics, such as control plane functions (CPF) and user plane functions (UPF), to other networks or devices through network exposure function (NEF) and/or an internal Analytics Function (AF), where said functions are performed by one or more devices, such as device 155 including one or more processors. In at least one embodiment, core network 150 includes an external application (e.g., MEC) that can subscribe to RAIE and/or NEF to obtain radio access network and core network specific network analytics and utilize said analytics to dynamically optimize its performance. In at least one embodiment, NEF includes NEF disclosed in FIG. 55, e.g., NEF 5516. In at least one embodiment, core network 150, transport network 130, and radio access network 110 can perform analytics sharing operations in parallel or sequentially.

In at least one embodiment, device 155 can perform a network data analytics function (NWDAF), e.g., to receive, use, or otherwise compute operations related to end user data and applications being performed in core network 150. In at least one embodiment, device 155 performs open software for 3GPP mobile core networks, such as model training logical function (MTLF) to train a model and/or analytics logic function (AnLF), to provide analytic results based on a trained model. In at least one embodiment, core network 150 includes an edge and regional cloud network, where an edge network is close to a particular group of client devices and regional cloud provides service to a region.

In at least one embodiment, interface 165 is software performed by one or more processors that causes information to be shared between radio access network 110 and core network 150. In at least one embodiment, interface 165 is circuitry or logic that causes information to be shared between two or more networks. In at least one embodiment, interface 165 includes an API. In at least one embodiment, interface 165 includes an API such that those disclosed in FIGS. 9-10. In at least one embodiment, interface 165 includes software performed by one or more processors that causes analytic data to be shared between radio access network 110 and core network 150. For example, if a device in radio access network can call interface 165 to request, receive, or otherwise cause analytic data from core network 150 to be shared with a device (e.g., device 115) in radio access network 110. In at least one embodiment, when device 115 calls an API (e.g., interface 165), device 155 in core network 150 receives said API call and, to perform said API, registers an address of device 115 (e.g., by storing an address of device 115 in a table). In at least one embodiment, when analytic data is generated in core network 150, device 155 in core network 150 sends analytic data to every device, including device 115 in radio access network 110, that has registered using said API. In at least one embodiment, when a device calls an API, a device in a radio access network receives an API call and, to perform an API, registers an address of a device (e.g., by storing an address of a device in a table). When analytic data is generated in a radio access network, same device in said radio access network sends an analytic data to every device that has registered using an API. In at least one embodiment, inputs to interface 165 can be IP address of device that requests to receive information, an event or trigger that causes an API to be performed, a type of information to be requested (e.g., latency performance, bandwidth performance, user experience data for workloads performed by network), or other information to cause two networks to exchange information. In at least one embodiment, outputs from interface 165 can be IP address of a device, a confirmation that information (e.g., analytic data) will be shared, information (e.g., analytic data), indications of where information is stored (e.g., memory address), a function or code to be performed, a subscription service, or other outputs to cause an exchange of information between two networks.

In at least one embodiment, computing environment 100 includes network 170, device 175, interface 180, interface 185, and interface 190. In at least one embodiment, network 170 includes devices such as device 175 (e.g., a controller for a MEC network or an internal control or a device that is local to end users that are using a MEC). In at least one embodiment, network 170 can communicate or exchange information with radio access network 110, transport network 130, and core network 150, e.g., using interface 180, interface 185, and interface 190. In at least one embodiment, interface 180, interface 185, and interface 190 includes APIs, which devices can call or perform to share analytic information. For example, device 175 can call or perform an API to share analytic data with core network 150. In at least one embodiment, device 175 includes one or more processors that used to perform software or applications.

In at least one embodiment, network 170 includes a multi-access edge computing (MEC) network, e.g., a type of network architecture that provides cloud computing capabilities and service at an edge of a network (e.g., close to a group of users or away from a core network 150). In at least one embodiment, network 170 (e.g., a MEC) provides video analytics, location services, internet-of-things (IoT), augmented reality, optimized local content distribution, and/or data caching. For example, network 170 includes software applications performed by one or more devices to use local content and real-time information about local-access network conditions to generate analytic data that can be shared with other networks. In at least one embodiment, network 170 includes a MEC that meets industry specification group (ISG) within ETSI.

In at least one embodiment, device 115, device 135, device 155, and device 175 use interface 125, interface 145, interface 165, interface 180, interface 185, and interface 185 share information bi-directionally to prepare for upcoming workload (e.g., services to be performed) to improve user quality of service and increase network efficiency. For example, a scheduler (e.g., SMO) in a radio access network performed by a processor can share its upcoming schedule and analytic information of such schedule with transport network 130 and core network 150 to improve user quality of service and increase network efficiency. In at least one embodiment, interface 125, interface 145, and interface 165 are proprietary and support analytic data sharing functions;

in at least one embodiment, interface 125, interface 145, and interface 165 are standard interfaces that can be performed in O-RAN.

In at least one embodiment, radio access network 110, transport network 130, and core network 150 are divided into a "network slices." In at least one embodiment, a network slice is a logical division of portions of a network that is performed by one or more devices comprising one or more processors to provide 5G-NR service. In at least one embodiment, different network slices of a 5G-NR network provide a different type of service corresponding to a different quality of service ("QoS"). For example, a 5G-NR service provider offers network slices with enhanced mobile broadband ("eMBB"), ultra-reliable low latency communications ("URLLC"), massive machine-type communications ("mMTC"), and/or vehicle-to-everything ("V2X") for one or several cells in a 5G-NR network, where each service type has a different QoS, e.g., URLLC relates to ultra-low latency when processing 5G-NR workloads. In at least one embodiment, cells refer to sections of a 5G-NR network that are divided into geographical areas (e.g., 5G small cells). In at least one embodiment, cells refer to sections of a 5G-NR network that are operated using a different frequency range or different frequency band (e.g., macrocells, microcells, femtocells, or picocells).

In at least one embodiment, all techniques and systems in computing environment 100 can be used to in an open radio access network (O-RAN). In at least one embodiment, networks include software networks, which include software performed by one or more processors to generate a virtual computer network. In at least one embodiment, computing network 100 includes providing wireless service for any 3rd Generation partnership Project (3GPP) wireless communication standard, including Sixth Generation (6G) and further generations from 3GPP or other standard setting organizations (e.g., European Telecommunications Standards Institute (ETSI) and Institute of Electrical and Electronics Engineers (IEEE)).

In at least one embodiment, networks or devices within networks can be combined. For example, radio access network 110 can be combined with transport network 130 to form one network. As another example, transport network 130 can be combined with core network 150 to form one network. As another example, radio access network 110 can be combined with core network 150 to form one network. In at least one embodiment, when two or more networks are combined, those networks can be co-located, which includes having hardware in close proximity or in a same server.

Figure 2:
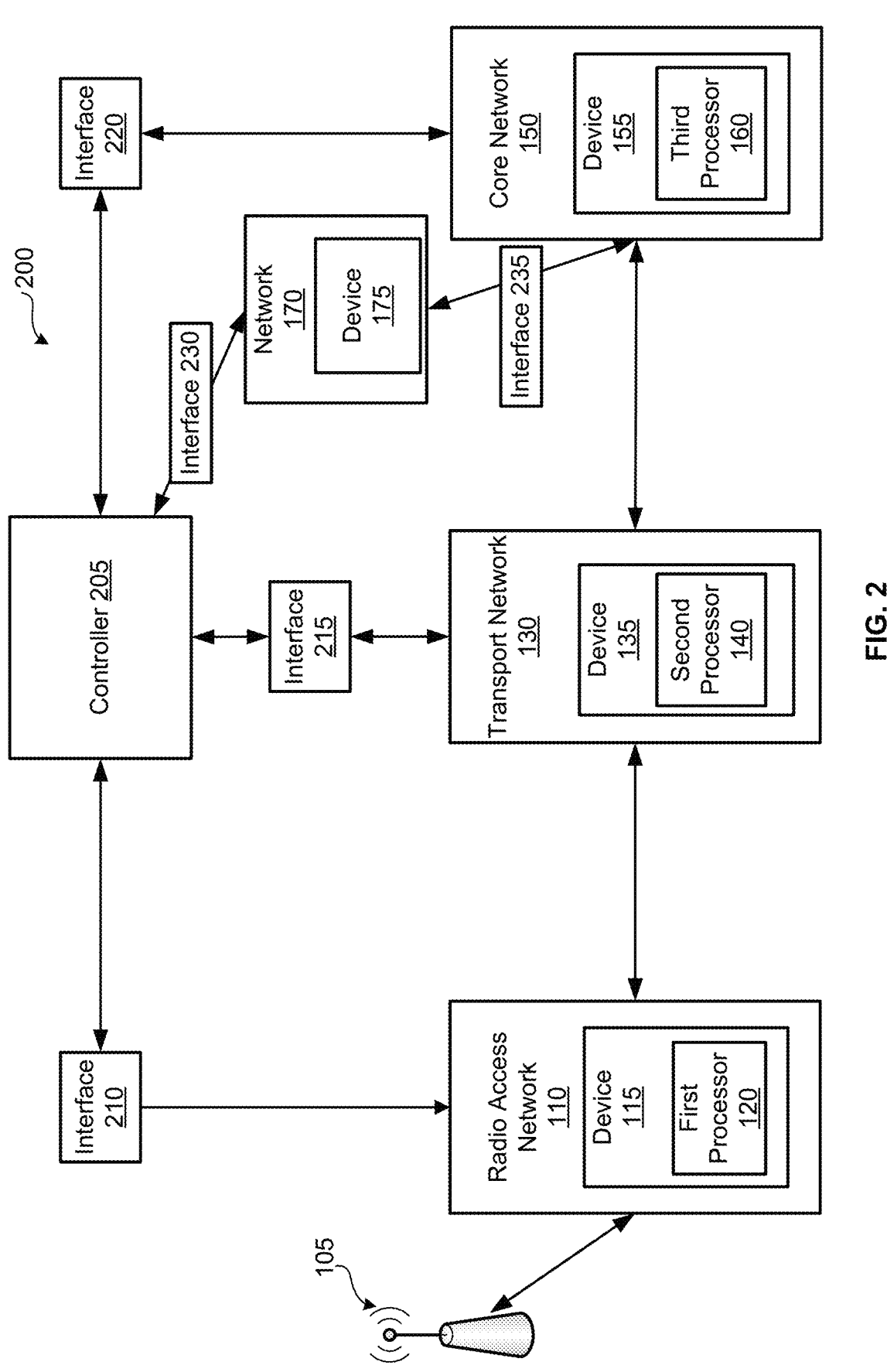
FIG. 2 illustrates another computing environment including networks that provide wireless access, transport, and performance of applications, according to at least one embodiment.

FIG. 2 illustrates a computing environment 200 in accordance with at least one embodiment. FIG. 2 includes base station 105, radio access network 110 including device 115 with first processor 120, transport network 130 including device 135 with processor 140, core network 150 including device 155 with third processor 160, controller 205, interface 210, interface 215, interface 220, network 170, device 175, interface 230, and interface 235. In at least one embodiment, FIG. 2 includes all components disclosed in FIG. 1. In at least one embodiment, computing environment 100 in FIG. 1 and computing environment 200 in FIG. 2 are combined together to form another computing environment such that methods and processes disclosed herein can be performed in said combined environment.

In at least one embodiment, controller 205 is software performed by one or more processors (e.g., a CPU) to adjust network settings of a network, including radio access network 110, transport network 130, and core network 150. In at least one embodiment, controller 205 is hardware, e.g., an ASIC design to receive analytic data, generate network settings based on received analytic data, and transmit control signals to each network (e.g., devices in a network) to cause each network to have adjusted settings. In at least one embodiment, controller 205 is referred to as an end-to-end analytics controller because it receives analytic information from radio access network 110, transport network 130, and core network 150, and uses all this received analytic information to determine settings for each network such that end-to-end performance collectively of said networks is improved (e.g., optimized), such that a user device that uses all three networks (e.g., a user playing a video game using 5G) experiences an improved performance. In at least one embodiment, controller 205 is a combination of hardware and software to perform operations described herein. In at least one embodiment, controller 205 can be performed by one or more processors disclosed in FIG. 31A to FIG. 42; in at least one embodiment, fourth processor includes one or more processors disclosed in FIG. 31A to FIG. 42. In at least one embodiment, controller 205 can use interface 210, interface 215, interface 220, interface 230, and interface 235 to exchange, share, expose, or otherwise communicate information such as analytic information, which said controller 205 can use to determine improved (e.g., optimal settings) for each network.

In at least one embodiment, computing environment 200 includes network 170, device 175, interface 230, and interface 235. In at least one embodiment, network 170 includes devices such as device 175. In at least one embodiment, software controller 205 can communicate with network 170 and/or devices in network 170 using interface 230 and interface 235. In at least one embodiment, interface 230 and interface 235 includes API, which devices can call or perform to share analytic information. In at least one embodiment, network 170 can communicate or exchange information with radio access network 110, transport network 130, and core network 150, e.g., using APIs or other interfaces.

In at least one embodiment, network 170 includes a MEC, e.g., a type of network architecture that provides cloud computing capabilities and service at an edge of a network (e.g., close to a group of users or away from a core network 150). In at least one embodiment, network 170 (e.g., a MEC) provides video analytics, location services, internet-of-things (IoT), augmented reality, optimized local content distribution, and/or data caching. For example, network 170 includes software applications performed by one or more devices to use local content and real-time information about local-access network conditions to generate analytic data that can be shared with other networks. In at least one embodiment, network 170 includes a MEC that meets industry specification group (ISG) within ETSI. In at least one embodiment, controller 205 receives analytic information from network 170 (e.g., MEC) via interface 230 (e.g., API) interface 235 (e.g., API) and uses that information to determine improved network settings (e.g., optimized end-to-end networks settings) when providing services to devices that use network 170 (MEC).

Figure 3:
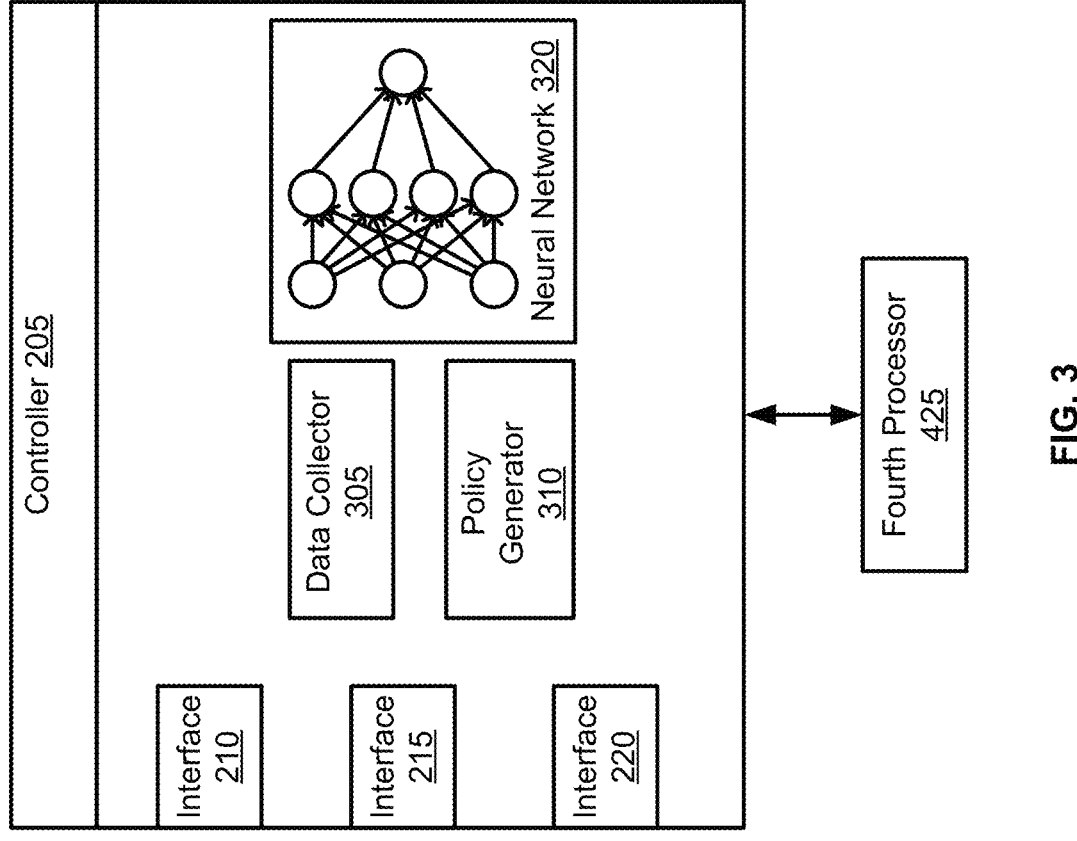
FIG. 3 illustrates a controller from FIG. 2 in more detail, according to at least one embodiment.

FIG. 3 illustrates a controller 205 from FIG. 2 in more detail, according to at least one embodiment. In at least one embodiment, FIG. 3 is an example of controller 205 disclosed in FIG. 2, and controller 205 can be used in computing environment 200 of FIG. 2. In at least one embodiment, controller 205 includes interface 210, interface 215, interface 220, data collector 305, policy generator 310, and neural network 320. In at least one embodiment, controller 205 includes functions that, when performed by one or more processors, cause controller 205 to expose its components and/or data to radio access network 110, transport network 130, and core network 150.

In at least one embodiment, data collector 305 is a database, data structure, or data retaining object that stores information collected from different networks. In at least one embodiment, data collector 305 stores or manages storage for analytic data received from radio network 110, transport network 130, and core network 150. In at least one embodiment, data collector 305 is a software module performed by one or more processors (e.g., fourth processor 425) that provides analytic data to neural network 320.

In at least one embodiment, policy generator 310 is a software module performed by one or more processors to generate policies for radio access network 110, transport network 130, and core network 150. In at least one embodiment, policy generator 310 uses analytic data received from radio network 110, transport network 130, and core network 150 to generate policies for applications or large workloads. In at least one embodiment, policy generator 310 can receive current policies for each network, and then based on those received policies, it can recommend a specific policy or modify an existing policy and transmit said recommended policy to a network. In at least one embodiment, policy generator 310 includes policies for each network related to adjusting security, adjusting power consumption (e.g., energy per bit), adjusting bandwidth for traffic congestion, and adjusting network setting to improve (e.g., optimize) latency.

In at least one embodiment, neural network 320 is performed by one or more processors to generate settings (e.g., optimal settings) for radio access network 110, transport network 130, or core network 150. In at least one embodiment, neural network 320 comprises collections of weights (e.g., organized in matrices or other tensors or otherwise) and code (e.g., graph code) that indicate how weights are to be applied to determine network settings (e.g., optimal network settings for radio access network 110). In at least one embodiment, neural network 320 is a trained neural network that includes a convolution neural network (CNN), recurrent neural network (RNN), and/or a general adversarial network (GAN). In at least one embodiment, neural network 320 comprises nodes, neurons, layers, pooling layers, and/or other components of a neural network such as weights. In at least one embodiment, neural network 320 and can be referred to as a neural model, inferencing model (e.g., to infer network settings), or learning model (e.g., to learn network settings). In at least one embodiment, neural network 320 is one of a plurality of neural networks that are used by controller 205. In at least one embodiment, neural network 320 is trained using received analytic data from each interface 210, 215, and 220.

In at least one embodiment, fourth processor 425 is a processor that performs functions and operations for controller 205, e.g., a CPU. In at least one embodiment, fourth processor 425 comprises a CPU coupled to another processor to form an SoC. For example, said SoC can include a FPGA, an ASIC, a GPU, or a PPU.

Figure 4:
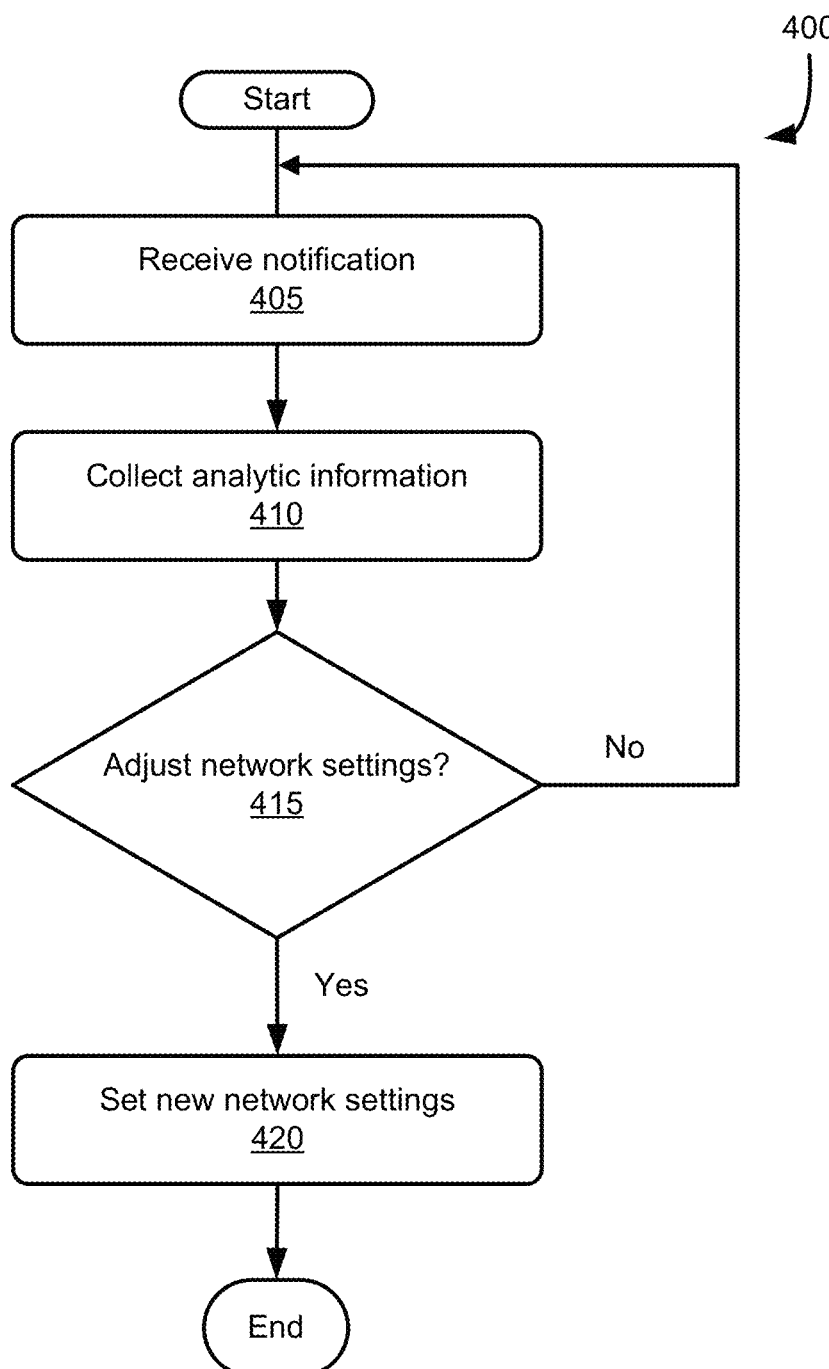
FIG. 4 illustrates a process flow diagram to adjust network settings, according to at least one embodiment.

FIG. 4 illustrates a process flow diagram to adjust settings of a network, according to at least one embodiment. In at least one embodiment, by performing process 400, a processor comprising one or more circuits performs an API to indicate one or more devices within one or more 5G-NR access networks, with which one or more devices within one or more 5G transport networks is to share information; a processor comprising one or more circuits performs an API to indicate one or more devices within one or more 5G-NR access networks, with which one or more devices within one or more 5G core networks is to share information; a processor comprising one or more circuits performs an API to indicate one or more devices within one or more 5G-NR transport networks, with which one or more devices within one or more 5G access networks is to share information; a processor comprising one or more circuits performs an API to indicate one or more devices within one or more 5G-NR transport networks, with which one or more devices within one or more 5G core networks is to share information; a processor comprising one or more circuits performs an API to indicate one or more devices within one or more 5G-NR core networks, with which one or more devices within one or more 5G access networks is to share information; and/or a processor comprising: one or more circuits performs an application programming interface (API) to indicate one or more devices within one or more fifth generation new radio (5G-NR) core networks, with which one or more devices within one or more 5G transport networks is to share information; a processor comprising one or more circuits performs an API to indicate one or more controllers to control one or more devices within one or more 5G access networks; a processor comprising one or more circuits performs an API to indicate one or more controllers to control one or more devices within one or more 5G transport networks; a processor comprising one or more circuits performs an API to cause one or more indications of one or more devices within one or more 5G access networks to be stored; a processor comprising one or more circuits performs an API to cause one or more indications of one or more devices within one or more 5G transport networks to be stored; and/or a processor comprising one or more circuits performs an API to cause one or more indications of one or more devices within one or more 5G core networks to be stored.

In at least one embodiment, systems and components disclosed in FIGS. 1-3 can perform part or all of process 400 or be integrated into process 400. In at least one embodiment, process 400 can be performed concurrently or sequentially with process 500 as disclosed in FIG. 5. In at least one embodiment, systems and processors disclosed in FIGS. 20-59 perform part or all of process 400.

In at least one embodiment, some or all of process 400 (or any other processes described herein, or variations and/or combinations thereof) is performed under control of one or more computer systems configured with computer executable instructions and is implemented as code (e.g., non-transitory computer readable instructions, computer executable instructions, one or more computer programs, or one or more applications) executing collectively on one or more processors, by hardware, software, or combinations thereof. In at least one embodiment, process 400 is performed by hardware disclosed in FIGS. 1-3 such as device 115, device 135, and/or device 155. In at least one embodiment, code is stored on a computer-readable storage medium in form of a computer program comprising a plurality of computer-readable instructions executable by one or more processors. In at least one embodiment, a computer-readable storage medium is a non-transitory computer-readable medium. In at least one embodiment, at least some computer-readable instructions usable to perform process 400 are not stored solely using transitory signals (e.g., a propagating transient electric or electromagnetic transmission). In at least one embodiment, a non-transitory computer-readable medium does not necessarily include non-transitory data storage circuitry (e.g., buffers, caches, and queues) within transceivers of transitory signals. In at least one embodiment, process 400 is performed at least in part on a computer system such as those described elsewhere in this disclosure. In at least one embodiment, logic (e.g., hardware, software, or a combination of hardware and software) performs process 400. In at least one embodiment, process 400 can begin at receive operation 405 and proceeds to collect analytic information operation 410.

At receive operation 405, in at least one embodiment, a device receives notification of a network event. In at least one embodiment, a notification is a message including information about a network event. In at least one embodiment, an event is an action or occurrence that can be identified by a program and has significance for system hardware or software (e.g., devices in a network). In at least one embodiment, an event is a startup of a device, startup of a system, startup of a network, maintenance of a network, shutdown of a system or network, status update, error message, periodic update, periodic status update, or request from administration or user of network. For example, an internal controller or other device in a radio access network can receive a request from a transport network or core network that these networks request to optimize performance, or that these networks are starting up and request to optimize performance. As another example, a controller in a transport network can receive a notification from controller outside of said transport network that said controller is transmitting control signals to different networks and monitoring said networks for optimization. In at least one embodiment, instead of starting process 400 based on an event, one or more devices can start process 400 based on a time period, e.g., every 20 minutes, every day, once before month, or every few seconds. For example, a device in a transport network can transmit a signal to other networks that it is planning to share its analytic data every 20 minutes, every hour, or every day. As another example, a device in a core network can transmit a signal to other networks that it will share its analytic data related to performance of applications every day or every week.

At collect operation 410, in at least one embodiment, one or more devices in one network collect information from other networks. In at least one embodiment, one or more devices in one or more networks perform APIs to share information (e.g., APIs disclosed in FIGS. 6-17), which begins a collect operation 410 at a device within a network. For example, a device in radio access network can perform an API to share information with a device in transport network and/or a device in a core network, where said shared information includes analytic information related to performance of each network. In at least one embodiment, an external controller (e.g., a controller outside of radio access network, transport network, and core network) including one or more processors performs a data collector that stores or manages storage for analytic data received from radio network 110, transport network 130, and core network 150 as shown in FIGS. 1 and 2. In at least one embodiment, one or more devices in radio network 110, transport network 130, and core network 150 as shown in FIGS. 1 and 2 share and collect analytic data based on performing subscription services. For example, one or more devices within one or more 5G-NR access networks call an API to initiate a subscription service, wherein said subscription service performed by one or more processors is to periodically provide analytic information of one or more 5G transport networks to one or more 5G-NR access networks, which causes data to be collected by one or more devices. For example, one or more devices within one or more 5G-NR access networks call an API to initiate a subscription service, wherein said subscription service performed by one or more processors is to periodically provide analytic information from one or more 5G core networks to said one or more 5G-NR access networks.

At adjust decision operation 415, in at least one embodiment, a device including one or more processors determines whether to adjust network settings for one or more networks. If a device determines to adjust network settings, e.g., based on analytic information, a device proceeds to set operation 420. If a device determines not to adjust network settings, process 400 can return to receive operation 405. In at least one embodiment, an internal controller in a radio access network receives analytic data from a transport controller and/or requests to adjust network settings to improve (e.g., optimize) performance, e.g., where said internal controller is a software module performed by one or more processors to adjust devices or network settings for devices only within a network (e.g., not outside a network). In at least one embodiment, network settings include modulation schemes (e.g., for a radio access network), routing settings (e.g., routing table, routing path, and/or routing protocol for devices in a transport network), and application settings (e.g., resolution of images, size of workloads, capacity of processors available to perform operations in a core network). In at least one embodiment, network settings can also include selecting different devices (e.g., a virtual machine versus hardware, or a device with a CPU versus a device with several GPUs) to perform operations in a network. In at least one embodiment, a device performing analytic functions determines whether shared information (e.g., feedback, raw data, analytic data) reaches a threshold or meets a policy such that a change in network settings should be implemented. For example, a MEC network or device can subscribe to RAIE and/or NEF to obtain radio access network and core network specific network analytics and utilize analytics to dynamically optimize its performance, e.g., to modify settings. For example, a radio access network and core network analytics node (e.g., RAIE and NEF/AF) can either feedback raw input from MEC to other RAN/CN nodes (e.g., rApps/xApps running at RICs or CPFs in CN), or RAIE/NEF can derive new RAN/CN specific feedback from MEC input, before disseminating received information to other RAN/CN nodes to cause those nodes to receive information and implement a change. In at least one embodiment, a node in a network includes an internal controller that is configured to receive shared information, determine whether such shared information triggers a policy change or satisfies criteria to implement a change (e.g., demand has increased, latency has increased, resolution is below a threshold), and adjust said network devices to meet new criteria.

At set operation 420, in at least one embodiment, a device including a processor receives adjusted network settings from adjust decision operation 415 and uses those settings (e.g., control signals) to establish network settings. In at least one embodiment, a device in a radio access network modifies a modulation scheme of one or more 5G-NR access networks based, at least in part, on receiving shared information from a transport network or a core network. In at least one embodiment, a device in a transport network analytic provided information to modify a routing table of one or more devices within one or more 5G-NR transport networks. In at least one embodiment, a device in a core network including a processor modifies network performance settings of an application based, at least in part, on analytic information, and said application is performed in one or more 5G-NR core networks. In at least one embodiment, transport network including a device with a processor adjusts a protocol or selects a new protocol used by transport network to improve (e.g., optimize) performance based on analytic data, and such protocol can be selected from WDM, PAM4, tunneling protocols including MPLS and SR-MPLS, and VXLAN, and/or routing algorithms including OSPF and Border Gateway Protocol BGP. In at least one embodiment, radio access network 110 includes a device that selects which modulation scheme to be used, and said device can change that modulation scheme based on analytic data that determines whether performance can be improved (e.g., single-sideband, vestigial-side band, self-phase modulation).

In at least one embodiment, after set operation 420, a device (e.g., controller in a network such as an internal controller or external controller outside of a network) including a processor can stop or end process 400. In at least one embodiment, a device continues to perform process 400, e.g., to continue to improve (e.g., optimize) network performance from end-to-end based on received analytic information as long as application services is provided. For example, a 5G-NR service provider can continue to use devices to perform process 400 while providing a hosted video game or mathematics computing service.

Figure 5:
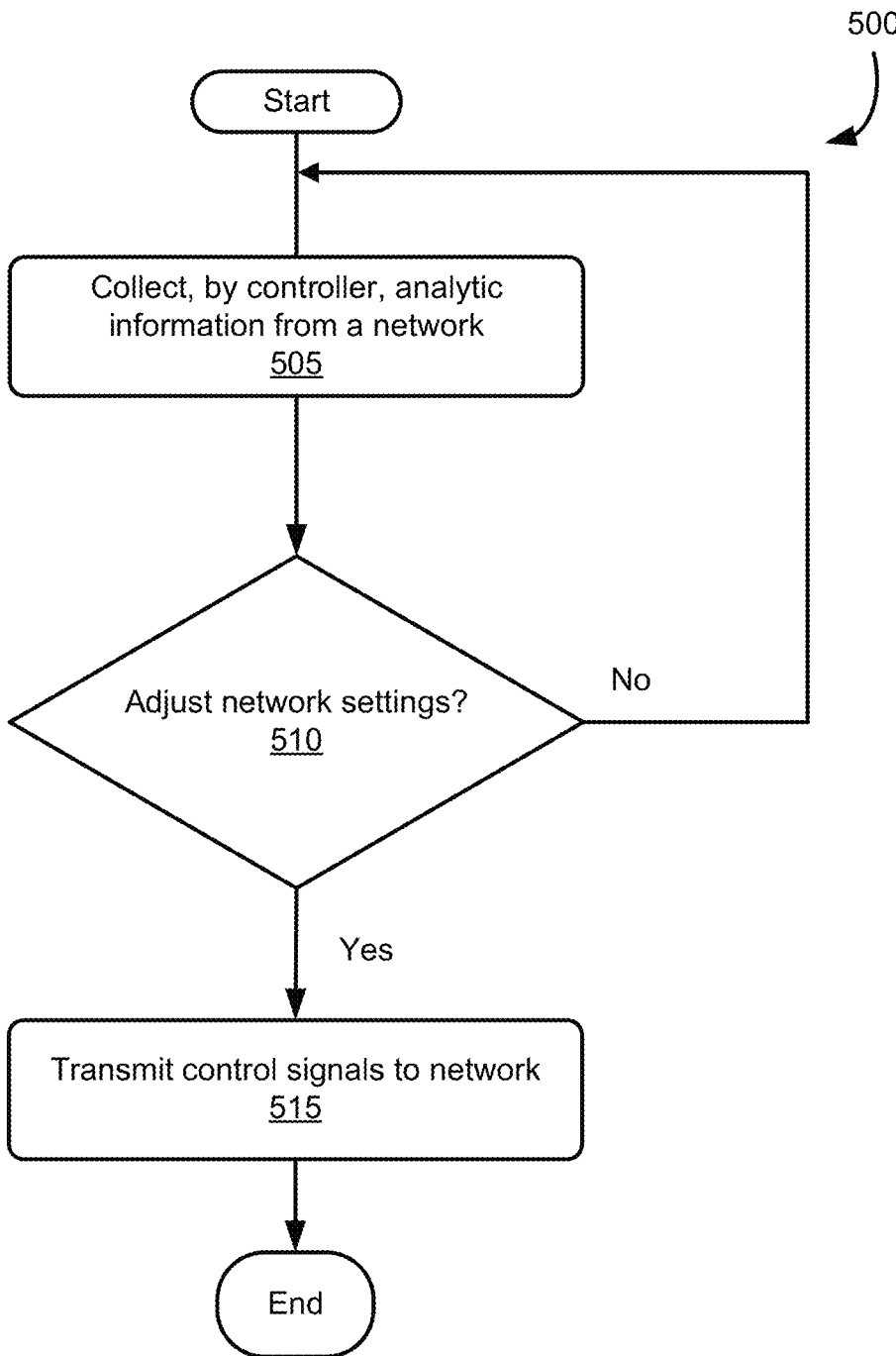
FIG. 5 illustrates a process flow diagram to adjust network settings, according to at least one embodiment.

FIG. 5 illustrates another process flow diagram to adjust network settings, according to at least one embodiment. In at least one embodiment, by performing process 500, a processor comprising one or more circuits performs an API to indicate one or more devices within one or more 5G-NR access networks, with which one or more devices within one or more 5G transport networks is to share information; a processor comprising one or more circuits performs an API to indicate one or more devices within one or more 5G-NR access networks, with which one or more devices within one or more 5G core networks is to share information; a processor comprising one or more circuits performs an API to indicate one or more devices within one or more 5G-NR transport networks, with which one or more devices within one or more 5G access networks is to share information; a processor comprising one or more circuits performs an API to indicate one or more devices within one or more 5G-NR transport networks, with which one or more devices within one or more 5G core networks is to share information; a processor comprising one or more circuits performs an API to indicate one or more devices within one or more 5G-NR core networks, with which one or more devices within one or more 5G access networks is to share information; and/or a processor comprising: one or more circuits performs an application programming interface (API) to indicate one or more devices within one or more fifth generation new radio (5G-NR) core networks, with which one or more devices within one or more 5G transport networks is to share information; a processor comprising one or more circuits performs an API to indicate one or more controllers to control one or more devices within one or more 5G access networks; a processor comprising one or more circuits performs an API to indicate one or more controllers to control one or more devices within one or more 5G transport networks; a processor comprising one or more circuits performs an API to cause one or more indications of one or more devices within one or more 5G access networks to be stored; a processor comprising one or more circuits performs an API to cause one or more indications of one or more devices within one or more 5G transport networks to be stored; and/or a processor comprising one or more circuits performs an API to cause one or more indications of one or more devices within one or more 5G core networks to be stored.

In at least one embodiment, systems and components disclosed in FIGS. 1-3 can perform part or all of process 500 or be integrated into process 500. In at least one embodiment, process 500 can be performed concurrently or sequentially with process 400 as disclosed in FIG. 4. In at least one embodiment, systems and processors disclosed in FIGS. 20-59 perform part or all of process 500.

In at least one embodiment, some or all of process 500 (or any other processes described herein, or variations and/or combinations thereof) is performed under control of one or more computer systems configured with computer executable instructions and is implemented as code (e.g., non-transitory computer readable instructions, computer executable instructions, one or more computer programs, or one or more applications) executing collectively on one or more processors, by hardware, software, or combinations thereof. In at least one embodiment, process 500 is performed by hardware disclosed in FIGS. 1-3 such as device 115, device 135, and/or device 155. In at least one embodiment, code is stored on a computer-readable storage medium in form of a computer program comprising a plurality of computer-readable instructions executable by one or more processors. In at least one embodiment, a computer-readable storage medium is a non-transitory computer-readable medium. In at least one embodiment, at least some computer-readable instructions usable to perform process 500 are not stored solely using transitory signals (e.g., a propagating transient electric or electromagnetic transmission). In at least one embodiment, a non-transitory computer-readable medium does not necessarily include non-transitory data storage circuitry (e.g., buffers, caches, and queues) within transceivers of transitory signals. In at least one embodiment, process 500 is performed at least in part on a computer system such as those described elsewhere in this disclosure. In at least one embodiment, logic (e.g., hardware, software, or a combination of hardware and software) performs process 500. In at least one embodiment, process 500 can begin at collect operation 505 and proceeds to adjust decision 510.

At collect operation 505, in at least one embodiment, a controller outside a network (e.g., controller 205 in FIGS. 2 and 3) receives notification of a network event. In at least one embodiment, one or more controllers in one or more networks perform APIs to share information (e.g., APIs disclosed in FIGS. 6-17), which begins a collect operation 505 at a controller outside. For example, an external controller can perform an API to share (e.g., receive and transmit) information with a device in an access network, transport network, and/or a core network, where said shared information includes analytic information related to performance of each network. In at least one embodiment, an external controller (e.g., a controller outside of radio access network, transport network, and core network) including one or more processors performs a data collector that stores or manages storage for analytic data received from radio network 110, transport network 130, and core network 150 as shown in FIGS. 1 and 2. In at least one embodiment, one or more devices in radio network 110, transport network 130, and core network 150 as shown in FIGS. 1 and 2 share and collect analytic data based on performing subscription services. For example, one or more devices within one or more 5G-NR access networks call an API to initiate a subscription service, wherein said subscription service performed by one or more processors is to periodically provide analytic information of one or more 5G transport networks to one or more 5G-NR access networks, which causes data to be collected by one or more devices. For example, one or more devices within one or more 5G-NR access networks call an API to initiate a subscription service, wherein said subscription service performed by one or more processors is to periodically provide analytic information from one or more 5G core networks to said one or more 5G-NR access networks.

At adjust decision 510, in at least one embodiment, a controller comprising a processor determines whether settings of a network should be adjusted. A device including one or more processors determines whether to adjust network settings for one or more networks. If a controller determines to adjust network settings, e.g., based on analytic information, a controller proceeds to transmit operation 515 to send control signals to one or more networks to adjust said network settings. If a controller determines not to adjust network settings, process 500 can return to receive operation 505. In at least one embodiment, a controller outside a radio access network receives analytic data from a transport controller and/or requests to adjust network settings to improve network performance (e.g., optimize performance), and said external controller (e.g., controller 205 in FIGS. 2 and 3) determines settings for said one or more networks. In at least one embodiment, network settings include modulation schemes (e.g., for a radio access network), routing settings (e.g., routing table, routing path, and/or routing protocol for devices in a transport network), and application settings (e.g., resolution of images, size of workloads, and/or capacity of processors available to perform operations in a core network). In at least one embodiment, network settings can also include selecting different devices (e.g., a virtual machine versus hardware, or a device with a CPU versus a device with several GPUs) to perform operations in a network. For example, an external application (e.g., MEC) can subscribe to RAIE and/or NEF to obtain radio access network and core network specific network analytics and utilize analytics to dynamically optimize its performance, e.g., to modify settings. For example, a radio access network and core network analytics node (e.g., RAIE and NEF/AF) can either feedback raw input from MEC to other RAN/CN nodes (e.g., rApps/xApps running at RICs or CPFs in CN), or RAIE/NEF can derive new RAN/CN specific feedback from MEC input, before disseminating received information to other RAN/CN nodes to cause those nodes to receive information and implement a change. In at least one embodiment, a node in a network includes an internal controller that is configured to receive shared information, determine whether such shared information triggers a policy change or satisfies criteria to implement a change (e.g., demand has increased, latency has increased, resolution is below a threshold), and adjust said network devices to meet new criteria.

At transmit operation 515, in at least one embodiment, a device (e.g., controller) including a processor receives adjusted network settings from adjust decision operation 515 and uses those settings (e.g., control signals) to transmit control signals to one or more networks to cause said networks (e.g., devices with said networks) to adjust network settings. In at least one embodiment, a controller outside a radio access network sends control signals to a radio access network to adjust modulation schemes. In at least one embodiment, a controller outside a transport network transits control signals to a transport network to adjust routing settings (e.g., routing table, routing path, and/or routing protocol for devices in a transport network). In at least one embodiment, application settings (e.g., resolution of images, size of workloads, capacity of processors available to perform operations in a core network) are included. In at least one embodiment, network settings can also include selecting different devices (e.g., a virtual machine versus hardware, a device with a CPU versus a device with several GPUs) to perform operations in a network.

In at least one embodiment, after transmit operation 515, a device (e.g., controller in a network, or external controller) including a processor can stop or end process 500. In at least one embodiment, a device continues to perform process 500, e.g., to continue to improve (e.g., optimize) network performance from end-to-end based on received analytic information as long as application services are provided. For example, a 5G-NR service provider can continue to use devices to perform process 500 while providing a hosted video game or mathematics computing service.

In at least one embodiment, APIs disclosed in FIGS. 6-17 can be used by devices individually or in combination. For example, devices in radio networks, transport networks, and core networks can call an API in FIG. 6 alone or call APIs in FIGS. 6-17 together (e.g., sequentially or in parallel) as part of a process to improve (e.g., optimize) network performance. In at least one embodiment, a device calls APIs disclosed in FIGS. 6-17 when an event occurs (e.g., in response to an event occurring), e.g., startup, optimization process, error, request from one network to another. In at least one embodiment, API 610, API 710, API 810, API 910, API 1010, API 1110, API 1210, API 1310, API 1410, API 1510, API 1610, and API 1710 include inputs, outputs, and when performed by one or more processors causes devices to perform operations. In at least one embodiment, inputs for API 610, API 710, API 810, API 910, API 1010, API 1110, API 1210, API 1310, API 1410, API 1510, API 1610, and API 1710 can be an IP address of device that requests to receive information, an event or trigger that causes an API to be performed, a type of information to be requested (e.g., latency performance, bandwidth performance, user experience data for workloads performed by network), control information (e.g., a request for control signals), or other information to cause two networks to exchange information. In at least one embodiment, outputs for API 610, API 710, API 810, API 910, API 1010, API 1110, API 1210, API 1310, API 1410, API 1510, API 1610, and API 1710 can be IP address of a device, a confirmation that information (e.g., analytic data) will be shared, information (e.g., analytic data), indications of where information is stored (e.g., memory address), a function or code to be performed, a subscription service, or other outputs to cause an exchange of information between two networks. In at least one embodiment, a processor performing API 610, API 710, API 810, API 910, API 1010, API 1110, API 1210, API 1310, API 1410, API 1510, API 1610, and API 1710 can cause tables (e.g., lookup tables for analytic data, lookup tables for control signals, lookup tables for policies) to be modify or read. In at least one embodiment, API 610, API 710, API 810, API 910, API 1010, API 1110, API 1210, API 1310, API 1410, API 1510, API 1610, and API 1710 or subscription services between networks include bi-directional flow of information because information can be sent or received in either direction (e.g., from radio access network to transport network or vice versa; from transport network to core network or vice versa; from radio access network to core network or vice versa). In at least one embodiment, an API to indicate information or indicate a device includes providing a network address, for instance, a uniform resource identifier (URI) or uniform resource locator (URL) that is resolved by a domain name system (DNS) to obtain an IP address. In at least one embodiment, a computer-readable medium stores an API that, if performed by one or more processors, cause instructions to be performed, where said instructions including operations disclosed in API 610, API

710, API 810, API 910, API 1010, API 1110, API 1210, API 1310, API 1410, API 1510, API 1610, and API 1710.

Figure 6:
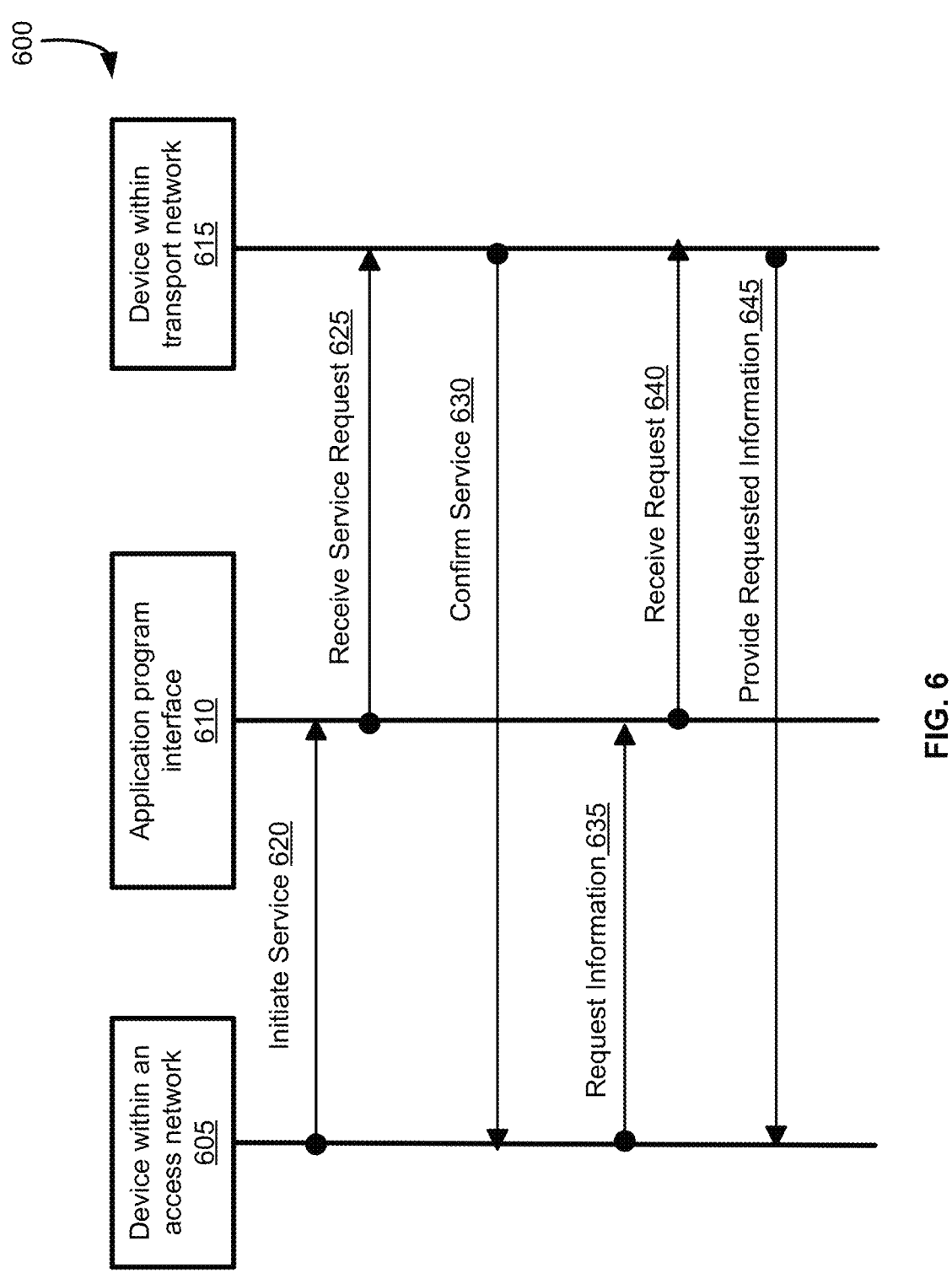
FIG. 6 illustrates a call-flow diagram for an API to cause a device within an access network to share information with a device within a transport network, according to at least one embodiment.

FIG. 6 illustrates a call-flow diagram 600 for an API to cause a device within an access network to share information with a device within a transport network, according to at least one embodiment. In at least one embodiment, by performing part or all of call-flow diagram 600, a processor comprising one or more circuits performs an API to indicate one or more devices within one or more 5G-NR access networks, with which one or more devices within one or more 5G transport networks is to share information. In at least one embodiment, to indicate includes providing an IP address of one or more devices within one or more 5G-NR access networks to a device within a transport network (e.g., internal controller).

In at least an embodiment, a device including a processor calls API 610 to perform call-flow diagram 600. In at least one embodiment, a device within an access network 605 can be a scheduling device or an internal controller, e.g., a controller for a radio access network (e.g., radio access network 110). For example, a hardware device that controls network settings or devices for radio access network calls API 610 to determine whether it can adjust network settings to improve (e.g., optimize) performance of said radio access network. In at least one embodiment, API 610 includes one or more operations that include initiating, requesting, receiving, exposing, or otherwise exchanging information between a device within access network 605 and a device within transport network 615. In at least one embodiment, API 610 includes operations to: initiate service 620 (e.g., initiate a subscription service to periodically share or initiate a service based on an event occurring to share information with a device within transport network 615), receive service request 625 (e.g., based on a processor performing API 610, device within a transport network 615 receives service request to initiate a process such as sharing information including analytic information), confirm service 630 (e.g., a packet of information or API that causes service to be confirmed), request information 635 (e.g., request analytic information from a device within transport network 615), receive request 640 (e.g., API 610 transmits a request from device within an access network 605 to device within transport network 615), and provide requested information 645 (e.g., providing analytic information from a device within a transport network 605 to a device within an access network 615). In at least one embodiment, a device performing API 610 causes sharing of information that includes analytic information of performance of one or more 5G transport networks. In at least one embodiment, a device using API 610 to indicate includes providing an IP address of one or more devices within one or more 5G-NR access networks (e.g., to a device within a transport network). In at least one embodiment, a device performing API 610 calls said API to initiate a subscription service, where said subscription service performed by one or more processors is to periodically provide analytic information of one or more 5G transport networks to one or more 5G-NR access networks. In at least one embodiment, a device performs API 610 including sharing information that includes analytic data, where one or more devices within one or more 5G-NR access networks adjust settings of said one or more 5G-NR access networks based on said analytic data. In at least one embodiment, a device uses API 610 to modify a modulation scheme of said one or more 5G-NR access networks based on received analytic information from a transport network.

Figure 7:
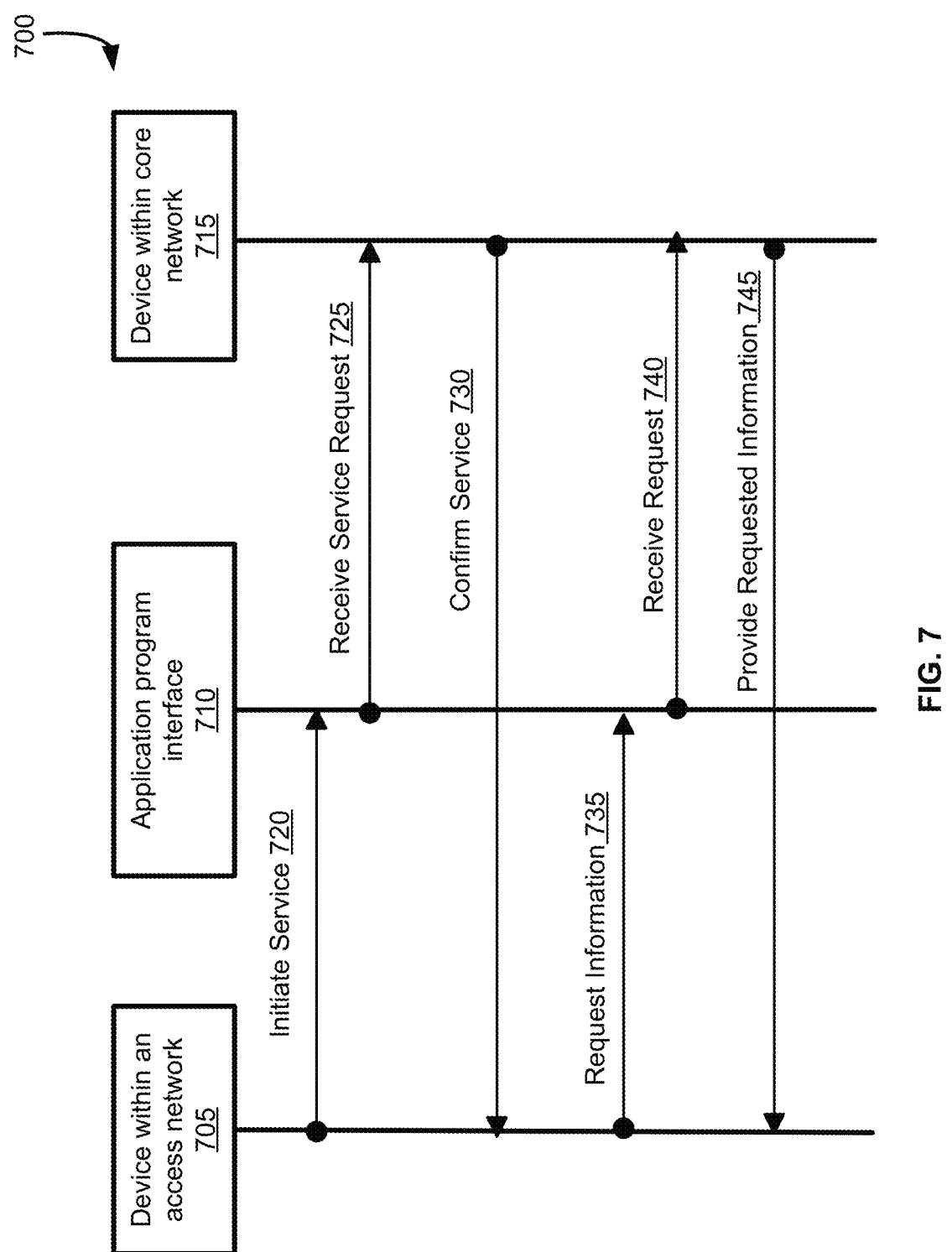
FIG. 7 illustrates a call-flow diagram for an API to cause a device within an access network to share information with a device within a core network, according to at least one embodiment.

FIG. 7 illustrates a call-flow diagram 700 for an API to cause a device within an access network to share information with a device within a core network, according to at least one embodiment. In at least one embodiment, by performing part or all of call-flow diagram 700, a processor comprising one or more circuits performs an API to indicate one or more devices within one or more 5G-NR access networks, with which one or more devices within one or more 5G core networks is to share information. In at least one embodiment, API 710 includes one or more operations performed by one or more processors that include requesting, receiving, exposing, or otherwise exchanging information between device within access network 705 and device within core network 715. In at least one embodiment, API 710 includes operations to: initiate service 720 (e.g., initiate a subscription service periodically or based on an event occurring to receive information from a device or share information with a device within transport network 715), receive service request 725 (e.g., based on a processor performing API 610, device within a transport network 715 receives service request to initiate a process such as sharing information including analytic information), confirm service 730 (e.g., a packet of information or API that causes service to be confirmed), request information 635 (e.g., request analytic information from a device within transport network 715), receive request 740 (e.g., API 710 transmits a request from device within a access network 705 to device within transport network 715), and provide requested information 745 (e.g., providing analytic information from a device within a transport network 705 to a device within an access network 715). In at least one embodiment, a device 705 performs API 715 to share information that includes analytic information of performance of one or more 5G core networks. In at least one embodiment, a device 705 performs API 715 to indicate information, which includes providing an IP address of one or more devices within one or more 5G-NR access networks (e.g., to a core network). In at least one embodiment, device 705 calls API 715 to initiate a subscription service, where said subscription service performed by one or more processors is to periodically provide analytic information of one or more 5G core networks to one or more 5G-NR access networks. In at least one embodiment, device 705 performs API 715 to share information that includes analytic data, wherein one or more devices within one or more 5G-NR access networks adjust settings of said one or more 5G-NR access network based on said received analytic data (e.g., to adjust a modulation scheme).

Figure 8:
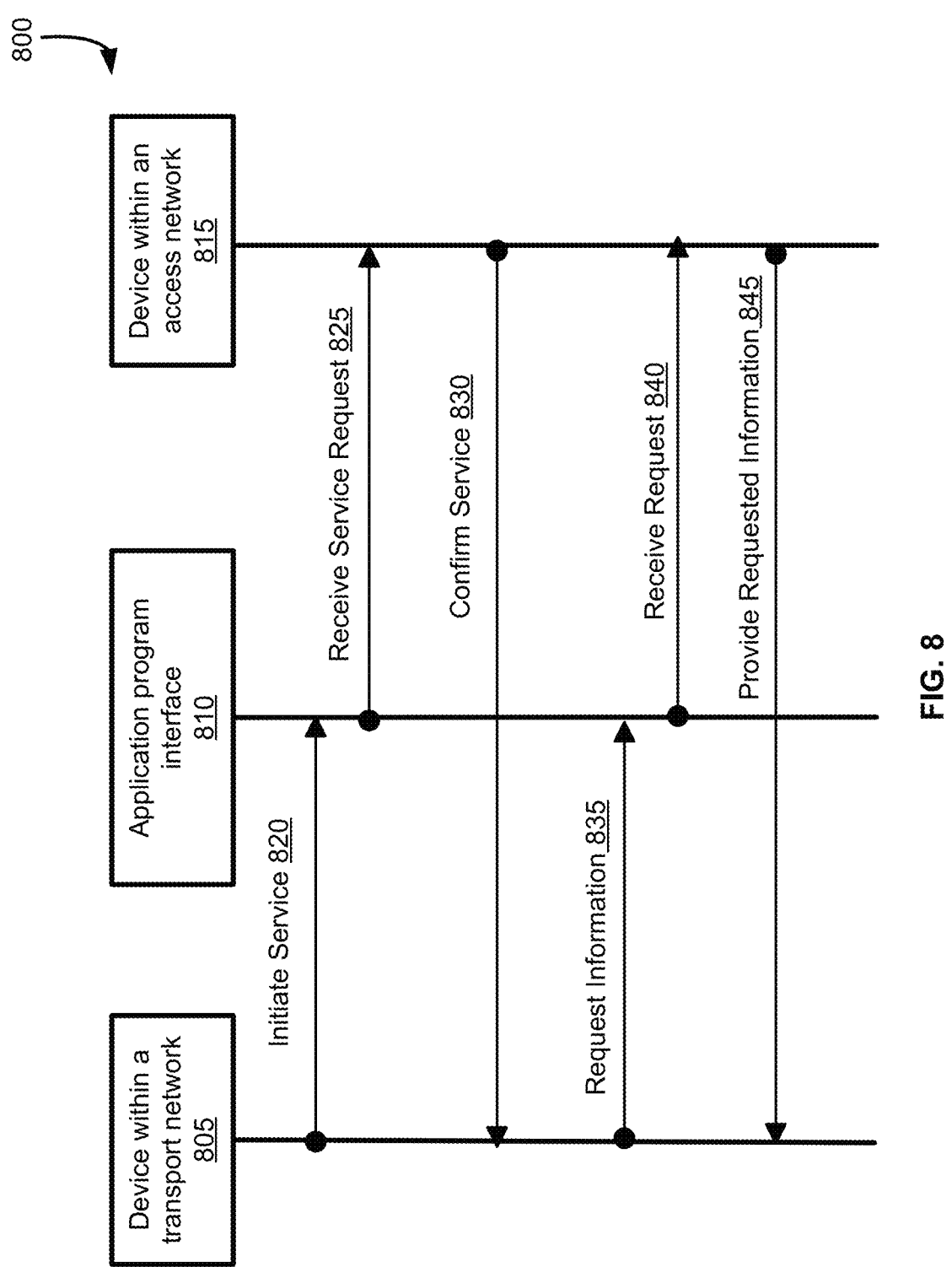
FIG. 8 illustrates a call-flow diagram for an API to cause a device within a transport network to share information with a device within an access network, according to at least one embodiment.

FIG. 8 illustrates a call-flow diagram 800 for an API to cause a device within a transport network to share information with a device within an access network, according to at least one embodiment. In at least one embodiment, by performing part or all of call-flow diagram 800, a processor comprising one or more circuits performs an API to indicate one or more devices within one or more 5G-NR transport networks, with which one or more devices within one or more 5G access networks is to share information. In at least one embodiment, API 810 includes one or more operations performed by one or more processors that include requesting, receiving, exposing, or otherwise exchanging information between device within transport network 805 and device within access network 815. In at least one embodiment, API 810 includes operations to: initiate service 820 (e.g., initiate a subscription service to periodically provide analytic information or initiate a service based on an event occurring to receive information from a device or share information with a device within an access network 815), receive service request 825 (e.g., based on a processor performing API 810, a device within an access network 815 receives service request to initiate a process such as sharing information including analytic information), confirm service 830 (e.g., a packet of information or API that causes service to be confirmed), request information 835 (e.g., request analytic information from a device within access network 815), receive request 840 (e.g., API 810 transmits a request from device within a transport network 805 to device within transport network 815), and provide requested information 845 (e.g., providing analytic information from a device within access network 815 to a device within a transport network 805).

Figure 9:
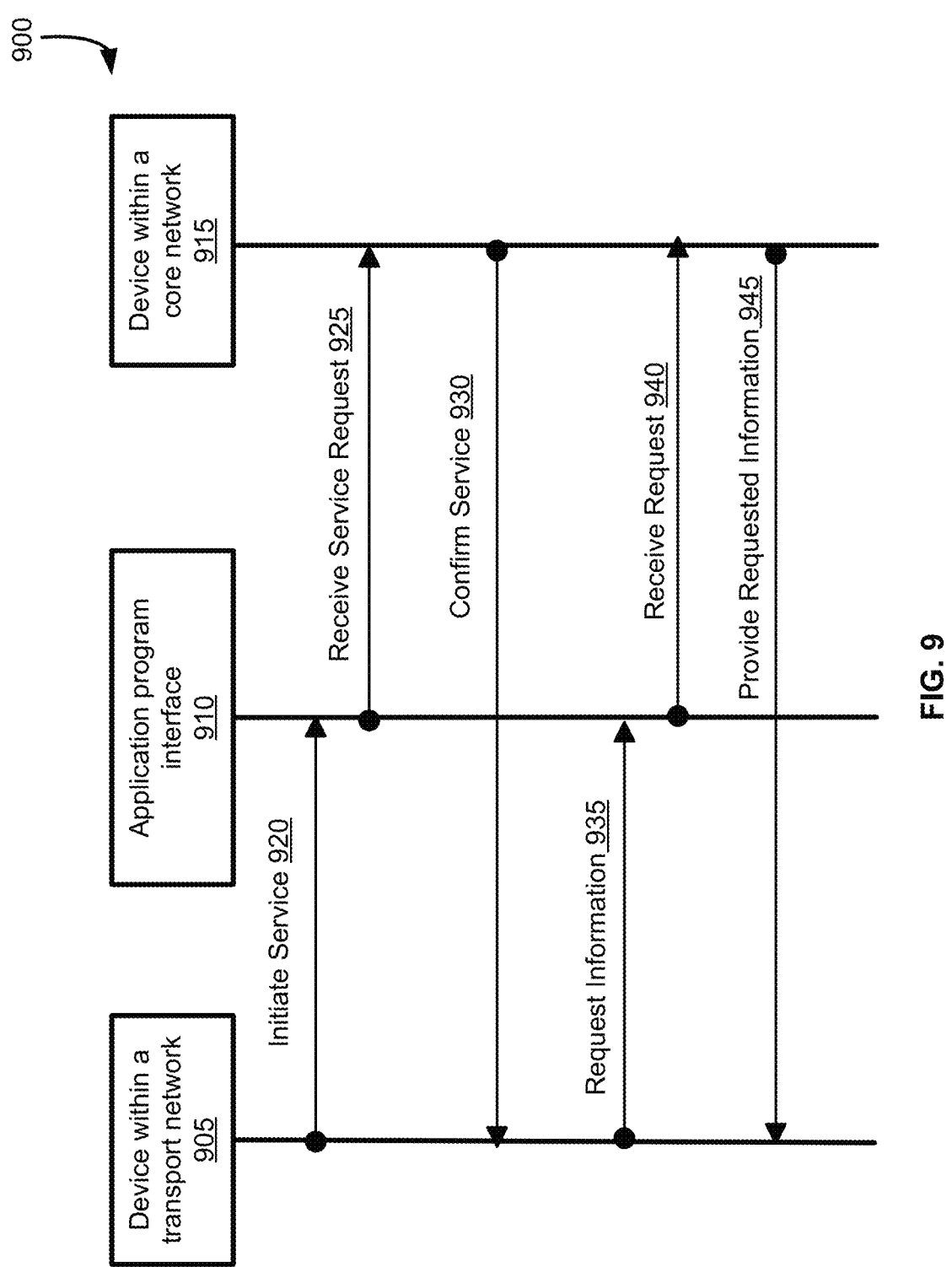
FIG. 9 illustrates a call-flow diagram for an API to cause a device within a transport network to share information with a device within a core network, according to at least one embodiment.

FIG. 9 illustrates a call-flow diagram 900 for an API to cause a device within a transport network to share information with a device within a core network, according to at least one embodiment. In at least one embodiment, by performing part or all of call-flow diagram 900, a processor comprising one or more circuits is to perform an API to indicate one or more devices within one or more 5G-NR transport networks, with which one or more devices within one or more 5G core networks is to share information. In at least one embodiment, API 910 includes one or more operations performed by one or more processors that include requesting, receiving, exposing, or otherwise exchanging information between device within transport network 905 and device within core network 915. In at least one embodiment, API 910 includes operations to: initiate service 920 (e.g., initiate a subscription service to periodically provide analytic information or initiate a service based on an event occurring to receive information from a device or share information with a device within a core network 915), receive service request 925 (e.g., based on a processor performing API 910, a device within a core network 915 receives a service request to initiate a process such as sharing information, including analytic information, with a device within a transport network 905), confirm service 930 (e.g., a packet of information or API operation that causes service to be confirmed), request information 935 (e.g., request analytic information from a device within a core network 915), receive request 940 (e.g., a device performing API 910 transmits a request from device within a transport network 905 to device within core network 915), and provide requested information 945 (e.g., providing analytic information from a device within core network 915 to a device within a transport network 905). In at least one embodiment, a device performing API 915 causes sharing of information that includes analytic information of performance of one or more 5G core networks with a transport network. In at least one embodiment, a device performing API 915 includes indicating information, where indicating includes to provide an IP address of one or more devices within one or more 5G-NR transport networks to one or more devices within one or more 5G core networks. In at least one embodiment, a device calls API 915 to initiate a subscription service, where said subscription service performed by one or more processors is to periodically provide analytic information of one or more 5G core networks to one or more 5G-NR transport networks. In at least one embodiment, a device performing API 915 causes sharing of information that includes analytic data, where one or more devices within one or more 5G transport networks are to adjust settings of said one or more 5G transport networks based on said analytic data. In at least one embodiment, a device performing API 915 can use received information to modify a routing table of one or more devices within one or more 5G-NR transport networks (e.g., to optimize performance of end-to-end communications).

Figure 10:
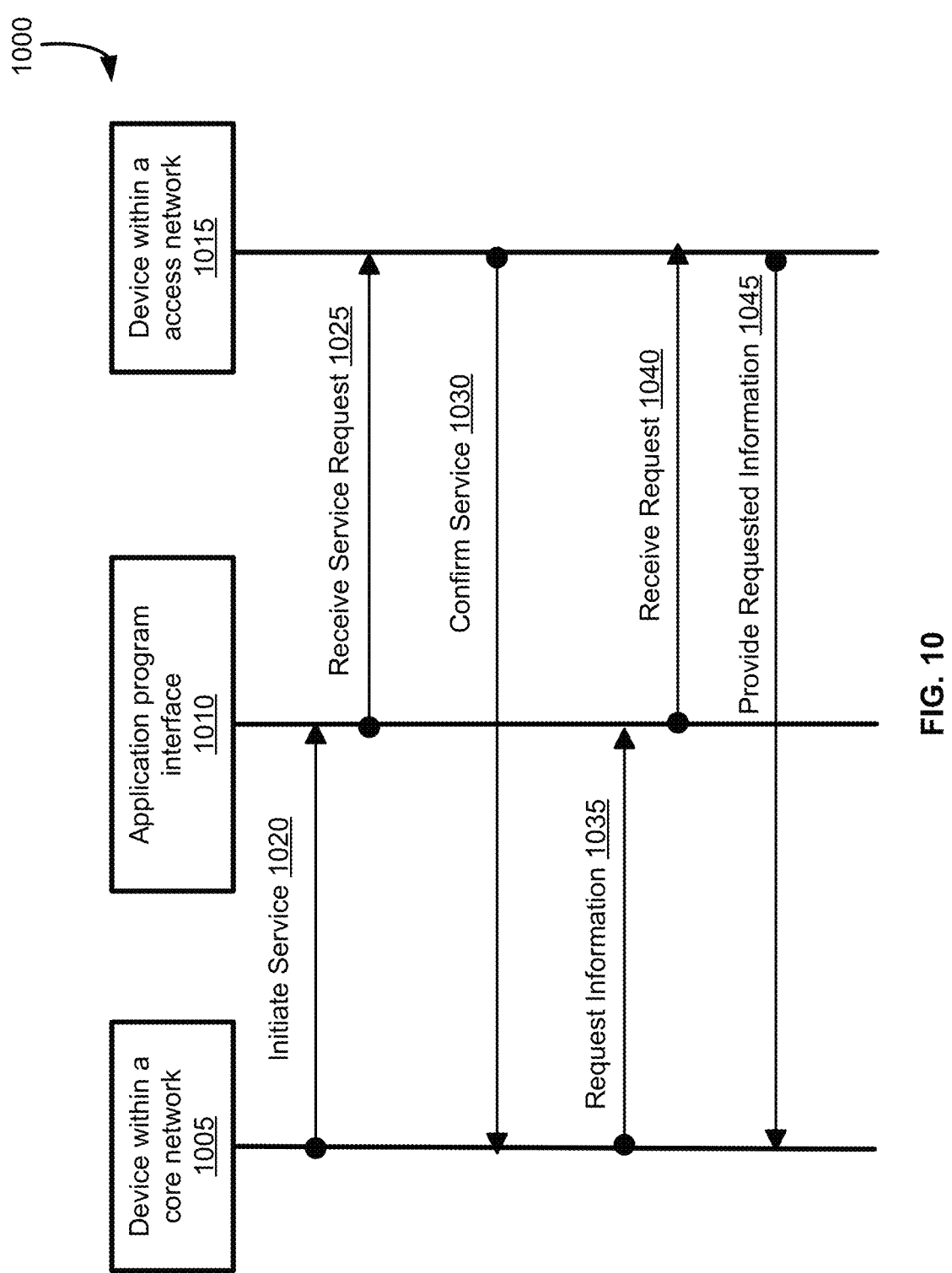
FIG. 10 illustrates a call-flow diagram for an API to cause a device within a core network to share information with a device within an access network, according to at least one embodiment.

FIG. 10 illustrates a call-flow diagram 1000 for an API to cause a device within a core network to share information with a device within an access network, according to at least one embodiment. In at least one embodiment, by performing part of all of call-flow diagram 1000, a processor comprising one or more circuits performs an API to indicate one or more devices within one or more 5G-NR core networks, with which one or more devices within one or more 5G access networks is to share information. In at least one embodiment, API 1000 includes one or more operations performed by one or more processors that include requesting, receiving, exposing, or otherwise exchanging information between device within core network 1005 and device within access network 1015. In at least one embodiment, API 1015 includes operations to: initiate service 1020 (e.g., initiate a subscription service to periodically provide analytic information or initiate a service based on an event occurring to receive information from a device or share information with a device within an access network 1015), receive service request 1025 (e.g., based on a processor performing API 1010, a device within an access network 1015 receives a service request to initiate a process such as sharing information including analytic information with a device within a core network 1005), confirm service 1030 (e.g., a packet of information or API operation that causes service to be confirmed), request information 1035 (e.g., request analytic information from a device within an access network 1015), receive request 1040 (e.g., a device performing API 1010 transmits a request from device within a core network 1005 to device within an access network 1015), and provide requested information 1045 (e.g., providing analytic information from a device within an access network 1015 to a device within a core network 1005). In at least one embodiment, a device performing API 1010 causes sharing of information that includes analytic information of performance of one or more 5G access networks. In at least one embodiment, a device performing API 1010 causes a device to indicate information that includes an IP address of one or more devices within one or more 5G-NR core networks. In at least one embodiment, one or more devices within one or more 5G-NR core networks call API 1010 to initiate a subscription service, where said subscription service performed by one or more processors is to periodically provide analytic information of one or more 5G access networks to one or more 5G-NR core networks. In at least one embodiment, a device performing API 1010 causes sharing of information that includes analytic data, where one or more devices within one or more 5G core networks are to adjust settings of one or more 5G core networks based on said analytic data. In at least one embodiment, a device performing API 1010 can result in a device modifying a routing table of one or more devices within one or more 5G-NR transport networks based on provided (e.g., shared) information.

Figure 11:
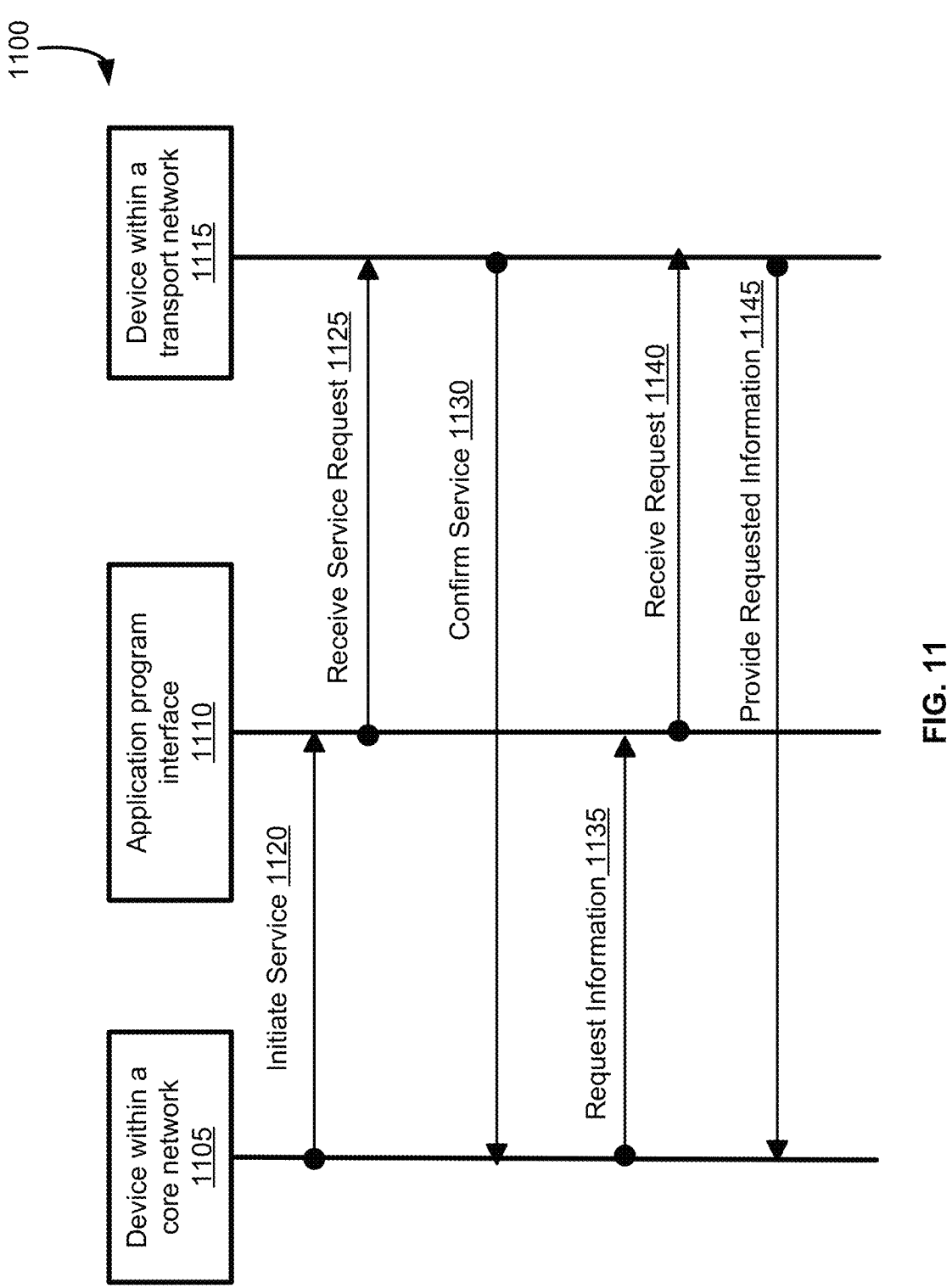
FIG. 11 illustrates a call-flow diagram for an API to cause a device within a core network to share information with a device within a transport network, according to at least one embodiment.

FIG. 11 illustrates a call-flow diagram 1100 for an API to cause a device within a core network to share information with a device within a transport network, according to at least one embodiment. In at least one embodiment, by performing part or all of call-flow diagram 1100, a processor comprising one or more circuits to perform an API to indicate one or more controllers to control one or more devices within one or more 5G access networks. In at least one embodiment, API 1100 includes one or more operations performed by one or more processors that include requesting, receiving, exposing, or otherwise exchanging information between device within core network 1105 and device within a transport network 1105.

In at least one embodiment, API 1115 includes operations to: initiate service 1120 (e.g., initiate a subscription service to periodically provide analytic information or initiate a service based on an event occurring to receive information from a device within a transport network 1115), receive service request 1125 (e.g., based on a processor performing API 1110, a device within a core network 1115 receives a service request to initiate a process such as sharing information including analytic information with a device within a core network 1105), confirm service 1130 (e.g., a packet of information or API operation that causes service to be confirmed), request information 1135 (e.g., request analytic information from a device within an access network 1115), receive request 1140 (e.g., a device performing API 1110 transmits a request from device within a core network 1105 to device within a transport network 1115), and provide requested information 1145 (e.g., providing analytic information from a device within a transport network 1115 to a device within a core network 1105). In at least one embodiment, a device calls API 1115 to initiate a subscription service, where said subscription service performed by one or more processors is to periodically provide analytic information of one or more 5G transport networks to one or more 5G-NR core networks. In at least on embodiment, a device performing API 115 results in one or more devices within one or more 5G-NR core networks modifying performance settings of an application based, at least in part, on shared information, and wherein an application is performed by one or more devices in one or more 5G-NR core networks.

Figure 12:
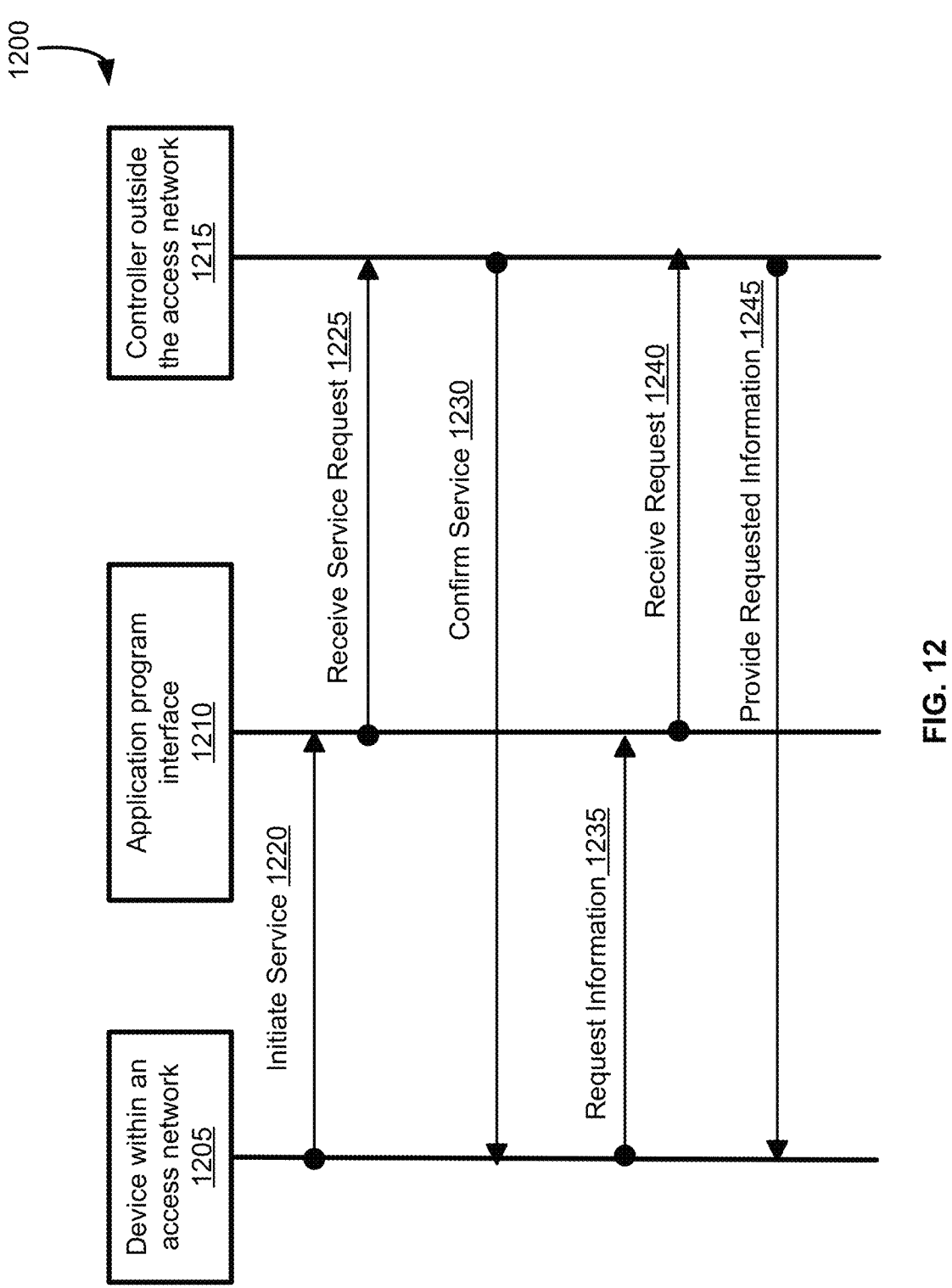
FIG. 12 illustrates a call-flow diagram for an API to cause a device within an access network to share information with a controller outside said access network, according to at least one embodiment.

FIG. 12 illustrates a call-flow diagram 1200 for an API to cause a device within an access network to share information with a controller outside said access network, according to at least one embodiment. In at least one embodiment, by performing part or all of call-flow diagram 1200, a processor comprising one or more circuits performs an API to indicate one or more controllers to control one or more devices within one or more 5G transport networks. In at least one embodiment, API 1210 includes one or more operations performed by one or more processors that include requesting, receiving, exposing, or otherwise exchanging information between device (e.g., controller) within access network 1205 and a controller outside an access network 1215.

In at least one embodiment, API 1210 includes operations to: initiate service 1120 (e.g., initiate a subscription service to periodically provide control signals from a controller outside of access network 1215, where said control signals are based on received analytic information at controller 1215), receive service request 1225 (e.g., based on a processor performing API 1210, a controller outside an access network receives a service request to initiate control operations to optimize network performance), confirm service 1230 (e.g., a packet of information or API operation that causes service to be confirmed), request information 1235 (e.g., request control signals from controller 1215), receive request 1240 (e.g., a device performing API 1210 transmits a request from device within an access network 1205 to a controller outside network 1215), and provide requested information 1245 (e.g., provide control signals). In at least one embodiment, one or more devices calling or performing API 1210 include one or more controllers outside of one or more 5G access networks, e.g., where one or more controllers are performed by one or more virtual machines. In at least one embodiment, provide requested information 1245 includes providing indications including network settings generated by one or more controllers outside one or more 5G access networks.

Figure 13:
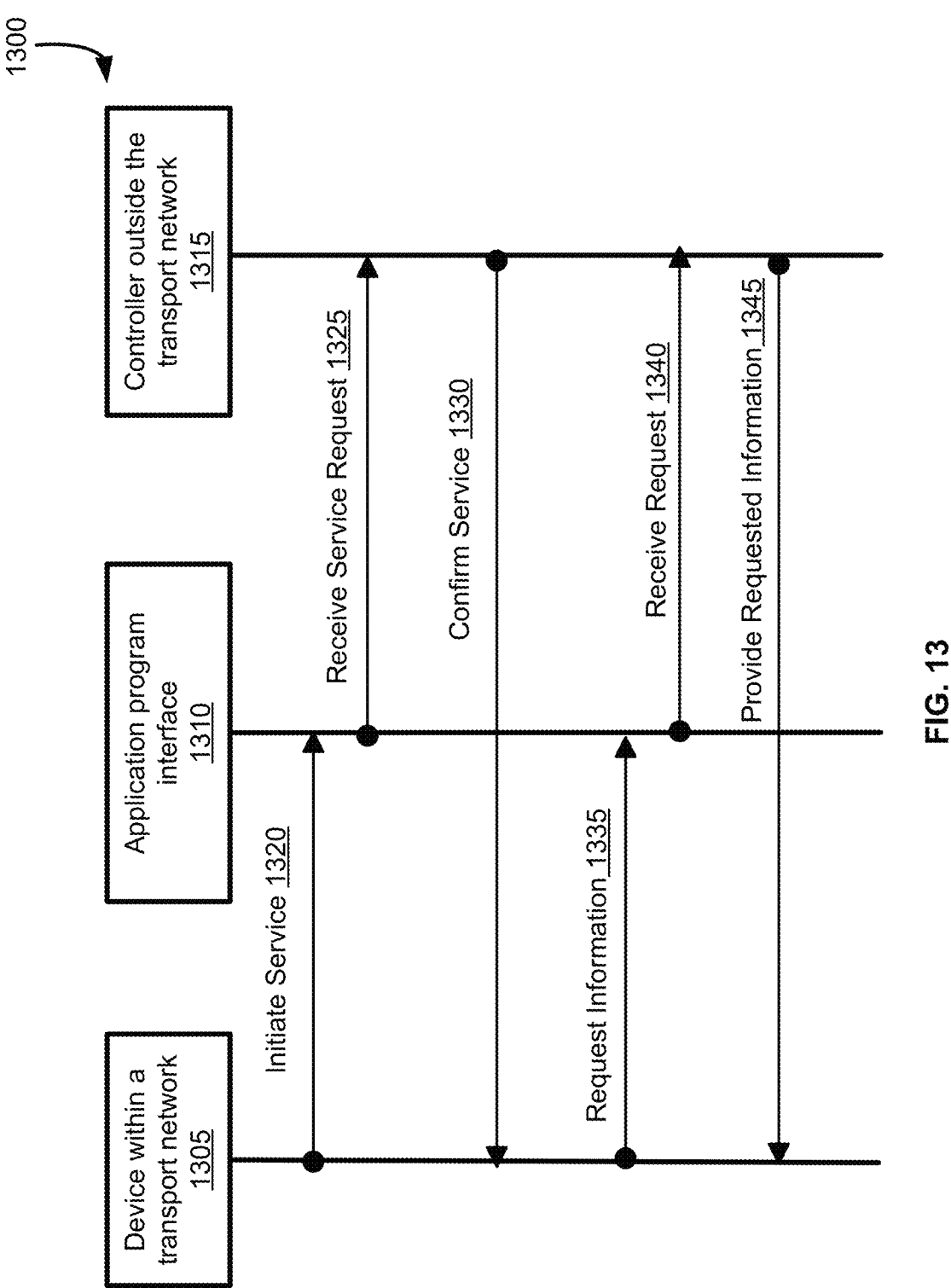
FIG. 13 illustrates a call-flow diagram for an API to cause a device within a transport network to share information with a controller outside said transport network, according to at least one embodiment.

FIG. 13 illustrates a call-flow diagram 1300 for an API to cause a device within a transport network to share information with a controller outside said transport network, according to at least one embodiment. In at least one embodiment, by performing part or all of call-flow diagram 1300, a processor comprising one or more circuits performs an API to indicate one or more controllers to control one or more devices within one or more 5G transport networks. In at least one embodiment, API 1310 includes one or more operations performed by one or more processors that include requesting, receiving, exposing, or otherwise exchanging information between a device within transport network 1305 and controller outside a transport network 1315.

In at least one embodiment, API 1310 includes operations to: initiate service 1320 (e.g., initiate a subscription service to periodically provide control signals from a controller outside of transport network 1315, where said control signals are based on received analytic information at controller 1315), receive service request 1325 (e.g., based on a processor performing API 1310, a controller outside an access network receives a service request to initiate control operations to optimize network performance), confirm service 1330 (e.g., a packet of information or API operation that causes service to be confirmed), request information 1335 (e.g., request control signals from controller 1315), receive request 1340 (e.g., a device performing API 1310 transmits a request from device within an transport network 1305 to a controller outside network 1315), and provide requested information 1345 (e.g., provide control signals). In at least one embodiment, a processor performing API 1310 is included in one or more controllers that are external to one or more 5G transport networks. In at least one embodiment, one or more controllers perform API 1310 to receive analytic information from one or more 5G transport networks, one or more 5G access networks, and one or more 5G core networks. In at least one embodiment, by performing API 1310 or after performing API 1310, one or more controllers are to generate one or more control signals to transmit to one or more 5G transport networks based on analytic information received from said one or more 5G transport networks. In at least one embodiment, by performing API 1310 or after performing API 1310, one or more controllers are to generate one or more control signals to transmit to one or more 5G transport networks based on analytic information received from one or more 5G access networks, one or more 5G transport networks, and one or more 5G core networks. In at least one embodiment, by performing API 1310 or after performing API 1310, one or more controllers including one or more processors perform a neural network to generate network settings of one or more 5G access networks.

Figure 14:
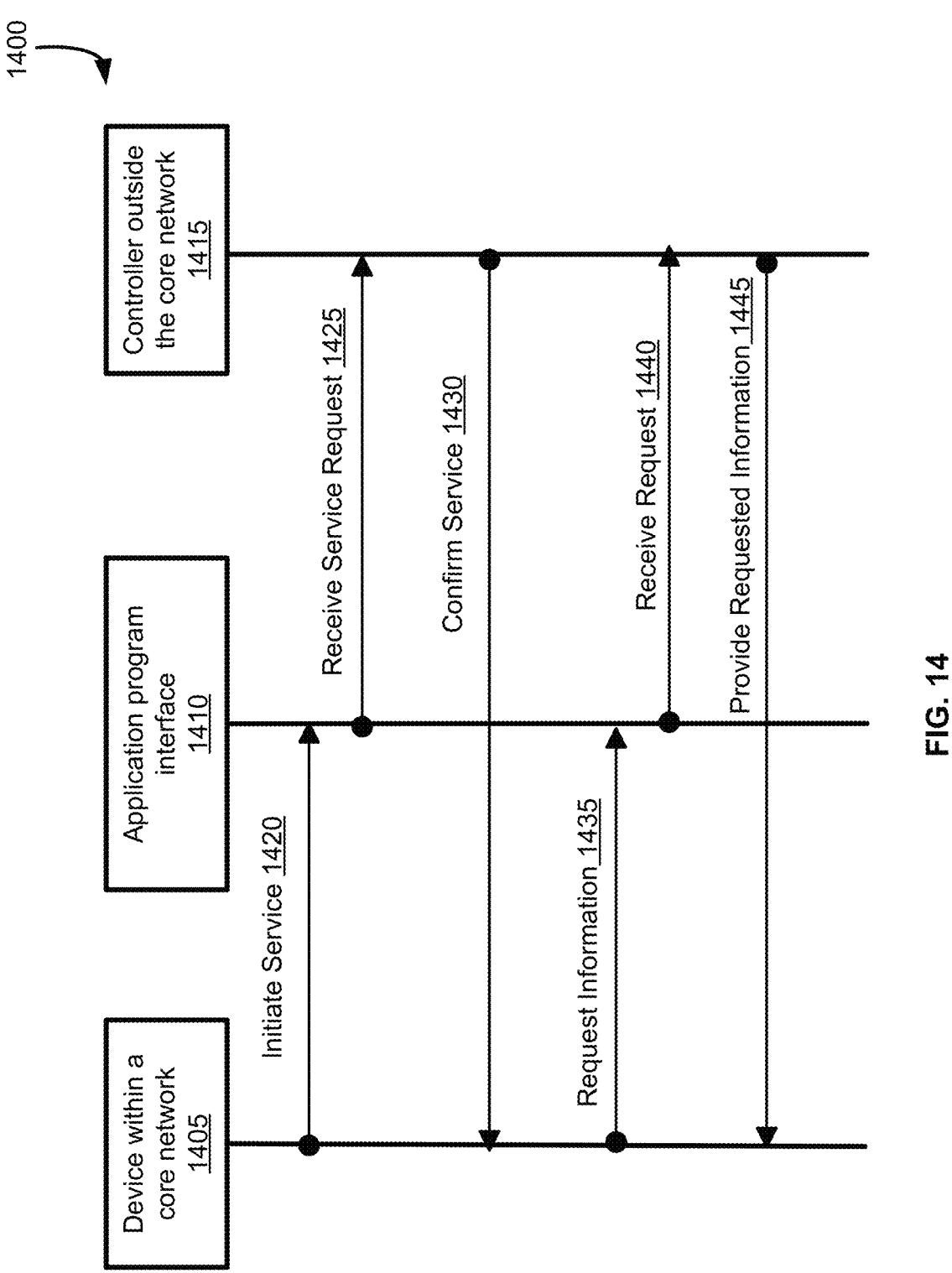
FIG. 14 illustrates a call-flow diagram for an API to cause a device within a core network to share information with a controller outside said core network, according to at least one embodiment.

FIG. 14 illustrates a call-flow diagram 1400 for an API to cause a device within a core network to share information with a controller outside said core network, according to at least one embodiment. In at least one embodiment, by performing part or all of call-flow diagram 1400, a processor comprising one or more circuits to perform an API to indicate one or more controllers to control one or more devices within one or more 5G core networks. In at least one embodiment, API 1405 includes one or more operations performed by one or more processors that include requesting, receiving, exposing, or otherwise exchanging information between a device within a core network 1405 and controller outside a core network 1415.

In at least one embodiment, API 1410 includes operations to: initiate service 1420 (e.g., initiate a subscription service to periodically provide control signals from a controller outside of core network 1415, where said control signals are based on received analytic information at controller 1415), receive service request 1325 (e.g., based on a processor performing API 1410, a controller outside an access network receives a service request to initiate control operations to optimize network performance for core network), confirm service 1430 (e.g., a packet of information or API operation that causes service to be confirmed), request information 1435 (e.g., request control signals from controller 1415), receive request 1440 (e.g., a device performing API 1310 transmits a request from device within an core network 1405 to a controller outside network 1415), and provide requested information 1445 (e.g., provide control signals). In at least one embodiment, a processor performing API 1410 is included in one or more controllers that are external to one or more 5G core networks. In at least one embodiment, one or more controllers perform API 1410 to receive analytic information from one or more 5G core networks, one or more 5G access networks, and one or more 5G transport networks. In at least one embodiment, by performing API 1410 or after performing API 1410, one or more controllers are to generate one or more control signals to transmit to one or more 5G core networks based on analytic information received from one or more 5G core networks. In at least one embodiment, by performing API 1410 or after performing API 1410, one or more controllers are to generate one or more control signals to transmit to one or more 5G core networks based on analytic information received from one or more 5G core networks, one or more 5G transport networks, and one or more 5G access networks. In at least one embodiment, by performing API 1410 or after performing API 1410, one or more controllers including one or more processors perform a neural network to generate network settings of one or more 5G access networks.

Figure 15:
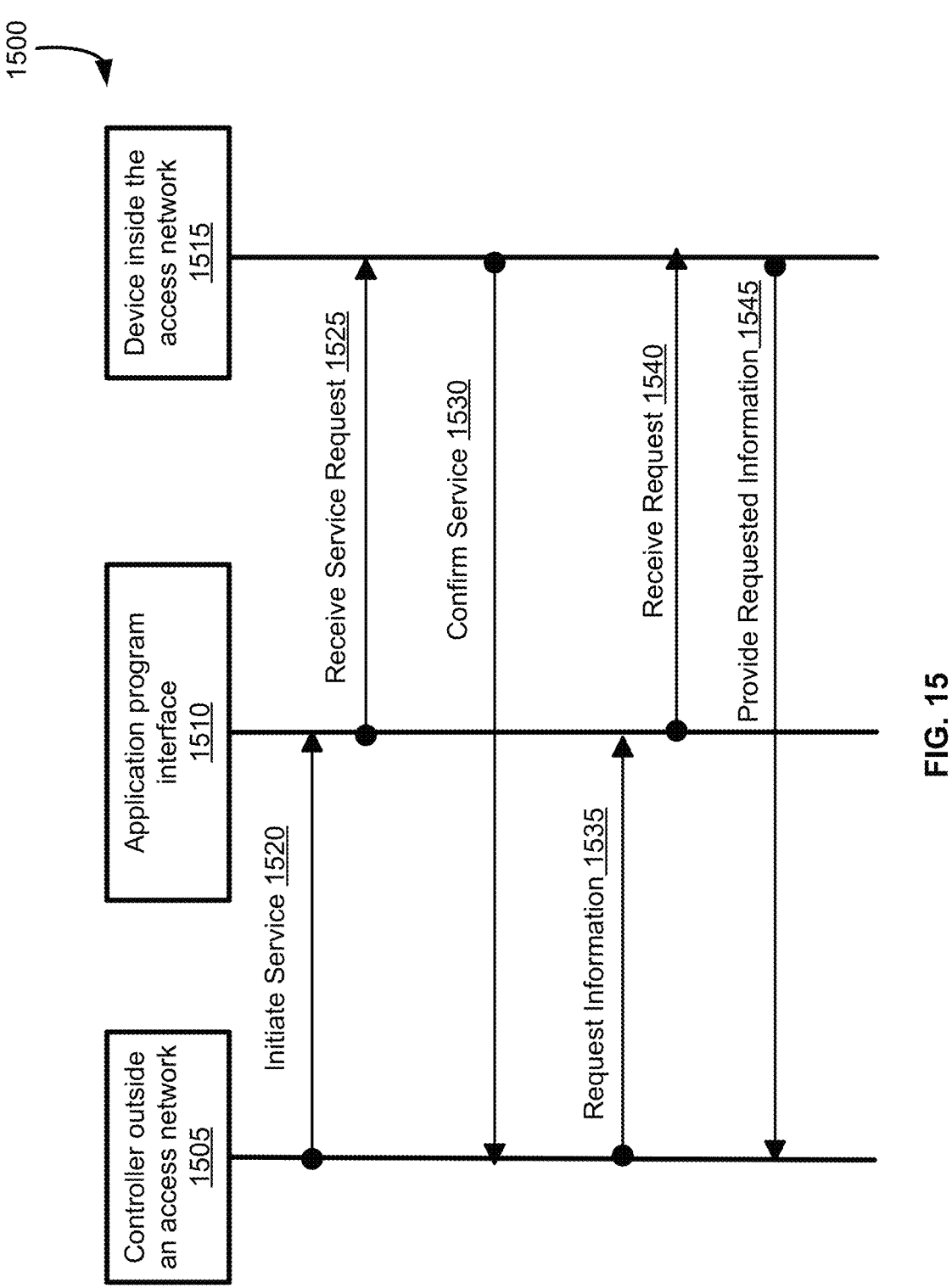
FIG. 15 illustrates a call-flow diagram for an API to cause a controller outside an access network to share information with a device inside said access network, according to at least one embodiment.

FIG. 15 illustrates a call-flow diagram 1500 for an API to cause a controller outside an access network to share information with a device inside said access network, according to at least one embodiment. In at least one embodiment, by performing part or all of call-flow diagram 1500, a processor comprising one or more circuits performs an API to cause one or more indications of one or more devices within one or more 5G access networks to be stored. In at least one embodiment, API 1510 includes one or more operations performed by one or more processors that include requesting, receiving, exposing, or otherwise exchanging information between a controller outside an access network 1505 and device inside an access network 1515.

In at least one embodiment, API 1510 includes operations to: initiate service 1520 (e.g., initiate a subscription service to periodically provide a controller with analytic data from a radio access network, e.g., device with a radio access network), receive service request 1525 (e.g., based on a processor performing API 1510, a controller outside an access network receives a service request to initiate receiving analytic information from one or more devices, e.g., controllers), confirm service 1530 (e.g., a packet of information or API operation that, when performed by one or more processors, causes service to be confirmed), request information 1535 (e.g., request to receive analytic information by an external controller), receive request 1540 (e.g., a device performing API 1510 receives request from a controller to receive analytic information), and provide requested information 1545 (e.g., provide analytic information to controller). In at least one embodiment, a processor performing API 1510 is included in one or more controllers that are external to one or more 5G core networks. In at least one embodiment, one or more controllers perform API 1510 to receive analytic information from one or more 5G core networks, one or more 5G access networks, and one or more 5G transport networks. In at least one embodiment, by performing API 1510 or after performing API 1510, one or more controllers generate one or more control signals to transmit to one or more 5G access networks based on analytic information received from one or more 5G core networks. In at least one embodiment, by performing API 1510 or after performing API 1510, one or more controllers generate one or more control signals to transmit to one or more 5G access networks based on analytic information received from one or more 5G core networks, one or more 5G transport networks, and one or more 5G access networks. In at least one embodiment, by performing API 1510 or after performing API 1510, one or more controllers including one or more processors perform a neural network generate network settings of one or more 5G access networks.

Figure 16:
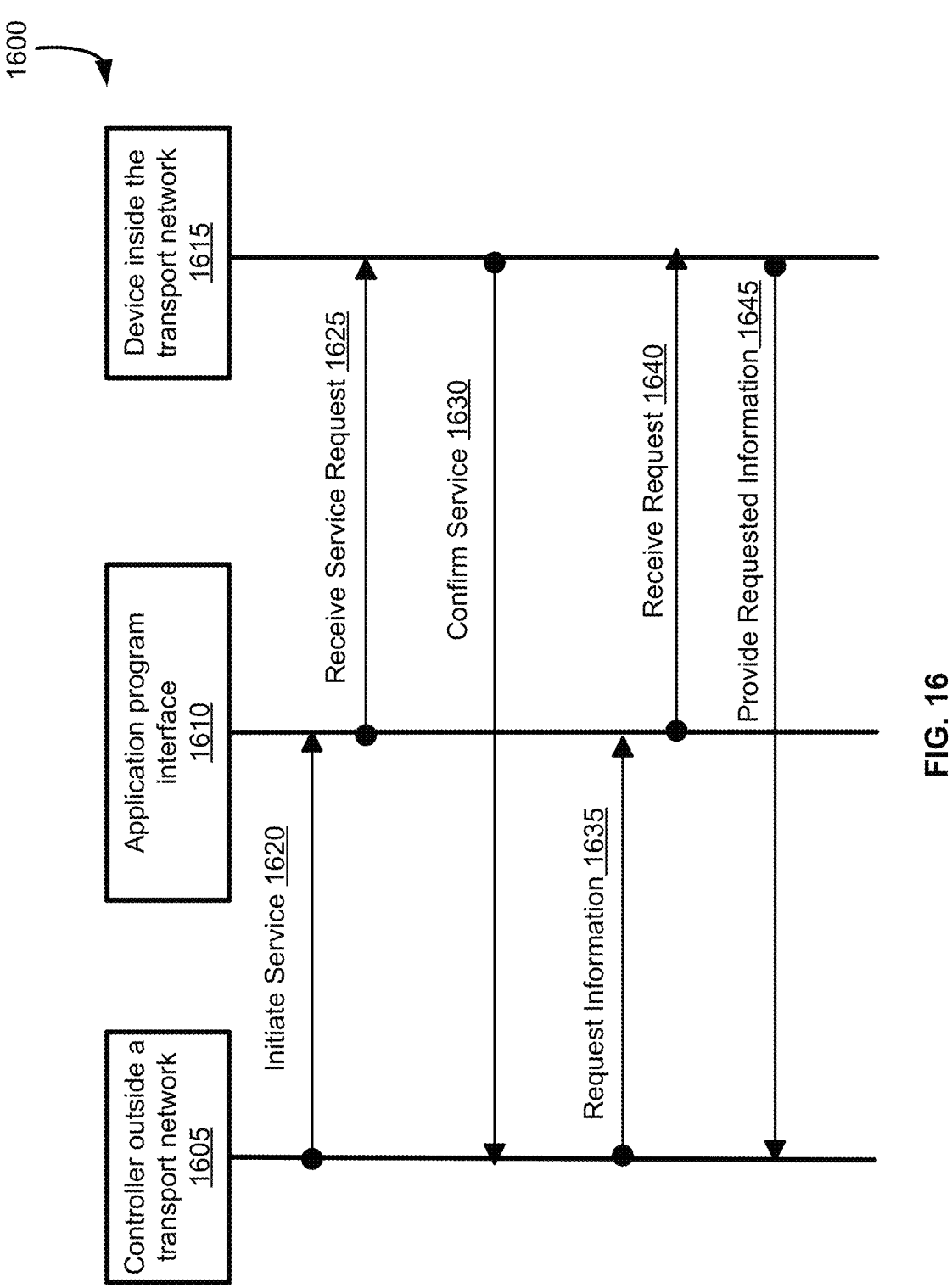
FIG. 16 illustrates a call-flow diagram for an API to cause a controller outside a transport network to share information with a device inside said transport network, according to at least one embodiment.

FIG. 16 illustrates a call-flow diagram 1600 for an API to cause a controller outside a transport network to share information with a device inside said transport network, according to at least one embodiment. In at least one embodiment, by performing part or all of call-flow diagram 1600, a processor comprising one or more circuits performs an API to cause one or more indications of one or more devices within one or more 5G transport networks to be stored. In at least one embodiment, API 1610 includes one or more operations performed by one or more processors that include requesting, receiving, exposing, or otherwise exchanging information between a controller outside a transport network 1605 and device inside a transport network 1615. In at least one embodiment, indications to be stored include an IP address of a device that is to control a network or other devices in a network, a network address of a device, or other identification parameters of a device.

In at least one embodiment, API 1610 includes operations to: initiate service 1620 (e.g., initiate a subscription service to periodically provide a controller with analytic data from a transport network), receive service request 1625 (e.g., based on a processor performing API 1610, a device receives a service request to initiate providing analytic information to one or more devices, e.g., controllers), confirm service 1630 (e.g., a packet of information or API operation that causes service to be confirmed), request information 1635 (e.g., request to receive analytic information), receive request 1640 (e.g., a device performing API 1610 receives request from a controller to receive analytic information), and provide requested information 1645 (e.g., performance data for transport network). In at least one embodiment, one or more controllers perform API 1610 to receive analytic information from one or more 5G transport networks (e.g., devices in said one or more core networks), one or more 5G access networks, and one or more 5G transport networks. In at least one embodiment, by performing API 1610 or after performing API 1610, one or more controllers are to generate one or more control signals to transmit to one or more 5G transport networks based on analytic information received from one or more 5G transport networks. In at least one embodiment, by performing API 1610 or after performing API 1610, one or more controllers are to generate one or more control signals to transmit to one or more 5G transport networks based on analytic information received from one or more 5G transport networks, one or more 5G access networks, and one or more 5G core networks. In at least one embodiment, by performing API 1710 or after performing API 1710, one or more controllers including one or more processors perform a neural network to generate network settings of one or more 5G transport networks.

Figure 17:
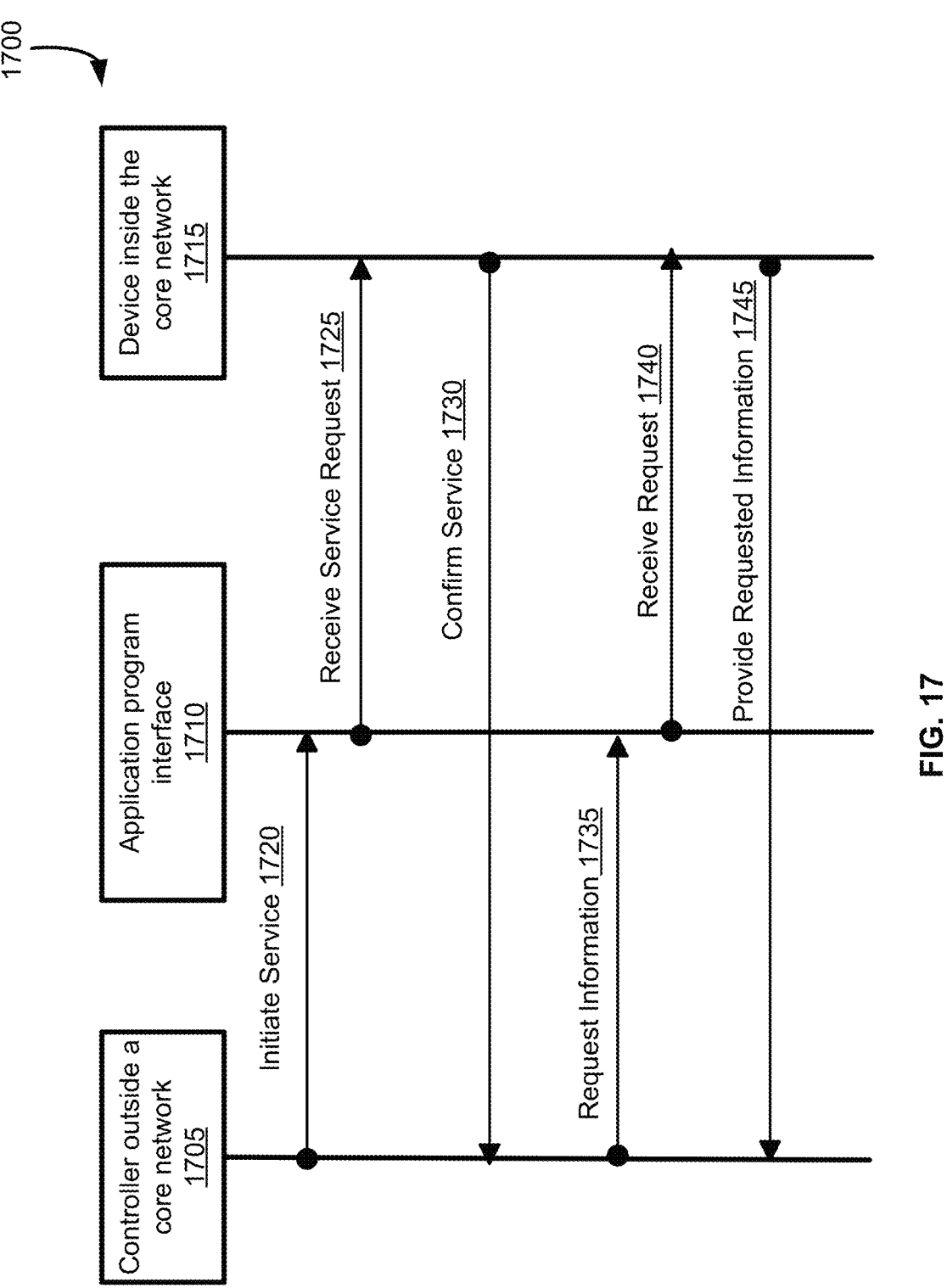
FIG. 17 illustrates a call-flow diagram for an API to cause a controller outside a core network to share information with a device inside said core network, according to at least one embodiment.

FIG. 17 illustrates a call-flow diagram 1700 for an API to cause a controller outside a core network to share information with a device or receiving information from a device inside said core network, according to at least one embodiment. In at least one embodiment, by performing part or all of call-flow diagram 1700, a processor comprising one or more circuits performs an API to cause one or more indications of one or more devices within one or more 5G core networks to be stored. In at least one embodiment, API 1710 includes one or more operations performed by one or more processors that include requesting, receiving, exposing, or otherwise exchanging information between a controller outside a core network 1705 and device inside a core network 1715. In at least one embodiment, one or more devices calling or performing API 1710 include one or more controllers outside of one or more 5G core networks, e.g., where one or more controllers are performed by one or more virtual machines. In at least one embodiment, provide requested information 1745 includes providing indications including network settings generated by one or more controllers outside one or more 5G core networks.

In at least one embodiment, API 1710 includes operations to: initiate service 1720 (e.g., initiate a service to receive analytic information from device inside said core network 1715, where said analytic information can used to generate control signals), receive service request 1725 (e.g., based on a processor performing API 1710, a controller outside a core network receives a service request to initiate control operations to optimize network performance for core network), confirm service 1730 (e.g., a packet of information or API operation that causes service to be confirmed), request information 1735 (e.g., request control signals from device inside a core network 1715), receive request 1740 (e.g., a device performing API 1710 transmits a request from to receive information according to subscription service or based on request), and provide requested information 1745 (e.g., provide analytic information of feedback). In at least one embodiment, a processor performing API 1710 is included in one or more controllers that are external to one or more 5G core networks. In at least one embodiment, one or more controllers perform API 1710 to receive analytic information from one or more 5G core networks (e.g., devices in said one or more core networks), one or more 5G access networks, and one or more 5G transport networks. In at least one embodiment, by performing API 1710 or after performing API 1710, one or more controllers are to generate one or more control signals to transmit to one or more 5G core networks based on analytic information received from one or more 5G core networks. In at least one embodiment, by performing API 1710 or after performing API 1710, one or more controllers are to generate one or more control signals to transmit to one or more 5G core networks based on analytic information received from one or more 5G core networks, one or more 5G transport networks, and one or more 5G access networks. In at least one embodiment, by performing API 1710 or after performing API 1710, one or more controllers including one or more processors perform a neural network to generate network settings of one or more 5G access networks.

Figure 18:
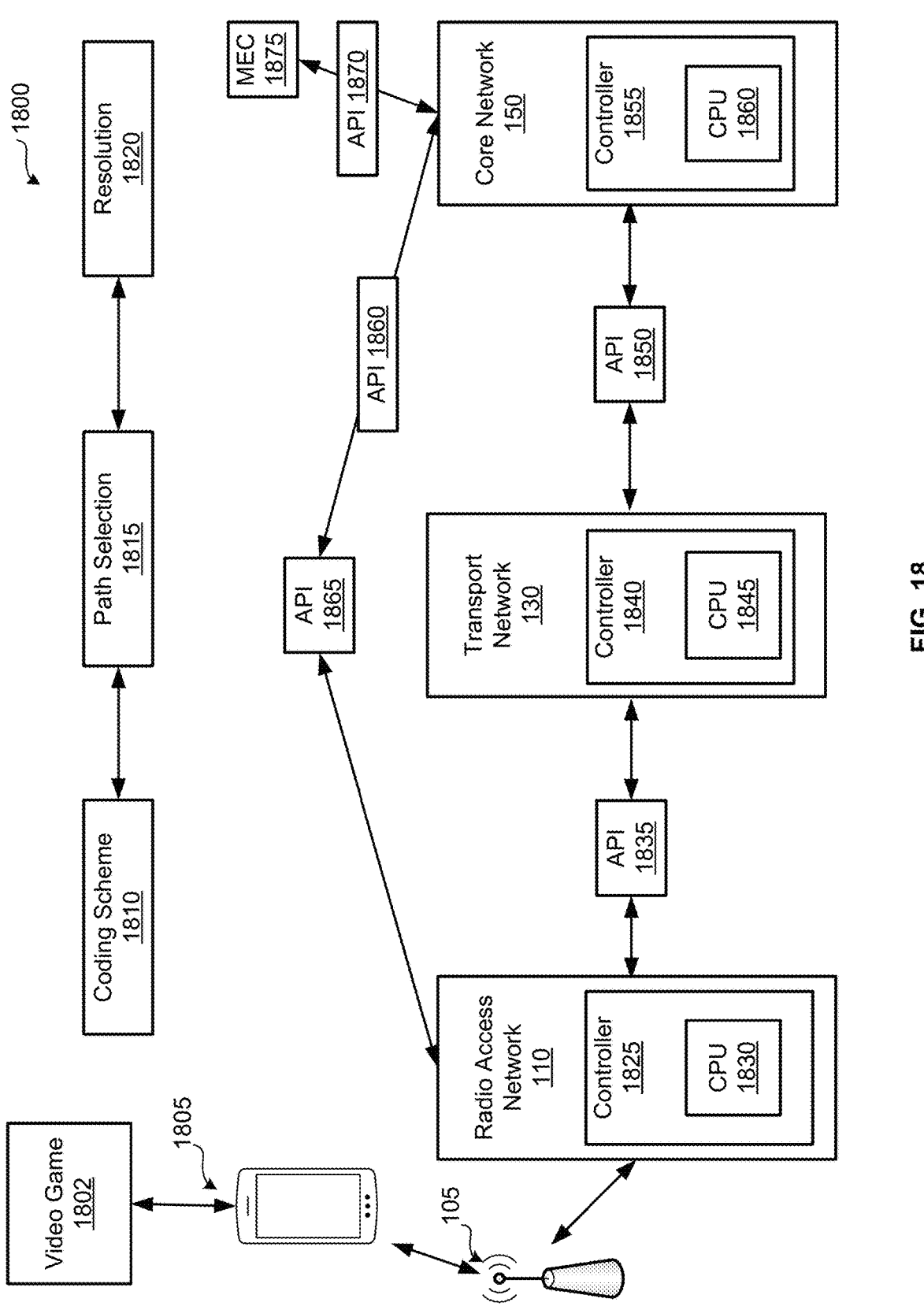
FIG. 18 illustrates an example of a video game performed by devices using APIs and networks, according to at least one embodiment.

FIG. 18 illustrates an example 1800 of a video game 1802 that one or more devices performs using APIs and networks, according to at least one embodiment. A top section of FIG. 18 illustrates an end user device 1805 providing a video game 1802 to a user, where said end user device 1805 is using 5G-NR technology including networks. In at least one embodiment, as part of providing video game 1802, devices and networks sharing information when providing and/or supporting video game 1802 such that network settings such as coding scheme 1810, path selection 1815, and resolution 1820 are adjusted to improve (e.g., optimize) performance. In at least one embodiment, FIG. 18 includes base station 105, radio access network 110 including controller 1825 with CPU 1835, API 1835, transport network 130 including controller 1840 with CPU 1845, API 1850, core network 150 including control 1855 with CPU 1860, API 1865, API 1870, and MEC 1875. FIG. 18 illustrates a computing environment that can integrated any components, systems, and/or processes from FIGS. 1-17. In at least one embodiment, API 1835 is example of interface 125 (FIG. 1), API 1850 is an example of interface 145 (FIG. 1), API 1865 is an example of interface 165 (FIG. 1). In at least one embodiment, controller 1825 is an example of device 115 (FIG. 1), controller 1840 is an example of device 135, controller 1855 is an example of device 155, CPU 1830 is an example of first processor 120, CPU 1845 is an example of second processor 140, and CPU 1860 is an example of third processor 160. In at least one embodiment, MEC 1875 includes devices that are performing video game 1802 such as graphics programming for a video game. In at least one embodiment, MEC 1875 shares analytic data with core network 170 such that core network 150 or MEC 1875 can use shared analytic data to determine improved (e.g., optimal) network settings for MEC 1875 or core network 150 or devices within these networks. In at least one embodiment, a device within MEC 1875 or controller 1855 calls or performs API 1870 to share information, e.g., analytic information about performance of workloads in core network 150 or MEC 1875.

In at least one embodiment, end user device 1805 is providing video game 1802 by using APIs, devices, and networks shown in FIG. 18, e.g., core network 150 is an application layer or application network or mobile edge computing framework that provides video game 1802 (e.g., graphics, images). In at least one embodiment, using API 1835, API 1850, and API 1865, radio access network 110, transport network 130, and core network 150 share analytic information such as how radio access network 110 is performing (e.g., coding scheme 1810 which can be a modulation scheme and how effective or how much latency said coding scheme 1810 provides), how transport network 130 is performing (e.g., how much latency a routing path causes or a path selection 1815 and its associated latency or throughput), and how core network 150 is performing (e.g., resolution 1820 provided by said video game application such as frames per second and resolution for each frame). In at least one embodiment, controller 1825, controller 1840, and controller 1855 can use said shared analytic information to adjust network settings such as coding scheme 1810, path selection 1815, and resolution 1820 to improve (e.g., optimize) network performance collectively.

Figure 19:
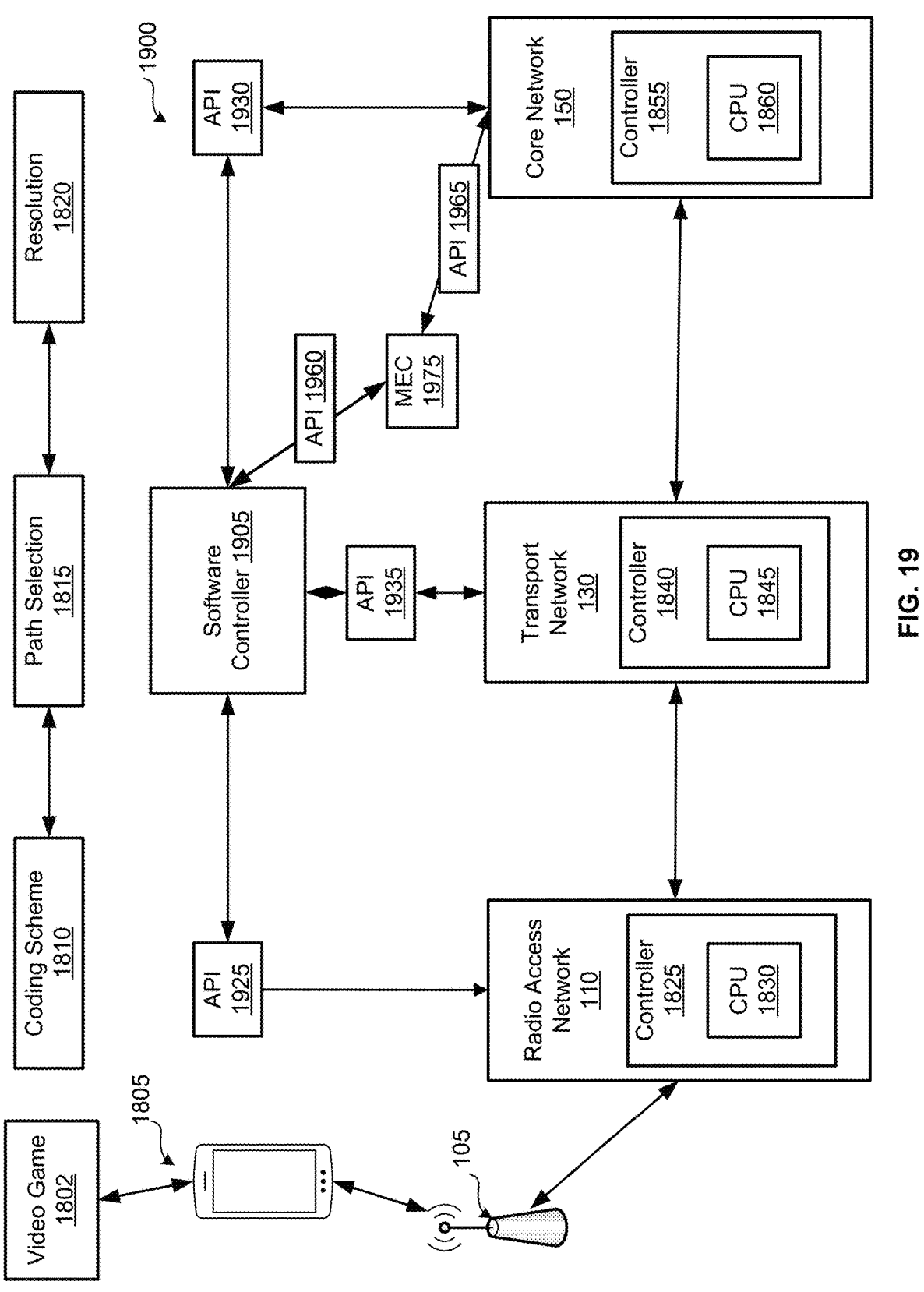
FIG. 19 illustrates another example of a video game performed by devices using APIs and networks, according to at least one embodiment.

FIG. 19 illustrates another example 1900 of a video game performed by one or more devices using APIs and networks, according to at least one embodiment. A top section of FIG. 18 illustrates an end user device 1805 providing a video game 1802 to a user, where said end user device 1805 is using 5G-NR technology including networks. In at least one embodiment, as part of providing video game 1802, devices and networks sharing information when providing and/or supporting video game 1802 such that network settings such as coding scheme 1810, path selection 1815, and resolution 1820 are adjusted to improve (e.g., optimize) performance. In at least one embodiment, FIG. 19 includes base station 105, radio access network 110 including controller 1825 with CPU 1830, API 1925, transport network 130 including controller 1840 with CPU 1845, API 1935, core network 150 including control 1855 with CPU 1860, API 1930, software controller 1905, API 1960, MEC 1975, and API 1965. FIG. 19 illustrates a computing environment that can integrated any components, systems, and/or processes from FIGS. 1-17. In at least one embodiment, API 1925 is example of interface 125 (FIG. 1), API 1935 is an example of interface 145 (FIG. 1), API 1930 is an example of interface 165 (FIG. 1), controller 1825 is an example of device 115 (FIG. 1), controller 1840 is an example of device 135, controller 1855 is an example of device 155, CPU 1830 is an example of first processor 120, CPU 1845 is an example of second processor 140, and CPU 1860 is an example of third processor 160. In at least on embodiment, software controller 1905 is an example of controller 205 (FIG. 2).

In at least one embodiment, MEC 1975 includes devices that perform video game 1802 such as graphics programming for a video game. In at least one embodiment, MEC 1975 includes devices that perform autonomous vehicle services. In at least one embodiment, MEC 1975 shares analytic data with software controller 1905 and core network 150, where software controller 1905 can use shared analytic data to determine improved (e.g., optimal) network settings for MEC 1975 or core network 150 or devices within these networks. In at least one embodiment, a device within MEC 1975 or controller 1855 calls or performs API 1965 to share information, e.g., analytic information about performance of workloads in core network 150 or MEC 1975. In at least one embodiment, a device within MEC 1975 or software controller 1905 calls or performs API 1960 to share information, e.g., analytic information about performance of workloads in MEC 1975. In at least one embodiment, software controller 1905 can use received analytic information (e.g., exposed by APIs from MEC 1975) to generate networks settings and/or send control signals to MEC 1975 or other networks (e.g., radio access network 110, transport network 130, core network 150).

In at least one embodiment, end user device 1805 is providing video game 1802 by using APIs, devices, and networks shown in FIG. 19, e.g., core network 150 is an application layer or application network or mobile edge computing framework that provides video game 1802 (e.g., including graphics, images). In at least one embodiment, using API 1925, API 1935, and API 1930, radio access network 110, transport network 130, and core network 150 share analytic information such as how radio access network 110 is performing (e.g., coding scheme 1810 which can be a modulation scheme and how effective or how much latency said coding scheme 1810 provides), how transport network 130 is performing (e.g., how much latency a routing path causes or a path selection 1815 and its associated latency or throughput), and how core network 150 is performing (e.g., resolution 1820 provided by said video game application such as frames per second and resolution for each frame). In at least one embodiment, controller 1825, controller 1840, controller 1855, and software controller 1905 can use said shared analytic information to adjust network settings such as coding scheme 1810, path selection 1815, and resolution 1820 to improve (e.g., optimize) network performance collectively.

Data Center

Figure 20:
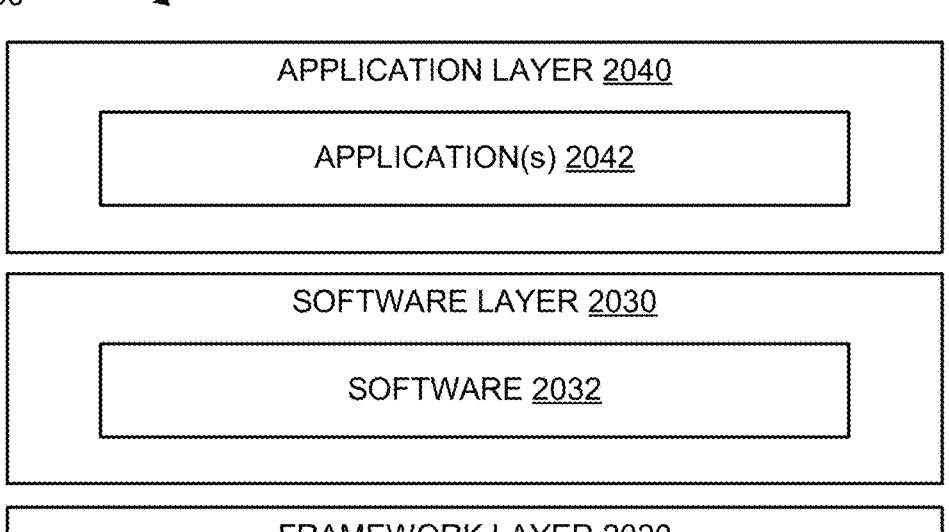
FIG. 20 illustrates an example of a data center system, according to at least one embodiment.
Figure 20:
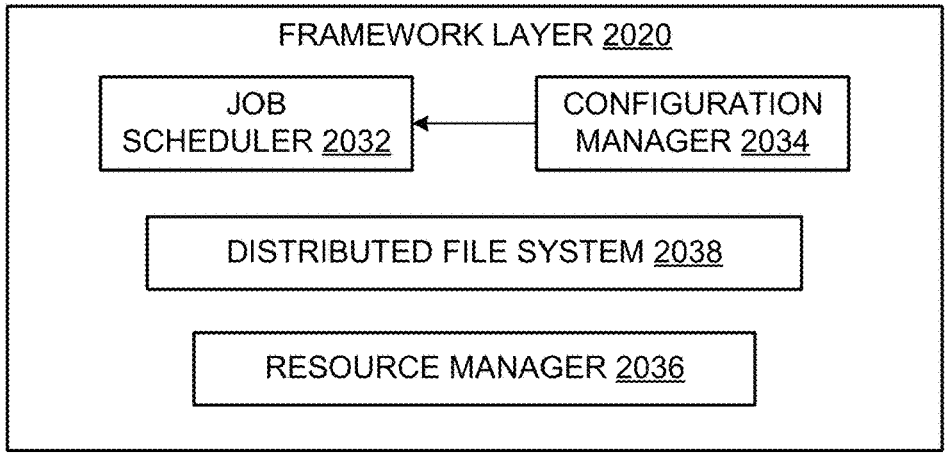
Figure 20:
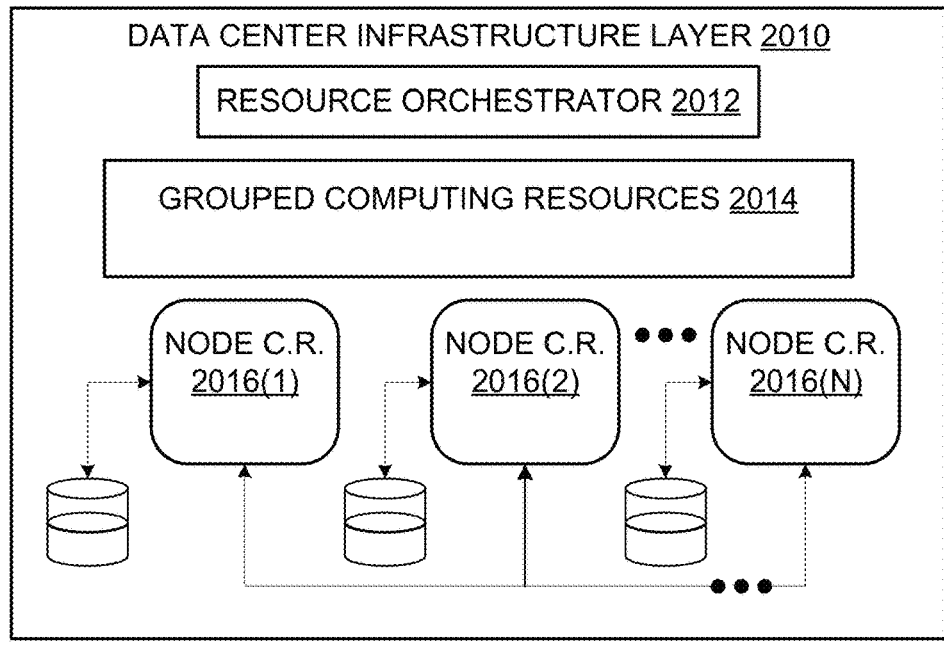

FIG. 20 illustrates an example data center 2000, in which at least one embodiment may be used. In at least one embodiment, data center 2000 includes a data center infrastructure layer 2010, a framework layer 2020, a software layer 2030 and an application layer 2040.

In at least one embodiment, as shown in FIG. 20, data center infrastructure layer 2010 may include a resource orchestrator 2012, grouped computing resources 2014, and node computing resources ("node C.R.s") 2016(1)-2016(N), where "N" represents any whole, positive integer. In at least one embodiment, node C.R.s 2016(1)-2016(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 2016(1)-2016(N) may be a server having one or more of above-mentioned computing resources.

In at least one embodiment, grouped computing resources 2014 may include separate groupings of node C.R.s housed within one or more racks (not shown), or many racks housed in data centers at various geographical locations (also not shown). In at least one embodiment, separate groupings of node C.R.s within grouped computing resources 2014 may include grouped compute, network, memory, or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 2012 may configure or otherwise control one or more node C.R.s 2016(1)-2016(N) and/or grouped computing resources 2014. In at least one embodiment, resource orchestrator 2012 may include a software design infrastructure ("SDI") management entity for data center 2000. In at least one embodiment, resource orchestrator may include hardware, software, or some combination thereof.

In at least one embodiment, as shown in FIG. 20, framework layer 2020 includes a job scheduler 2032, a configuration manager 2034, a resource manager 2036 and a distributed file system 2038. In at least one embodiment, framework layer 2020 may include a framework to support software 2032 of software layer 2030 and/or one or more application(s) 2042 of application layer 2040. In at least one embodiment, software 2032 or application(s) 2042 may respectively include web-based service software or applications, such as those provided by Amazon Web Services, Google Cloud and Microsoft Azure. In at least one embodiment, framework layer 2020 may be, but is not limited to, a type of free and open-source software web application framework such as Apache Spark™ (hereinafter "Spark") that may utilize distributed file system 2038 for large-scale data processing (e.g., "big data"). In at least one embodiment, job scheduler 2032 may include a Spark driver to facilitate scheduling of workloads supported by various layers of data center 2000. In at least one embodiment, configuration manager 2034 may be capable of configuring different layers such as software layer 2030 and framework layer 2020 including Spark and distributed file system 2038 for supporting large-scale data processing. In at least one embodiment, resource manager 2036 may be capable of managing clustered or grouped computing resources mapped to or allocated for support of distributed file system 2038 and job scheduler 2032. In at least one embodiment, clustered or grouped computing resources may include grouped computing resource 2014 at data center infrastructure layer 2010. In at least one embodiment, resource manager 2036 may coordinate with resource orchestrator 2012 to manage these mapped or allocated computing resources.

In at least one embodiment, software 2032 included in software layer 2030 may include software used by at least portions of node C.R.s 2016(1)-2016(N), grouped computing resources 2014, and/or distributed file system 2038 of framework layer 2020. In at least one embodiment, one or more types of software may include, but are not limited to, Internet web page search software, e-mail virus scan software, database software, and streaming video content software.

In at least one embodiment, application(s) 2042 included in application layer 2040 may include one or more types of applications used by at least portions of node C.R.s 2016 (1)-2016(N), grouped computing resources 2014, and/or distributed file system 2038 of framework layer 2020. In at least one embodiment, one or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 2034, resource manager 2036, and resource orchestrator 2012 may implement any number and type of self-modifying actions based on any amount and type of data acquired in any technically feasible fashion. In at least one embodiment, self-modifying actions may relieve a data center operator of data center 2000 from making possibly bad configuration decisions and possibly avoiding underutilized and/or poor performing portions of a data center.

In at least one embodiment, data center 2000 may include tools, services, software, or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 2000. In at least one embodiment, trained machine learning models corresponding to one or more neural networks may be used to infer or predict information using resources described above with respect to data center 2000 by using weight parameters calculated through one or more training techniques described herein.

In at least one embodiment, data center 2000 may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

In at least one embodiment, data center 2000 can be integrated into computing environment 100 (FIG. 1) and computing environment 200 (FIG. 2). In at least one embodiment, data center 2000 can include controller 205 illustrated in FIG. 3. In at least one embodiment, data center 2000 can perform processes 400 and 500 (FIGS. 4 and 5). In at least one embodiment, data center 2000 can call or perform APIs disclosed in FIGS. 6-17. In at least one embodiment, data center 2000 can perform examples in FIGS. 18 and 19.

Figure 21A:
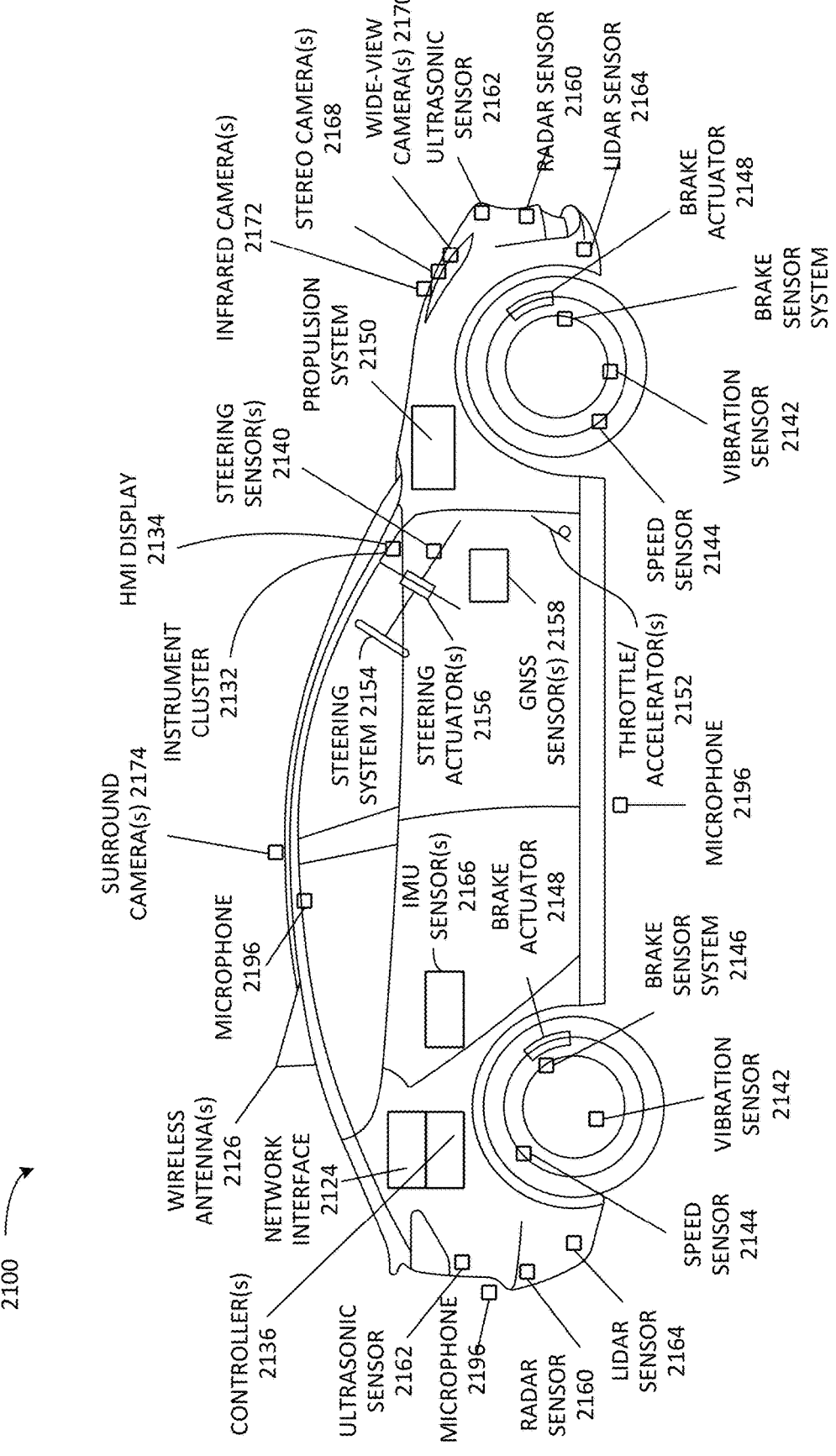
FIG. 21A illustrates an example of an autonomous vehicle, according to at least one embodiment.

FIG. 21A illustrates an example of an autonomous vehicle 2100, according to at least one embodiment. In at least one embodiment, autonomous vehicle 2100 (alternatively referred to herein as "vehicle 2100") may be, without limitation, a passenger vehicle, such as a car, a truck, a bus, and/or another type of vehicle that accommodates one or more passengers. In at least one embodiment, vehicle 2100 may be a semi-tractor-trailer truck used for hauling cargo. In at least one embodiment, vehicle 2100 may be an airplane, robotic vehicle, or other kind of vehicle.

Autonomous vehicles may be described in terms of automation levels, defined by National Highway Traffic Safety Administration ("NHTSA"), a division of US Department of Transportation, and Society of Automotive Engineers ("SAE") "Taxonomy and Definitions for Terms Related to Driving Automation Systems for On-Road Motor Vehicles" (e.g., Standard No. J3016-201806, published on Jun. 15, 2018, Standard No. J3016-201609, published on Sep. 30, 2016, and previous and future versions of this standard). In one or more embodiments, vehicle 2100 may be capable of functionality in accordance with one or more of level 1-level 5 of autonomous driving levels. For example, in at least one embodiment, vehicle 2100 may be capable of conditional automation (Level 3), high automation (Level 4), and/or full automation (Level 5), depending on embodiment.

In at least one embodiment, vehicle 2100 may include, without limitation, components such as a chassis, a vehicle body, wheels (e.g., 2, 4, 6, 8, 18, etc.), tires, axles, and other components of a vehicle. In at least one embodiment, vehicle 2100 may include, without limitation, a propulsion system 2150, such as an internal combustion engine, hybrid electric power plant, an all-electric engine, and/or another propulsion system type. In at least one embodiment, propulsion system 2150 may be connected to a drive train of vehicle 2100, which may include, without limitation, a transmission, to enable propulsion of vehicle 2100. In at least one embodiment, propulsion system 2150 may be controlled in response to receiving signals from a throttle/accelerator(s) 2152.

In at least one embodiment, a steering system 2154, which may include, without limitation, a steering wheel, is used to steer a vehicle 2100 (e.g., along a desired path or route) when a propulsion system 2150 is operating (e.g., when vehicle is in motion). In at least one embodiment, a steering system 2154 may receive signals from steering actuator(s) 2156. In at least one embodiment, steering wheel may be optional for full automation (Level 5) functionality. In at least one embodiment, a brake sensor system 2146 may be used to operate vehicle brakes in response to receiving signals from brake actuator(s) 2148 and/or brake sensors.

In at least one embodiment, controller(s) 2136, which may include, without limitation, one or more system on chips ("SoCs") (not shown in FIG. 21A) and/or graphics processing unit(s) ("GPU(s)"), provide signals (e.g., representative of commands) to one or more components and/or systems of vehicle 2100. For instance, in at least one embodiment, controller(s) 2136 may send signals to operate vehicle brakes via brake actuators 2148, to operate steering system 2154 via steering actuator(s) 2156, to operate propulsion system 2150 via throttle/accelerator(s) 2152. In at least one embodiment, controller(s) 2136 may include one or more onboard (e.g., integrated) computing devices (e.g., supercomputers) that process sensor signals, and output operation commands (e.g., signals representing commands) to enable autonomous driving and/or to assist a human driver in driving vehicle 2100. In at least one embodiment, controller(s) 2136 may include a first controller 2136 for autonomous driving functions, a second controller 2136 for functional safety functions, a third controller 2136 for artificial intelligence functionality (e.g., computer vision), a fourth controller 2136 for infotainment functionality, a fifth controller 2136 for redundancy in emergency conditions, and/or other controllers. In at least one embodiment, a single controller 2136 may handle two or more of above functionalities, two or more controllers 2136 may handle a single functionality, and/or any combination thereof.

In at least one embodiment, controller(s) 2136 provide signals for controlling one or more components and/or systems of vehicle 2100 in response to sensor data received from one or more sensors (e.g., sensor inputs). In at least one embodiment, sensor data may be received from, for example and without limitation, global navigation satellite systems ("GNSS") sensor(s) 2158 (e.g., Global Positioning System sensor(s)), RADAR sensor(s) 2160, ultrasonic sensor(s) 2162, LIDAR sensor(s) 2164, inertial measurement unit ("IMU") sensor(s) 2166 (e.g., accelerometer(s), gyroscope(s), magnetic compass(es), magnetometer(s), etc.), microphone(s) 2196, stereo camera(s) 2168, wide-view camera(s) 2170 (e.g., fisheye cameras), infrared camera(s) 2172, surround camera(s) 2174 (e.g., 360 degree cameras), long-range cameras (not shown in FIG. 21A), mid-range camera(s) (not shown in FIG. 21A), speed sensor(s) 2144 (e.g., for measuring speed of vehicle 2100), vibration sensor(s) 2142, steering sensor(s) 2140, brake sensor(s) (e.g., as part of brake sensor system 2146), and/or other sensor types.

In at least one embodiment, one or more of controller(s) 2136 may receive inputs (e.g., represented by input data) from an instrument cluster 2132 of vehicle 2100 and provide outputs (e.g., represented by output data, display data, etc.) via a human-machine interface ("HMI") display 2134, an audible annunciator, a loudspeaker, and/or via other components of vehicle 2100. In at least one embodiment, outputs may include information such as vehicle velocity, speed, time, map data (e.g., a High Definition map (not shown in FIG. 21A)), location data (e.g., vehicle's 2100 location, such as on a map), direction, location of other vehicles (e.g., an occupancy grid), information about objects and status of objects as perceived by controller(s) 2136, etc. For example, in at least one embodiment, HMI display 2134 may display information about presence of one or more objects (e.g., a street sign, caution sign, traffic light changing, etc.), and/or information about driving maneuvers vehicle has made, is making, or will make (e.g., changing lanes now, taking exit 34B in two miles, etc.).

In at least one embodiment, vehicle 2100 further includes a network interface 2124 which may use wireless antenna(s) 2126 and/or modem(s) to communicate over one or more networks. For example, in at least one embodiment, network interface 2124 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. In at least one embodiment, wireless antenna(s) 2126 may also enable communication between objects in environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

In at least one embodiment, vehicle 2100 can be integrated into computing environment 100 (FIG. 1) and computing environment 200 (FIG. 2). In at least one embodiment, vehicle 2100 can include or communicate with controller 205 illustrated in FIG. 3. In at least one embodiment, vehicle 2100 can perform processes 400 and 500 (FIGS. 4 and 5). In at least one embodiment, vehicle 2100 can call or perform APIs disclosed in FIGS. 6-17. In at least one embodiment, vehicle 2100 can perform examples in FIGS. 18 and 19.

Figure 21B:
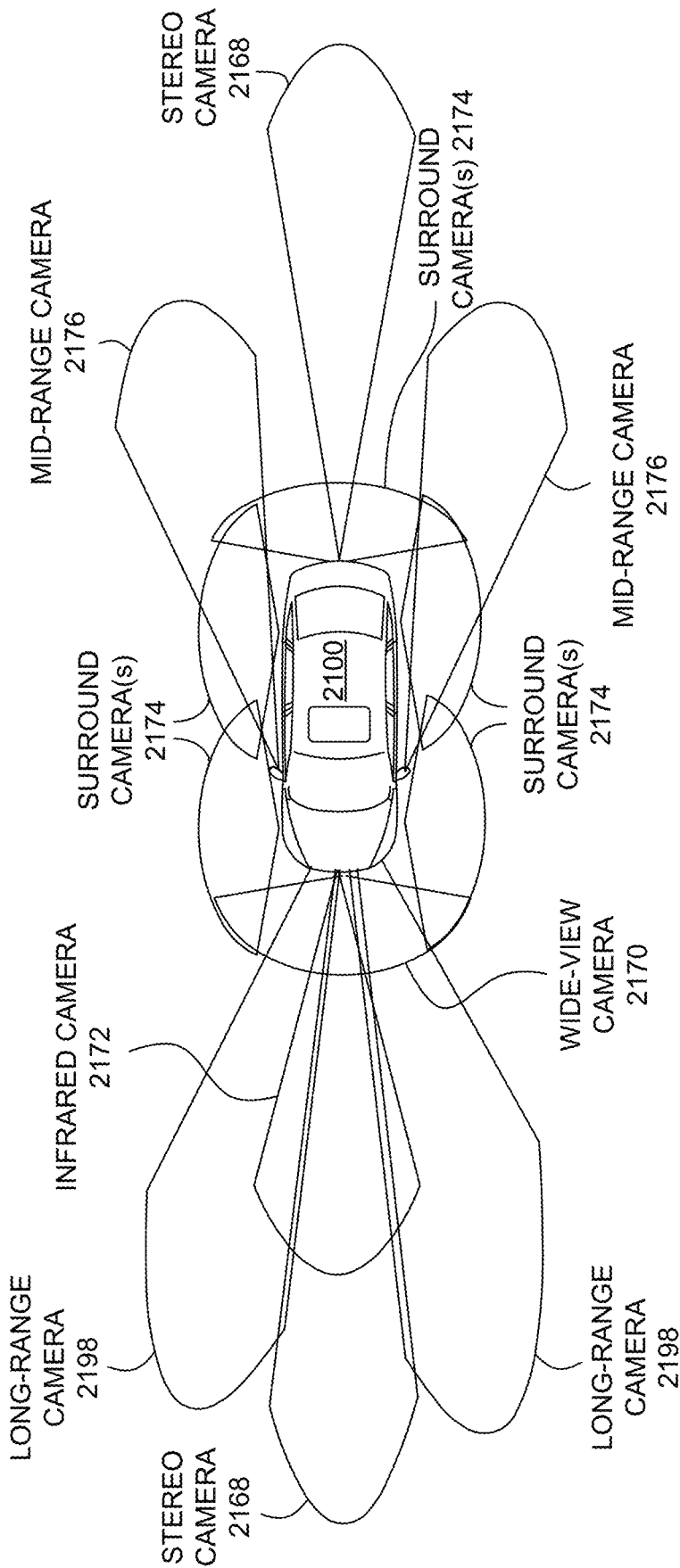
FIG. 21B illustrates an example of camera locations and fields of view for the autonomous vehicle of FIG. 21A, according to at least one embodiment.

FIG. 21B illustrates an example of camera locations and fields of view for autonomous vehicle 2100 of FIG. 21A, according to at least one embodiment. In at least one embodiment, cameras and respective fields of view are one example embodiment and are not intended to be limiting. For instance, in at least one embodiment, additional and/or alternative cameras may be included and/or cameras may be located at different locations on vehicle 2100.

In at least one embodiment, camera types for cameras may include, but are not limited to, digital cameras that may be adapted for use with components and/or systems of vehicle 2100. In at least one embodiment, camera(s) may operate at automotive safety integrity level ("ASIL") B and/or at another ASIL. In at least one embodiment, camera types may be capable of any image capture rate, such as 60 frames per second (fps), 1220 fps, 240 fps, etc., depending on embodiment. In at least one embodiment, cameras may be capable of using rolling shutters, global shutters, another type of shutter, or a combination thereof. In at least one embodiment, color filter array may include a red clear clear clear ("RCCC") color filter array, a red clear clear blue ("RCCB") color filter array, a red blue green clear ("RBGC") color filter array, a Foveon X3 color filter array, a Bayer sensors ("RGGB") color filter array, a monochrome sensor color filter array, and/or another types of color filter arrays. In at least one embodiment, clear pixel cameras, such as cameras with an RCCC, an RCCB, and/or an RBGC color filter array, may be used in an effort to increase light sensitivity.

In at least one embodiment, one or more of camera(s) may be used to perform advanced driver assistance systems ("ADAS") functions (e.g., as part of a redundant or fail-safe design). For example, in at least one embodiment, a Multi-Function Mono Camera may be installed to provide functions including lane departure warning, traffic sign assist and intelligent headlamp control. In at least one embodiment, one or more of camera(s) (e.g., all of cameras) may record and provide image data (e.g., video) simultaneously.

In at least one embodiment, one or more cameras may be mounted in a mounting assembly, such as a custom designed (three-dimensional ("3D") printed) assembly, in order to cut out stray light and reflections from within a car (e.g., reflections from dashboard reflected in windshield mirrors) which may interfere with a camera's image data capture abilities. With reference to wing-mirror mounting assemblies, in at least one embodiment, wing-mirror assemblies may be custom 3D printed so that camera mounting plate matches shape of wing-mirror. In at least one embodiment, camera(s) may be integrated into wing-mirror. In at least one embodiment, for side-view cameras, camera(s) may also be integrated within four pillars at each corner of car.

In at least one embodiment, cameras with a field of view that include portions of environment in front of vehicle 2100 (e.g., front-facing cameras) may be used for surround view, to help identify forward facing paths and obstacles, as well as aid in, with help of one or more of controllers 2136 and/or control SoCs, providing information critical to generating an occupancy grid and/or determining preferred vehicle paths. In at least one embodiment, front-facing cameras may be used to perform many of same ADAS functions as LIDAR, including, without limitation, emergency braking, pedestrian detection, and collision avoidance. In at least one embodiment, front-facing cameras may also be used for ADAS functions and systems including, without limitation, Lane Departure Warnings ("LDW"), Autonomous Cruise Control ("ACC"), and/or other functions such as traffic sign recognition.

In at least one embodiment, a variety of cameras may be used in a front-facing configuration, including, for example, a monocular camera platform that includes a CMOS ("complementary metal oxide semiconductor") color imager. In at least one embodiment, wide-view camera 2170 may be used to perceive objects coming into view from periphery (e.g., pedestrians, crossing traffic or bicycles). Although only one wide-view camera 2170 is illustrated in FIG. 21B, in other embodiments, there may be any number (including zero) of wide-view camera(s) 2170 on vehicle 2100. In at least one embodiment, any number of long-range camera(s) 2198 (e.g., a long-view stereo camera pair) may be used for depth-based object detection, especially for objects for which a neural network has not yet been trained. In at least one embodiment, long-range camera(s) 2198 may also be used for object detection and classification, as well as basic object tracking.

In at least one embodiment, any number of stereo camera(s) 2168 may also be included in a front-facing configuration. In at least one embodiment, one or more of stereo camera(s) 2168 may include an integrated control unit comprising a scalable processing unit, which may provide a programmable logic ("FPGA") and a multi-core microprocessor with an integrated Controller Area Network ("CAN") or Ethernet interface on a single chip. In at least one embodiment, such a unit may be used to generate a 3D map of environment of vehicle 2100, including a distance estimate for all points in image. In at least one embodiment, one or more of stereo camera(s) 2168 may include, without limitation, compact stereo vision sensor(s) that may include, without limitation, two camera lenses (one each on left and right) and an image processing chip that may measure distance from vehicle 2100 to target object and use generated information (e.g., metadata) to activate autonomous emergency braking and lane departure warning functions. In at least one embodiment, other types of stereo camera(s) 2168 may be used in addition to, or alternatively from, those described herein.

In at least one embodiment, cameras with a field of view that include portions of environment to side of vehicle 2100 (e.g., side-view cameras) may be used for surround view, providing information used to create and update occupancy grid, as well as to generate side impact collision warnings. For example, in at least one embodiment, surround camera(s) 2174 (e.g., four surround cameras 2174 as illustrated in FIG. 21B) could be positioned on vehicle 2100. In at least one embodiment, surround camera(s) 2174 may include, without limitation, any number and combination of wide-view camera(s) 2170, fisheye camera(s), 360 degree camera(s), and/or like. For instance, in at least one embodiment, four fisheye cameras may be positioned on front, rear, and sides of vehicle 2100. In at least one embodiment, vehicle 2100 may use three surround camera(s) 2174 (e.g., left, right, and rear), and may leverage one or more other camera(s) (e.g., a forward-facing camera) as a fourth surround-view camera.

In at least one embodiment, cameras with a field of view that include portions of environment to rear of vehicle 2100 (e.g., rear-view cameras) may be used for park assistance, surround view, rear collision warnings, and creating and updating occupancy grid. In at least one embodiment, a wide variety of cameras may be used including, but not limited to, cameras that are also suitable as a front-facing camera(s)

(e.g., long-range cameras 2198 and/or mid-range camera(s) 2176, stereo camera(s) 2168, infrared camera(s) 2172, etc.), as described herein.

Figure 21C:
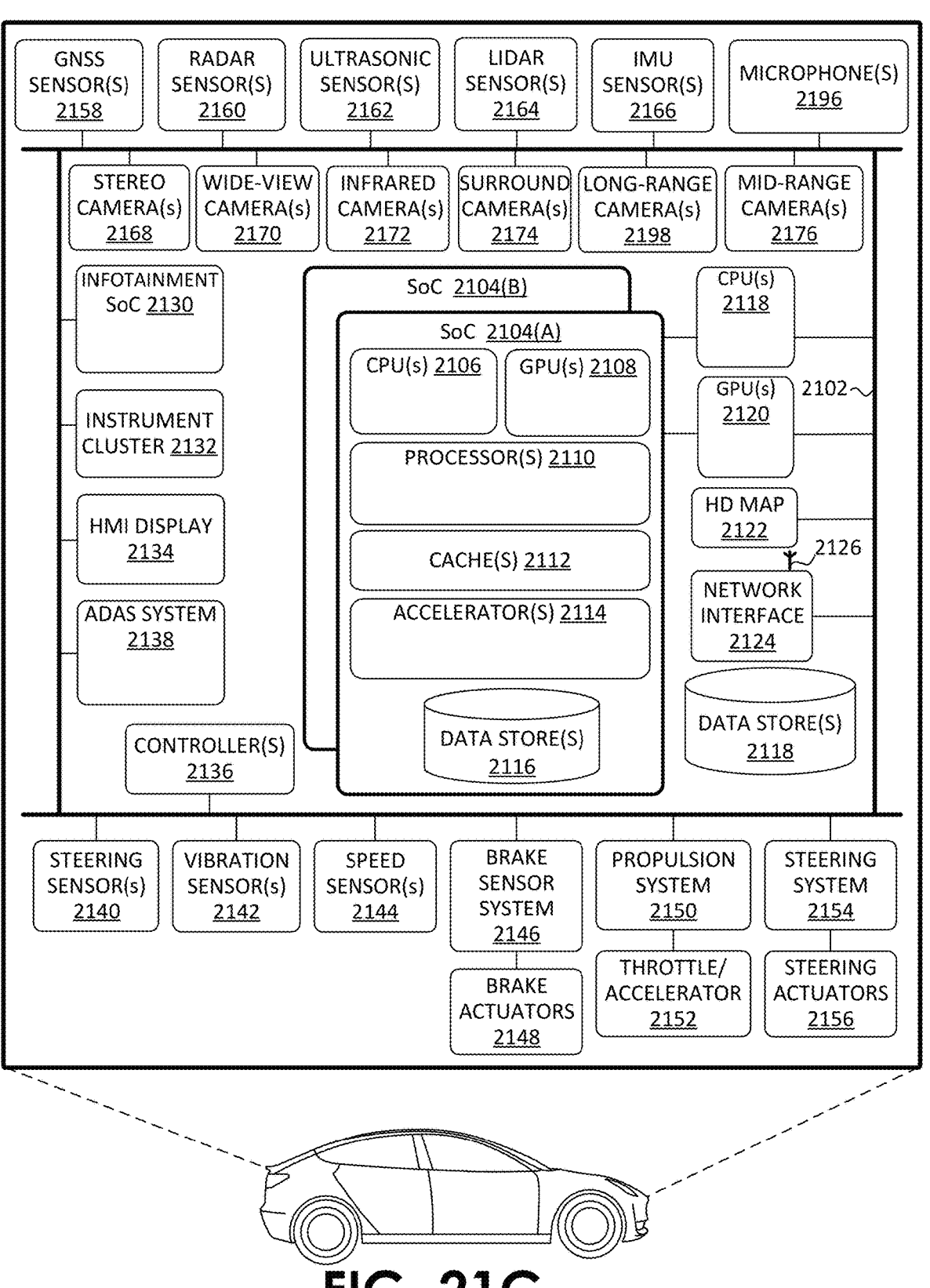
FIG. 21C is a block diagram illustrating an example system architecture for the autonomous vehicle of FIG. 21A, according to at least one embodiment.

FIG. 21C is a block diagram illustrating an example system architecture for autonomous vehicle 2100 of FIG. 21A, according to at least one embodiment. In at least one embodiment, each of components, features, and systems of vehicle 2100 in FIG. 21C are illustrated as being connected via a bus 2102. In at least one embodiment, bus 2102 may include, without limitation, a CAN data interface (alternatively referred to herein as a "CAN bus"). In at least one embodiment, a CAN may be a network inside vehicle 2100 used to aid in control of various features and functionality of vehicle 2100, such as actuation of brakes, acceleration, braking, steering, windshield wipers, etc. In at least one embodiment, bus 2102 may be configured to have dozens or even hundreds of nodes, each with its own unique identifier (e.g., a CAN ID). In at least one embodiment, bus 2102 may be read to find steering wheel angle, ground speed, engine revolutions per minute ("RPMs"), button positions, and/or other vehicle status indicators. In at least one embodiment, bus 2102 may be a CAN bus that is ASIL B compliant.

In at least one embodiment, in addition to, or alternatively from CAN, FlexRay and/or Ethernet may be used. In at least one embodiment, there may be any number of busses 2102, which may include, without limitation, zero or more CAN busses, zero or more FlexRay busses, zero or more Ethernet busses, and/or zero or more other types of busses using a different protocol. In at least one embodiment, two or more busses 2102 may be used to perform different functions, and/or may be used for redundancy. For example, a first bus 2102 may be used for collision avoidance functionality and a second bus 2102 may be used for actuation control. In at least one embodiment, each bus 2102 may communicate with any of components of vehicle 2100, and two or more busses 2102 may communicate with same components. In at least one embodiment, each of any number of system(s) on chip(s) ("SoC(s)") 2104, each of controller(s) 2136, and/or each computer within vehicle may have access to same input data (e.g., inputs from sensors of vehicle 2100), and may be connected to a common bus, such CAN bus.

In at least one embodiment, vehicle 2100 may include one or more controller(s) 2136, such as those described herein with respect to FIG. 21A. In at least one embodiment, controller(s) 2136 may be used for a variety of functions. In at least one embodiment, controller(s) 2136 may be coupled to any of various other components and systems of vehicle 2100, and may be used for control of vehicle 2100, artificial intelligence of vehicle 2100, infotainment for vehicle 2100, and/or like.

In at least one embodiment, vehicle 2100 may include any number of SoCs 2104. Each of SoCs 2104 may include, without limitation, central processing units ("CPU(s)") 2106, graphics processing units ("GPU(s)") 2108, processor(s) 2110, cache(s) 2112, accelerator(s) 2114, data store(s) 2116, and/or other components and features not illustrated. In at least one embodiment, SoC(s) 2104 may be used to control vehicle 2100 in a variety of platforms and systems. For example, in at least one embodiment, SoC(s) 2104 may be combined in a system (e.g., system of vehicle 2100) with a High Definition ("HD") map 2122 which may obtain map refreshes and/or updates via network interface 2124 from one or more servers (not shown in FIG. 21C).

In at least one embodiment, CPU(s) 2106 may include a CPU cluster or CPU complex (alternatively referred to herein as a "CCPLEX"). In at least one embodiment, CPU(s) 2106 may include multiple cores and/or level two ("L2")

caches. For instance, in at least one embodiment, CPU(s) 2106 may include eight cores in a coherent multi-processor configuration. In at least one embodiment, CPU(s) 2106 may include four dual-core clusters where each cluster has a dedicated L2 cache (e.g., a 2 MB L2 cache). In at least one embodiment, CPU(s) 2106 (e.g., CCPLEX) may be configured to support simultaneous cluster operation enabling any combination of clusters of CPU(s) 2106 to be active at any given time.

In at least one embodiment, one or more of CPU(s) 2106 may implement power management capabilities that include, without limitation, one or more of following features: individual hardware blocks may be clock-gated automatically when idle to save dynamic power; each core clock may be gated when core is not actively executing instructions due to execution of Wait for Interrupt ("WFI")/Wait for Event ("WFE") instructions; each core may be independently power-gated; each core cluster may be independently clock-gated when all cores are clock-gated or power-gated; and/or each core cluster may be independently power-gated when all cores are power-gated. In at least one embodiment, CPU(s) 2106 may further implement an enhanced algorithm for managing power states, where allowed power states and expected wakeup times are specified, and hardware/microcode determines best power state to enter for core, cluster, and CCPLEX. In at least one embodiment, processing cores may support simplified power state entry sequences in software with work offloaded to microcode. In at least one embodiment, processing cores are referred to as compute units or computing units.

In at least one embodiment, GPU(s) 2108 may include an integrated GPU (alternatively referred to herein as an "iGPU"). In at least one embodiment, GPU(s) 2108 may be programmable and may be efficient for parallel workloads. In at least one embodiment, GPU(s) 2108, in at least one embodiment, may use an enhanced tensor instruction set. In on embodiment, GPU(s) 2108 may include one or more streaming microprocessors, where each streaming microprocessor may include a level one ("L1") cache (e.g., an L1 cache with at least 96 KB storage capacity), and two or more of streaming microprocessors may share an L2 cache (e.g., an L2 cache with a 512 KB storage capacity). In at least one embodiment, GPU(s) 2108 may include at least eight streaming microprocessors. In at least one embodiment, GPU(s) 2108 may use compute application programming interface(s) (API(s)). In at least one embodiment, GPU(s) 2108 may use one or more parallel computing platforms and/or programming models (e.g., NVIDIA's CUDA).

In at least one embodiment, one or more of GPU(s) 2108 may be power-optimized for best performance in automotive and embedded use cases. For example, in on embodiment, GPU(s) 2108 could be fabricated on a Fin field-effect transistor ("FinFET"). In at least one embodiment, each streaming microprocessor may incorporate a number of mixed-precision processing cores partitioned into multiple blocks. For example, and without limitation, 64 PF32 cores and 32 PF64 cores could be partitioned into four processing blocks. In at least one embodiment, each processing block could be allocated 16 FP32 cores, 8 FP64 cores, 16 INT32 cores, two mixed-precision NVIDIA TENSOR COREs for deep learning matrix arithmetic, a level zero ("L0") instruction cache, a warp scheduler, a dispatch unit, and/or a 64 KB register file. In at least one embodiment, streaming microprocessors may include independent parallel integer and floating-point data paths to provide for efficient execution of workloads with a mix of computation and addressing calculations. In at least one embodiment, streaming microprocessors may include independent thread scheduling capability to enable finer-grain synchronization and cooperation between parallel threads. In at least one embodiment, streaming microprocessors may include a combined L1 data cache and shared memory unit in order to improve performance while simplifying programming.

In at least one embodiment, one or more of GPU(s) 2108 may include a high bandwidth memory ("HBM") and/or a 16 GB HBM2 memory subsystem to provide, in some examples, about 900 GB/second peak memory bandwidth. In at least one embodiment, in addition to, or alternatively from, HBM memory, a synchronous graphics random-access memory ("SGRAM") may be used, such as a graphics double data rate type five synchronous random-access memory ("GDDR5").

In at least one embodiment, GPU(s) 2108 may include unified memory technology. In at least one embodiment, address translation services ("ATS") support may be used to allow GPU(s) 2108 to access CPU(s) 2106 page tables directly. In at least one embodiment, embodiment, when GPU(s) 2108 memory management unit ("MMU") experiences a miss, an address translation request may be transmitted to CPU(s) 2106. In response, CPU(s) 2106 may look in its page tables for virtual-to-physical mapping for address and transmits translation back to GPU(s) 2108, in at least one embodiment. In at least one embodiment, unified memory technology may allow a single unified virtual address space for memory of both CPU(s) 2106 and GPU(s) 2108, thereby simplifying GPU(s) 2108 programming and porting of applications to GPU(s) 2108.

In at least one embodiment, GPU(s) 2108 may include any number of access counters that may keep track of frequency of access of GPU(s) 2108 to memory of other processors. In at least one embodiment, access counter(s) may help ensure that memory pages are moved to physical memory of processor that is accessing pages most frequently, thereby improving efficiency for memory ranges shared between processors.

In at least one embodiment, one or more of SoC(s) 2104 may include any number of cache(s) 2112, including those described herein. For example, in at least one embodiment, cache(s) 2112 could include a level three ("L3") cache that is available to both CPU(s) 2106 and GPU(s) 2108 (e.g., that is connected to both CPU(s) 2106 and GPU(s) 2108). In at least one embodiment, cache(s) 2112 may include a write-back cache that may keep track of states of lines, such as by using a cache coherence protocol (e.g., MEI, MESI, MSI, etc.). In at least one embodiment, L3 cache may include 4 MB or more, depending on embodiment, although smaller cache sizes may be used.

In at least one embodiment, one or more of SoC(s) 2104 may include one or more accelerator(s) 2114 (e.g., hardware accelerators, software accelerators, or a combination thereof). In at least one embodiment, SoC(s) 2104 may include a hardware acceleration cluster that may include optimized hardware accelerators and/or large on-chip memory. In at least one embodiment, large on-chip memory (e.g., 4 MB of SRAM), may enable hardware acceleration cluster to accelerate neural networks and other calculations. In at least one embodiment, hardware acceleration cluster may be used to complement GPU(s) 2108 and to off-load some of tasks of GPU(s) 2108 (e.g., to free up more cycles of GPU(s) 2108 for performing other tasks). In at least one embodiment, accelerator(s) 2114 could be used for targeted workloads (e.g., perception, convolutional neural networks ("CNNs"), recurrent neural networks ("RNNs"), etc.) that are stable enough to be amenable to acceleration. In at least one embodiment, a CNN may include a region-based or regional convolutional neural networks ("RCNNs") and Fast RCNNs (e.g., as used for object detection) or other type of CNN.

In at least one embodiment, accelerator(s) 2114 (e.g., hardware acceleration cluster) may include a deep learning accelerator(s) ("DLA"). DLA(s) may include, without limitation, one or more Tensor processing units ("TPUs") that may be configured to provide an additional ten trillion operations per second for deep learning applications and inferencing. In at least one embodiment, TPUs may be accelerators configured to, and optimized for, performing image processing functions (e.g., for CNNs, RCNNs, etc.). DLA(s) may further be optimized for a specific set of neural network types and floating point operations, as well as inferencing. In at least one embodiment, design of DLA(s) may provide more performance per millimeter than a typical general-purpose GPU, and typically vastly exceeds performance of a CPU. In at least one embodiment, TPU(s) may perform several functions, including a single-instance convolution function, supporting, for example, INT8, INT16, and FP16 data types for both features and weights, as well as post-processor functions. In at least one embodiment, DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones 2196; a CNN for facial recognition and vehicle owner identification using data from camera sensors; and/or a CNN for security and/or safety related events.

In at least one embodiment, DLA(s) may perform any function of GPU(s) 2108, and by using an inference accelerator, for example, a designer may target either DLA(s) or GPU(s) 2108 for any function. For example, in at least one embodiment, designer may focus processing of CNNs and floating point operations on DLA(s) and leave other functions to GPU(s) 2108 and/or other accelerator(s) 2114.

In at least one embodiment, accelerator(s) 2114 (e.g., hardware acceleration cluster) may include a programmable vision accelerator(s) ("PVA"), which may alternatively be referred to herein as a computer vision accelerator. In at least one embodiment, PVA(s) may be designed and configured to accelerate computer vision algorithms for advanced driver assistance system ("ADAS") 2138, autonomous driving, augmented reality ("AR") applications, and/or virtual reality ("VR") applications. PVA(s) may provide a balance between performance and flexibility. For example, in at least one embodiment, each PVA(s) may include, for example and without limitation, any number of reduced instruction set computer ("RISC") cores, direct memory access ("DMA"), and/or any number of vector processors.

In at least one embodiment, RISC cores may interact with image sensors (e.g., image sensors of any of cameras described herein), image signal processor(s), and/or like. In at least one embodiment, each of RISC cores may include any amount of memory. In at least one embodiment, RISC cores may use any of a number of protocols, depending on embodiment. In at least one embodiment, RISC cores may execute a real-time operating system ("RTOS"). In at least one embodiment, RISC cores may be implemented using one or more integrated circuit devices, application specific integrated circuits ("ASICs"), and/or memory devices. For example, in at least one embodiment, RISC cores could include an instruction cache and/or a tightly coupled RAM.

In at least one embodiment, DMA may enable components of PVA(s) to access system memory independently of CPU(s) 2106. In at least one embodiment, DMA may support any number of features used to provide optimization to PVA including, but not limited to, supporting multi-dimensional addressing and/or circular addressing. In at least one embodiment, DMA may support up to six or more dimensions of addressing, which may include, without limitation, block width, block height, block depth, horizontal block stepping, vertical block stepping, and/or depth stepping.

In at least one embodiment, vector processors may be programmable processors that may be designed to efficiently and flexibly execute programming for computer vision algorithms and provide signal processing capabilities. In at least one embodiment, PVA may include a PVA core and two vector processing subsystem partitions. In at least one embodiment, PVA core may include a processor subsystem, DMA engine(s) (e.g., two DMA engines), and/or other peripherals. In at least one embodiment, vector processing subsystem may operate as a primary processing engine of PVA and may include a vector processing unit ("VPU"), an instruction cache, and/or vector memory (e.g., "VMEM"). In at least one embodiment, VPU core may include a digital signal processor such as, for example, a single instruction, multiple data ("SIMD"), very long instruction word ("VLIW") digital signal processor. In at least one embodiment, a combination of SIMD and VLIW may enhance throughput and speed.

In at least one embodiment, each of vector processors may include an instruction cache and may be coupled to dedicated memory. As a result, in at least one embodiment, each of vector processors may be configured to execute independently of other vector processors. In at least one embodiment, vector processors that are included in a particular PVA may be configured to employ data parallelism. For instance, in at least one embodiment, plurality of vector processors included in a single PVA may execute same computer vision algorithm, but on different regions of an image. In at least one embodiment, vector processors included in a particular PVA may simultaneously execute different computer vision algorithms, on same image, or even execute different algorithms on sequential images or portions of an image. In at least one embodiment, among other things, any number of PVAs may be included in hardware acceleration cluster and any number of vector processors may be included in each of PVAs. In at least one embodiment, PVA(s) may include additional error correcting code ("ECC") memory, to enhance overall system safety.

In at least one embodiment, accelerator(s) 2114 (e.g., hardware acceleration cluster) may include a computer vision network on-chip and static random-access memory ("SRAM"), for providing a high-bandwidth, low latency SRAM for accelerator(s) 2114. In at least one embodiment, on-chip memory may include at least 4 MB SRAM, consisting of, for example and without limitation, eight field-configurable memory blocks, that may be accessible by both PVA and DLA. In at least one embodiment, each pair of memory blocks may include an advanced peripheral bus ("APB") interface, configuration circuitry, a controller, and a multiplexer. In at least one embodiment, any type of memory may be used. In at least one embodiment, PVA and DLA may access memory via a backbone that provides PVA and DLA with high-speed access to memory. In at least one embodiment, backbone may include a computer vision network on-chip that interconnects PVA and DLA to memory (e.g., using APB).

In at least one embodiment, computer vision network on-chip may include an interface that determines, before transmission of any control signal/address/data, that both PVA and DLA provide ready and valid signals. In at least one embodiment, an interface may provide for separate phases and separate channels for transmitting control signals/addresses/data, as well as burst-type communications for continuous data transfer. In at least one embodiment, an interface may comply with International Organization for Standardization ("ISO") 26262 or International Electrotechnical Commission ("IEC") 61508 standards, although other standards and protocols may be used.

In at least one embodiment, one or more of SoC(s) 2104 may include a real-time ray-tracing hardware accelerator. In at least one embodiment, real-time ray-tracing hardware accelerator may be used to quickly and efficiently determine positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses.

In at least one embodiment, accelerator(s) 2114 (e.g., hardware accelerator cluster) have a wide array of uses for autonomous driving. In at least one embodiment, PVA may be a programmable vision accelerator that may be used for key processing stages in ADAS and autonomous vehicles. In at least one embodiment, PVA's capabilities are a good match for algorithmic domains needing predictable processing, at low power and low latency. In other words, PVA performs well on semi-dense or dense regular computation, even on small data sets, which need predictable run-times with low latency and low power. In at least one embodiment, autonomous vehicles, such as vehicle 2100, PVAs are designed to run classic computer vision algorithms, as they are efficient at object detection and operating on integer math.

For example, according to at least one embodiment of technology, PVA is used to perform computer stereo vision. In at least one embodiment, semi-global matching-based algorithm may be used in some examples, although this is not intended to be limiting. In at least one embodiment, applications for Level 3-5 autonomous driving use motion estimation/stereo matching on-the-fly (e.g., structure from motion, pedestrian recognition, lane detection, etc.). In at least one embodiment, PVA may perform computer stereo vision function on inputs from two monocular cameras.

In at least one embodiment, PVA may be used to perform dense optical flow. For example, in at least one embodiment, PVA could process raw RADAR data (e.g., using a 4D Fast Fourier Transform) to provide processed RADAR data. In at least one embodiment, PVA is used for time-of-flight depth processing, by processing raw time of flight data to provide processed time of flight data, for example.

In at least one embodiment, DLA may be used to run any type of network to enhance control and driving safety, including for example and without limitation, a neural network that outputs a measure of confidence for each object detection. In at least one embodiment, confidence may be represented or interpreted as a probability, or as providing a relative "weight" of each detection compared to other detections. In at least one embodiment, confidence enables a system to make further decisions regarding which detections should be considered as true positive detections rather than false positive detections. In at least one embodiment, a system may set a threshold value for confidence and consider only detections exceeding threshold value as true positive detections. In an embodiment in which an automatic emergency braking ("AEB") system is used, false positive detections would cause vehicle to automatically perform emergency braking, which is obviously undesirable. In at least one embodiment, highly confident detections may be considered as triggers for AEB. In at least one embodiment, DLA may run a neural network for regressing confidence value. In at least one embodiment, neural network may take as its input at least some subset of parameters, such as bounding box dimensions, ground plane estimate obtained (e.g., from another subsystem), output from IMU sensor(s) 2166 that correlates with vehicle 2100 orientation, distance, 3D location estimates of object obtained from neural network and/or other sensors (e.g., LIDAR sensor(s) 2164 or RADAR sensor(s) 2160), among others.

In at least one embodiment, one or more of SoC(s) 2104 may include data store(s) 2116 (e.g., memory). In at least one embodiment, data store(s) 2116 may be on-chip memory of SoC(s) 2104, which may store neural networks to be executed on GPU(s) 2108 and/or DLA. In at least one embodiment, data store(s) 2116 may be large enough in capacity to store multiple instances of neural networks for redundancy and safety. In at least one embodiment, data store(s) 2112 may comprise L2 or L3 cache(s).

In at least one embodiment, one or more of SoC(s) 2104 may include any number of processor(s) 2110 (e.g., embedded processors). In at least one embodiment, processor(s) 2110 may include a boot and power management processor that may be a dedicated processor and subsystem to handle boot power and management functions and related security enforcement. In at least one embodiment, boot and power management processor may be a part of SoC(s) 2104 boot sequence and may provide runtime power management services. In at least one embodiment, boot power and management processor may provide clock and voltage programming, assistance in system low power state transitions, management of SoC(s) 2104 thermals and temperature sensors, and/or management of SoC(s) 2104 power states. In at least one embodiment, each temperature sensor may be implemented as a ring-oscillator whose output frequency is proportional to temperature, and SoC(s) 2104 may use ring-oscillators to detect temperatures of CPU(s) 2106, GPU(s) 2108, and/or accelerator(s) 2114. In at least one embodiment, if temperatures are determined to exceed a threshold, then boot and power management processor may enter a temperature fault routine and put SoC(s) 2104 into a lower power state and/or put vehicle 2100 into a chauffeur to safe stop mode (e.g., bring vehicle 2100 to a safe stop).

In at least one embodiment, processor(s) 2110 may further include a set of embedded processors that may serve as an audio processing engine. In at least one embodiment, audio processing engine may be an audio subsystem that enables full hardware support for multi-channel audio over multiple interfaces, and a broad and flexible range of audio I/O interfaces. In at least one embodiment, audio processing engine is a dedicated processor core with a digital signal processor with dedicated RAM.

In at least one embodiment, processor(s) 2110 may further include an always on processor engine that may provide necessary hardware features to support low power sensor management and wake use cases. In at least one embodiment, always on processor engine may include, without limitation, a processor core, a tightly coupled RAM, supporting peripherals (e.g., timers and interrupt controllers), various I/O controller peripherals, and routing logic.

In at least one embodiment, processor(s) 2110 may further include a safety cluster engine that includes, without limitation, a dedicated processor subsystem to handle safety management for automotive applications. In at least one embodiment, safety cluster engine may include, without limitation, two or more processor cores, a tightly coupled RAM, support peripherals (e.g., timers, an interrupt controller, etc.), and/or routing logic. In a safety mode, two or more cores may operate, in at least one embodiment, in a lockstep mode and function as a single core with comparison logic to detect any differences between their operations. In at least one embodiment, processor(s) 2110 may further include a real-time camera engine that may include, without limitation, a dedicated processor subsystem for handling real-time camera management. In at least one embodiment, processor(s) 2110 may further include a high-dynamic range signal processor that may include, without limitation, an image signal processor that is a hardware engine that is part of camera processing pipeline.

In at least one embodiment, processor(s) 2110 may include a video image compositor that may be a processing block (e.g., implemented on a microprocessor) that implements video post-processing functions needed by a video playback application to produce final image for player window. In at least one embodiment, video image compositor may perform lens distortion correction on wide-view camera(s) 2170, surround camera(s) 2174, and/or on in-cabin monitoring camera sensor(s). In at least one embodiment, in-cabin monitoring camera sensor(s) are preferably monitored by a neural network running on another instance of SoC 2104, configured to identify in cabin events and respond accordingly. In at least one embodiment, an in-cabin system may perform, without limitation, lip reading to activate cellular service and place a phone call, dictate emails, change vehicle's destination, activate or change vehicle's infotainment system and settings, or provide voice-activated web surfing. In at least one embodiment, certain functions are available to driver when vehicle is operating in an autonomous mode and are disabled otherwise.

In at least one embodiment, video image compositor may include enhanced temporal noise reduction for both spatial and temporal noise reduction. For example, in at least one embodiment, where motion occurs in a video, noise reduction weights spatial information appropriately, decreasing weight of information provided by adjacent frames. In at least one embodiment, where an image or portion of an image does not include motion, temporal noise reduction performed by video image compositor may use information from previous image to reduce noise in current image.

In at least one embodiment, video image compositor may also be configured to perform stereo rectification on input stereo lens frames. In at least one embodiment, video image compositor may further be used for user interface composition when operating system desktop is in use, and GPU(s) 2108 are not required to continuously render new surfaces. In at least one embodiment, when GPU(s) 2108 are powered on and active doing 3D rendering, video image compositor may be used to offload GPU(s) 2108 to improve performance and responsiveness.

In at least one embodiment, one or more of SoC(s) 2104 may further include a mobile industry processor interface ("MIPI") camera serial interface for receiving video and input from cameras, a high-speed interface, and/or a video input block that may be used for camera and related pixel input functions. In at least one embodiment, one or more of SoC(s) 2104 may further include an input/output controller(s) that may be controlled by software and may be used for receiving I/O signals that are uncommitted to a specific role.

In at least one embodiment, one or more of SoC(s) 2104 may further include a broad range of peripheral interfaces to enable communication with peripherals, audio encoders/decoders ("codecs"), power management, and/or other devices. SoC(s) 2104 may be used to process data from cameras (e.g., connected over Gigabit Multimedia Serial Link and Ethernet), sensors (e.g., LIDAR sensor(s) 2164, RADAR sensor(s) 2160, etc. that may be connected over Ethernet), data from bus 2102 (e.g., speed of vehicle 2100, steering wheel position, etc.), data from GNSS sensor(s) 2158 (e.g., connected over Ethernet or CAN bus), etc. In at least one embodiment, one or more of SoC(s) 2104 may further include dedicated high-performance mass storage controllers that may include their own DMA engines, and that may be used to free CPU(s) 2106 from routine data management tasks.

In at least one embodiment, SoC(s) 2104 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. In at least one embodiment, SoC(s) 2104 may be faster, more reliable, and even more energy-efficient and space-efficient than conventional systems. For example, in at least one embodiment, accelerator(s) 2114, when combined with CPU(s) 2106, GPU(s) 2108, and data store(s) 2116, may provide for a fast, efficient platform for Level 3-5 autonomous vehicles.

In at least one embodiment, computer vision algorithms may be executed on CPUs, which may be configured using high-level programming language, such as C programming language, to execute a wide variety of processing algorithms across a wide variety of visual data. However, in at least one embodiment, CPUs are oftentimes unable to meet performance requirements of many computer vision applications, such as those related to execution time and power consumption, for example. In at least one embodiment, many CPUs are unable to execute complex object detection algorithms in real-time, which is used in in-vehicle ADAS applications and in practical Level 3-5 autonomous vehicles.

Embodiments described herein allow for multiple neural networks to be performed simultaneously and/or sequentially, and for results to be combined together to enable Level 3-5 autonomous driving functionality. For example, in at least one embodiment, a CNN executing on DLA or discrete GPU (e.g., GPU(s) 2120) may include text and word recognition, allowing supercomputer to read and understand traffic signs, including signs for which neural network has not been specifically trained. In at least one embodiment, DLA may further include a neural network that is able to identify, interpret, and provide semantic understanding of sign, and to pass that semantic understanding to path planning modules running on CPU Complex.

In at least one embodiment, multiple neural networks may be run simultaneously, as for Level 3, 4, or 5 driving. For example, in at least one embodiment, a warning sign consisting of "Caution: flashing lights indicate icy conditions," along with an electric light, may be independently or collectively interpreted by several neural networks. In at least one embodiment, sign itself may be identified as a traffic sign by a first deployed neural network (e.g., a neural network that has been trained), text "flashing lights indicate icy conditions" may be interpreted by a second deployed neural network, which informs vehicle's path planning software (preferably executing on CPU Complex) that when flashing lights are detected, icy conditions exist. In at least one embodiment, flashing light may be identified by operating a third deployed neural network over multiple frames, informing vehicle's path-planning software of presence (or absence) of flashing lights. In at least one embodiment, all three neural networks may run simultaneously, such as within DLA and/or on GPU(s) 2108.

In at least one embodiment, a CNN for facial recognition and vehicle owner identification may use data from camera sensors to identify presence of an authorized driver and/or owner of vehicle 2100. In at least one embodiment, an always on sensor processing engine may be used to unlock vehicle when owner approaches driver door and turn on lights, and, in security mode, to disable vehicle when owner leaves vehicle. In this way, SoC(s) 2104 provide for security against theft and/or carjacking.

In at least one embodiment, a CNN for emergency vehicle detection and identification may use data from microphones 2196 to detect and identify emergency vehicle sirens. In at least one embodiment, SoC(s) 2104 use CNN for classifying environmental and urban sounds, as well as classifying visual data. In at least one embodiment, CNN running on DLA is trained to identify relative closing speed of emergency vehicle (e.g., by using Doppler effect). In at least one embodiment, CNN may also be trained to identify emergency vehicles specific to local area in which vehicle is operating, as identified by GNSS sensor(s) 2158. In at least one embodiment, when operating in Europe, CNN will seek to detect European sirens, and when in United States CNN will seek to identify only North American sirens. In at least one embodiment, once an emergency vehicle is detected, a control program may be used to execute an emergency vehicle safety routine, slowing vehicle, pulling over to side of road, parking vehicle, and/or idling vehicle, with assistance of ultrasonic sensor(s) 2162, until emergency vehicle(s) passes.

In at least one embodiment, vehicle 2100 may include CPU(s) 2118 (e.g., discrete CPU(s), or dCPU(s)), that may be coupled to SoC(s) 2104 via a high-speed interconnect (e.g., PCIe). In at least one embodiment, CPU(s) 2118 may include an X86 processor, for example. CPU(s) 2118 may be used to perform any of a variety of functions, including arbitrating potentially inconsistent results between ADAS sensors and SoC(s) 2104, and/or monitoring status and health of controller(s) 2136 and/or an infotainment system on a chip ("infotainment SoC") 2130, for example.

In at least one embodiment, vehicle 2100 may include GPU(s) 2120 (e.g., discrete GPU(s), or dGPU(s)), that may be coupled to SoC(s) 2104 via a high-speed interconnect (e.g., NVIDIA's NVLINK). In at least one embodiment, GPU(s) 2120 may provide additional artificial intelligence functionality, such as by executing redundant and/or different neural networks and may be used to train and/or update neural networks based at least in part on input (e.g., sensor data) from sensors of vehicle 2100.

In at least one embodiment, vehicle 2100 may further include network interface 2124 which may include, without limitation, wireless antenna(s) 2126 (e.g., one or more wireless antennas 2126 for different communication protocols, such as a cellular antenna, a Bluetooth antenna, etc.). In at least one embodiment, network interface 2124 may be used to enable wireless connectivity over Internet with cloud (e.g., with server(s) and/or other network devices), with other vehicles, and/or with computing devices (e.g., client devices of passengers). In at least one embodiment, to communicate with other vehicles, a direct link may be established between vehicle 210 and other vehicle and/or an indirect link may be established (e.g., across networks and over Internet). In at least one embodiment, direct links may be provided using a vehicle-to-vehicle communication link. In at least one embodiment, vehicle-to-vehicle communication link may provide vehicle 2100 information about vehicles in proximity to vehicle 2100 (e.g., vehicles in front of, on side of, and/or behind vehicle 2100). In at least one embodiment, aforementioned functionality may be part of a cooperative adaptive cruise control functionality of vehicle 2100.

In at least one embodiment, network interface 2124 may include an SoC that provides modulation and demodulation functionality and enables controller(s) 2136 to communicate over wireless networks. In at least one embodiment, network interface 2124 may include a radio frequency front-end for up-conversion from baseband to radio frequency, and down conversion from radio frequency to baseband. In at least one embodiment, frequency conversions may be performed in any technically feasible fashion. For example, frequency conversions could be performed through well-known processes, and/or using super-heterodyne processes. In at least one embodiment, radio frequency front end functionality may be provided by a separate chip. In at least one embodiment, network interface may include wireless functionality for communicating over LTE, WCDMA, UMTS, GSM, CDMA2000, Bluetooth, Bluetooth LE, Wi-Fi, Z-Wave, Zig-Bee, LoRaWAN, and/or other wireless protocols.

In at least one embodiment, vehicle 2100 may further include data store(s) 2128 which may include, without limitation, off-chip (e.g., off SoC(s) 2104) storage. In at least one embodiment, data store(s) 2128 may include, without limitation, one or more storage elements including RAM, SRAM, dynamic random-access memory ("DRAM"), video random-access memory ("VRAM"), Flash, hard disks, and/or other components and/or devices that may store at least one bit of data.

In at least one embodiment, vehicle 2100 may further include GNSS sensor(s) 2158 (e.g., GPS and/or assisted GPS sensors), to assist in mapping, perception, occupancy grid generation, and/or path planning functions. In at least one embodiment, any number of GNSS sensor(s) 2158 may be used, including, for example and without limitation, a GPS using a USB connector with an Ethernet to Serial (e.g., RS-232) bridge.

In at least one embodiment, vehicle 2100 may further include RADAR sensor(s) 2160. RADAR sensor(s) 2160 may be used by vehicle 2100 for long-range vehicle detection, even in darkness and/or severe weather conditions. In at least one embodiment, RADAR functional safety levels may be ASIL B. RADAR sensor(s) 2160 may use CAN and/or bus 2102 (e.g., to transmit data generated by RADAR sensor(s) 2160) for control and to access object tracking data, with access to Ethernet to access raw data in some examples. In at least one embodiment, wide variety of RADAR sensor types may be used. For example, and without limitation, RADAR sensor(s) 2160 may be suitable for front, rear, and side RADAR use. In at least one embodiment, one or more of RADAR sensors(s) 2160 are Pulse Doppler RADAR sensor(s).

In at least one embodiment, RADAR sensor(s) 2160 may include different configurations, such as long-range with narrow field of view, short-range with wide field of view, short-range side coverage, etc. In at least one embodiment, long-range RADAR may be used for adaptive cruise control functionality. In at least one embodiment, long-range RADAR systems may provide a broad field of view realized by two or more independent scans, such as within a 250 m range. In at least one embodiment, RADAR sensor(s) 2160 may help in distinguishing between static and moving objects, and may be used by ADAS system 2138 for emergency brake assist and forward collision warning. In at least one embodiment, sensors 2160(s) included in a long-range RADAR system may include, without limitation, monostatic multimodal RADAR with multiple (e.g., six or more) fixed RADAR antennae and a high-speed CAN and FlexRay interface. In at least one embodiment, with six antennae, central four antennae may create a focused beam pattern, designed to record vehicle's 2100 surroundings at higher speeds with minimal interference from traffic in adjacent lanes. In at least one embodiment, other two antennae may expand field of view, making it possible to quickly detect vehicles entering or leaving vehicle's 2100 lane.

In at least one embodiment, mid-range RADAR systems may include, as an example, a range of up to 160 m (front) or 80 m (rear), and a field of view of up to 42 degrees (front) or 150 degrees (rear). In at least one embodiment, short-range RADAR systems may include, without limitation, any number of RADAR sensor(s) 2160 designed to be installed at both ends of rear bumper. When installed at both ends of rear bumper, in at least one embodiment, a RADAR sensor system may create two beams that constantly monitor blind spot in rear and next to vehicle. In at least one embodiment, short-range RADAR systems may be used in ADAS system 2138 for blind spot detection and/or lane change assist.

In at least one embodiment, vehicle 2100 may further include ultrasonic sensor(s) 2162. In at least one embodiment, ultrasonic sensor(s) 2162, which may be positioned at front, back, and/or sides of vehicle 2100, may be used for park assist and/or to create and update an occupancy grid. In at least one embodiment, a wide variety of ultrasonic sensor (s) 2162 may be used, and different ultrasonic sensor(s) 2162 may be used for different ranges of detection (e.g., 2.5 m, 4 m). In at least one embodiment, ultrasonic sensor(s) 2162 may operate at functional safety levels of ASIL B.

In at least one embodiment, vehicle 2100 may include LIDAR sensor(s) 2164. LIDAR sensor(s) 2164 may be used for object and pedestrian detection, emergency braking, collision avoidance, and/or other functions. In at least one embodiment, LIDAR sensor(s) 2164 may be functional safety level ASIL B. In at least one embodiment, vehicle 2100 may include multiple LIDAR sensors 2164 (e.g., two, four, six, etc.) that may use Ethernet (e.g., to provide data to a Gigabit Ethernet switch).

In at least one embodiment, LIDAR sensor(s) 2164 may be capable of providing a list of objects and their distances for a 360-degree field of view. In at least one embodiment, commercially available LIDAR sensor(s) 2164 may have an advertised range of approximately 100 m, with an accuracy of 2 cm-3 cm, and with support for a 100 Mbps Ethernet connection, for example. In at least one embodiment, one or more non-protruding LIDAR sensors 2164 may be used. In such an embodiment, LIDAR sensor(s) 2164 may be implemented as a small device that may be embedded into front, rear, sides, and/or corners of vehicle 2100. In at least one embodiment, LIDAR sensor(s) 2164, in such an embodiment, may provide up to a 120-degree horizontal and 35-degree vertical field-of-view, with a 200 m range even for low-reflectivity objects. In at least one embodiment, front-mounted LIDAR sensor(s) 2164 may be configured for a horizontal field of view between 45 degrees and 135 degrees.

In at least one embodiment, LIDAR technologies, such as 3D flash LIDAR, may also be used. 3D Flash LIDAR uses a flash of a laser as a transmission source, to illuminate surroundings of vehicle 2100 up to approximately 200 m. In at least one embodiment, a flash LIDAR unit includes, without limitation, a receptor, which records laser pulse transit time and reflected light on each pixel, which in turn corresponds to range from vehicle 2100 to objects. In at least one embodiment, flash LIDAR may allow for highly accurate and distortion-free images of surroundings to be generated with every laser flash. In at least one embodiment, four flash LIDAR sensors may be deployed, one at each side of vehicle 2100. In at least one embodiment, 3D flash LIDAR systems include, without limitation, a solid-state 3D staring array LIDAR camera with no moving parts other than a fan (e.g., a non-scanning LIDAR device). In at least one embodiment, flash LIDAR device may use a 5 nano-second class I (eye-safe) laser pulse per frame and may capture reflected laser light in form of 3D range point clouds and co-registered intensity data.

In at least one embodiment, vehicle may further include IMU sensor(s) 2166. In at least one embodiment, IMU sensor(s) 2166 may be located at a center of rear axle of vehicle 2100, in at least one embodiment. In at least one embodiment, IMU sensor(s) 2166 may include, for example and without limitation, accelerometer(s), magnetometer(s), gyroscope(s), magnetic compass(es), and/or other sensor types. In at least one embodiment, such as in six-axis applications, IMU sensor(s) 2166 may include, without limitation, accelerometers and gyroscopes. In at least one embodiment, such as in nine-axis applications, IMU sensor(s) 2166 may include, without limitation, accelerometers, gyroscopes, and magnetometers.

In at least one embodiment, IMU sensor(s) 2166 may be implemented as a miniature, high performance GPS-Aided Inertial Navigation System ("GPS/INS") that combines micro-electro-mechanical systems ("MEMS") inertial sensors, a high-sensitivity GPS receiver, and advanced Kalman filtering algorithms to provide estimates of position, velocity, and attitude. In at least one embodiment, IMU sensor(s) 2166 may enable vehicle 2100 to estimate heading without requiring input from a magnetic sensor by directly observing and correlating changes in velocity from GPS to IMU sensor(s) 2166. In at least one embodiment, IMU sensor(s) 2166 and GNSS sensor(s) 2158 may be combined in a single integrated unit.

In at least one embodiment, vehicle 2100 may include microphone(s) 2196 placed in and/or around vehicle 2100. In at least one embodiment, microphone(s) 2196 may be used for emergency vehicle detection and identification, among other things.

In at least one embodiment, vehicle 2100 may further include any number of camera types, including stereo camera(s) 2168, wide-view camera(s) 2170, infrared camera(s) 2172, surround camera(s) 2174, long-range camera(s) 2198, mid-range camera(s) 2176, and/or other camera types. In at least one embodiment, cameras may be used to capture image data around an entire periphery of vehicle 2100. In at least one embodiment, types of cameras used depends vehicle 2100. In at least one embodiment, any combination of camera types may be used to provide necessary coverage around vehicle 2100. In at least one embodiment, number of cameras may differ depending on embodiment. For example, in at least one embodiment, vehicle 2100 could include six cameras, seven cameras, ten cameras, twelve cameras, or another number of cameras. In at least one embodiment, cameras may support, as an example and without limitation, Gigabit Multimedia Serial Link ("GMSL") and/or Gigabit Ethernet. In at least one embodiment, each of camera(s) is described with more detail previously herein with respect to FIG. 21A and FIG. 21B.

In at least one embodiment, vehicle 2100 may further include vibration sensor(s) 2142. In at least one embodiment, vibration sensor(s) 2142 may measure vibrations of components of vehicle 2100, such as axle(s). For example, in at least one embodiment, changes in vibrations may indicate a change in road surfaces. In at least one embodiment, when two or more vibration sensors 2142 are used, differences between vibrations may be used to determine friction or slippage of road surface (e.g., when difference in vibration is between a power-driven axle and a freely rotating axle).

In at least one embodiment, vehicle 2100 may include ADAS system 2138. ADAS system 2138 may include, without limitation, an SoC, in some examples. In at least one embodiment, ADAS system 2138 may include, without limitation, any number and combination of an autonomous/adaptive/automatic cruise control ("ACC") system, a cooperative adaptive cruise control ("CACC") system, a forward crash warning ("FCW") system, an automatic emergency braking ("AEB") system, a lane departure warning ("LDW)" system, a lane keep assist ("LKA") system, a blind spot warning ("BSW") system, a rear cross-traffic warning ("RCTW") system, a collision warning ("CW") system, a lane centering ("LC") system, and/or other systems, features, and/or functionality.

In at least one embodiment, ACC system may use RADAR sensor(s) 2160, LIDAR sensor(s) 2164, and/or any number of camera(s). In at least one embodiment, ACC system may include a longitudinal ACC system and/or a lateral ACC system. In at least one embodiment, longitudinal ACC system monitors and controls distance to vehicle immediately ahead of vehicle 2100 and automatically adjust speed of vehicle 2100 to maintain a safe distance from vehicles ahead. In at least one embodiment, lateral ACC system performs distance keeping, and advises vehicle 2100 to change lanes when necessary. In at least one embodiment, lateral ACC is related to other ADAS applications such as LC and CW.

In at least one embodiment, CACC system uses information from other vehicles that may be received via network interface 2124 and/or wireless antenna(s) 2126 from other vehicles via a wireless link, or indirectly, over a network connection (e.g., over Internet). In at least one embodiment, direct links may be provided by a vehicle-to-vehicle ("V2V") communication link, while indirect links may be provided by an infrastructure-to-vehicle ("I2V") communication link. In general, V2V communication concept provides information about immediately preceding vehicles (e.g., vehicles immediately ahead of and in same lane as vehicle 2100), while I2V communication concept provides information about traffic further ahead. In at least one embodiment, CACC system may include either or both I2V and V2V information sources. In at least one embodiment, given information of vehicles ahead of vehicle 2100, CACC system may be more reliable, and it has potential to improve traffic flow smoothness and reduce congestion on a road.

In at least one embodiment, FCW system is designed to alert driver to a hazard, so that driver may take corrective action. In at least one embodiment, FCW system uses a front-facing camera and/or RADAR sensor(s) 2160, coupled to a dedicated processor, DSP, FPGA, and/or ASIC, that is electrically coupled to driver feedback, such as a display, speaker, and/or vibrating component. In at least one embodiment, FCW system may provide a warning, such as in form of a sound, visual warning, vibration and/or a quick brake pulse.

In at least one embodiment, AEB system detects an impending forward collision with another vehicle or other object, and may automatically apply brakes if driver does not take corrective action within a specified time or distance parameter. In at least one embodiment, AEB system may use front-facing camera(s) and/or RADAR sensor(s) 2160, coupled to a dedicated processor, DSP, FPGA, and/or ASIC. In at least one embodiment, when AEB system detects a hazard, AEB system typically first alerts driver to take corrective action to avoid collision and, if driver does not take corrective action, AEB system may automatically apply brakes in an effort to prevent, or at least mitigate, impact of predicted collision. In at least one embodiment, AEB system, may include techniques such as dynamic brake support and/or crash imminent braking.

In at least one embodiment, LDW system provides visual, audible, and/or tactile warnings, such as steering wheel or seat vibrations, to alert driver when vehicle 2100 crosses lane markings. In at least one embodiment, LDW system does not activate when driver indicates an intentional lane departure, by activating a turn signal. In at least one embodiment, LDW system may use front-side facing cameras, coupled to a dedicated processor, DSP, FPGA, and/or ASIC, that is electrically coupled to driver feedback, such as a display, speaker, and/or vibrating component. In at least one embodiment, LKA system is a variation of LDW system. LKA system provides steering input or braking to correct vehicle 2100 if vehicle 2100 starts to exit lane.

In at least one embodiment, BSW system detects and warns driver of vehicles in an automobile's blind spot. In at least one embodiment, BSW system may provide a visual, audible, and/or tactile alert to indicate that merging or changing lanes is unsafe. In at least one embodiment, BSW system may provide an additional warning when driver uses a turn signal. In at least one embodiment, BSW system may use rear-side facing camera(s) and/or RADAR sensor(s) 2160, coupled to a dedicated processor, DSP, FPGA, and/or ASIC, that is electrically coupled to driver feedback, such as a display, speaker, and/or vibrating component.

In at least one embodiment, RCTW system may provide visual, audible, and/or tactile notification when an object is detected outside rear-camera range when vehicle 2100 is backing up. In at least one embodiment, RCTW system includes AEB system to ensure that vehicle brakes are applied to avoid a crash. In at least one embodiment, RCTW system may use one or more rear-facing RADAR sensor(s) 2160, coupled to a dedicated processor, DSP, FPGA, and/or ASIC, that is electrically coupled to driver feedback, such as a display, speaker, and/or vibrating component.

In at least one embodiment, conventional ADAS systems may be prone to false positive results which may be annoying and distracting to a driver, but typically are not catastrophic, because conventional ADAS systems alert driver and allow driver to decide whether a safety condition truly exists and act accordingly. In at least one embodiment, vehicle 2100 itself decides, in case of conflicting results, whether to heed result from a primary computer or a secondary computer (e.g., first controller 2136 or second controller 2136). For example, in at least one embodiment, ADAS system 2138 may be a backup and/or secondary computer for providing perception information to a backup computer rationality module. In at least one embodiment, backup computer rationality monitor may run a redundant diverse software on hardware components to detect faults in perception and dynamic driving tasks. In at least one embodiment, outputs from ADAS system 2138 may be provided to a supervisory MCU. In at least one embodiment, if outputs from primary computer and secondary computer conflict, supervisory MCU determines how to reconcile conflict to ensure safe operation.

In at least one embodiment, primary computer may be configured to provide supervisory MCU with a confidence score, indicating primary computer's confidence in chosen result. In at least one embodiment, if confidence score exceeds a threshold, supervisory MCU may follow primary computer's direction, regardless of whether secondary computer provides a conflicting or inconsistent result. In at least one embodiment, where confidence score does not meet threshold, and where primary and secondary computer indicate different results (e.g., a conflict), supervisory MCU may arbitrate between computers to determine appropriate outcome.

In at least one embodiment, supervisory MCU may be configured to run a neural network(s) that is trained and configured to determine, based at least in part on outputs from primary computer and secondary computer, conditions under which secondary computer provides false alarms. In at least one embodiment, neural network(s) in supervisory MCU may learn when secondary computer's output may be trusted, and when it cannot. For example, in at least one embodiment, when secondary computer is a RADAR-based FCW system, a neural network(s) in supervisory MCU may learn when FCW system is identifying metallic objects that are not, in fact, hazards, such as a drainage grate or manhole cover that triggers an alarm. In at least one embodiment, when secondary computer is a camera-based LDW system, a neural network in supervisory MCU may learn to override LDW when bicyclists or pedestrians are present and a lane departure is, in fact, safest maneuver. In at least one embodiment, supervisory MCU may include at least one of a DLA or GPU suitable for running neural network(s) with associated memory. In at least one embodiment, supervisory MCU may comprise and/or be included as a component of SoC(s) 2104.

In at least one embodiment, ADAS system 2138 may include a secondary computer that performs ADAS functionality using traditional rules of computer vision. In at least one embodiment, secondary computer may use classic computer vision rules (if-then), and presence of a neural network(s) in supervisory MCU may improve reliability, safety, and performance. For example, in at least one embodiment, diverse implementation and intentional non-identity makes overall system more fault-tolerant, especially to faults caused by software (or software-hardware interface) functionality. For example, in at least one embodiment, if there is a software bug or error in software running on primary computer, and non-identical software code running on secondary computer provides same overall result, then supervisory MCU may have greater confidence that overall result is correct, and bug in software or hardware on primary computer is not causing material error.

In at least one embodiment, output of ADAS system 2138 may be fed into primary computer's perception block and/or primary computer's dynamic driving task block. For example, in at least one embodiment, if ADAS system 2138 indicates a forward crash warning due to an object immediately ahead, perception block may use this information when identifying objects. In at least one embodiment, secondary computer may have its own neural network which is trained and thus reduces risk of false positives, as described herein.

In at least one embodiment, vehicle 2100 may further include infotainment SoC 2130 (e.g., an in-vehicle infotainment system (IVI)). Although illustrated and described as an SoC, infotainment system 2130, in at least one embodiment, may not be an SoC, and may include, without limitation, two or more discrete components. In at least one embodiment, infotainment SoC 2130 may include, without limitation, a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, WiFi, etc.), and/or information services (e.g., navigation systems, rear-parking assistance, a radio data system, vehicle related information such as fuel level, total distance covered, brake fuel level, oil level, door open/close, air filter information, etc.) to vehicle 2100. For example, infotainment SoC 2130 could include radios, disk players, navigation systems, video players, USB and Bluetooth connectivity, carputers, in-car entertainment, WiFi, steering wheel audio controls, hands free voice control, a heads-up display ("HUD"), HIMI display 2134, a telematics device, a control panel (e.g., for controlling and/or interacting with various components, features, and/or systems), and/or other components. In at least one embodiment, infotainment SoC 2130 may further be used to provide information (e.g., visual and/or audible) to user(s) of vehicle, such as information from ADAS system 2138, autonomous driving information such as planned vehicle maneuvers, trajectories, surrounding environment information (e.g., intersection information, vehicle information, road information, etc.), and/or other information.

In at least one embodiment, infotainment SoC 2130 may include any amount and type of GPU functionality. In at least one embodiment, infotainment SoC 2130 may communicate over bus 2102 (e.g., CAN bus, Ethernet, etc.) with other devices, systems, and/or components of vehicle 2100. In at least one embodiment, infotainment SoC 2130 may be coupled to a supervisory MCU such that GPU of infotainment system may perform some self-driving functions in event that primary controller(s) 2136 (e.g., primary and/or backup computers of vehicle 2100) fail. In at least one embodiment, infotainment SoC 2130 may put vehicle 2100 into a chauffeur to safe stop mode, as described herein.

In at least one embodiment, vehicle 2100 may further include instrument cluster 2132 (e.g., a digital dash, an electronic instrument cluster, a digital instrument panel, etc.). In at least one embodiment, instrument cluster 2132 may include, without limitation, a controller and/or supercomputer (e.g., a discrete controller or supercomputer). In at least one embodiment, instrument cluster 2132 may include, without limitation, any number and combination of a set of instrumentation such as a speedometer, fuel level, oil pressure, tachometer, odometer, turn indicators, gearshift position indicator, seat belt warning light(s), parking-brake warning light(s), engine-malfunction light(s), supplemental restraint system (e.g., airbag) information, lighting controls, safety system controls, navigation information, etc. In some examples, information may be displayed and/or shared among infotainment SoC 2130 and instrument cluster 2132. In at least one embodiment, instrument cluster 2132 may be included as part of infotainment SoC 2130, or vice versa.

In at least one embodiment, vehicle 2100 can be integrated into computing environment 100 (FIG. 1) and computing environment 200 (FIG. 2). In at least one embodiment, vehicle 2100 can include or communicate with controller 205 illustrated in FIG. 3. In at least one embodiment, vehicle 2100 can perform processes 400 and 500 (FIGS. 4 and 5). In at least one embodiment, vehicle 2100 can call or perform APIs disclosed in FIGS. 6-17. In at least one embodiment, vehicle 2100 can perform examples in FIGS. 18 and 19.

Figure 21D:
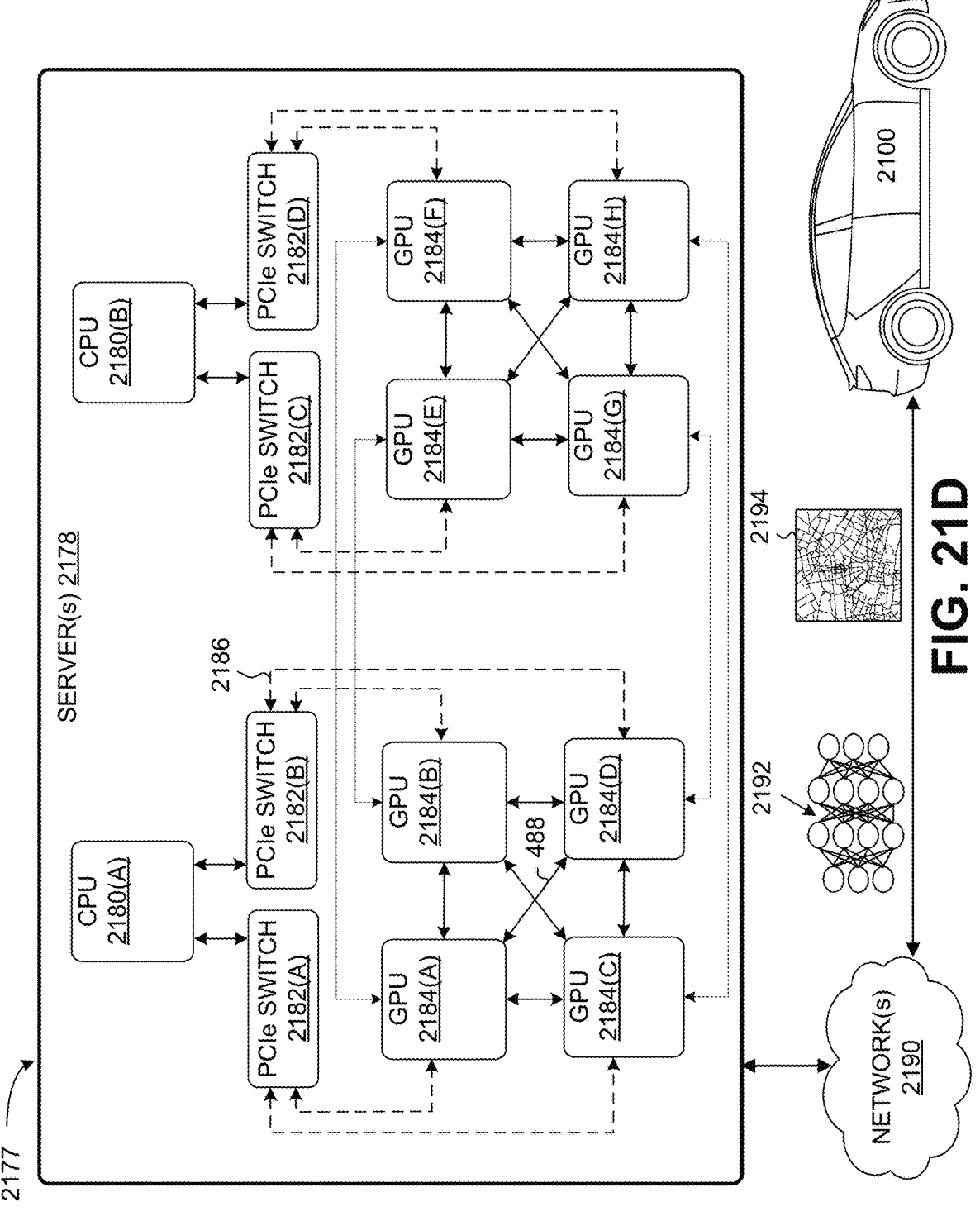
FIG. 21D is a diagram illustrating a system for communication between cloud-based server(s) and the autonomous vehicle of FIG. 21A, according to at least one embodiment.

FIG. 21D is a diagram of a system 2177 for communication between cloud-based server(s) and autonomous vehicle 2100 of FIG. 21A, according to at least one embodiment. In at least one embodiment, system 2177 may include, without limitation, server(s) 2178, network(s) 2190, and any number and type of vehicles, including vehicle 2100. Server(s) 2178 may include, without limitation, a plurality of GPUs 2184(A)-2184(H) (collectively referred to herein as GPUs 2184), PCIe switches 2182(A)-2182(H) (collectively referred to herein as PCIe switches 2182), and/or CPUs 2180(A)-2180(B) (collectively referred to herein as CPUs 2180). GPUs 2184, CPUs 2180, and PCIe switches 2182 may be interconnected with high-speed interconnects such as, for example and without limitation, NVLink interfaces 2188 developed by NVIDIA and/or PCIe connections 2186. In at least one embodiment, GPUs 2184 are connected via an NVLink and/or NVSwitch SoC and GPUs 2184 and PCIe switches 2182 are connected via PCIe interconnects. In at least one embodiment, although eight GPUs 2184, two CPUs 2180, and four PCIe switches 2182 are illustrated, this is not intended to be limiting. In at least one embodiment, each of server(s) 2178 may include, without limitation, any number of GPUs 2184, CPUs 2180, and/or PCIe switches 2182, in any combination. For example, in at least one embodiment, server(s) 2178 could each include eight, sixteen, thirty-two, and/or more GPUs 2184.

In at least one embodiment, server(s) 2178 may receive, over network(s) 2190 and from vehicles, image data representative of images showing unexpected or changed road conditions, such as recently commenced roadwork. In at least one embodiment, server(s) 2178 may transmit, over network(s) 2190 and to vehicles, neural networks 2192, updated neural networks 2192, and/or map information 2194, including, without limitation, information regarding traffic and road conditions. In at least one embodiment, updates to map information 2194 may include, without limitation, updates for HD map 2122, such as information regarding construction sites, potholes, detours, flooding, and/or other obstructions. In at least one embodiment, neural networks 2192, updated neural networks 2192, and/or map information 2194 may have resulted from new training and/or experiences represented in data received from any number of vehicles in environment, and/or based at least in part on training performed at a data center (e.g., using server(s) 2178 and/or other servers).

In at least one embodiment, server(s) 2178 may be used to train machine learning models (e.g., neural networks) based at least in part on training data. In at least one embodiment, training data may be generated by vehicles, and/or may be generated in a simulation (e.g., using a game engine). In at least one embodiment, any amount of training data is tagged (e.g., where associated neural network benefits from supervised learning) and/or undergoes other pre-processing. In at least one embodiment, any amount of training data is not tagged and/or pre-processed (e.g., where associated neural network does not require supervised learning). In at least one embodiment, once machine learning models are trained, machine learning models may be used by vehicles (e.g., transmitted to vehicles over network(s) 2190, and/or machine learning models may be used by server(s) 2178 to remotely monitor vehicles).

In at least one embodiment, server(s) 2178 may receive data from vehicles and apply data to up-to-date real-time neural networks for real-time intelligent inferencing. In at least one embodiment, server(s) 2178 may include deep-learning supercomputers and/or dedicated AI computers powered by GPU(s) 2184, such as a DGX and DGX Station machines developed by NVIDIA. However, in at least one embodiment, server(s) 2178 may include deep learning infrastructure that use CPU-powered data centers.

In at least one embodiment, deep-learning infrastructure of server(s) 2178 may be capable of fast, real-time inferencing, and may use that capability to evaluate and verify health of processors, software, and/or associated hardware in vehicle 2100. For example, in at least one embodiment, deep-learning infrastructure may receive periodic updates from vehicle 2100, such as a sequence of images and/or objects that vehicle 2100 has located in that sequence of images (e.g., via computer vision and/or other machine learning object classification techniques). In at least one embodiment, deep-learning infrastructure may run its own neural network to identify objects and compare them with objects identified by vehicle 2100 and, if results do not match and deep-learning infrastructure concludes that AI in vehicle 2100 is malfunctioning, then server(s) 2178 may transmit a signal to vehicle 2100 instructing a fail-safe computer of vehicle 2100 to assume control, notify passengers, and complete a safe parking maneuver.

In at least one embodiment, server(s) 2178 may include GPU(s) 2184 and one or more programmable inference accelerators (e.g., NVIDIA's TensorRT 3). In at least one embodiment, combination of GPU-powered servers and inference acceleration may make real-time responsiveness possible. In at least one embodiment, such as where performance is less critical, servers powered by CPUs, FPGAs, and other processors may be used for inferencing.

Computer Systems

Figure 22:
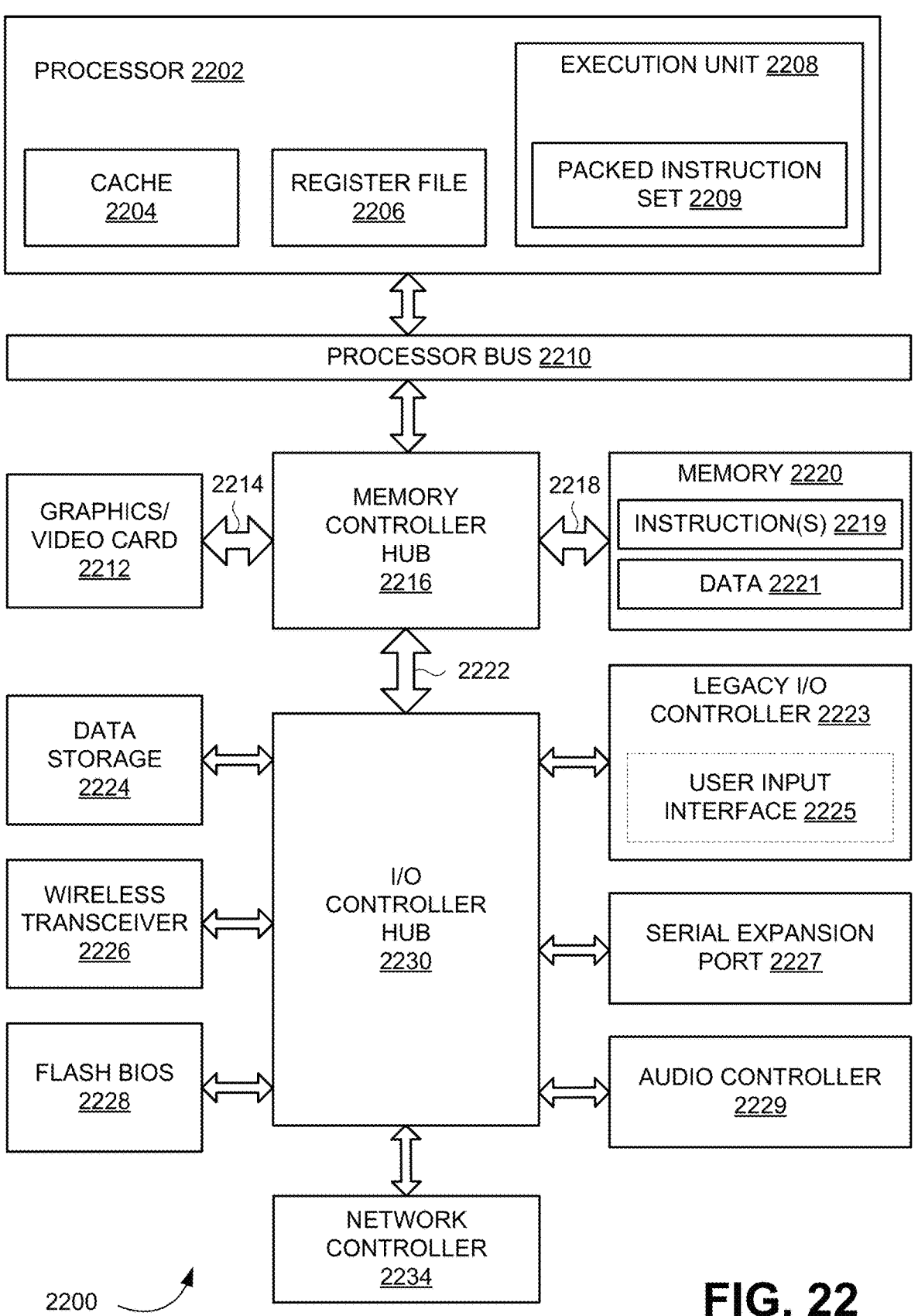
FIG. 22 is a block diagram illustrating a computer system, according to at least one embodiment.

FIG. 22 is a block diagram illustrating an exemplary computer system, which may be a system with interconnected devices and components, a system-on-a-chip (SOC) or some combination thereof 2200 formed with a processor that may include execution units to execute an instruction, according to at least one embodiment. In at least one embodiment, computer system 2200 may include, without limitation, a component, such as a processor 2202 to employ execution units including logic to perform algorithms for process data, in accordance with present disclosure, such as in embodiment described herein. In at least one embodiment, computer system 2200 may include processors, such as PENTIUM® Processor family, Xeon™ Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 2200 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 2200 may include, without limitation, processor 2202 that may include, without limitation, one or more execution units 2208 to perform machine learning model training and/or inferencing according to techniques described herein. In at least one embodiment, system 22 is a single processor desktop or server system, but in another embodiment system 22 may be a multiprocessor system. In at least one embodiment, processor 2202 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 2202 may be coupled to a processor bus 2210 that may transmit data signals between processor 2202 and other components in computer system 2200.

In at least one embodiment, processor 2202 may include, without limitation, a Level 1 ("L1") internal cache memory ("cache") 2204. n at least one embodiment, processor 2202 may have a single internal cache or multiple levels of internal cache. In at least one embodiment, cache memory may reside external to processor 2202. Other embodiments may also include a combination of both internal and external caches depending on particular implementation and needs. In at least one embodiment, register file 2206 may store different types of data in various registers including, without limitation, integer registers, floating point registers, status registers, and instruction pointer register.

In at least one embodiment, execution unit 2208, including, without limitation, logic to perform integer and floating point operations, also resides in processor 2202. In at least one embodiment, processor 2202 may also include a microcode ("ucode") read only memory ("ROM") that stores microcode for certain macro instructions. In at least one embodiment, execution unit 2208 may include logic to handle a packed instruction set 2209. In at least one embodiment, by including packed instruction set 2209 in instruction set of a general-purpose processor 2202, along with associated circuitry to execute instructions, operations used by many multimedia applications may be performed using packed data in a general-purpose processor 2202. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 2208 may also be used in microcontrollers, embedded processors, graphics devices, DSPs, and other types of logic circuits. In at least one embodiment, computer system 2200 may include, without limitation, a memory 2220. In at least one embodiment, memory 2220 may be implemented as a Dynamic Random Access Memory ("DRAM") device, a Static Random Access Memory ("SRAM") device, flash memory device, or other memory device. In at least one embodiment, memory 2220 may store instruction(s) 2219 and/or data 2221 represented by data signals that may be executed by processor 2202.

In at least one embodiment, system logic chip may be coupled to processor bus 2210 and memory 2220. In at least one embodiment, system logic chip may include, without limitation, a memory controller hub ("MCH") 2216, and processor 2202 may communicate with MCH 2216 via processor bus 2210. In at least one embodiment, MCH 2216 may provide a high bandwidth memory path 2218 to memory 2220 for instruction and data storage and for storage of graphics commands, data, and textures. In at least one embodiment, MCH 2216 may direct data signals between processor 2202, memory 2220, and other components in computer system 2200 and to bridge data signals between processor bus 2210, memory 2220, and a system I/O 2222. In at least one embodiment, system logic chip may provide a graphics port for coupling to a graphics controller. In at least one embodiment, MCH 2216 may be coupled to memory 2220 through a high bandwidth memory path 2218 and graphics/video card 2212 may be coupled to MCH 2216 through an Accelerated Graphics Port ("AGP") interconnect 2214.

In at least one embodiment, computer system 2200 may use system I/O 2222 that is a proprietary hub interface bus to couple MCH 2216 to I/O controller hub ("ICH") 2230. In at least one embodiment, ICH 2230 may provide direct connections to some I/O devices via a local I/O bus. In at least one embodiment, local I/O bus may include, without limitation, a high-speed I/O bus for connecting peripherals to memory 2220, chipset, and processor 2202. Examples may include, without limitation, an audio controller 2229, a firmware hub ("flash BIOS") 2228, a wireless transceiver 2226, a data storage 2224, a legacy I/O controller 2223 containing user input and keyboard interfaces, a serial expansion port 2227, such as Universal Serial Bus ("USB"), and a network controller 2234. In at least one embodiment, data storage 2224 may comprise a hard disk drive, a floppy disk drive, a CD-ROM device, a flash memory device, or other mass storage device.

In at least one embodiment, FIG. 22 illustrates a system, which includes interconnected hardware devices or "chips", whereas in other embodiments, FIG. 22 may illustrate an exemplary System on a Chip ("SoC"). In at least one embodiment, devices illustrated in FIG. 22 may be interconnected with proprietary interconnects, standardized interconnects (e.g., PCIe) or some combination thereof. In at least one embodiment, one or more components of system 2200 are interconnected using compute express link (CXL) interconnects.

In at least one embodiment, system of FIG. 22 can be integrated into or included in computing environment 100 (FIG. 1) and computing environment 200 (FIG. 2). In at least one embodiment, system of FIG. 22 can include or communicate with controller 205 illustrated in FIG. 3. In at least one embodiment, system of FIG. 22 can perform processes 400 and 500 (FIGS. 4 and 5). In at least one embodiment, system of FIG. 22 can call or perform APIs disclosed in FIGS. 6-17. In at least one embodiment, system of FIG. 22 can perform examples in FIGS. 18 and 19.

Figure 23:
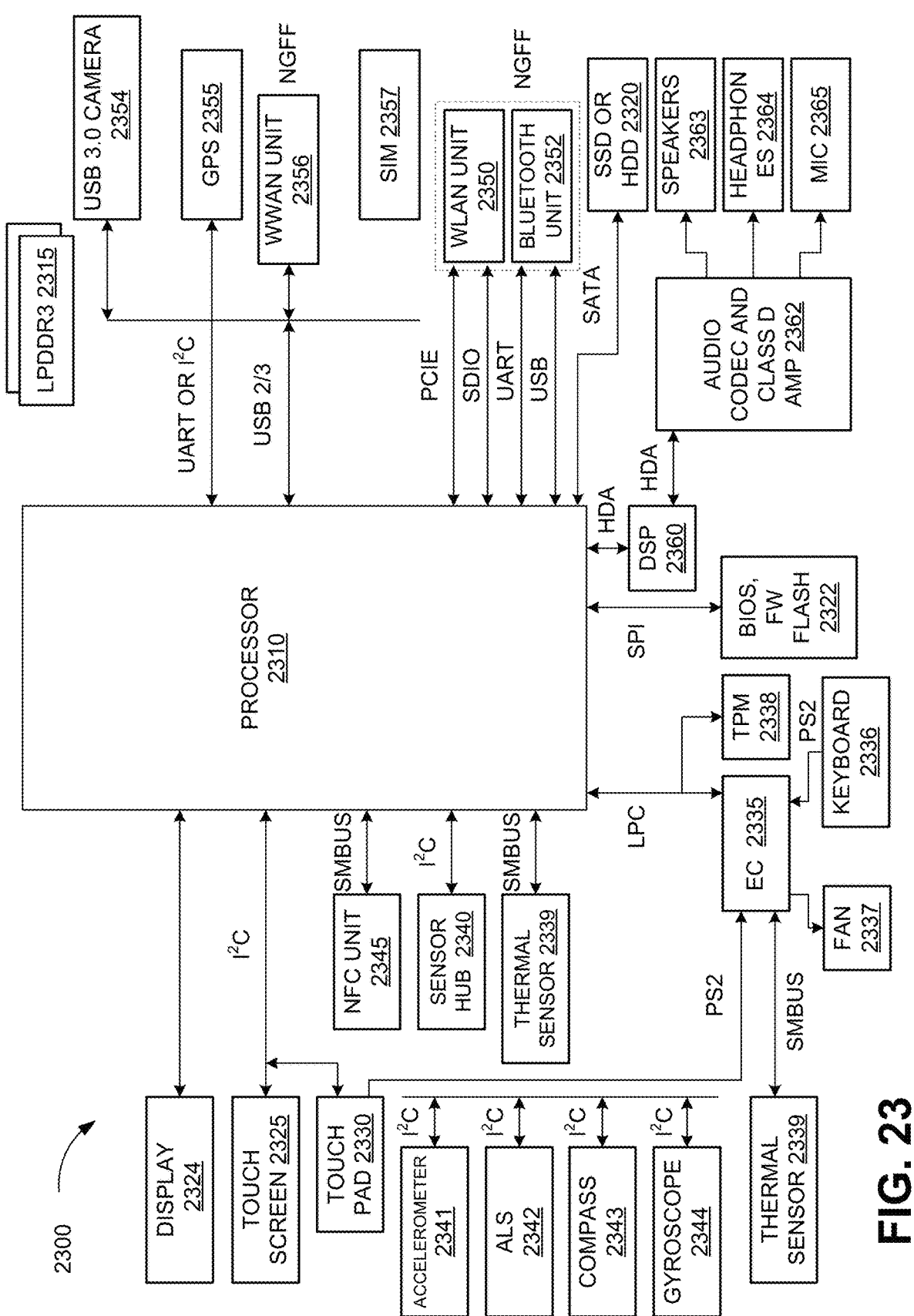
FIG. 23 is a block diagram illustrating a computer system, according to at least one embodiment.

FIG. 23 is a block diagram illustrating an electronic device 2300 for utilizing a processor 2310, according to at least one embodiment. In at least one embodiment, electronic device 2300 may be, for example and without limitation, a notebook, a tower server, a rack server, a blade server, a laptop, a desktop, a tablet, a mobile device, a phone, an embedded computer, or any other suitable electronic device.

In at least one embodiment, system 2300 may include, without limitation, processor 2310 communicatively coupled to any suitable number or kind of components, peripherals, modules, or devices. In at least one embodiment, processor 2310 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 23 illustrates a system, which includes interconnected hardware devices or "chips", whereas in other embodiments, FIG. 23 may illustrate an exemplary System on a Chip ("SoC"). In at least one embodiment, devices illustrated in FIG. 23 may be interconnected with proprietary interconnects, standardized interconnects (e.g., PCIe) or some combination thereof. In at least one embodiment, one or more components of FIG. 23 are interconnected using compute express link (CXL) interconnects.

In at least one embodiment, FIG. 23 may include a display 2324, a touch screen 2325, a touch pad 2330, a Near Field Communications unit ("NFC") 2345, a sensor hub 2340, a thermal sensor 2339, an Express Chipset ("EC") 2335, a Trusted Platform Module ("TPM") 2338, BIOS/firmware/flash memory ("BIOS, FW Flash") 2322, a DSP 2360, a drive "SSD or HDD") 2320 such as a Solid State Disk ("SSD") or a Hard Disk Drive ("HDD"), a wireless local area network unit ("WLAN") 2350, a Bluetooth unit 2352, a Wireless Wide Area Network unit ("WWAN") 2356, a Global Positioning System (GPS) 2355, a camera ("USB 3.0 camera") 2354 such as a USB 3.0 camera, or a Low Power Double Data Rate ("LPDDR") memory unit ("LPDDR3") 2315 implemented in, for example, LPDDR3 standard. These components may each be implemented in any suitable manner.

In at least one embodiment, other components may be communicatively coupled to processor 2310 through components discussed above. In at least one embodiment, an accelerometer 2341, Ambient Light Sensor ("ALS") 2342, compass 2343, and a gyroscope 2344 may be communicatively coupled to sensor hub 2340. In at least one embodiment, thermal sensor 2339, a fan 2337, a keyboard 2336, and a touch pad 2330 may be communicatively coupled to EC 2335. In at least one embodiment, speaker 2363, a headphone 2364, and a microphone ("mic") 2365 may be communicatively coupled to an audio unit ("audio codec and class d amp") 2364, which may in turn be communicatively coupled to DSP 2360. In at least one embodiment, audio unit 2364 may include, for example and without limitation, an audio coder/decoder ("codec") and a class D amplifier. In at least one embodiment, SIM card ("SIM") 2357 may be communicatively coupled to WWAN unit 2356. In at least one embodiment, components such as WLAN unit 2350 and Bluetooth unit 2352, as well as WWAN unit 2356 may be implemented in a Next Generation Form Factor ("NGFF").

In at least one embodiment, system of FIG. 23 can be integrated into or included in computing environment 100 (FIG. 1) and computing environment 200 (FIG. 2). In at least one embodiment, system of FIG. 23 can include or communicate with controller 205 illustrated in FIG. 3. In at least one embodiment, system of FIG. 23 can perform processes 400 and 500 (FIGS. 4 and 5). In at least one embodiment, system of FIG. 23 can call or perform APIs disclosed in FIGS. 6-17. In at least one embodiment, system of FIG. 23 can perform examples in FIGS. 18 and 19.

Figure 24:
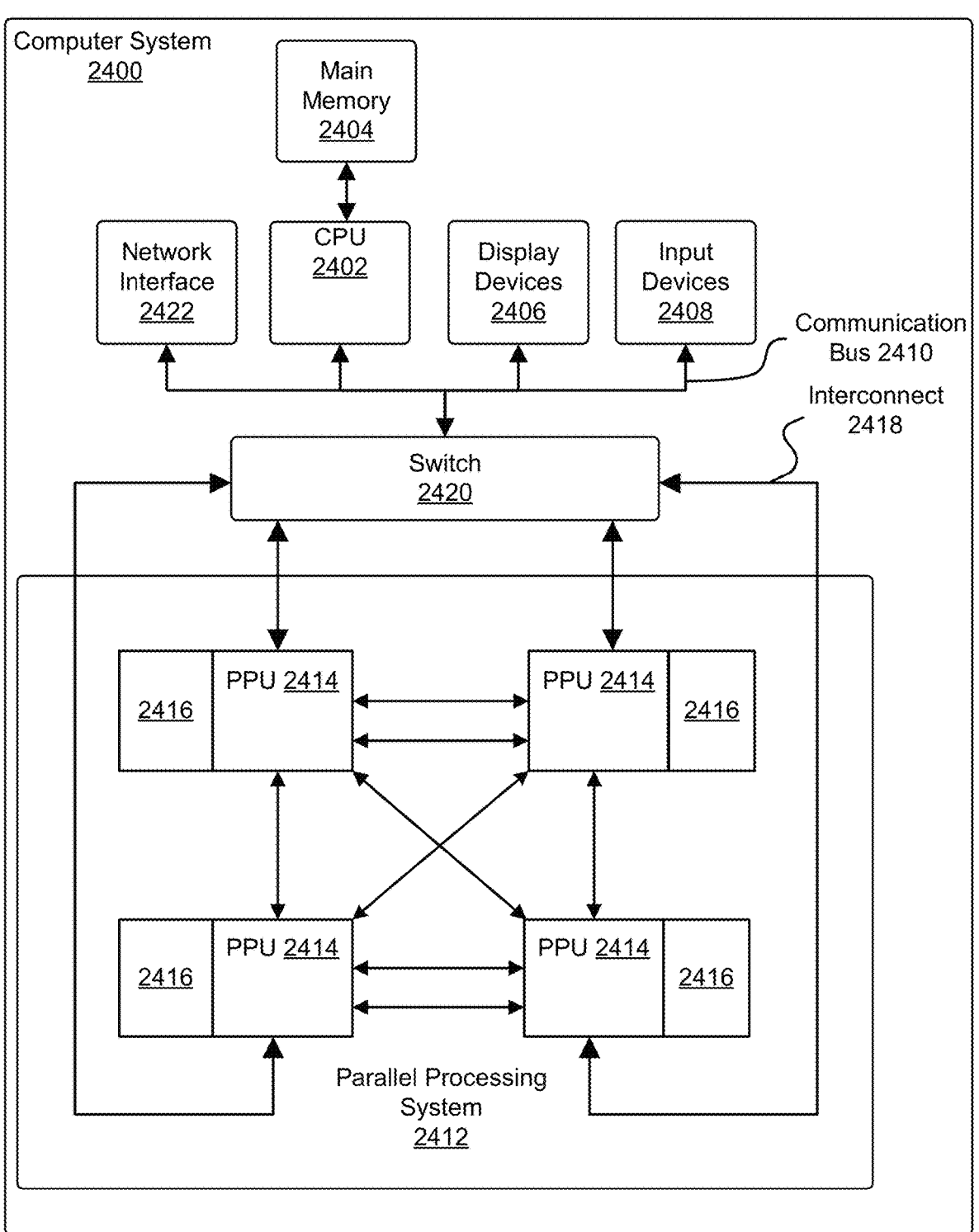
FIG. 24 illustrates a computer system, according to at least one embodiment.

FIG. 24 illustrates a computer system 2400, according to at least one embodiment. In at least one embodiment, computer system 2400 is configured to implement various processes and methods described throughout this disclosure.

In at least one embodiment, computer system 2400 comprises, without limitation, at least one central processing unit ("CPU") 2402 that is connected to a communication bus 2410 implemented using any suitable protocol, such as PCI ("Peripheral Component Interconnect"), peripheral component interconnect express ("PCI-Express"), AGP ("Accelerated Graphics Port"), HyperTransport, or any other bus or point-to-point communication protocol(s). In at least one embodiment, computer system 2400 includes, without limitation, a main memory 2404 and control logic (e.g., implemented as hardware, software, or a combination thereof) and data are stored in main memory 2404 which may take form of random access memory ("RAM"). In at least one embodiment, a network interface subsystem ("network interface") 2422 provides an interface to other computing devices and networks for receiving data from and transmitting data to other systems from computer system 2400.

In at least one embodiment, computer system 2400, in at least one embodiment, includes, without limitation, input devices 2408, parallel processing system 2412, and display devices 2406 which can be implemented using a conventional cathode ray tube ("CRT"), liquid crystal display ("LCD"), light emitting diode ("LED"), plasma display, or other suitable display technologies. In at least one embodiment, user input is received from input devices 2408 such as keyboard, mouse, touchpad, microphone, and more. In at least one embodiment, each of foregoing modules can be situated on a single semiconductor platform to form a processing system.

In at least one embodiment, computer system 2400 can be integrated into or included in computing environment 100 (FIG. 1) and computing environment 200 (FIG. 2). In at least one embodiment, computer system 2400 can include or communicate with controller 205 illustrated in FIG. 3. In at least one embodiment, computer system 2400 can perform processes 400 and 500 (FIGS. 4 and 5). In at least one embodiment, computer system 2400 can call or perform APIs disclosed in FIGS. 6-17. In at least one embodiment, computer system 2400 can perform examples in FIGS. 18 and 19.

Figure 25:
FIG. 25 illustrates a computer system, according to at least one embodiment.
Figure 25:
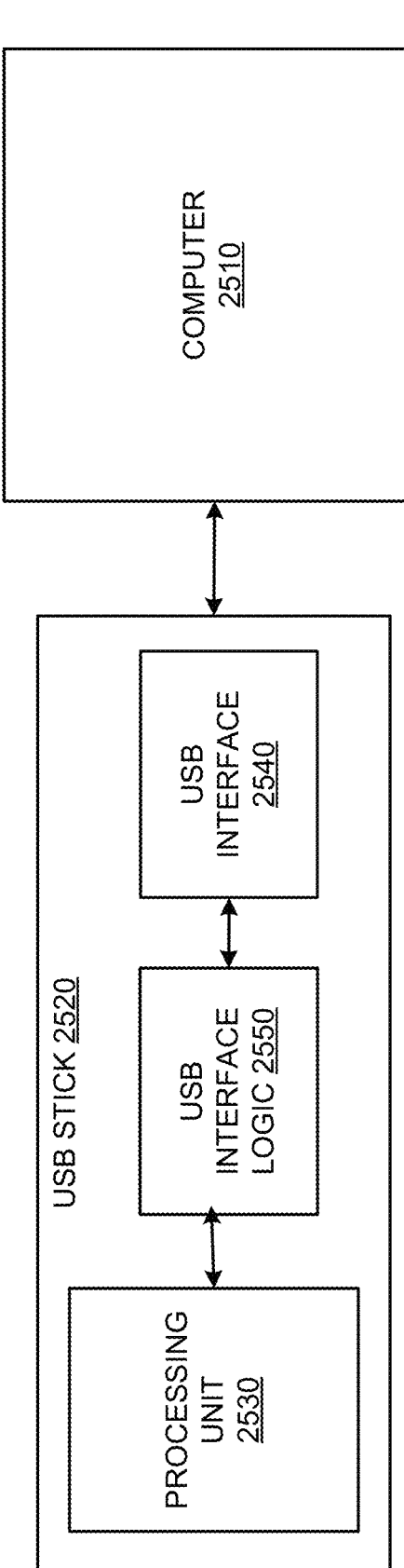

FIG. 25 illustrates a computer system 2500, according to at least one embodiment. In at least one embodiment, computer system 2500 includes, without limitation, a computer 2510 and a USB stick 2520. In at least one embodiment, computer 2510 may include, without limitation, any number and type of processor(s) (not shown) and a memory (not shown). In at least one embodiment, computer 2510 includes, without limitation, a server, a cloud instance, a laptop, and a desktop computer.

In at least one embodiment, USB stick 2520 includes, without limitation, a processing unit 2530, a USB interface 2540, and USB interface logic 2550. In at least one embodiment, processing unit 2530 may be any instruction execution system, apparatus, or device capable of executing instructions. In at least one embodiment, processing unit 2530 may include, without limitation, any number and type of processing cores (not shown). In at least one embodiment, processing core 2530 comprises an application specific integrated circuit ("ASIC") that is optimized to perform any amount and type of operations associated with machine learning. For instance, in at least one embodiment, processing core 2530 is a tensor processing unit ("TPC") that is optimized to perform machine learning inference operations.

In at least one embodiment, processing core 2530 is a vision processing unit ("VPU") that is optimized to perform machine vision and machine learning inference operations.

In at least one embodiment, USB interface 2540 may be any type of USB connector or USB socket. For instance, in at least one embodiment, USB interface 2540 is a USB 3.0 Type-C socket for data and power. In at least one embodiment, USB interface 2540 is a USB 3.0 Type-A connector. In at least one embodiment, USB interface logic 2550 may include any amount and type of logic that enables processing unit 2530 to interface with or devices (e.g., computer 2510) via USB connector 2540.

In at least one embodiment, computer system 2500 can be integrated into or included in computing environment 100 (FIG. 1) and computing environment 200 (FIG. 2). In at least one embodiment, computer system 2500 can include or communicate with controller 205 illustrated in FIG. 3. In at least one embodiment, computer system 2500 can perform processes 400 and 500 (FIGS. 4 and 5). In at least one embodiment, computer system 2500 can call or perform APIs disclosed in FIGS. 6-17. In at least one embodiment, computer system 2500 can perform examples in FIGS. 18 and 19.

Figure 26A:
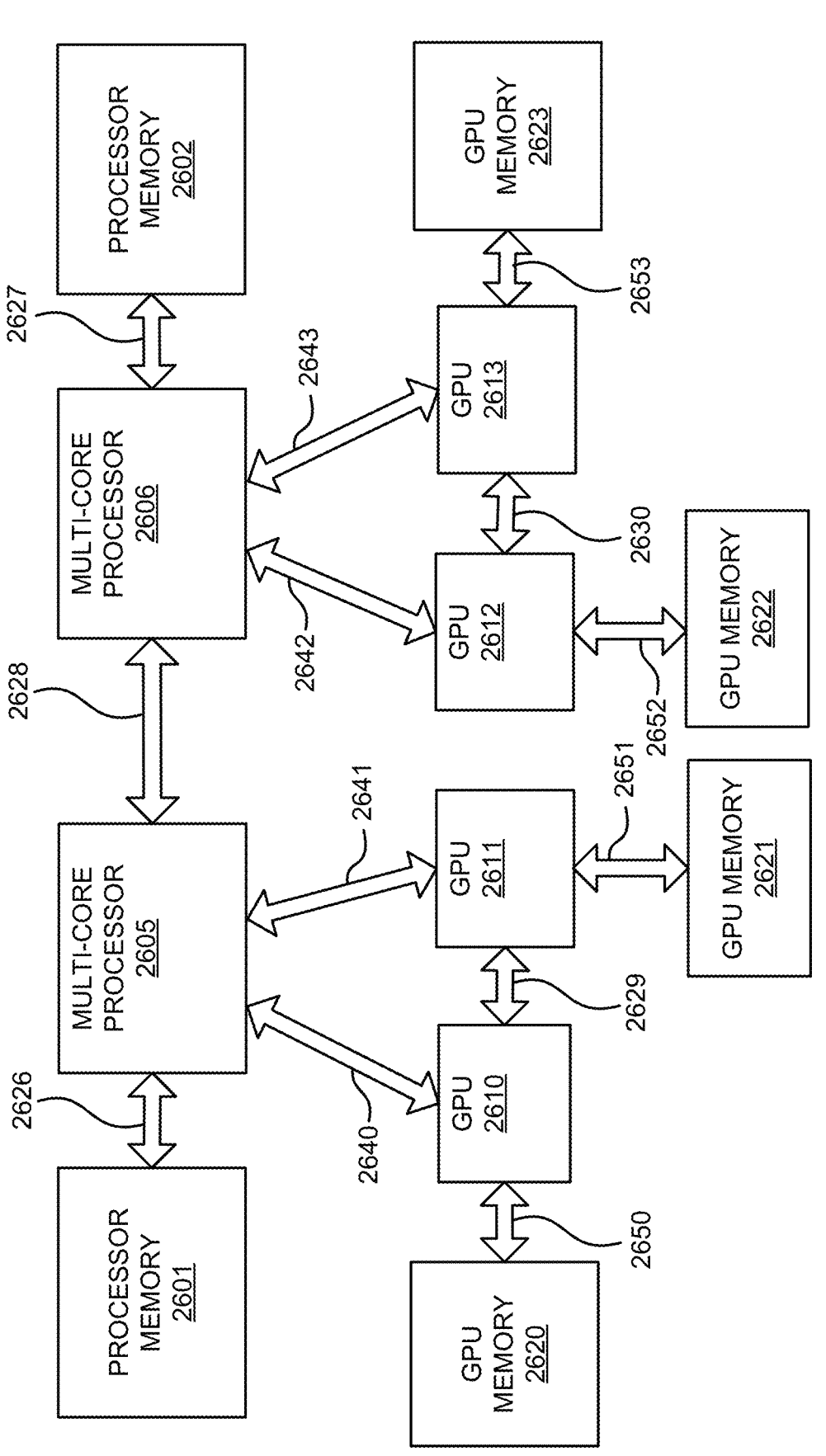
FIG. 26A illustrates a computer system, according to at least one embodiment.

FIG. 26A illustrates an exemplary architecture in which a plurality of GPUs 2610-2613 is communicatively coupled to a plurality of multi-core processors 2605-2606 over high-speed links 2640-2643 (e.g., buses, point-to-point interconnects, etc.). In one embodiment, high-speed links 2640-2643 support a communication throughput of 4 GB/s, 30 GB/s, 80 GB/s or higher. Various interconnect protocols may be used including, but not limited to, PCIe 4.0 or 5.0 and NVLink 2.0.

In addition, and in one embodiment, two or more of GPUs 2610-2613 are interconnected over high-speed links 2629-2630, which may be implemented using same or different protocols/links than those used for high-speed links 2640-2643. Similarly, two or more of multi-core processors 2605-2606 may be connected over high-speed link 2628 which may be symmetric multi-processor (SMP) buses operating at 20 GB/s, 30 GB/s, 120 GB/s or higher. Alternatively, all communication between various system components shown in FIG. 26A may be accomplished using same protocols/links (e.g., over a common interconnection fabric).

In one embodiment, each multi-core processor 2605-2606 is communicatively coupled to a processor memory 2601-2602, via memory interconnects 2626-2627, respectively, and each GPU 2610-2613 is communicatively coupled to GPU memory 2620-2623 over GPU memory interconnects 2650-2653, respectively. Memory interconnects 2626-2627 and 2650-2653 may utilize same or different memory access technologies. By way of example, and not limitation, processor memories 2601-2602 and GPU memories 2620-2623 may be volatile memories such as dynamic random access memories (DRAMs) (including stacked DRAMs), Graphics DDR SDRAM (GDDR) (e.g., GDDR5, GDDR6), or High Bandwidth Memory (HBM) and/or may be non-volatile memories such as 3D XPoint or Nano-Ram. In one embodiment, some portion of processor memories 2601-2602 may be volatile memory and another portion may be non-volatile memory (e.g., using a two-level memory (2LM) hierarchy).

As described herein, although various processors 2605-2606 and GPUs 2610-2613 may be physically coupled to a particular memory 2601-2602, 2620-2623, respectively, a unified memory architecture may be implemented in which a same virtual system address space (also referred to as "effective address" space) is distributed among various physical memories. For example, processor memories 2601-

2602 may each comprise 64 GB of system memory address space and GPU memories 2620-2623 may each comprise 32 GB of system memory address space (resulting in a total of 256 GB addressable memory in this example).

Figure 26B:
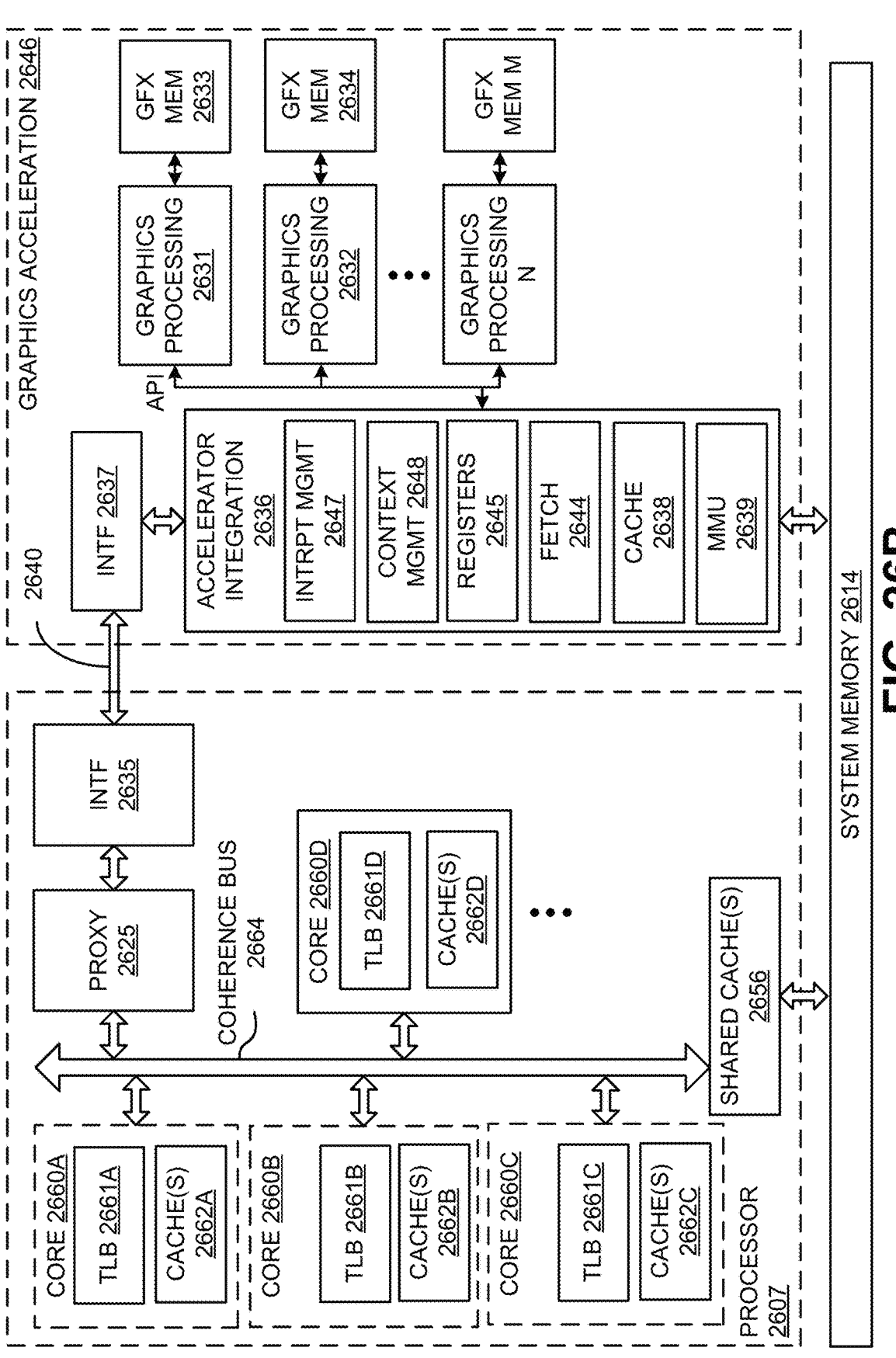
FIG. 26B illustrates a computer system, according to at least one embodiment.

FIG. 26B illustrates additional details for an interconnection between a multi-core processor 2607 and a graphics acceleration module 2646 in accordance with one exemplary embodiment. Graphics acceleration module 2646 may include one or more GPU chips integrated on a line card which is coupled to processor 2607 via high-speed link 2640. Alternatively, graphics acceleration module 2646 may be integrated on a same package or chip as processor 2607.

In at least one embodiment, illustrated processor 2607 includes a plurality of cores 2660A-2660D, each with a translation lookaside buffer 2661A-2661D and one or more caches 2662A-2662D. In at least one embodiment, cores 2660A-2660D may include various other components for executing instructions and processing data which are not illustrated. Caches 2662A-2662D may comprise level 1 (L1) and level 2 (L2) caches. In addition, one or more shared caches 2656 may be included in caches 2662A-2662D and shared by sets of cores 2660A-2660D. For example, one embodiment of processor 2607 includes 24 cores, each with its own L1 cache, twelve shared L2 caches, and twelve shared L3 caches. In this embodiment, one or more L2 and L3 caches are shared by two adjacent cores. Processor 2607 and graphics acceleration module 2646 connect with system memory 2614, which may include processor memories 2601-2602 of FIG. 26A.

Coherency is maintained for data and instructions stored in various caches 2662A-2662D, 2656 and system memory 2614 via inter-core communication over a coherence bus 2664. For example, each cache may have cache coherency logic/circuitry associated therewith to communicate to over coherence bus 2664 in response to detected reads or writes to particular cache lines. In one implementation, a cache snooping protocol is implemented over coherence bus 2664 to snoop cache accesses.

In one embodiment, a proxy circuit 2625 communicatively couples graphics acceleration module 2646 to coherence bus 2664, allowing graphics acceleration module 2646 to participate in a cache coherence protocol as a peer of cores 2660A-2660D. An interface 2635 provides connectivity to proxy circuit 2625 over high-speed link 2640 (e.g., a PCIe bus, NVLink, etc.) and an interface 2637 connects graphics acceleration module 2646 to link 2640.

In one implementation, an accelerator integration circuit 2636 provides cache management, memory access, context management, and interrupt management services on behalf of a plurality of graphics processing engines 2631, 2632, N of graphics acceleration module 2646. Graphics processing engines 2631, 2632, N may each comprise a separate graphics processing unit (GPU). Alternatively, graphics processing engines 2631, 2632, N may comprise different types of graphics processing engines within a GPU such as graphics execution units, media processing engines (e.g., video encoders/decoders), samplers, and blit engines. In at least one embodiment, graphics acceleration module 2646 may be a GPU with a plurality of graphics processing engines 2631-2632, N or graphics processing engines 2631-2632, N may be individual GPUs integrated on a common package, line card, or chip.

In one embodiment, accelerator integration circuit 2636 includes a memory management unit (MMU) 2639 for performing various memory management functions such as virtual-to-physical memory translations (also referred to as effective-to-real memory translations) and memory access protocols for accessing system memory 2614. MMU 2639 may also include a translation lookaside buffer (TLB) (not shown) for caching virtual/effective to physical/real address translations. In one implementation, a cache 2638 stores commands and data for efficient access by graphics processing engines 2631-2632, N. In one embodiment, data stored in cache 2638 and graphics memories 2633-2634, M is kept coherent with core caches 2662A-2662D, 2656 and system memory 2614. As mentioned, this may be accomplished via proxy circuit 2625 on behalf of cache 2638 and memories 2633-2634, M (e.g., sending updates to cache 2638 related to modifications/accesses of cache lines on processor caches 2662A-2662D, 2656 and receiving updates from cache 2638).

A set of registers 2645 store context data for threads executed by graphics processing engines 2631-2632, N and a context management circuit 2648 manages thread contexts. For example, context management circuit 2648 may perform save and restore operations to save and restore contexts of various threads during contexts switches (e.g., where a first thread is saved and a second thread is stored so that a second thread can be execute by a graphics processing engine). For example, on a context switch, context management circuit 2648 may store current register values to a designated region in memory (e.g., identified by a context pointer). It may then restore register values when returning to a context. In one embodiment, an interrupt management circuit 2647 receives and processes interrupts received from system devices.

In one implementation, virtual/effective addresses from a graphics processing engine 2631 are translated to real/physical addresses in system memory 2614 by MMU 2639. One embodiment of accelerator integration circuit 2636 supports multiple (e.g., 4, 8, 16) graphics accelerator modules 2646 and/or other accelerator devices. Graphics accelerator module 2646 may be dedicated to a single application executed on processor 2607 or may be shared between multiple applications. In one embodiment, a virtualized graphics execution environment is presented in which resources of graphics processing engines 2631-2632, N are shared with multiple applications or virtual machines (VMs). In at least one embodiment, resources may be subdivided into "slices" which are allocated to different VMs and/or applications based on processing requirements and priorities associated with VMs and/or applications.

In at least one embodiment, accelerator integration circuit 2636 performs as a bridge to a system for graphics acceleration module 2646 and provides address translation and system memory cache services. In addition, accelerator integration circuit 2636 may provide virtualization facilities for a host processor to manage virtualization of graphics processing engines 2631-2632, interrupts, and memory management.

Because hardware resources of graphics processing engines 2631-2632, N are mapped explicitly to a real address space seen by host processor 2607, any host processor can address these resources directly using an effective address value. One function of accelerator integration circuit 2636, in one embodiment, is physical separation of graphics processing engines 2631-2632, N so that they appear to a system as independent units.

In at least one embodiment, one or more graphics memories 2633-2634, M are coupled to each of graphics processing engines 2631-2632, N, respectively. Graphics memories 2633-2634, M store instructions and data being processed by each of graphics processing engines 2631-2632, N. Graphics memories 2633-2634, M may be volatile memories such as DRAMs (including stacked DRAMs), GDDR memory (e.g., GDDR5, GDDR6), or HBM, and/or may be non-volatile memories such as 3D XPoint or Nano-Ram.

In one embodiment, to reduce data traffic over link 2640, biasing techniques are used to ensure that data stored in graphics memories 2633-2634, M is data which will be used most frequently by graphics processing engines 2631-2632, N and preferably not used by cores 2660A-2660D (at least not frequently). Similarly, a biasing mechanism attempts to keep data needed by cores (and preferably not graphics processing engines 2631-2632, N) within caches 2662A-2662D, 2656 of cores and system memory 2614.

Figure 26C:
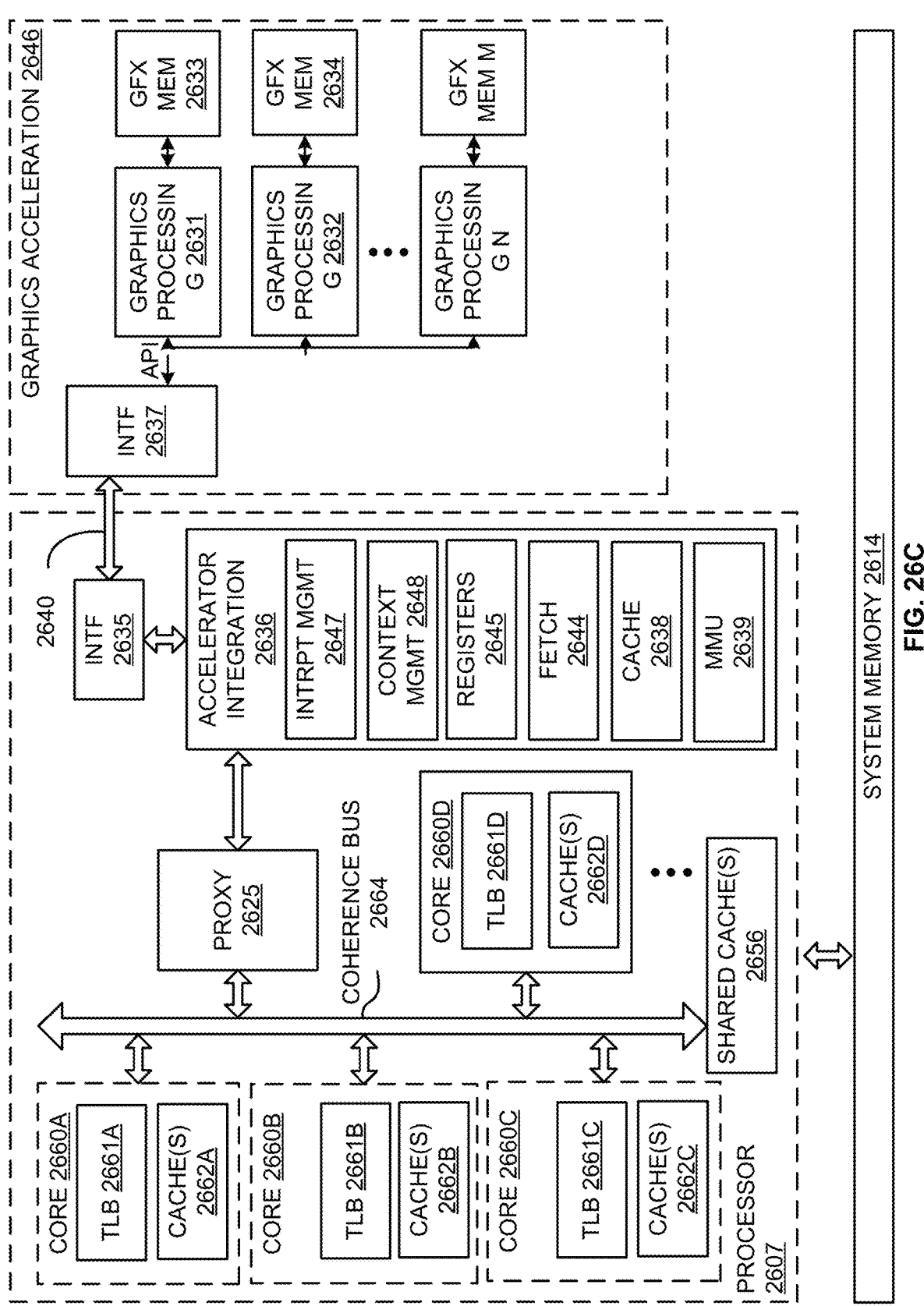
FIG. 26C illustrates a computer system, according to at least one embodiment.

FIG. 26C illustrates another exemplary embodiment in which accelerator integration circuit 2636 is integrated within processor 2607. In this embodiment, graphics processing engines 2631-2632, N communicate directly over high-speed link 2640 to accelerator integration circuit 2636 via interface 2637 and interface 2635 (which, again, may be utilize any form of bus or interface protocol). Accelerator integration circuit 2636 may perform same operations as those described with respect to FIG. 26B, but potentially at a higher throughput given its close proximity to coherence bus 2664 and caches 2662A-2662D, 2656. One embodiment supports different programming models including a dedicated-process programming model (no graphics acceleration module virtualization) and shared programming models (with virtualization), which may include programming models which are controlled by accelerator integration circuit 2636 and programming models which are controlled by graphics acceleration module 2646.

In at least one embodiment, graphics processing engines 2631-2632, N are dedicated to a single application or process under a single operating system. In at least one embodiment, a single application can funnel other application requests to graphics processing engines 2631-2632, N, providing virtualization within a VM/partition.

In at least one embodiment, graphics processing engines 2631-2632, N, may be shared by multiple VM/application partitions. In at least one embodiment, shared models may use a system hypervisor to virtualize graphics processing engines 2631-2632, N to allow access by each operating system. For single-partition systems without a hypervisor, graphics processing engines 2631-2632, N are owned by an operating system. In at least one embodiment, an operating system can virtualize graphics processing engines 2631-2632, N to provide access to each process or application.

In at least one embodiment, graphics acceleration module 2646 or an individual graphics processing engine 2631-2632, N selects a process element using a process handle. In one embodiment, process elements are stored in system memory 2614 and are addressable using an effective address to real address translation techniques described herein. In at least one embodiment, a process handle may be an implementation-specific value provided to a host process when registering its context with graphics processing engine 2631-2632, N (that is, calling system software to add a process element to a process element linked list). In at least one embodiment, a lower 16-bits of a process handle may be an offset of the process element within a process element linked list.

Figure 26D:
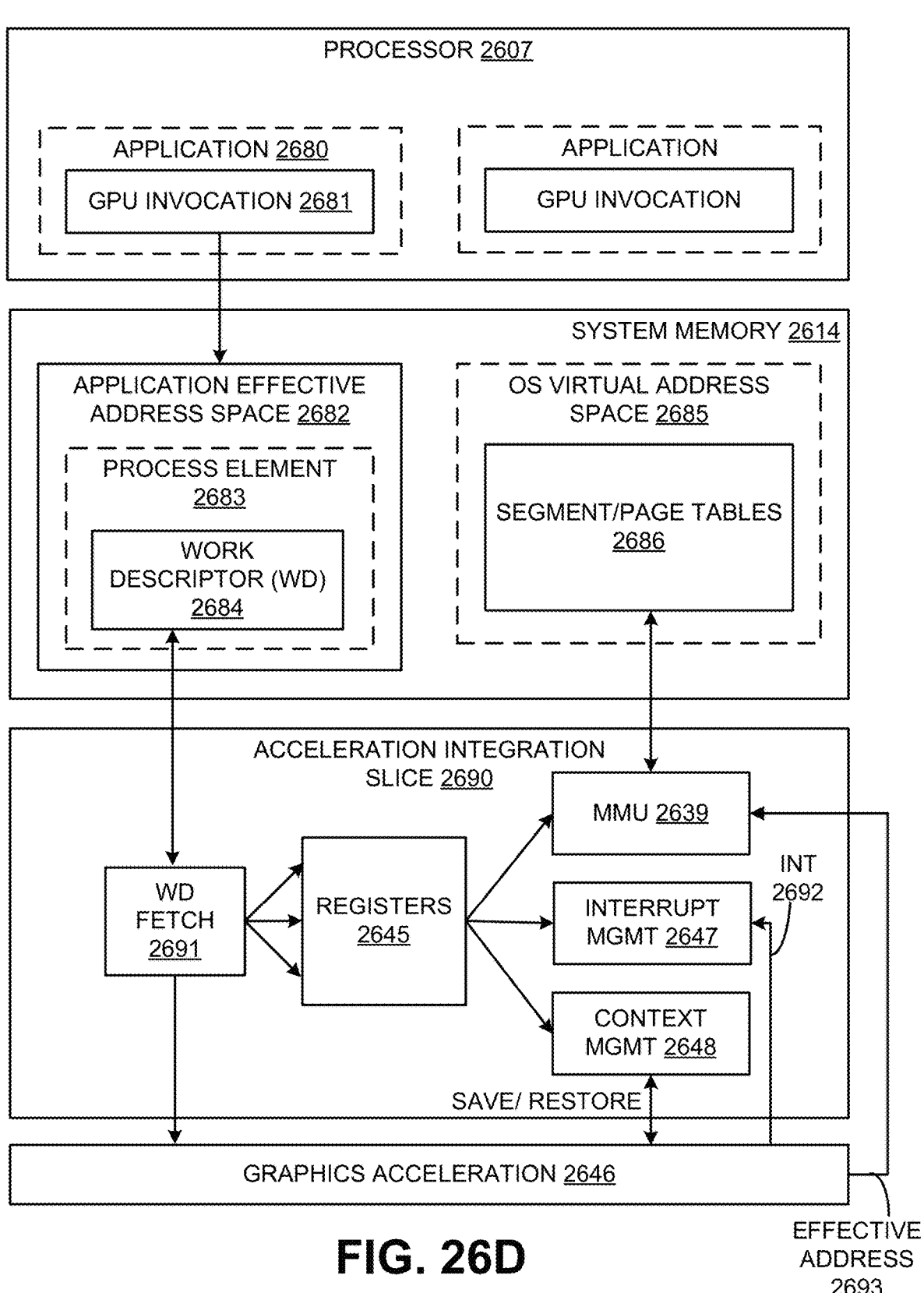
FIG. 26D illustrates a computer system, according to at least one embodiment.

FIG. 26D illustrates an exemplary accelerator integration slice 2690. As used herein, a "slice" comprises a specified portion of processing resources of accelerator integration circuit 2636. Application effective address space 2682 within system memory 2614 stores process elements 2683. In one embodiment, process elements 2683 are stored in response to GPU invocations 2681 from applications 2680 executed on processor 2607. A process element 2683 contains process state for corresponding application 2680. A work descriptor (WD) 2684 contained in process element 2683 can be a single job requested by an application or may contain a pointer to a queue of jobs. In at least one embodiment, WD 2684 is a pointer to a job request queue in an application's address space 2682.

Graphics acceleration module 2646 and/or individual graphics processing engines 2631-2632, N can be shared by all or a subset of processes in a system. In at least one embodiment, an infrastructure for setting up process state and sending a WD 2684 to a graphics acceleration module 2646 to start a job in a virtualized environment may be included.

In at least one embodiment, a dedicated-process programming model is implementation-specific. In this model, a single process owns graphics acceleration module 2646 or an individual graphics processing engine 2631. Because graphics acceleration module 2646 is owned by a single process, a hypervisor initializes accelerator integration circuit 2636 for an owning partition and an operating system initializes accelerator integration circuit 2636 for an owning process when graphics acceleration module 2646 is assigned.

In operation, a WD fetch unit 2691 in accelerator integration slice 2690 fetches next WD 2684 which includes an indication of work to be done by one or more graphics processing engines of graphics acceleration module 2646. Data from WD 2684 may be stored in registers 2645 and used by MMU 2639, interrupt management circuit 2647 and/or context management circuit 2648 as illustrated. For example, one embodiment of MMU 2639 includes segment/page walk circuitry for accessing segment/page tables 2686 within OS virtual address space 2685. Interrupt management circuit 2647 may process interrupt events 2692 received from graphics acceleration module 2646. When performing graphics operations, an effective address 2693 generated by a graphics processing engine 2631-2632, N is translated to a real address by MMU 2639.

In one embodiment, a same set of registers 2645 are duplicated for each graphics processing engine 2631-2632, N and/or graphics acceleration module 2646 and may be initialized by a hypervisor or operating system. Each of these duplicated registers may be included in an accelerator integration slice 2690. Exemplary registers that may be initialized by a hypervisor are shown in Table 1.

TABLE 1

| Hypervisor Initialized Registers | |
| --- | --- |
| 1 | Slice Control Register |
| 2 | Real Address (RA) Scheduled Processes Area Pointer |
| 3 | Authority Mask Override Register |
| 4 | Interrupt Vector Table Entry Offset |
| 5 | Interrupt Vector Table Entry Limit |
| 6 | State Register |
| 7 | Logical Partition ID |
| 8 | Real address (RA) Hypervisor Accelerator Utilization Record Pointer |
| 9 | Storage Description Register |

Exemplary registers that may be initialized by an operating system are shown in Table 2.

TABLE 2

| Operating System Initialized Registers | |
| --- | --- |
| 1 | Process and Thread Identification |

TABLE 2-continued

| Operating System Initialized Registers | |
| --- | --- |
| 2 | Effective Address (EA) Context Save/Restore Pointer |
| 3 | Virtual Address (VA) Accelerator Utilization Record Pointer |
| 4 | Virtual Address (VA) Storage Segment Table Pointer |
| 5 | Authority Mask |
| 6 | Work descriptor |

In one embodiment, each WD 2684 is specific to a particular graphics acceleration module 2646 and/or graphics processing engines 2631-2632, N. It contains all information required by a graphics processing engine 2631-2632, N to do work or it can be a pointer to a memory location where an application has set up a command queue of work to be completed.

Figure 26E:
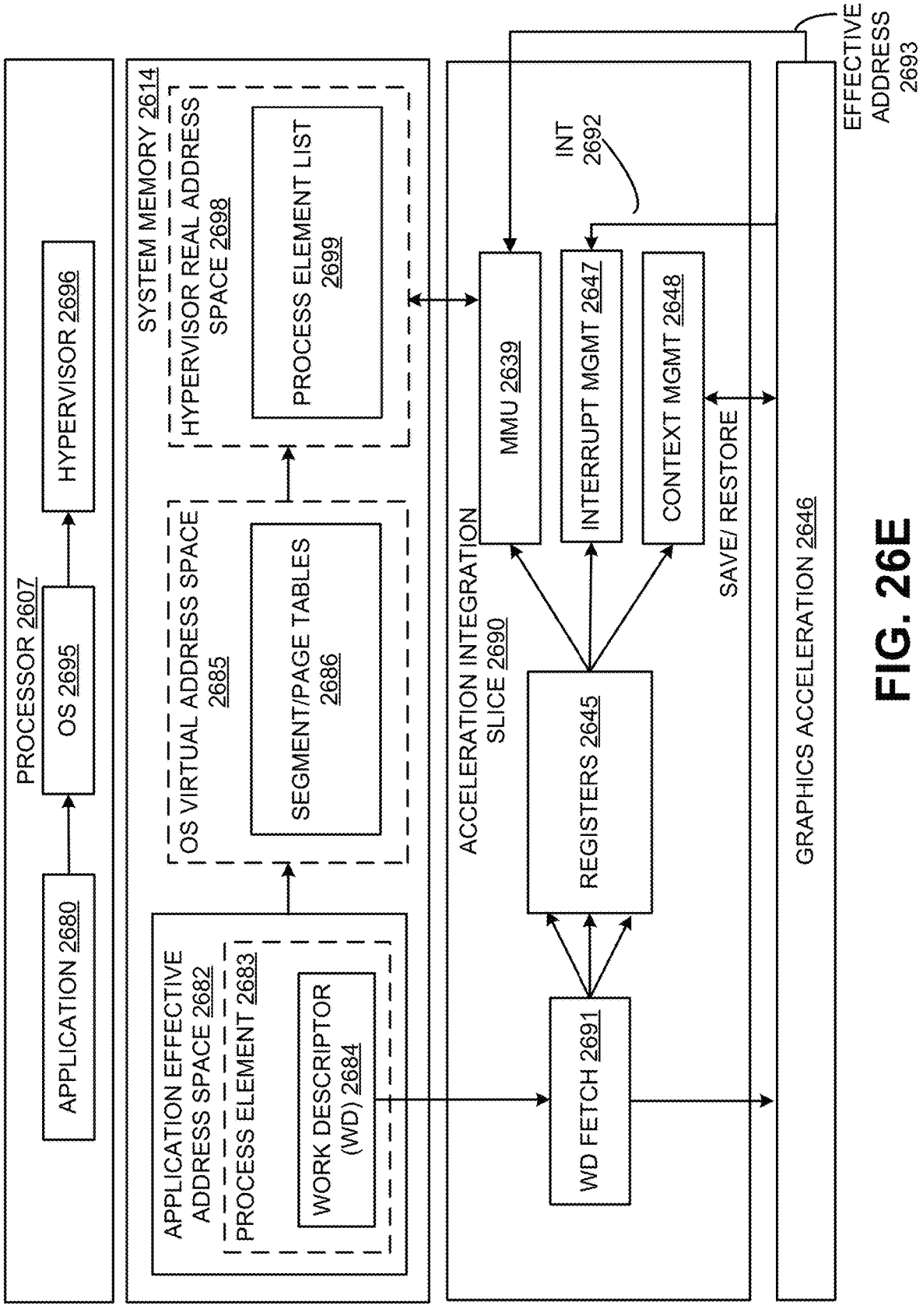
FIGS. 26E and 26F illustrate a shared programming model, according to at least one embodiment.

FIG. 26E illustrates additional details for one exemplary embodiment of a shared model. This embodiment includes a hypervisor real address space 2698 in which a process element list 2699 is stored. Hypervisor real address space 2698 is accessible via a hypervisor 2696 which virtualizes graphics acceleration module engines for operating system 2695.

In at least one embodiment, shared programming models allow for all or a subset of processes from all or a subset of partitions in a system to use a graphics acceleration module 2646. There are two programming models where graphics acceleration module 2646 is shared by multiple processes and partitions: time-sliced shared and graphics directed shared.

In this model, system hypervisor 2696 owns graphics acceleration module 2646 and makes its function available to all operating systems 2695. For a graphics acceleration module 2646 to support virtualization by system hypervisor 2696, graphics acceleration module 2646 may adhere to the following: 1) An application's job request must be autonomous (that is, state does not need to be maintained between jobs), or graphics acceleration module 2646 must provide a context save and restore mechanism. 2) An application's job request is guaranteed by graphics acceleration module 2646 to complete in a specified amount of time, including any translation faults, or graphics acceleration module 2646 provides an ability to preempt processing of a job. 3) Graphics acceleration module 2646 must be guaranteed fairness between processes when operating in a directed shared programming model.

In at least one embodiment, application 2680 is required to make an operating system 2695 system call with a graphics acceleration module 2646 type, a work descriptor (WD), an authority mask register (AMR) value, and a context save/restore area pointer (CSRP). In at least one embodiment, graphics acceleration module 2646 type describes a targeted acceleration function for a system call. In at least one embodiment, graphics acceleration module 2646 type may be a system-specific value. In at least one embodiment, WD is formatted specifically for graphics acceleration module 2646 and can be in a form of a graphics acceleration module 2646 command, an effective address pointer to a user-defined structure, an effective address pointer to a queue of commands, or any other data structure to describe work to be done by graphics acceleration module 2646. In one embodiment, an AMR value is an AMR state to use for a current process. In at least one embodiment, a value passed to an operating system is similar to an application setting an AMR. If accelerator integration circuit 2636 and graphics acceleration module 2646 implementations do not support a User Authority Mask Override Register (UAMOR), an operating system may apply a current UAMOR value to an AMR value before passing an AMR in a hypervisor call. Hypervisor 2696 may optionally apply a current Authority Mask Override Register (AMOR) value before placing an AMR into process element 2683. In at least one embodiment, CSRP is one of registers 2645 containing an effective address of an area in an application's address space 2682 for graphics acceleration module 2646 to save and restore context state. This pointer is optional if no state is required to be saved between jobs or when a job is preempted. In at least one embodiment, context save/restore area may be pinned system memory.

Upon receiving a system call, operating system 2695 may verify that application 2680 has registered and been given authority to use graphics acceleration module 2646. Operating system 2695 then calls hypervisor 2696 with information shown in Table 3.

TABLE 3

| OS to Hypervisor Call Parameters | |
| --- | --- |
| 1 | A work descriptor (WD) |
| 2 | An Authority Mask Register (AMR) value (potentially masked) |
| 3 | An effective address (EA) Context Save/Restore Area Pointer (CSRP) |
| 4 | A process ID (PID) and optional thread ID (TID) |
| 5 | A virtual address (VA) accelerator utilization record pointer (AURP) |
| 6 | Virtual address of storage segment table pointer (SSTP) |
| 7 | A logical interrupt service number (LISN) |

Upon receiving a hypervisor call, hypervisor 2696 verifies that operating system 2695 has registered and been given authority to use graphics acceleration module 2646. Hypervisor 2696 then puts process element 2683 into a process element linked list for a corresponding graphics acceleration module 2646 type. A process element may include information shown in Table 4.

TABLE 4

| Process Element Information | |
| --- | --- |
| 1 | A work descriptor (WD) |
| 2 | An Authority Mask Register (AMR) value (potentially masked). |
| 3 | An effective address (EA) Context Save/Restore Area Pointer (CSRP) |
| 4 | A process ID (PID) and optional thread ID (TID) |
| 5 | A virtual address (VA) accelerator utilization record pointer (AURP) |
| 6 | Virtual address of storage segment table pointer (SSTP) |
| 7 | A logical interrupt service number (LISN) |
| 8 | Interrupt vector table, derived from hypervisor call parameters |
| 9 | A state register (SR) value |
| 10 | A logical partition ID (LPID) |
| 11 | A real address (RA) hypervisor accelerator utilization record pointer |
| 12 | Storage Descriptor Register (SDR) |

In at least one embodiment, hypervisor initializes a plurality of accelerator integration slice 2690 registers 2645.

Figure 26F:
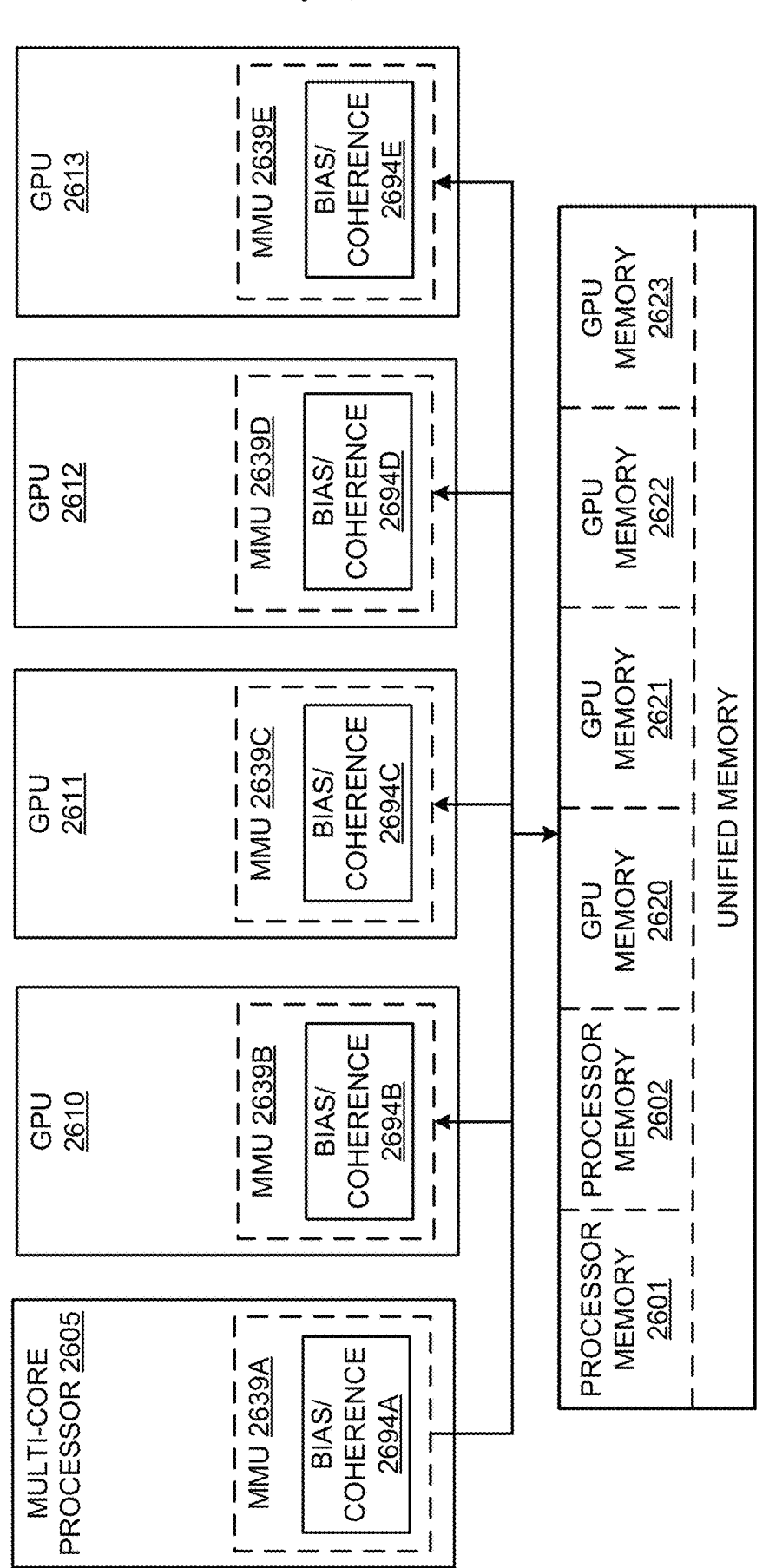

As illustrated in FIG. 26F, in at least one embodiment, a unified memory is used, addressable via a common virtual memory address space used to access physical processor memories 2601-2602 and GPU memories 2620-2623. In this implementation, operations executed on GPUs 2610-2613 utilize a same virtual/effective memory address space to access processor memories 2601-2602 and vice versa, thereby simplifying programmability. In one embodiment, a first portion of a virtual/effective address space is allocated to processor memory 2601, a second portion to second processor memory 2602, a third portion to GPU memory 2620, and so on. In at least one embodiment, an entire virtual/effective memory space (sometimes referred to as an effective address space) is thereby distributed across each of processor memories 2601-2602 and GPU memories 2620-2623, allowing any processor or GPU to access any physical memory with a virtual address mapped to that memory.

In one embodiment, bias/coherence management circuitry 2694A-2694E within one or more of MMUs 2639A-2639E ensures cache coherence between caches of one or more host processors (e.g., 2605) and GPUs 2610-2613 and implements biasing techniques indicating physical memories in which certain types of data should be stored. While multiple instances of bias/coherence management circuitry 2694A-2694E are illustrated in FIG. 26F, bias/coherence circuitry may be implemented within an MMU of one or more host processors 2605 and/or within accelerator integration circuit 2636.

One embodiment allows GPU-attached memory 2620-2623 to be mapped as part of system memory, and accessed using shared virtual memory (SVM) technology, but without suffering performance drawbacks associated with full system cache coherence. In at least one embodiment, an ability for GPU-attached memory 2620-2623 to be accessed as system memory without onerous cache coherence overhead provides a beneficial operating environment for GPU offload. This arrangement allows host processor 2605 software to setup operands and access computation results, without overhead of tradition I/O DMA data copies. Such traditional copies involve driver calls, interrupts and memory mapped I/O (MMIO) accesses that are all inefficient relative to simple memory accesses. In at least one embodiment, an ability to access GPU attached memory 2620-2623 without cache coherence overheads can be critical to execution time of an offloaded computation. In cases with substantial streaming write memory traffic, for example, cache coherence overhead can significantly reduce an effective write bandwidth seen by a GPU 2610-2613. In at least one embodiment, efficiency of operand setup, efficiency of results access, and efficiency of GPU computation may play a role in determining effectiveness of a GPU offload.

In at least one embodiment, selection of GPU bias and host processor bias is driven by a bias tracker data structure. A bias table may be used, for example, which may be a page-granular structure (i.e., controlled at a granularity of a memory page) that includes 1 or 2 bits per GPU-attached memory page. In at least one embodiment, a bias table may be implemented in a stolen memory range of one or more GPU-attached memories 2620-2623, with or without a bias cache in GPU 2610-2613 (e.g., to cache frequently/recently used entries of a bias table). Alternatively, an entire bias table may be maintained within a GPU.

In at least one embodiment, a bias table entry associated with each access to GPU-attached memory 2620-2623 is accessed prior to actual access to a GPU memory, causing the following operations. First, local requests from GPU 2610-2613 that find their page in GPU bias are forwarded directly to a corresponding GPU memory 2620-2623. Local requests from a GPU that find their page in host bias are forwarded to processor 2605 (e.g., over a high-speed link as discussed above). In one embodiment, requests from processor 2605 that find a requested page in host processor bias complete a request like a normal memory read. Alternatively, requests directed to a GPU-biased page may be forwarded to GPU 2610-2613. In at least one embodiment, a GPU may then transition a page to a host processor bias if it is not currently using a page. In at least one embodiment, bias state of a page can be changed either by a software-based mechanism, a hardware-assisted software-based mechanism, or, for a limited set of cases, a purely hardware-based mechanism.

One mechanism for changing bias state employs an API call (e.g., OpenCL), which, in turn, calls a GPU's device driver which, in turn, sends a message (or enqueues a command descriptor) to a GPU directing it to change a bias state and, for some transitions, perform a cache flushing operation in a host. In at least one embodiment, cache flushing operation is used for a transition from host processor 2605 bias to GPU bias, but is not for an opposite transition.

In one embodiment, cache coherency is maintained by temporarily rendering GPU-biased pages uncacheable by host processor 2605. To access these pages, processor 2605 may request access from GPU 2610 which may or may not grant access right away. Thus, to reduce communication between processor 2605 and GPU 2610 it is beneficial to ensure that GPU-biased pages are those which are required by a GPU but not host processor 2605 and vice versa.

In at least one embodiment, processors disclosed in FIG. 26 can be integrated into or included in computing environment 100 (FIG. 1) and computing environment 200 (FIG. 2). In at least one embodiment, processors disclosed in FIG. 26 can include or communicate with controller 205 illustrated in FIG. 3. In at least one embodiment, processors disclosed in FIG. 26 can perform processes 400 and 500 (FIGS. 4 and 5). In at least one embodiment, processors disclosed in FIG. 26 can call or perform APIs disclosed in FIGS. 6-17. In at least one embodiment, processors disclosed in FIG. 26 can perform examples in FIGS. 18 and 19.

Figure 27:
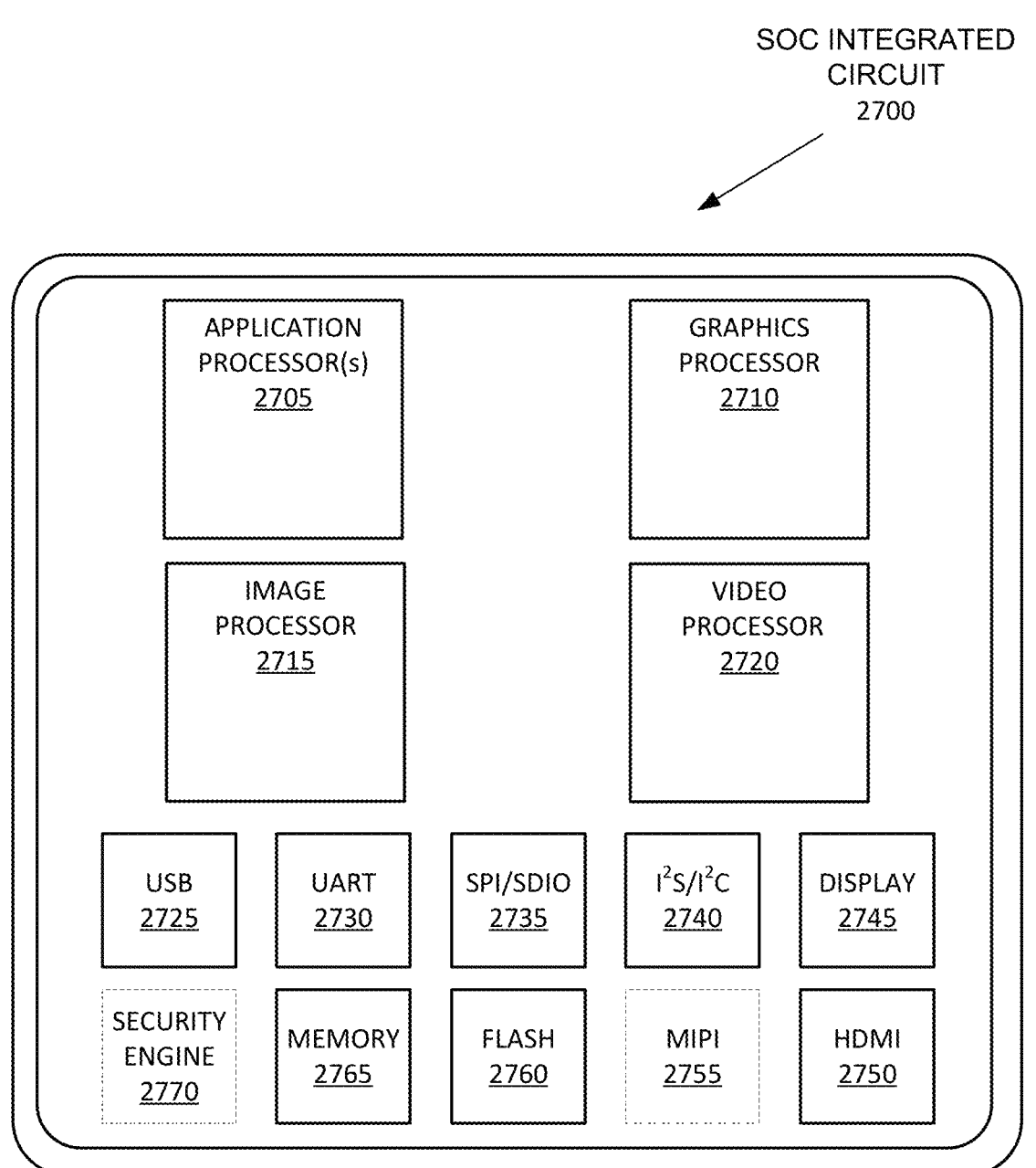
FIG. 27 illustrates exemplary integrated circuits and associated graphics processors, according to at least one embodiment.

FIG. 27 illustrates exemplary integrated circuits and associated graphics processors that may be fabricated using one or more IP cores, according to various embodiments described herein. In addition to what is illustrated, other logic and circuits may be included in at least one embodiment, including additional graphics processors/cores, peripheral interface controllers, or general-purpose processor cores.

FIG. 27 is a block diagram illustrating an exemplary system on a chip integrated circuit 2700 that may be fabricated using one or more IP cores, according to at least one embodiment. In at least one embodiment, integrated circuit 2700 includes one or more application processor(s) 2705 (e.g., CPUs), at least one graphics processor 2710, and may additionally include an image processor 2715 and/or a video processor 2720, any of which may be a modular IP core. In at least one embodiment, integrated circuit 2700 includes peripheral or bus logic including a USB controller 2725, UART controller 2730, an SPI/SDIO controller 2735, and an I.sup.2S/I.sup.2C controller 2740. In at least one embodiment, integrated circuit 2700 can include a display device 2745 coupled to one or more of a high-definition multimedia interface (HDMI) controller 2750 and a mobile industry processor interface (MIPI) display interface 2755. In at least one embodiment, storage may be provided by a flash memory subsystem 2760 including flash memory and a flash memory controller. In at least one embodiment, memory interface may be provided via a memory controller 2765 for access to SDRAM or SRAM memory devices. In at least one embodiment, some integrated circuits additionally include an embedded security engine 2770.

In at least one embodiment, integrated circuit 2700 can be integrated into or included in computing environment 100 (FIG. 1) and computing environment 200 (FIG. 2). In at least one embodiment, integrated circuit 2700 can include or communicate with controller 205 illustrated in FIG. 3. In at least one embodiment, integrated circuit 2700 can perform processes 400 and 500 (FIGS. 4 and 5). In at least one embodiment, integrated circuit 2700 can call or perform APIs disclosed in FIGS. 6-17. In at least one embodiment, integrated circuit 2700 can perform examples in FIGS. 18 and 19.

Figure 28A:
FIGS. 28A and 28B illustrate exemplary integrated circuits and associated graphics processors, according to at least one embodiment.
Figure 28A:
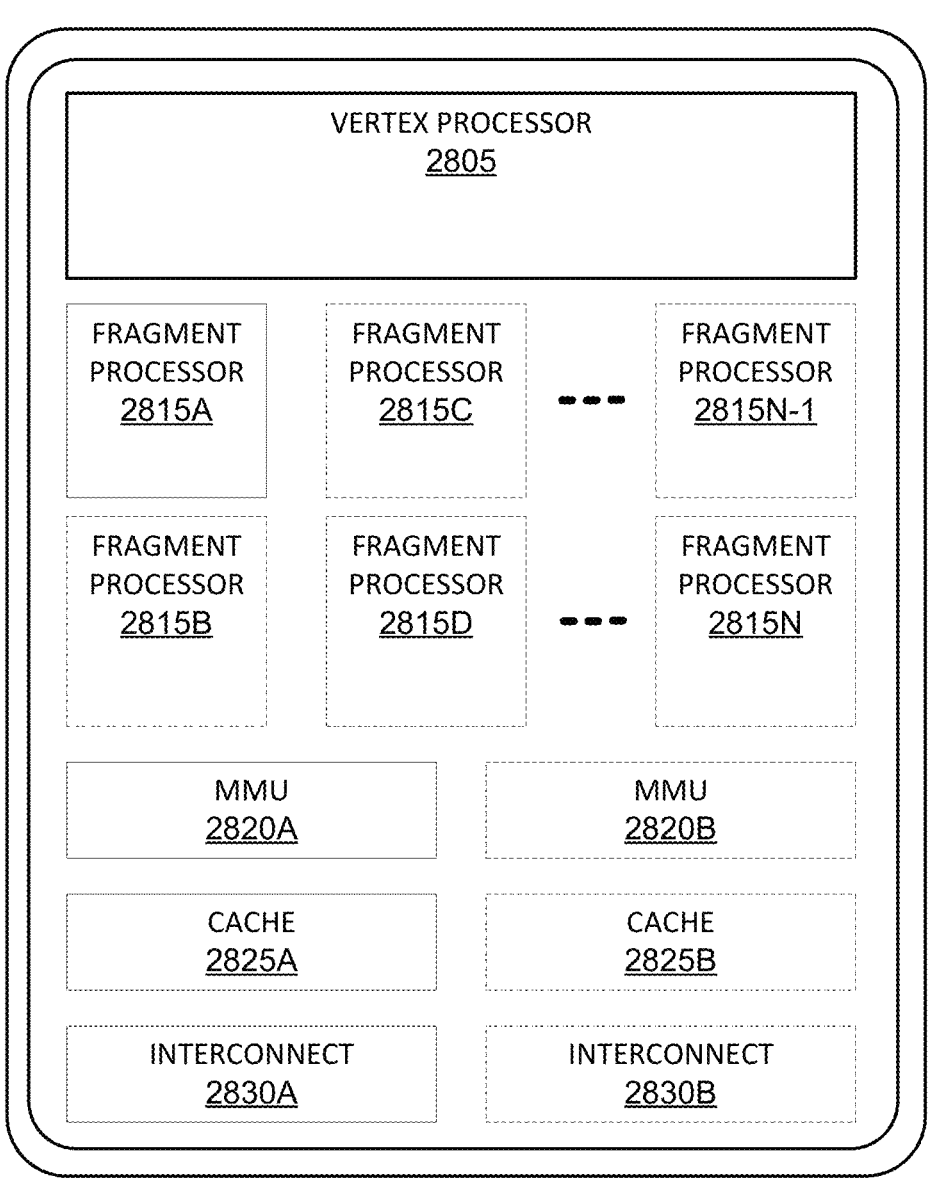
Figure 28B:
Figure 28B:
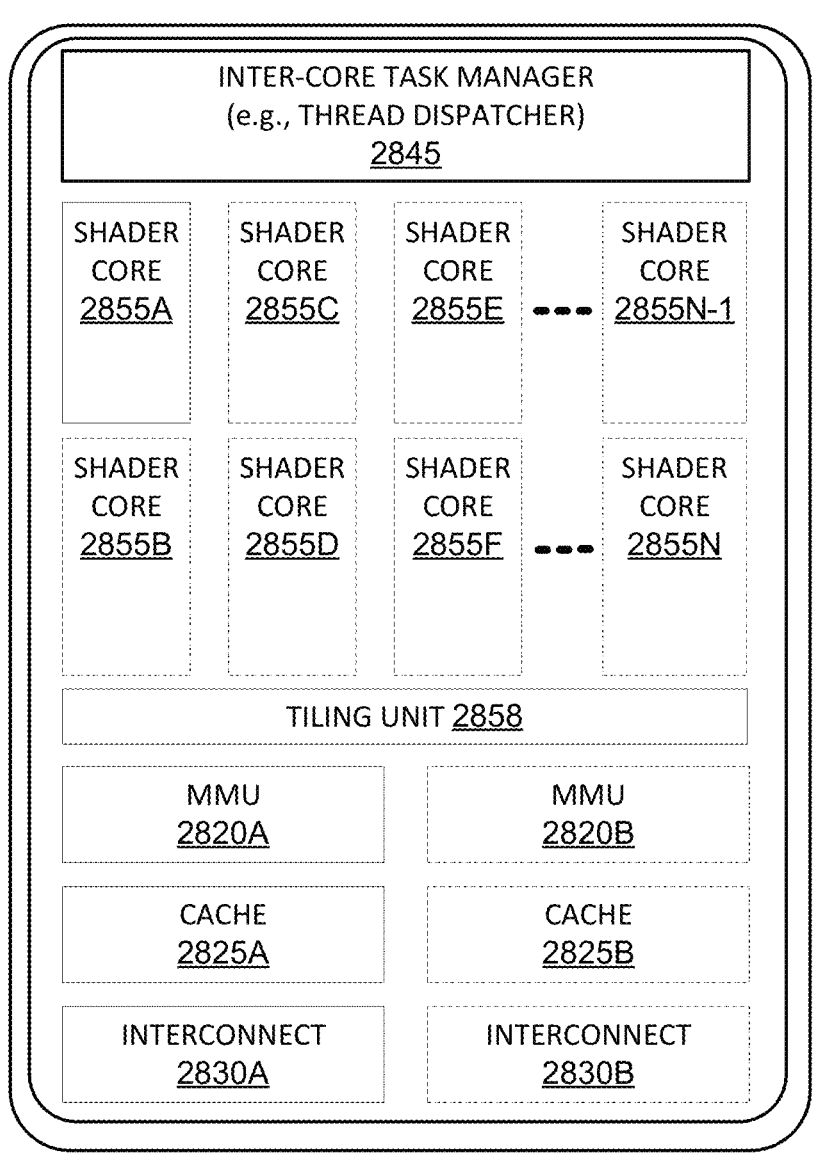

FIGS. 28A-28B illustrate exemplary integrated circuits and associated graphics processors that may be fabricated using one or more IP cores, according to various embodiments described herein. In addition to what is illustrated, other logic and circuits may be included in at least one embodiment, including additional graphics processors/cores, peripheral interface controllers, or general-purpose processor cores.

FIGS. 28A-28B are block diagrams illustrating exemplary graphics processors for use within an SoC, according to embodiments described herein. FIG. 28A illustrates an exemplary graphics processor 2810 of a system on a chip integrated circuit that may be fabricated using one or more IP cores, according to at least one embodiment. FIG. 28B illustrates an additional exemplary graphics processor 2840 of a system on a chip integrated circuit that may be fabricated using one or more IP cores, according to at least one embodiment. In at least one embodiment, graphics processor 2810 of FIG. 28A is a low power graphics processor core. In at least one embodiment, graphics processor 2840 of FIG. 28B is a higher performance graphics processor core. In at least one embodiment, each of graphics processors 2810, 2840 can be variants of graphics processor 2710 of FIG. 27.

In at least one embodiment, graphics processor 2810 includes a vertex processor 2805 and one or more fragment processor(s) 2815A-2815N (e.g., 2815A, 2815B, 2815C, 2815D, through 2815N-1, and 2815N). In at least one embodiment, graphics processor 2810 can execute different shader programs via separate logic, such that vertex processor 2805 is optimized to execute operations for vertex shader programs, while one or more fragment processor(s) 2815A-2815N execute fragment (e.g., pixel) shading operations for fragment or pixel shader programs. In at least one embodiment, vertex processor 2805 performs a vertex processing stage of a 3D graphics pipeline and generates primitives and vertex data. In at least one embodiment, fragment processor(s) 2815A-2815N use primitive and vertex data generated by vertex processor 2805 to produce a framebuffer that is displayed on a display device. In at least one embodiment, fragment processor(s) 2815A-2815N are optimized to execute fragment shader programs as provided for in an OpenGL API, which may be used to perform similar operations as a pixel shader program as provided for in a Direct 3D API.

In at least one embodiment, graphics processor 2810 additionally includes one or more memory management units (MMUs) 2820A-2820B, cache(s) 2825A-2825B, and circuit interconnect(s) 2830A-2830B. In at least one embodiment, one or more MMU(s) 2820A-2820B provide for virtual to physical address mapping for graphics processor 2810, including for vertex processor 2805 and/or fragment processor(s) 2815A-2815N, which may reference vertex or image/texture data stored in memory, in addition to vertex or image/texture data stored in one or more cache(s) 2825A-2825B. In at least one embodiment, one or more MMU(s) 2820A-2820B may be synchronized with other MMUs within system, including one or more MMUs associated with one or more application processor(s) 2705, image processors 2715, and/or video processors 2720 of FIG. 27, such that each processor 2705-2720 can participate in a shared or unified virtual memory system. In at least one embodiment, one or more circuit interconnect(s) 2830A-2830B enable graphics processor 2810 to interface with other IP cores within SoC, either via an internal bus of SoC or via a direct connection.

In at least one embodiment, graphics processor 2840 includes one or more MMU(s) 2820A-2820B, caches 2825A-2825B, and circuit interconnects 2830A-2830B of graphics processor 2810 of FIG. 28A. In at least one embodiment, graphics processor 2840 includes one or more shader core(s) 2855A-2855N (e.g., 2855A, 2855B, 2855C, 2855D, 2855E, 2855F, through 2855N-1, and 2855N), which provides for a unified shader core architecture in which a single core or type or core can execute all types of programmable shader code, including shader program code to implement vertex shaders, fragment shaders, and/or compute shaders. In at least one embodiment, a number of shader cores can vary. In at least one embodiment, graphics processor 2840 includes an inter-core task manager 2845, which acts as a thread dispatcher to dispatch execution threads to one or more shader cores 2855A-2855N and a tiling unit 2858 to accelerate tiling operations for tile-based rendering, in which rendering operations for a scene are subdivided in image space, for example to exploit local spatial coherence within a scene or to optimize use of internal caches.

In at least one embodiment, graphics processors in FIGS. 28A-28B can be integrated into or included in computing environment 100 (FIG. 1) and computing environment 200 (FIG. 2). In at least one embodiment, graphics processors in FIGS. 28A-28B can include or communicate with controller 205 illustrated in FIG. 3. In at least one embodiment, graphics processors in FIGS. 28A-28B can perform processes 400 and 500 (FIGS. 4 and 5). In at least one embodiment, graphics processors in FIGS. 28A-28B can call or perform APIs disclosed in FIGS. 6-17. In at least one embodiment, graphics processors in FIGS. 28A-28B can perform examples in FIGS. 18 and 19.

Figure 29A:
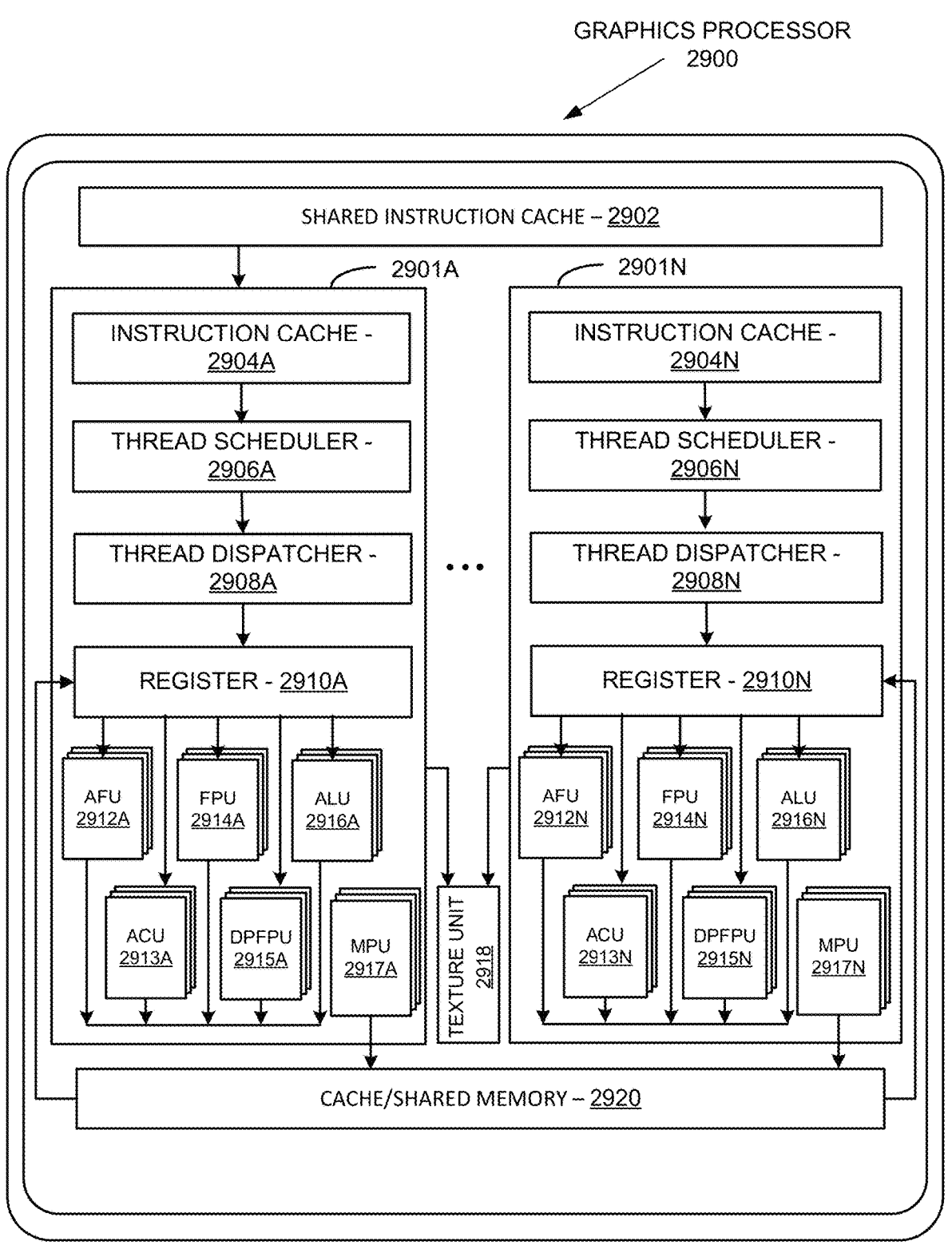
FIGS. 29A and 29B illustrate additional exemplary graphics processor logic, according to at least one embodiment.
Figure 29B:
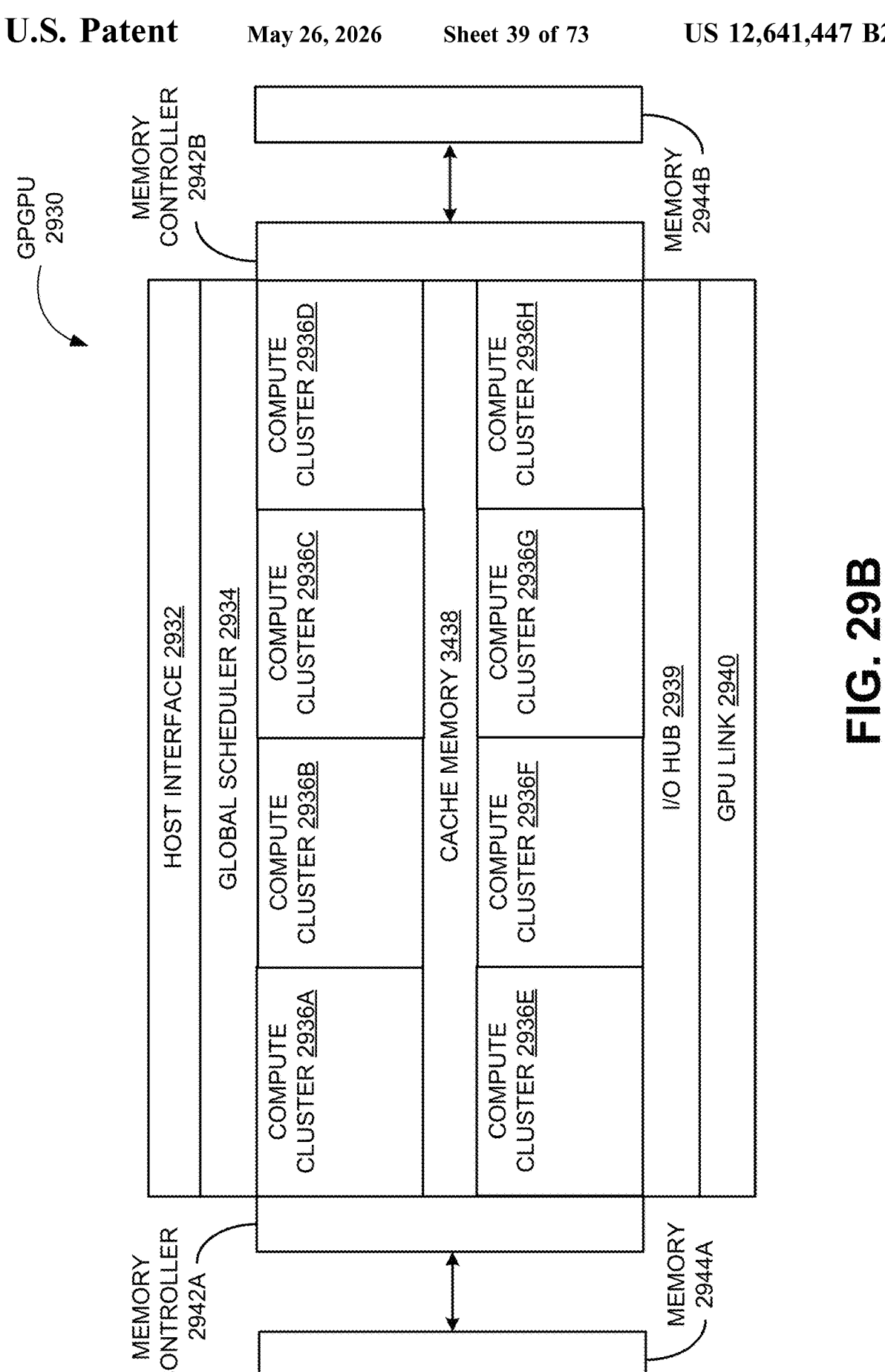

FIGS. 29A-29B illustrate additional exemplary graphics processor logic according to embodiments described herein. FIG. 29A illustrates a graphics core 2900 that may be included within graphics processor 2710 of FIG. 27, in at least one embodiment, and may be a unified shader core 2855A-2855N as in FIG. 28B in at least one embodiment. FIG. 29B illustrates a highly-parallel general-purpose graphics processing unit 2930 suitable for deployment on a multi-chip module in at least one embodiment.

In at least one embodiment, graphics core 2900 includes a shared instruction cache 2902, a texture unit 2918, and a cache/shared memory 2920 that are common to execution resources within graphics core 2900. In at least one embodiment, graphics core 2900 can include multiple slices 2901A-2901N or partition for each core, and a graphics processor can include multiple instances of graphics core 2900. Slices 2901A-2901N can include support logic including a local instruction cache 2904A-2904N, a thread scheduler 2906A-2906N, a thread dispatcher 2908A-2908N, and a set of registers 2910A-2910N. In at least one embodiment, slices 2901A-2901N can include a set of additional function units (AFUs 2912A-2912N), floating-point units (FPU 2914A-2914N), integer arithmetic logic units (ALUs 2916-2916N), address computational units (ACU 2913A-2913N), double-precision floating-point units (DPFPU 2915A-2915N), and matrix processing units (MPU 2917A-2917N).

In at least one embodiment, FPUs 2914A-2914N can perform single-precision (32-bit) and half-precision (16-bit) floating point operations, while DPFPUs 2915A-2915N perform double precision (64-bit) floating point operations. In at least one embodiment, ALUs 2916A-2916N can perform variable precision integer operations at 8-bit, 16-bit, and 32-bit precision, and can be configured for mixed precision operations. In at least one embodiment, MPUs 2917A-2917N can also be configured for mixed precision matrix operations, including half-precision floating point and 8-bit integer operations. In at least one embodiment, MPUs 2917-2917N can perform a variety of matrix operations to accelerate machine learning application frameworks, including enabling support for accelerated general matrix to matrix multiplication (GEMM). In at least one embodiment, AFUs 2912A-2912N can perform additional logic operations not supported by floating-point or integer units, including trigonometric operations (e.g., Sine, Cosine, etc.).

In at least one embodiment, graphics processors and/or logic in FIGS. 29A-29B can be integrated into or included in computing environment 100 (FIG. 1) and computing environment 200 (FIG. 2). In at least one embodiment, graphics processors and/or logic in FIGS. 29A-29B can include or communicate with controller 205 illustrated in FIG. 3. In at least one embodiment, graphics processors and/or logic in FIGS. 29A-29B can perform processes 400 and 500 (FIGS. 4 and 5). In at least one embodiment, graphics processors and/or logic in FIGS. 29A-29B can call or perform part or all of APIs disclosed in FIGS. 6-17. In at least one embodiment, graphics processors and/or logic in FIGS. 29A-29B can perform examples in FIGS. 18 and 19.

FIG. 29B illustrates a general-purpose processing unit (GPGPU) 2930 that can be configured to enable highly-parallel compute operations to be performed by an array of graphics processing units, in at least one embodiment. In at least one embodiment, GPGPU 2930 can be linked directly to other instances of GPGPU 2930 to create a multi-GPU cluster to improve training speed for deep neural networks. In at least one embodiment, GPGPU 2930 includes a host interface 2932 to enable a connection with a host processor. In at least one embodiment, host interface 2932 is a PCI Express interface. In at least one embodiment, host interface 2932 can be a vendor specific communications interface or communications fabric. In at least one embodiment, GPGPU 2930 receives commands from a host processor and uses a global scheduler 2934 to distribute execution threads associated with those commands to a set of compute clusters 2936A-2936H. In at least one embodiment, compute clusters 2936A-2936H share a cache memory 2938. In at least one embodiment, cache memory 2938 can serve as a higher-level cache for cache memories within compute clusters 2936A-2936H.

In at least one embodiment, GPGPU 2930 includes memory 2944A-2944B coupled with compute clusters 2936A-2936H via a set of memory controllers 2942A-2942B. In at least one embodiment, memory 2944A-2944B can include various types of memory devices including dynamic random access memory (DRAM) or graphics random access memory, such as synchronous graphics random access memory (SGRAM), including graphics double data rate (GDDR) memory.

In at least one embodiment, compute clusters 2936A-2936H each include a set of graphics cores, such as graphics core 2900 of FIG. 29A, which can include multiple types of integer and floating point logic units that can perform computational operations at a range of precisions including suited for machine learning computations. For example, in at least one embodiment, at least a subset of floating point units in each of compute clusters 2936A-2936H can be configured to perform 16-bit or 32-bit floating point operations, while a different subset of floating point units can be configured to perform 64-bit floating point operations.

In at least one embodiment, multiple instances of GPGPU 2930 can be configured to operate as a compute cluster. In at least one embodiment, communication used by compute clusters 2936A-2936H for synchronization and data exchange varies across embodiments. In at least one embodiment, multiple instances of GPGPU 2930 communicate over host interface 2932. In at least one embodiment, GPGPU 2930 includes an I/O hub 2939 that couples GPGPU 2930 with a GPU link 2940 that enables a direct connection to other instances of GPGPU 2930. In at least one embodiment, GPU link 2940 is coupled to a dedicated GPU-to-GPU bridge that enables communication and synchronization between multiple instances of GPGPU 2930. In at least one embodiment GPU link 2940 couples with a high-speed interconnect to transmit and receive data to other GPGPUs or parallel processors. In at least one embodiment, multiple instances of GPGPU 2930 are located in separate data processing systems and communicate via a network device that is accessible via host interface 2932. In at least one embodiment GPU link 2940 can be configured to enable a connection to a host processor in addition to or as an alternative to host interface 2932.

In at least one embodiment, GPGPU 2930 can be configured to train neural networks. In at least one embodiment, GPGPU 2930 can be used within an inferencing platform. In at least one embodiment, in which GPGPU 2930 is used for inferencing, GPGPU may include fewer compute clusters 2936A-2936H relative to when GPGPU is used for training a neural network. In at least one embodiment, memory technology associated with memory 2944A-2944B may differ between inferencing and training configurations, with higher bandwidth memory technologies devoted to training configurations. In at least one embodiment, inferencing configuration of GPGPU 2930 can support inferencing specific instructions. For example, in at least one embodiment, an inferencing configuration can provide support for one or more 8-bit integer dot product instructions, which may be used during inferencing operations for deployed neural networks.

In at least one embodiment, graphics processors and/or logic in FIGS. 29A-29B can be integrated into or included in computing environment 100 (FIG. 1) and computing environment 200 (FIG. 2). In at least one embodiment, graphics processors and/or logic in FIGS. 29A-29B can include or communicate with controller 205 illustrated in FIG. 3. In at least one embodiment, graphics processors and/or logic in FIGS. 29A-29B can perform processes 400 and 500 (FIGS. 4 and 5). In at least one embodiment, graphics processors and/or logic in FIGS. 29A-29B can call or perform part or all of APIs disclosed in FIGS. 6-17. In at least one embodiment, graphics processors and/or logic in FIGS. 29A-29B can perform examples in FIGS. 18 and 19.

Figure 30:
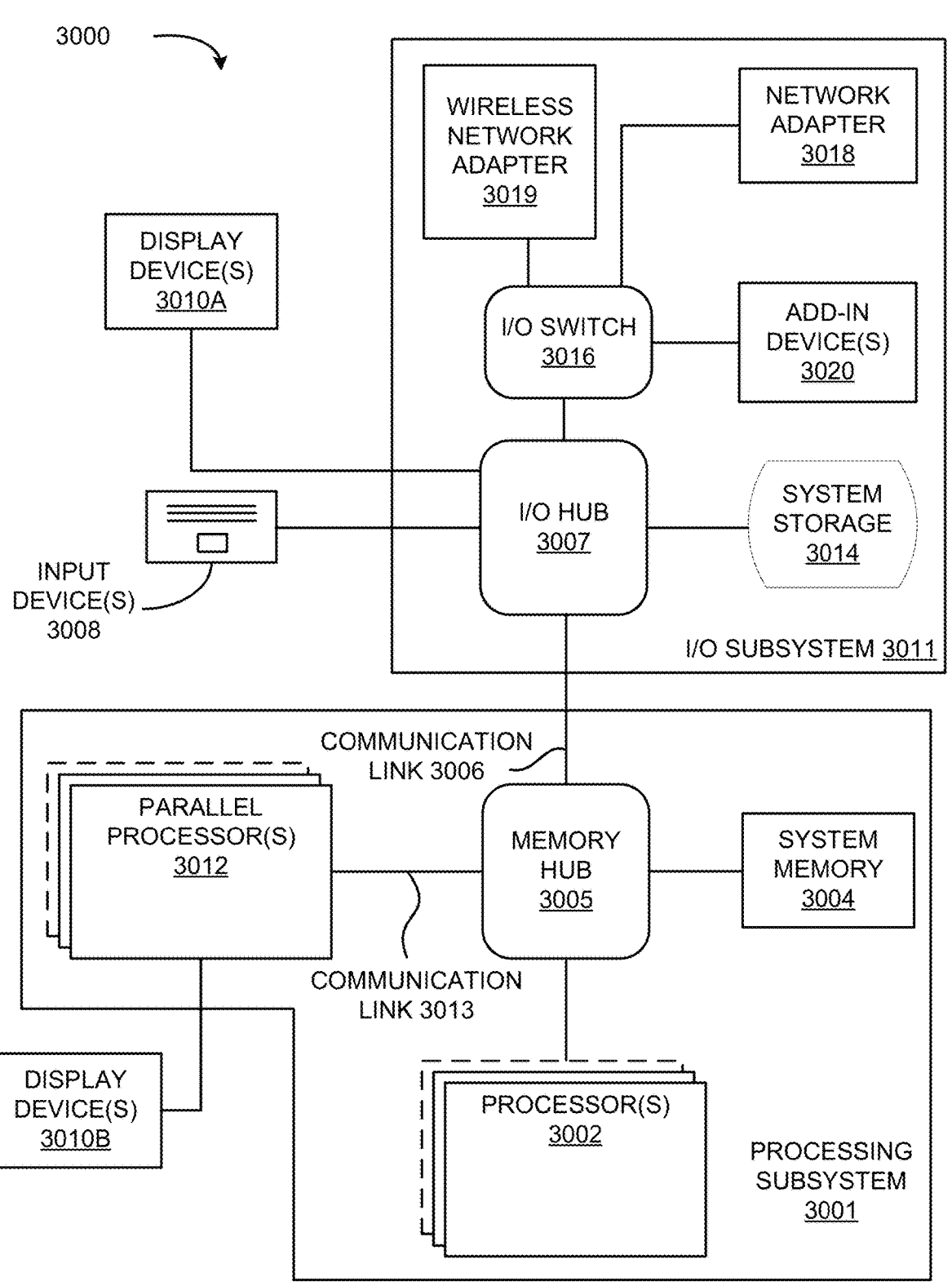
FIG. 30 illustrates a computer system, according to at least one embodiment.

FIG. 30 is a block diagram illustrating a computing system 3000 according to at least one embodiment. In at least one embodiment, computing system 3000 includes a processing subsystem 3001 having one or more processor(s) 3002 and a system memory 3004 communicating via an interconnection path that may include a memory hub 3005. In at least one embodiment, memory hub 3005 may be a separate component within a chipset component or may be integrated within one or more processor(s) 3002. In at least one embodiment, memory hub 3005 couples with an I/O subsystem 3011 via a communication link 3006. In at least one embodiment, I/O subsystem 3011 includes an I/O hub 3007 that can enable computing system 3000 to receive input from one or more input device(s) 3008. In at least one embodiment, I/O hub 3007 can enable a display controller, which may be included in one or more processor(s) 3002, to provide outputs to one or more display device(s) 3010A. In at least one embodiment, one or more display device(s) 3010A coupled with I/O hub 3007 can include a local, internal, or embedded display device.

In at least one embodiment, processing subsystem 3001 includes one or more parallel processor(s) 3012 coupled to memory hub 3005 via a bus or other communication link 3013. In at least one embodiment, communication link 3013 may be one of any number of standards based communication link technologies or protocols, such as, but not limited to PCI Express, or may be a vendor specific communications interface or communications fabric. In at least one embodiment, one or more parallel processor(s) 3012 form a computationally focused parallel or vector processing system that can include a large number of processing cores and/or processing clusters, such as a many integrated core (MIC) processor. In at least one embodiment, one or more parallel processor(s) 3012 form a graphics processing subsystem that can output pixels to one of one or more display device(s) 3010A coupled via I/O Hub 3007. In at least one embodiment, one or more parallel processor(s) 3012 can also include a display controller and display interface (not shown) to enable a direct connection to one or more display device(s) 3010B.

In at least one embodiment, a system storage unit 3014 can connect to I/O hub 3007 to provide a storage mechanism for computing system 3000. In at least one embodiment, an I/O switch 3016 can be used to provide an interface mechanism to enable connections between I/O hub 3007 and other components, such as a network adapter 3018 and/or wireless network adapter 3019 that may be integrated into platform, and various other devices that can be added via one or more add-in device(s) 3020. In at least one embodiment, network adapter 3018 can be an Ethernet adapter or another wired network adapter. In at least one embodiment, wireless network adapter 3019 can include one or more of a Wi-Fi, Bluetooth, near field communication (NFC), or other network device that includes one or more wireless radios.

In at least one embodiment, computing system 3000 can include other components not explicitly shown, including USB or other port connections, optical storage drives, video capture devices, and like, may also be connected to I/O hub 3007. In at least one embodiment, communication paths interconnecting various components in FIG. 30 may be implemented using any suitable protocols, such as PCI (Peripheral Component Interconnect) based protocols (e.g., PCI-Express), or other bus or point-to-point communication interfaces and/or protocol(s), such as NV-Link high-speed interconnect, or interconnect protocols.

In at least one embodiment, one or more parallel processor(s) 3012 incorporate circuitry optimized for graphics and video processing, including, for example, video output circuitry, and constitutes a graphics processing unit (GPU). In at least one embodiment, one or more parallel processor(s) 3012 incorporate circuitry optimized for general purpose processing. In at least an embodiment, components of computing system 3000 may be integrated with one or more other system elements on a single integrated circuit. For example, in at least one embodiment, one or more parallel processor(s) 3012, memory hub 3005, processor(s) 3002, and I/O hub 3007 can be integrated into a system on chip (SoC) integrated circuit. In at least one embodiment, components of computing system 3000 can be integrated into a single package to form a system in package (SIP) configuration. In at least one embodiment, at least a portion of components of computing system 3000 can be integrated into a multi-chip module (MCM), which can be interconnected with other multi-chip modules into a modular computing system.

In at least one embodiment, computing system 3000 can be integrated into or included in computing environment 100 (FIG. 1) and computing environment 200 (FIG. 2). In at least one embodiment, computing system 3000 can include or communicate with controller 205 illustrated in FIG. 3. In at least one embodiment, computing system 3000 can perform processes 400 and 500 (FIGS. 4 and 5). In at least one embodiment, computing system 3000 can call or perform part or all of APIs disclosed in FIGS. 6-17. In at least one embodiment, computing system 3000 can perform examples in FIGS. 18 and 19.

Processors

Figure 31A:
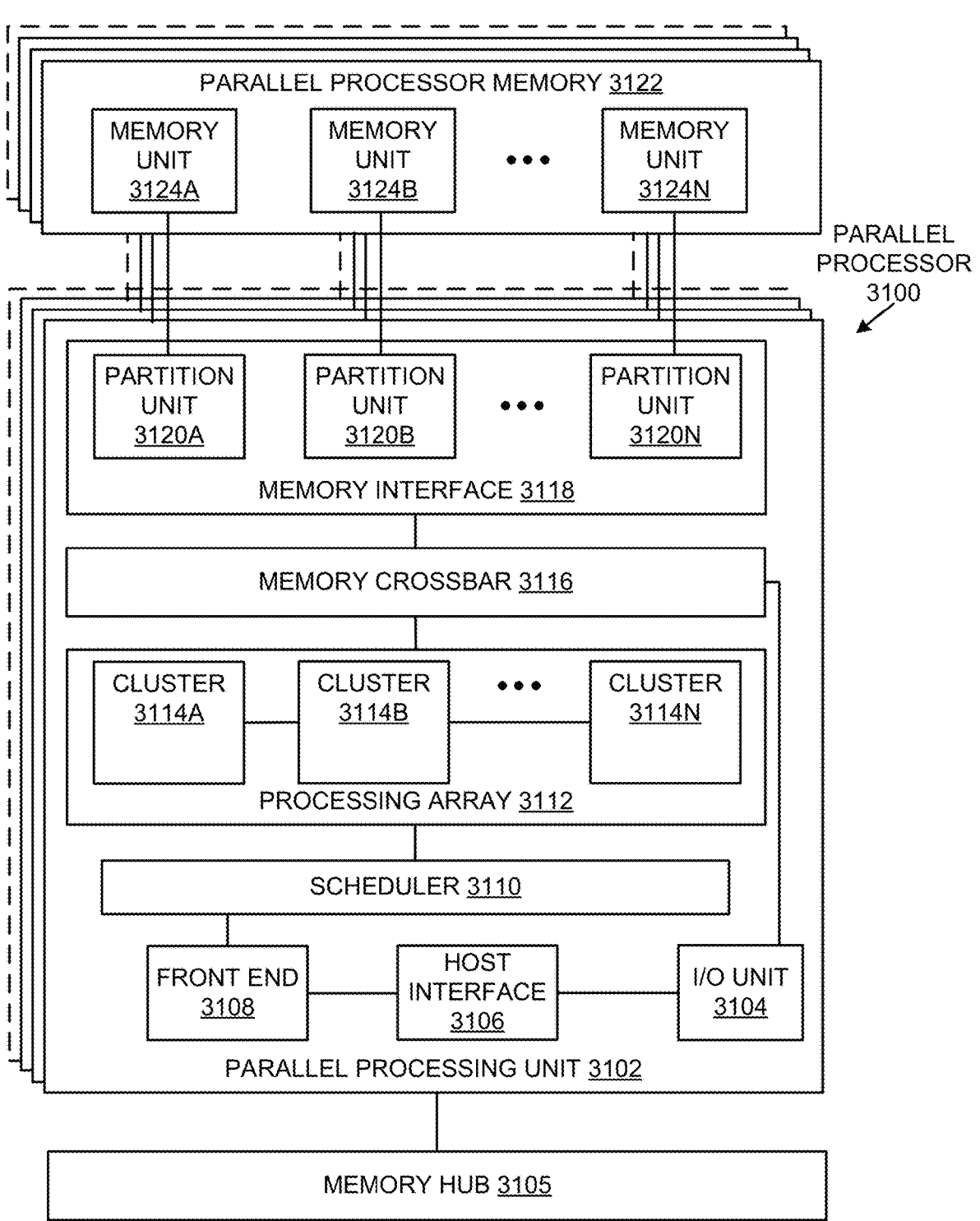
FIG. 31A illustrates a parallel processor, according to at least one embodiment.

FIG. 31A illustrates a parallel processor 3100 according to at least on embodiment. In at least one embodiment, various components of parallel processor 3100 may be implemented using one or more integrated circuit devices, such as programmable processors, application specific integrated circuits (ASICs), or field programmable gate arrays (FPGA). In at least one embodiment, illustrated parallel processor 3100 is a variant of one or more parallel processor(s) 3012 shown in FIG. 30 according to an exemplary embodiment.

In at least one embodiment, parallel processor 3100 includes a parallel processing unit 3102. In at least one embodiment, parallel processing unit 3102 includes an I/O unit 3104 that enables communication with other devices, including other instances of parallel processing unit 3102. In at least one embodiment, I/O unit 3104 may be directly connected to other devices. In at least one embodiment, I/O unit 3104 connects with other devices via use of a hub or switch interface, such as memory hub 3105. In at least one embodiment, connections between memory hub 3105 and I/O unit 3104 form a communication link. In at least one embodiment, I/O unit 3104 connects with a host interface 3106 and a memory crossbar 3116, where host interface 3106 receives commands directed to performing processing operations and memory crossbar 3116 receives commands directed to performing memory operations.

In at least one embodiment, when host interface 3106 receives a command buffer via I/O unit 3104, host interface 3106 can direct work operations to perform those commands to a front end 3108. In at least one embodiment, front end 3108 couples with a scheduler 3110, which is configured to distribute commands or other work items to a processing cluster array 3112. In at least one embodiment, scheduler 3110 ensures that processing cluster array 3112 is properly configured and in a valid state before tasks are distributed to processing cluster array 3112 of processing cluster array 3112. In at least one embodiment, scheduler 3110 is implemented via firmware logic executing on a microcontroller. In at least one embodiment, microcontroller implemented scheduler 3110 is configurable to perform complex scheduling and work distribution operations at coarse and fine granularity, enabling rapid preemption and context switching of threads executing on processing array 3112. In at least one embodiment, host software can prove workloads for scheduling on processing array 3112 via one of multiple graphics processing doorbells. In at least one embodiment, workloads can then be automatically distributed across processing array 3112 by scheduler 3110 logic within a microcontroller including scheduler 3110.

In at least one embodiment, processing cluster array 3112 can include up to "N" processing clusters (e.g., cluster 3114A, cluster 3114B, through cluster 3114N). In at least one embodiment, each cluster 3114A-3114N of processing cluster array 3112 can execute a large number of concurrent threads. In at least one embodiment, scheduler 3110 can allocate work to clusters 3114A-3114N of processing cluster array 3112 using various scheduling and/or work distribution algorithms, which may vary depending on workload arising for each type of program or computation. In at least one embodiment, scheduling can be handled dynamically by scheduler 3110, or can be assisted in part by compiler logic during compilation of program logic configured for execution by processing cluster array 3112. In at least one embodiment, different clusters 3114A-3114N of processing cluster array 3112 can be allocated for processing different types of programs or for performing different types of computations.

In at least one embodiment, processing cluster array 3112 can be configured to perform various types of parallel processing operations. In at least one embodiment, processing cluster array 3112 is configured to perform general-purpose parallel compute operations. For example, in at least one embodiment, processing cluster array 3112 can include logic to execute processing tasks including filtering of video and/or audio data, performing modeling operations, including physics operations, and performing data transformations.

In at least one embodiment, processing cluster array 3112 is configured to perform parallel graphics processing operations. In at least one embodiment, processing cluster array 3112 can include additional logic to support execution of such graphics processing operations, including, but not limited to texture sampling logic to perform texture operations, as well as tessellation logic and other vertex processing logic. In at least one embodiment, processing cluster array 3112 can be configured to execute graphics processing related shader programs such as, but not limited to vertex shaders, tessellation shaders, geometry shaders, and pixel shaders. In at least one embodiment, parallel processing unit 3102 can transfer data from system memory via I/O unit 3104 for processing. In at least one embodiment, during processing, transferred data can be stored to on-chip memory (e.g., parallel processor memory 3122) during processing, then written back to system memory.

In at least one embodiment, when parallel processing unit 3102 is used to perform graphics processing, scheduler 3110 can be configured to divide a processing workload into approximately equal sized tasks, to better enable distribution of graphics processing operations to multiple clusters 3114A-3114N of processing cluster array 3112. In at least one embodiment, portions of processing cluster array 3112 can be configured to perform different types of processing. For example, in at least one embodiment, a first portion may be configured to perform vertex shading and topology generation, a second portion may be configured to perform tessellation and geometry shading, and a third portion may be configured to perform pixel shading or other screen space operations, to produce a rendered image for display. In at least one embodiment, intermediate data produced by one or more of clusters 3114A-3114N may be stored in buffers to allow intermediate data to be transmitted between clusters 3114A-3114N for further processing.

In at least one embodiment, processing cluster array 3112 can receive processing tasks to be executed via scheduler 3110, which receives commands defining processing tasks from front end 3108. In at least one embodiment, processing tasks can include indices of data to be processed, e.g., surface (patch) data, primitive data, vertex data, and/or pixel data, as well as state parameters and commands defining how data is to be processed (e.g., what program is to be executed). In at least one embodiment, scheduler 3110 may be configured to fetch indices corresponding to tasks or may receive indices from front end 3108. In at least one embodiment, front end 3108 can be configured to ensure processing cluster array 3112 is configured to a valid state before a workload specified by incoming command buffers (e.g., batch-buffers, push buffers, etc.) is initiated.

In at least one embodiment, each of one or more instances of parallel processing unit 3102 can couple with parallel processor memory 3122. In at least one embodiment, parallel processor memory 3122 can be accessed via memory crossbar 3116, which can receive memory requests from processing cluster array 3112 as well as I/O unit 3104. In at least one embodiment, memory crossbar 3116 can access parallel processor memory 3122 via a memory interface 3118. In at least one embodiment, memory interface 3118 can include multiple partition units (e.g., partition unit 3120A, partition unit 3120B, through partition unit 3120N) that can each couple to a portion (e.g., memory unit) of parallel processor memory 3122. In at least one embodiment, a number of partition units 3120A-3120N is configured to be equal to a number of memory units, such that a first partition unit 3120A has a corresponding first memory unit 3124A, a second partition unit 3120B has a corresponding memory unit 3124B, and an Nth partition unit 3120N has a corresponding Nth memory unit 3124N. In at least one embodiment, a number of partition units 3120A-3120N may not be equal to a number of memory devices.

In at least one embodiment, memory units 3124A-3124N can include various types of memory devices, including dynamic random access memory (DRAM) or graphics random access memory, such as synchronous graphics random access memory (SGRAM), including graphics double data rate (GDDR) memory. In at least one embodiment, memory units 3124A-3124N may also include 3D stacked memory, including but not limited to high bandwidth memory (HBM). In at least one embodiment, render targets, such as frame buffers or texture maps may be stored across memory units 3124A-3124N, allowing partition units 3120A-3120N to write portions of each render target in parallel to efficiently use available bandwidth of parallel processor memory 3122. In at least one embodiment, a local instance of parallel processor memory 3122 may be excluded in favor of a unified memory design that utilizes system memory in conjunction with local cache memory.

In at least one embodiment, any one of clusters 3114A-3114N of processing cluster array 3112 can process data that will be written to any of memory units 3124A-3124N within parallel processor memory 3122. In at least one embodiment, memory crossbar 3116 can be configured to transfer an output of each cluster 3114A-3114N to any partition unit 3120A-3120N or to another cluster 3114A-3114N, which can perform additional processing operations on an output. In at least one embodiment, each cluster 3114A-3114N can communicate with memory interface 3118 through memory crossbar 3116 to read from or write to various external memory devices. In at least one embodiment, memory crossbar 3116 has a connection to memory interface 3118 to communicate with I/O unit 3104, as well as a connection to a local instance of parallel processor memory 3122, enabling processing units within different processing clusters 3114A-3114N to communicate with system memory or other memory that is not local to parallel processing unit 3102. In at least one embodiment, memory crossbar 3116 can use virtual channels to separate traffic streams between clusters 3114A-3114N and partition units 3120A-3120N.

In at least one embodiment, multiple instances of parallel processing unit 3102 can be provided on a single add-in card, or multiple add-in cards can be interconnected. In at least one embodiment, different instances of parallel processing unit 3102 can be configured to inter-operate even if different instances have different numbers of processing cores, different amounts of local parallel processor memory, and/or other configuration differences. For example, in at least one embodiment, some instances of parallel processing unit 3102 can include higher precision floating point units relative to other instances. In at least one embodiment, systems incorporating one or more instances of parallel processing unit 3102 or parallel processor 3100 can be implemented in a variety of configurations and form factors, including but not limited to desktop, laptop, or handheld personal computers, servers, workstations, game consoles, and/or embedded systems.

Figure 31B:
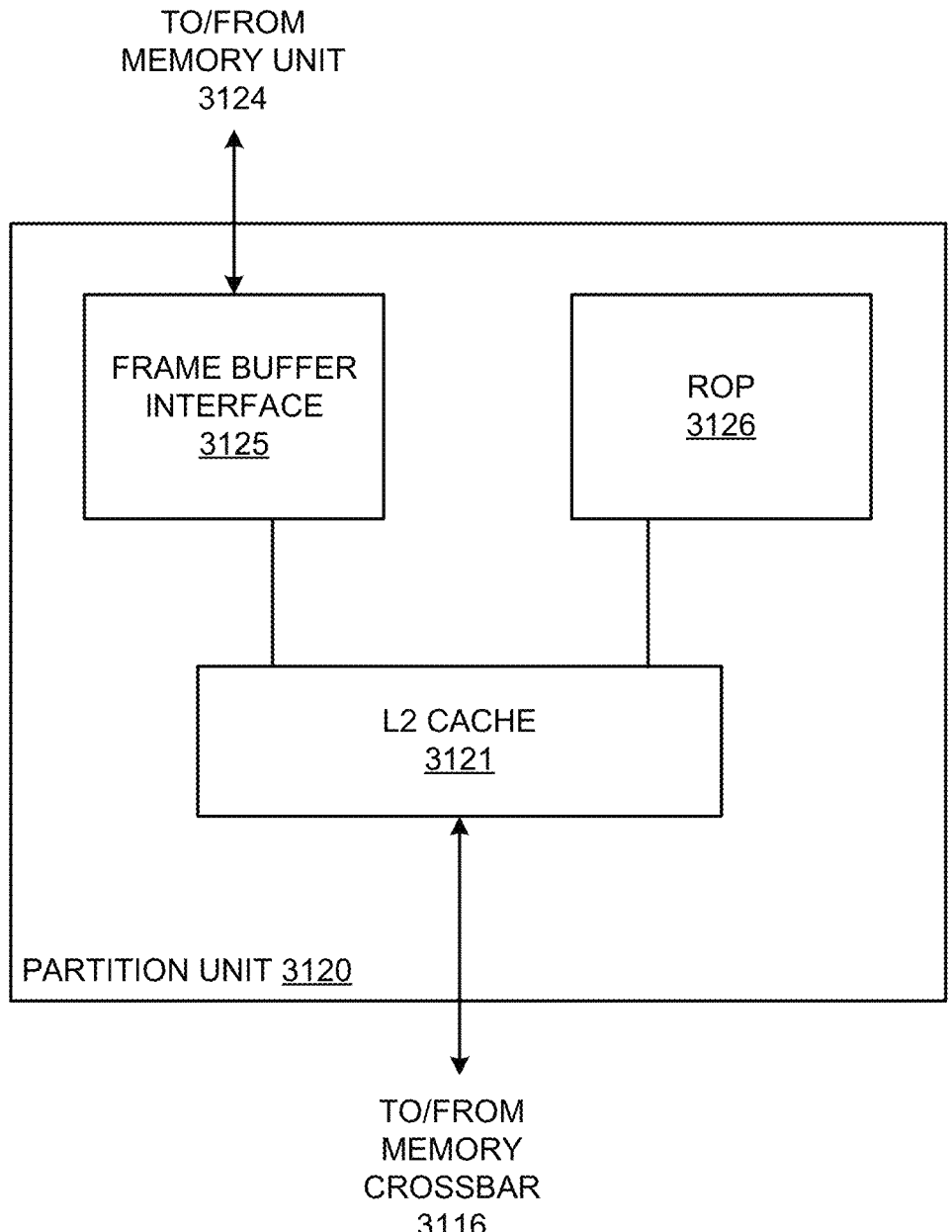
FIG. 31B illustrates a partition unit, according to at least one embodiment.

FIG. 31B is a block diagram of a partition unit 3120 according to at least one embodiment. In at least one embodiment, partition unit 3120 is an instance of one of partition units 3120A-3120N of FIG. 31A. In at least one embodiment, partition unit 3120 includes an L2 cache 3121, a frame buffer interface 3125, and a ROP 3126 (raster operations unit). L2 cache 3121 is a read/write cache that is configured to perform load and store operations received from memory crossbar 3116 and ROP 3126. In at least one embodiment, read misses and urgent write-back requests are output by L2 cache 3121 to frame buffer interface 3125 for processing. In at least one embodiment, updates can also be sent to a frame buffer via frame buffer interface 3125 for processing. In at least one embodiment, frame buffer interface 3125 interfaces with one of memory units in parallel processor memory, such as memory units 3124A-3124N of FIG. 31 (e.g., within parallel processor memory 3122).

In at least one embodiment, ROP 3126 is a processing unit that performs raster operations such as stencil, z test, blending, and like. In at least one embodiment, ROP 3126 then outputs processed graphics data that is stored in graphics memory. In at least one embodiment, ROP 3126 includes compression logic to compress depth or color data that is written to memory and decompress depth or color data that is read from memory. In at least one embodiment, compression logic can be lossless compression logic that makes use of one or more of multiple compression algorithms. In at least one embodiment, type of compression that is performed by ROP 3126 can vary based on statistical characteristics of data to be compressed. For example, in at least one embodiment, delta color compression is performed on depth and color data on a per-tile basis.

In at least one embodiment, ROP 3126 is included within each processing cluster (e.g., cluster 3114A-3114N of FIG. 31) instead of within partition unit 3120. In at least one embodiment, read and write requests for pixel data are transmitted over memory crossbar 3116 instead of pixel fragment data. In at least one embodiment, processed graphics data may be displayed on a display device, such as one of one or more display device(s) 3010 of FIG. 30, routed for further processing by processor(s) 3002, or routed for further processing by one of processing entities within parallel processor 3100 of FIG. 31A.

Figure 31C:
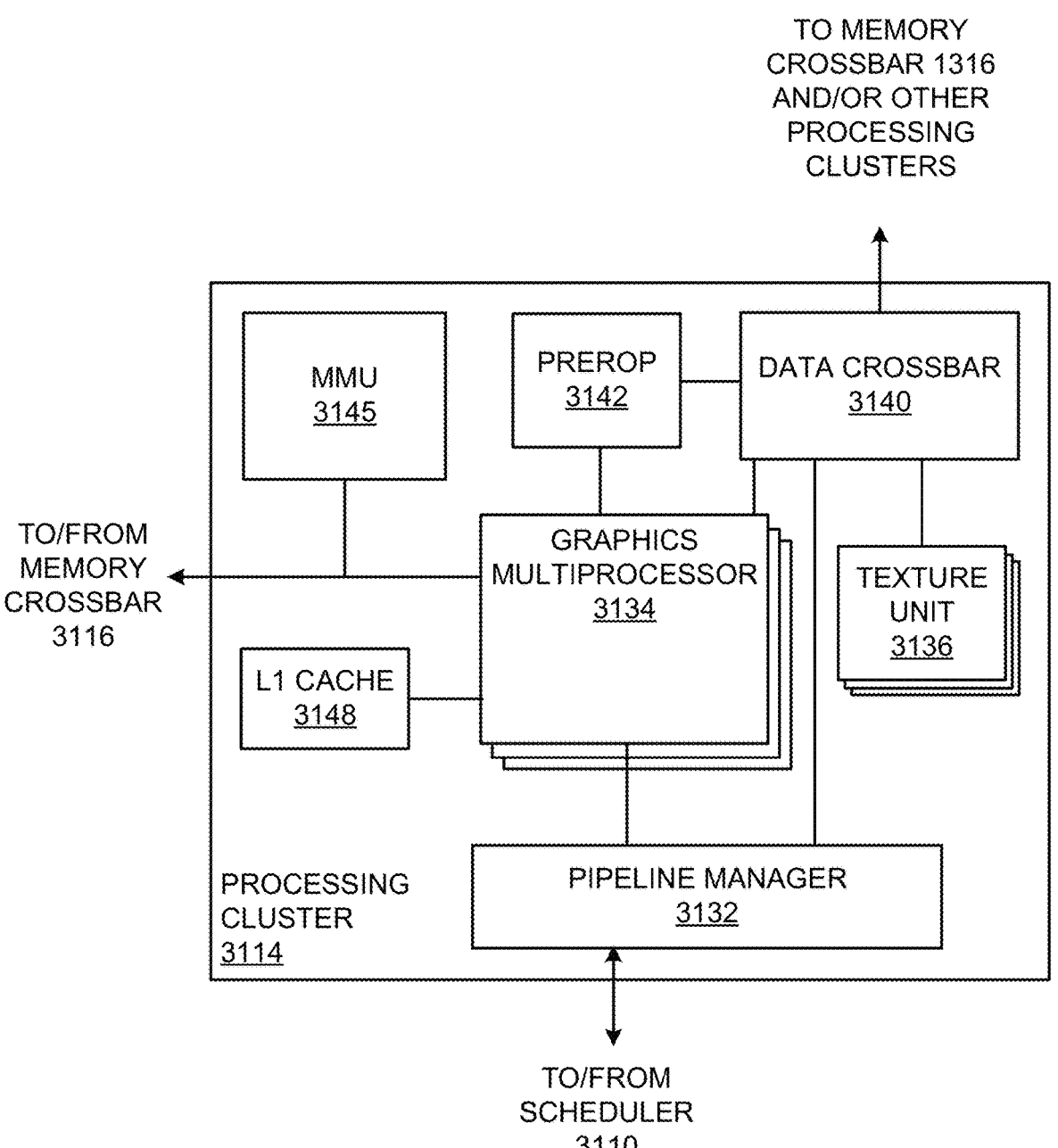
FIG. 31C illustrates a processing cluster, according to at least one embodiment.

FIG. 31C is a block diagram of a processing cluster 3114 within a parallel processing unit according to at least one embodiment. In at least one embodiment, a processing cluster is an instance of one of processing clusters 3114A-3114N of FIG. 31. In at least one embodiment, processing cluster 3114 can be configured to execute many threads in parallel, where term "thread" refers to an instance of a particular program executing on a particular set of input data. In at least one embodiment, single-instruction, multiple-data (SIMD) instruction issue techniques are used to support parallel execution of a large number of threads without providing multiple independent instruction units. In at least one embodiment, single-instruction, multiple-thread (SIMT) techniques are used to support parallel execution of a large number of generally synchronized threads, using a common instruction unit configured to issue instructions to a set of processing engines within each one of processing clusters.

In at least one embodiment, operation of processing cluster 3114 can be controlled via a pipeline manager 3132 that distributes processing tasks to SIMT parallel processors. In at least one embodiment, pipeline manager 3132 receives instructions from scheduler 3110 of FIG. 31 and manages execution of those instructions via a graphics multiprocessor 3134 and/or a texture unit 3136. In at least one embodiment, graphics multiprocessor 3134 is an exemplary instance of a SIMT parallel processor. However, in at least one embodiment, various types of SIMT parallel processors of differing architectures may be included within processing cluster 3114. In at least one embodiment, one or more instances of graphics multiprocessor 3134 can be included within a processing cluster 3114. In at least one embodiment, graphics multiprocessor 3134 can process data and a data crossbar 3140 can be used to distribute processed data to one of multiple possible destinations, including other shader units. In at least one embodiment, pipeline manager 3132 can facilitate distribution of processed data by specifying destinations for processed data to be distributed via data crossbar 3140.

In at least one embodiment, each graphics multiprocessor 3134 within processing cluster 3114 can include an identical set of functional execution logic (e.g., arithmetic logic units, load-store units, etc.). In at least one embodiment, functional execution logic can be configured in a pipelined manner in which new instructions can be issued before previous instructions are complete. In at least one embodiment, functional execution logic supports a variety of operations including integer and floating point arithmetic, comparison operations, Boolean operations, bit-shifting, and computation of various algebraic functions. In at least one embodiment, same functional-unit hardware can be leveraged to perform different operations and any combination of functional units may be present.

In at least one embodiment, instructions transmitted to processing cluster 3114 constitute a thread. In at least one embodiment, a set of threads executing across a set of parallel processing engines is a thread group. In at least one embodiment, thread group executes a program on different input data. In at least one embodiment, each thread within a thread group can be assigned to a different processing engine within a graphics multiprocessor 3134. In at least one embodiment, a thread group may include fewer threads than a number of processing engines within graphics multiprocessor 3134. In at least one embodiment, when a thread group includes fewer threads than a number of processing engines, one or more of processing engines may be idle during cycles in which that thread group is being processed. In at least one embodiment, a thread group may also include more threads than a number of processing engines within graphics multiprocessor 3134. In at least one embodiment, when a thread group includes more threads than number of processing engines within graphics multiprocessor 3134, processing can be performed over consecutive clock cycles. In at least one embodiment, multiple thread groups can be executed concurrently on a graphics multiprocessor 3134.

In at least one embodiment, graphics multiprocessor 3134 includes an internal cache memory to perform load and store operations. In at least one embodiment, graphics multiprocessor 3134 can forego an internal cache and use a cache memory (e.g., L1 cache 3148) within processing cluster 3114. In at least one embodiment, each graphics multiprocessor 3134 also has access to L2 caches within partition units (e.g., partition units 3120A-3120N of FIG. 31) that are shared among all processing clusters 3114 and may be used to transfer data between threads. In at least one embodiment, graphics multiprocessor 3134 may also access off-chip global memory, which can include one or more of local parallel processor memory and/or system memory. In at least one embodiment, any memory external to parallel processing unit 3102 may be used as global memory. In at least one embodiment, processing cluster 3114 includes multiple instances of graphics multiprocessor 3134 can share common instructions and data, which may be stored in L1 cache 3148.

In at least one embodiment, each processing cluster 3114 may include an MMU 3145 (memory management unit) that is configured to map virtual addresses into physical addresses. In at least one embodiment, one or more instances of MMU 3145 may reside within memory interface 3118 of FIG. 31. In at least one embodiment, MMU 3145 includes a set of page table entries (PTEs) used to map a virtual address to a physical address of a tile and optionally a cache line index. In at least one embodiment, MMU 3145 may include address translation lookaside buffers (TLB) or caches that may reside within graphics multiprocessor 3134 or L1 cache or processing cluster 3114. In at least one embodiment, physical address is processed to distribute surface data access locality to allow efficient request interleaving among partition units. In at least one embodiment, cache line index may be used to determine whether a request for a cache line is a hit or miss.

In at least one embodiment, a processing cluster 3114 may be configured such that each graphics multiprocessor 3134 is coupled to a texture unit 3136 for performing texture mapping operations, e.g., determining texture sample positions, reading texture data, and filtering texture data. In at least one embodiment, texture data is read from an internal texture L1 cache (not shown) or from an L1 cache within graphics multiprocessor 3134 and is fetched from an L2 cache, local parallel processor memory, or system memory, as needed. In at least one embodiment, each graphics multiprocessor 3134 outputs processed tasks to data crossbar 3140 to provide processed task to another processing cluster 3114 for further processing or to store processed task in an L2 cache, local parallel processor memory, or system memory via memory crossbar 3116. In at least one embodiment, preROP 3142 (pre-raster operations unit) is configured to receive data from graphics multiprocessor 3134, direct data to ROP units, which may be located with partition units as described herein (e.g., partition units 3120A-3120N of FIG. 31). In at least one embodiment, PreROP 3142 unit can perform optimizations for color blending, organize pixel color data, and perform address translations.

In at least one embodiment, processors or processor components in FIG. 31 can be integrated into or included in computing environment 100 (FIG. 1) and computing environment 200 (FIG. 2). In at least one embodiment, processors or processor components in FIG. 31 can include or communicate with controller 205 illustrated in FIG. 3. In at least one embodiment, processors or processor components in FIG. 31 can perform processes 400 and 500 (FIGS. 4 and 5). In at least one embodiment, processors or processor components in FIG. 31 can call or perform part or all of APIs disclosed in FIGS. 6-17. In at least one embodiment, processors or processor components in FIG. 31 can perform examples in FIGS. 18 and 19.

Figure 31D:
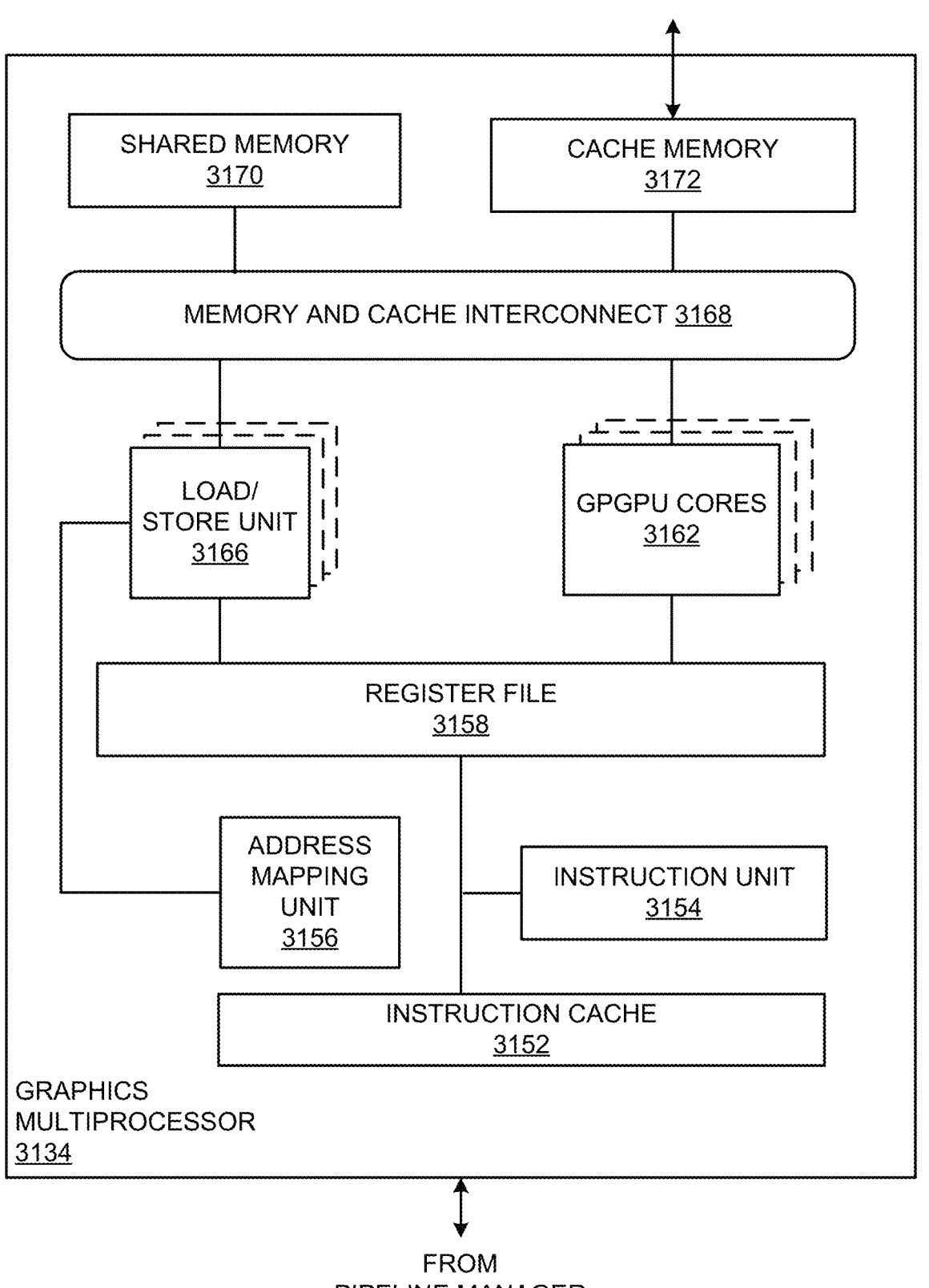
FIG. 31D illustrates a graphics multiprocessor, according to at least one embodiment.

FIG. 31D shows a graphics multiprocessor 3134 according to at least one embodiment. In at least one embodiment, graphics multiprocessor 3134 couples with pipeline manager 3132 of processing cluster 3114. In at least one embodiment, graphics multiprocessor 3134 has an execution pipeline including but not limited to an instruction cache 3152, an instruction unit 3154, an address mapping unit 3156, a register file 3158, one or more general purpose graphics processing unit (GPGPU) cores 3162, and one or more load/store units 3166. GPGPU cores 3162 and load/store units 3166 are coupled with cache memory 3172 and shared memory 3170 via a memory and cache interconnect 3168.

In at least one embodiment, instruction cache 3152 receives a stream of instructions to execute from pipeline manager 3132. In at least one embodiment, instructions are cached in instruction cache 3152 and dispatched for execution by instruction unit 3154. In at least one embodiment, instruction unit 3154 can dispatch instructions as thread groups (e.g., warps), with each thread of thread group assigned to a different execution unit within GPGPU core 3162. In at least one embodiment, an instruction can access any of a local, shared, or global address space by specifying an address within a unified address space. In at least one embodiment, address mapping unit 3156 can be used to translate addresses in a unified address space into a distinct memory address that can be accessed by load/store units 3166.

In at least one embodiment, register file 3158 provides a set of registers for functional units of graphics multiprocessor 3134. In at least one embodiment, register file 3158 provides temporary storage for operands connected to data paths of functional units (e.g., GPGPU cores 3162, load/store units 3166) of graphics multiprocessor 3134. In at least one embodiment, register file 3158 is divided between each of functional units such that each functional unit is allocated a dedicated portion of register file 3158. In at least one embodiment, register file 3158 is divided between different warps being executed by graphics multiprocessor 3134.

In at least one embodiment, GPGPU cores 3162 can each include floating point units (FPUs) and/or integer arithmetic logic units (ALUs) that are used to execute instructions of graphics multiprocessor 3134. GPGPU cores 3162 can be similar in architecture or can differ in architecture. In at least one embodiment, a first portion of GPGPU cores 3162 include a single precision FPU and an integer ALU while a second portion of GPGPU cores include a double precision FPU. In at least one embodiment, FPUs can implement IEEE 754-2008 standard for floating point arithmetic or enable variable precision floating point arithmetic. In at least one embodiment, graphics multiprocessor 3134 can additionally include one or more fixed function or special function units to perform specific functions such as copy rectangle or pixel blending operations. In at least one embodiment one or more of GPGPU cores can also include fixed or special function logic.

In at least one embodiment, GPGPU cores 3162 include SIMD logic capable of performing a single instruction on multiple sets of data. In at least one embodiment GPGPU cores 3162 can physically execute SIMD4, SIMD8, and SIMD16 instructions and logically execute SIMD1, SIMD2, and SIMD32 instructions. In at least one embodiment, SIMD instructions for GPGPU cores can be generated at compile time by a shader compiler or automatically generated when executing programs written and compiled for single program multiple data (SPMD) or SIMT architectures. In at least one embodiment, multiple threads of a program configured for an SIMT execution model can executed via a single SIMD instruction. For example, in at least one embodiment, eight SIMT threads that perform same or similar operations can be executed in parallel via a single SIMD8 logic unit.

In at least one embodiment, memory and cache interconnect 3168 is an interconnect network that connects each functional unit of graphics multiprocessor 3134 to register file 3158 and to shared memory 3170. In at least one embodiment, memory and cache interconnect 3168 is a crossbar interconnect that allows load/store unit 3166 to implement load and store operations between shared memory 3170 and register file 3158. In at least one embodiment, register file 3158 can operate at a same frequency as GPGPU cores 3162, thus data transfer between GPGPU cores 3162 and register file 3158 is very low latency. In at least one embodiment, shared memory 3170 can be used to enable communication between threads that execute on functional units within graphics multiprocessor 3134. In at least one embodiment, cache memory 3172 can be used as a data cache for example, to cache texture data communicated between functional units and texture unit 3136. In at least one embodiment, shared memory 3170 can also be used as a program managed cached. In at least one embodiment, threads executing on GPGPU cores 3162 can programmatically store data within shared memory in addition to automatically cached data that is stored within cache memory 3172.

In at least one embodiment, a parallel processor or GPGPU as described herein is communicatively coupled to host/processor cores to accelerate graphics operations, machine-learning operations, pattern analysis operations, and various general purpose GPU (GPGPU) functions. In at least one embodiment, GPU may be communicatively coupled to host processor/cores over a bus or other interconnect (e.g., a high-speed interconnect such as PCIe or NVLink). In at least one embodiment, GPU may be integrated on same package or chip as cores and communicatively coupled to cores over an internal processor bus/interconnect (i.e., internal to package or chip). In at least one embodiment, regardless of manner in which GPU is connected, processor cores may allocate work to GPU in form of sequences of commands/instructions contained in a work descriptor. In at least one embodiment, GPU then uses dedicated circuitry/logic for efficiently processing these commands/instructions.

Figure 32:
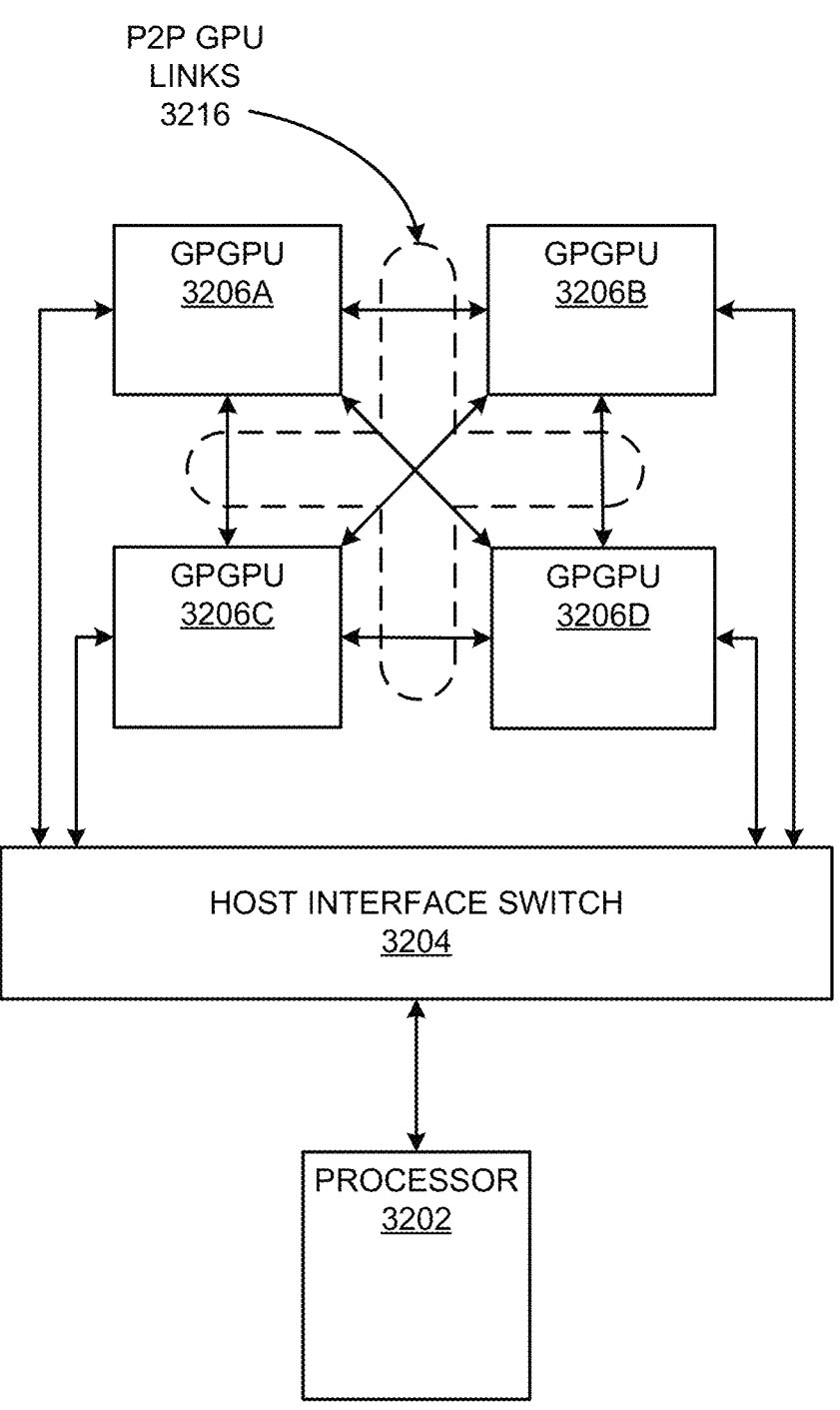
FIG. 32 illustrates a multi-graphics processing unit (GPU) system, according to at least one embodiment.

FIG. 32 illustrates a multi-GPU computing system 3200, according to at least one embodiment. In at least one embodiment, multi-GPU computing system 3200 can include a processor 3202 coupled to multiple general purpose graphics processing units (GPGPUs) 3206A-D via a host interface switch 3204. In at least one embodiment, host interface switch 3204 is a PCI express switch device that couples processor 3202 to a PCI express bus over which processor 3202 can communicate with GPGPUs 3206A-D. GPGPUs 3206A-D can interconnect via a set of high-speed point to point GPU to GPU links 3216. In at least one embodiment, GPU to GPU links 3216 connect to each of GPGPUs 3206A-D via a dedicated GPU link. In at least one embodiment, P2P GPU links 3216 enable direct communication between each of GPGPUs 3206A-D without requiring communication over host interface bus 3204 to which processor 3202 is connected. In at least one embodiment, with GPU-to-GPU traffic directed to P2P GPU links 3216, host interface bus 3204 remains available for system memory access or to communicate with other instances of multi-GPU computing system 3200, for example, via one or more network devices. While in at least one embodiment GPGPUs 3206A-D connect to processor 3202 via host interface switch 3204, in at least one embodiment processor 3202 includes direct support for P2P GPU links 3216 and can connect directly to GPGPUs 3206A-D.

In at least one embodiment, processors or processor components in FIG. 32 can be integrated into or included in computing environment 100 (FIG. 1) and computing environment 200 (FIG. 2). In at least one embodiment, processors or processor components in FIG. 32 can include or communicate with controller 205 illustrated in FIG. 3. In at least one embodiment, processors or processor components in FIG. 31 can perform processes 400 and 500 (FIGS. 4 and 5). In at least one embodiment, processors or processor components in FIG. 32 can call or perform part or all of APIs disclosed in FIGS. 6-17. In at least one embodiment, processors or processor components in FIG. 32 can perform examples in FIGS. 18 and 19.

Figure 33:
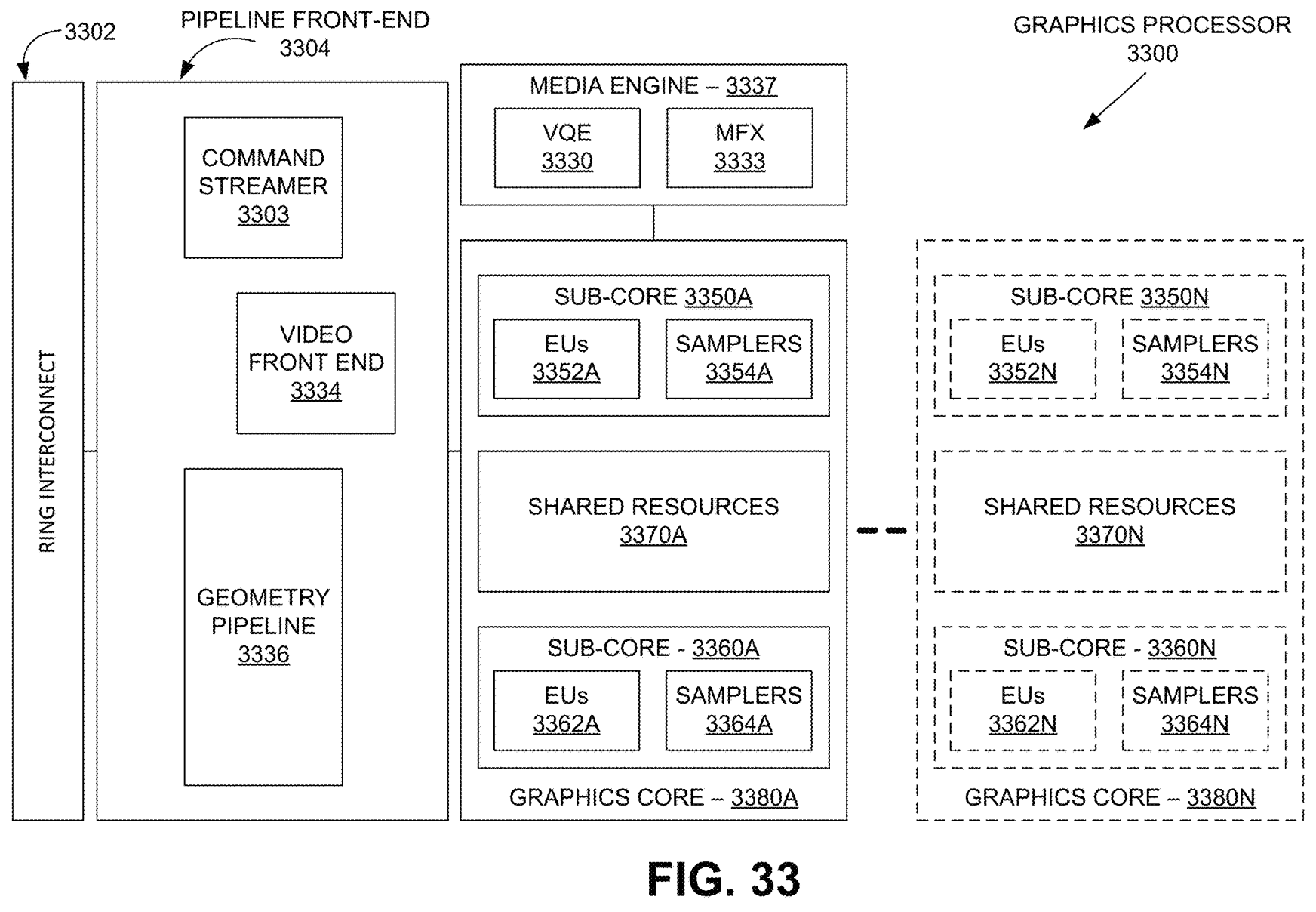

FIG. 33 is a block diagram of a graphics processor 3300, according to at least one embodiment. In at least one embodiment, graphics processor 3300 includes a ring interconnect 3302, a pipeline front-end 3304, a media engine 3337, and graphics cores 3380A-3380N. In at least one embodiment, ring interconnect 3302 couples graphics processor 3300 to other processing units, including other graphics processors or one or more general-purpose processor cores. In at least one embodiment, graphics processor 3300 is one of many processors integrated within a multi-core processing system.

In at least one embodiment, graphics processor 3300 receives batches of commands via ring interconnect 3302. In at least one embodiment, incoming commands are interpreted by a command streamer 3303 in pipeline front-end 3304. In at least one embodiment, graphics processor 3300 includes scalable execution logic to perform 3D geometry processing and media processing via graphics core(s) 3380A-3380N. In at least one embodiment, for 3D geometry processing commands, command streamer 3303 supplies commands to geometry pipeline 3336. In at least one embodiment, for at least some media processing commands, command streamer 3303 supplies commands to a video front end 3334, which couples with a media engine 3337. In at least one embodiment, media engine 3337 includes a Video Quality Engine (VQE) 3330 for video and image post-processing and a multi-format encode/decode (MFX) 3333 engine to provide hardware-accelerated media data encode and decode. In at least one embodiment, geometry pipeline 3336 and media engine 3337 each generate execution threads for thread execution resources provided by at least one graphics core 3380A.

In at least one embodiment, graphics processor 3300 includes scalable thread execution resources featuring modular cores 3380A-3380N (sometimes referred to as core slices), each having multiple sub-cores 3350A-550N, 3360A-3360N (sometimes referred to as core sub-slices). In at least one embodiment, graphics processor 3300 can have any number of graphics cores 3380A through 3380N. In at least one embodiment, graphics processor 3300 includes a graphics core 3380A having at least a first sub-core 3350A and a second sub-core 3360A. In at least one embodiment, graphics processor 3300 is a low power processor with a single sub-core (e.g., 3350A). In at least one embodiment, graphics processor 3300 includes multiple graphics cores 3380A-3380N, each including a set of first sub-cores 3350A-3350N and a set of second sub-cores 3360A-3360N. In at least one embodiment, each sub-core in first sub-cores 3350A-3350N includes at least a first set of execution units 3352A-3352N and media/texture samplers 3354A-3354N. In at least one embodiment, each sub-core in second sub-cores 3360A-3360N includes at least a second set of execution units 3362A-3362N and samplers 3364A-3364N. In at least one embodiment, each sub-core 3350A-3350N, 3360A-3360N shares a set of shared resources 3370A-3370N. In at least one embodiment, shared resources include shared cache memory and pixel operation logic.

In at least one embodiment, processors or processor components in FIG. 33 can be integrated into or included in computing environment 100 (FIG. 1) and computing environment 200 (FIG. 2). In at least one embodiment, processors or processor components in FIG. 33 can include or communicate with controller 205 illustrated in FIG. 3. In at least one embodiment, processors or processor components in FIG. 33 can perform processes 400 and 500 (FIGS. 4 and 5). In at least one embodiment, processors or processor components in FIG. 33 can call or perform part or all of APIs disclosed in FIGS. 6-17. In at least one embodiment, processors or processor components in FIG. 33 can perform examples in FIGS. 18 and 19.

Figure 34:
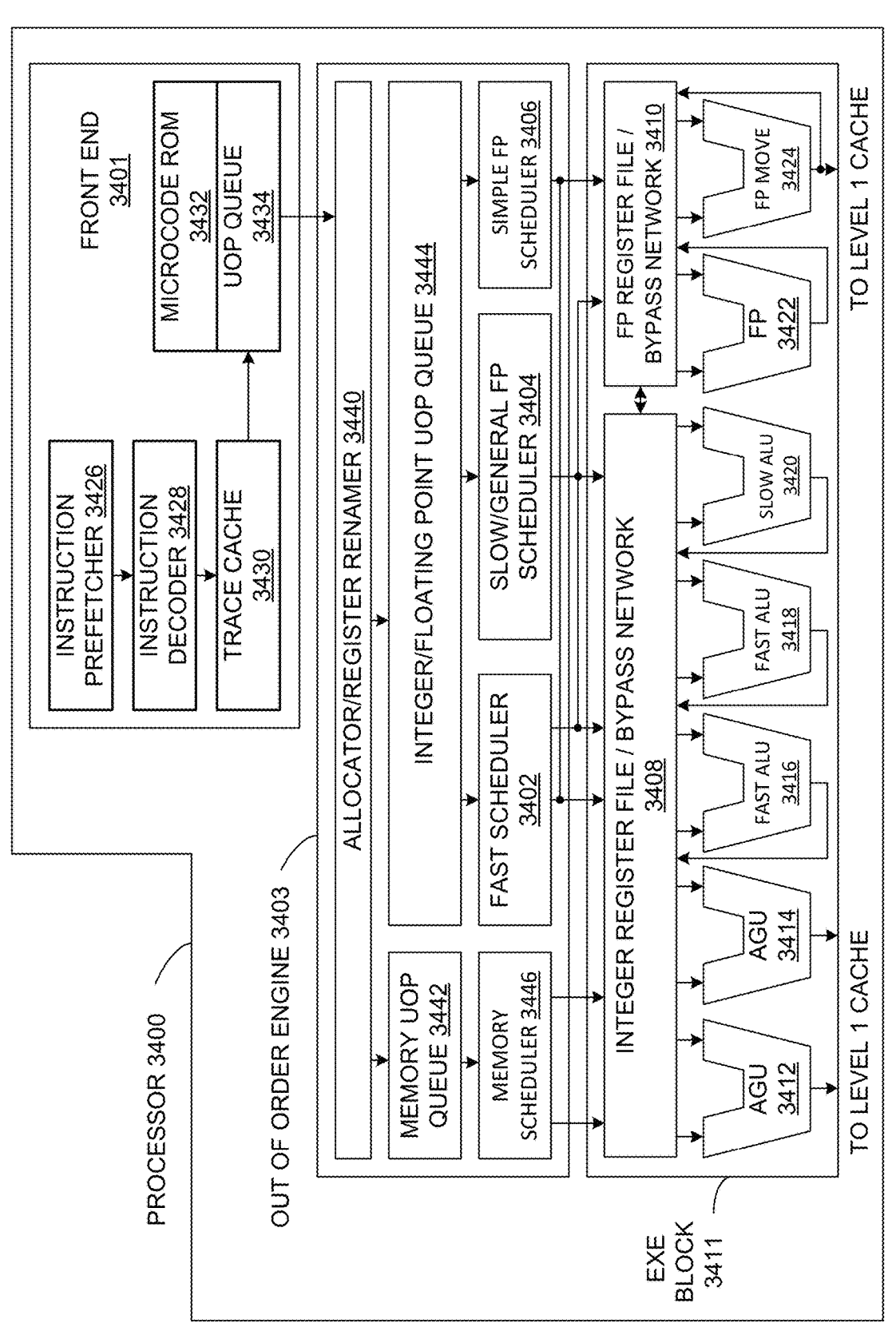
FIG. 34 is a block diagram illustrating a processor microarchitecture for a processor, according to at least one embodiment.

FIG. 34 is a block diagram illustrating micro-architecture for a processor 3400 that may include logic circuits to perform instructions, according to at least one embodiment. In at least one embodiment, processor 3400 may perform instructions, including x86 instructions, ARM instructions, specialized instructions for application-specific integrated circuits (ASICs), etc. In at least one embodiment, processor 3410 may include registers to store packed data, such as 64-bit wide MMX™ registers in microprocessors enabled with MMX technology from Intel Corporation of Santa Clara, Calif In at least one embodiment, MMX registers, available in both integer and floating point forms, may operate with packed data elements that accompany single instruction, multiple data ("SIMD") and streaming SIMD extensions ("SSE") instructions. In at least one embodiment, 128-bit wide XMM registers relating to SSE2, SSE3, SSE4, AVX, or beyond (referred to generically as "SSEx") technology may hold such packed data operands. In at least one embodiment, processors 3410 may perform instructions to accelerate machine learning or deep learning algorithms, training, or inferencing.

In at least one embodiment, processor 3400 includes an in-order front end ("front end") 3401 to fetch instructions to be executed and prepare instructions to be used later in processor pipeline. In at least one embodiment, front end 3401 may include several units. In at least one embodiment, an instruction prefetcher 3426 fetches instructions from memory and feeds instructions to an instruction decoder 3428 which in turn decodes or interprets instructions. For example, in at least one embodiment, instruction decoder 3428 decodes a received instruction into one or more operations called "micro-instructions" or "micro-operations" (also called "micro ops" or "uops") that machine may execute. In at least one embodiment, instruction decoder 3428 parses instruction into an opcode and corresponding data and control fields that may be used by micro-architecture to perform operations in accordance with at least one embodiment. In at least one embodiment, a trace cache 3430 may assemble decoded uops into program ordered sequences or traces in a uop queue 3434 for execution. In at least one embodiment, when trace cache 3430 encounters a complex instruction, a microcode ROM 3432 provides uops needed to complete operation.

In at least one embodiment, some instructions may be converted into a single micro-op, whereas others need several micro-ops to complete full operation. In at least one embodiment, if more than four micro-ops are needed to complete an instruction, instruction decoder 3428 may access microcode ROM 3432 to perform instruction. In at least one embodiment, an instruction may be decoded into a small number of micro-ops for processing at instruction decoder 3428. In at least one embodiment, an instruction may be stored within microcode ROM 3432 should a number of micro-ops be needed to accomplish operation. In at least one embodiment, trace cache 3430 refers to an entry point programmable logic array ("PLA") to determine a correct micro-instruction pointer for reading microcode sequences to complete one or more instructions from microcode ROM 3432 in accordance with at least one embodiment. In at least one embodiment, after microcode ROM 3432 finishes sequencing micro-ops for an instruction, front end 3401 of machine may resume fetching micro-ops from trace cache 3430.

In at least one embodiment, out-of-order execution engine ("out of order engine") 3403 may prepare instructions for execution. In at least one embodiment, out-of-order execution logic has a number of buffers to smooth out and re-order flow of instructions to optimize performance as they go down pipeline and get scheduled for execution. Out-of-order execution engine 3403 includes, without limitation, an allocator/register renamer 3440, a memory uop queue 3442, an integer/floating point uop queue 3444, a memory scheduler 3446, a fast scheduler 3402, a slow/general floating point scheduler ("slow/general FP scheduler") 3404, and a simple floating point scheduler ("simple FP scheduler") 3406. In at least one embodiment, fast schedule 3402, slow/general floating point scheduler 3404, and simple floating point scheduler 3406 are also collectively referred to herein as "uop schedulers 3402, 3404, 3406." In at least one embodiment, allocator/register renamer 3440 allocates machine buffers and resources that each uop needs in order to execute. In at least one embodiment, allocator/register renamer 3440 renames logic registers onto entries in a register file. In at least one embodiment, allocator/register renamer 3440 also allocates an entry for each uop in one of two uop queues, memory uop queue 3442 for memory operations and integer/floating point uop queue 3444 for non-memory operations, in front of memory scheduler 3446 and uop schedulers 3402, 3404, 3406. In at least one embodiment, uop schedulers 3402, 3404, 3406, determine when a uop is ready to execute based on readiness of their dependent input register operand sources and availability of execution resources uops need to complete their operation. In at least one embodiment, fast scheduler 3402 of at least one embodiment may schedule on each half of main clock cycle while slow/general floating point scheduler 3404 and simple floating point scheduler 3406 may schedule once per main processor clock cycle. In at least one embodiment, uop schedulers 3402, 3404, 3406 arbitrate for dispatch ports to schedule uops for execution.

In at least one embodiment, execution block b11 includes, without limitation, an integer register file/bypass network 3408, a floating point register file/bypass network ("FP register file/bypass network") 3410, address generation units ("AGUs") 3412 and 3414, fast Arithmetic Logic Units ("ALUs") ("fast ALUs") 3416 and 3418, a slow Arithmetic Logic Unit ("slow ALU") 3420, a floating point ALU ("FP")

3422, and a floating point move unit ("FP move") 3424. In at least one embodiment, integer register file/bypass network 3408 and floating point register file/bypass network 3410 are also referred to herein as "register files 3408, 3410." In at least one embodiment, AGUSs 3412 and 3414, fast ALUs 3416 and 3418, slow ALU 3420, floating point ALU 3422, and floating point move unit 3424 are also referred to herein as "execution units 3412, 3414, 3416, 3418, 3420, 3422, and 3424." In at least one embodiment, execution block b11 may include, without limitation, any number (including zero) and type of register files, bypass networks, address generation units, and execution units, in any combination.

In at least one embodiment, register files 3408, 3410 may be arranged between uop schedulers 3402, 3404, 3406, and execution units 3412, 3414, 3416, 3418, 3420, 3422, and 3424. In at least one embodiment, integer register file/bypass network 3408 performs integer operations. In at least one embodiment, floating point register file/bypass network 3410 performs floating point operations. In at least one embodiment, each of register files 3408, 3410 may include, without limitation, a bypass network that may bypass or forward just completed results that have not yet been written into register file to new dependent uops. In at least one embodiment, register files 3408, 3410 may communicate data with each other. In at least one embodiment, integer register file/bypass network 3408 may include, without limitation, two separate register files, one register file for low-order thirty-two bits of data and a second register file for high order thirty-two bits of data. In at least one embodiment, floating point register file/bypass network 3410 may include, without limitation, 128-bit wide entries because floating point instructions typically have operands from 64 to 128 bits in width.

In at least one embodiment, execution units 3412, 3414, 3416, 3418, 3420, 3422, 3424 may execute instructions. In at least one embodiment, register files 3408, 3410 store integer and floating point data operand values that micro-instructions need to execute. In at least one embodiment, processor 3400 may include, without limitation, any number and combination of execution units 3412, 3414, 3416, 3418, 3420, 3422, 3424. In at least one embodiment, floating point ALU 3422 and floating point move unit 3424, may execute floating point, MMX, SIMD, AVX and SSE, or other operations, including specialized machine learning instructions. In at least one embodiment, floating point ALU 3422 may include, without limitation, a 64-bit by 64-bit floating point divider to execute divide, square root, and remainder micro ops. In at least one embodiment, instructions involving a floating point value may be handled with floating point hardware. In at least one embodiment, ALU operations may be passed to fast ALUs 3416, 3418. In at least one embodiment, fast ALUS 3416, 3418 may execute fast operations with an effective latency of half a clock cycle. In at least one embodiment, most complex integer operations go to slow ALU 3420 as slow ALU 3420 may include, without limitation, integer execution hardware for long-latency type of operations, such as a multiplier, shifts, flag logic, and branch processing. In at least one embodiment, memory load/store operations may be executed by AGUS 3412, 3414. In at least one embodiment, fast ALU 3416, fast ALU 3418, and slow ALU 3420 may perform integer operations on 64-bit data operands. In at least one embodiment, fast ALU 3416, fast ALU 3418, and slow ALU 3420 may be implemented to support a variety of data bit sizes including sixteen, thirty-two, 128, 256, etc. In at least one embodiment, floating point ALU 3422 and floating point move unit 3424 may be implemented to support a range of operands having bits of various widths. In at least one embodiment, floating point ALU 3422 and floating point move unit 3424 may operate on 128-bit wide packed data operands in conjunction with SIMD and multimedia instructions.

In at least one embodiment, uop schedulers 3402, 3404, 3406, dispatch dependent operations before parent load has finished executing. In at least one embodiment, as uops may be speculatively scheduled and executed in processor 3400, processor 3400 may also include logic to handle memory misses. In at least one embodiment, if a data load misses in data cache, there may be dependent operations in flight in pipeline that have left scheduler with temporarily incorrect data. In at least one embodiment, a replay mechanism tracks and re-executes instructions that use incorrect data. In at least one embodiment, dependent operations might need to be replayed and independent ones may be allowed to complete. In at least one embodiment, schedulers and replay mechanism of at least one embodiment of a processor may also be designed to catch instruction sequences for text string comparison operations.

In at least one embodiment, term "registers" may refer to on-board processor storage locations that may be used as part of instructions to identify operands. In at least one embodiment, registers may be those that may be usable from outside of processor (from a programmer's perspective). In at least one embodiment, registers might not be limited to a particular type of circuit. Rather, in at least one embodiment, a register may store data, provide data, and perform functions described herein. In at least one embodiment, registers described herein may be implemented by circuitry within a processor using any number of different techniques, such as dedicated physical registers, dynamically allocated physical registers using register renaming, combinations of dedicated and dynamically allocated physical registers, etc. In at least one embodiment, integer registers store 32-bit integer data. A register file of at least one embodiment also contains eight multimedia SIMD registers for packed data.

In at least one embodiment, processors or processor components in FIG. 34 can be integrated into or included in computing environment 100 (FIG. 1) and computing environment 200 (FIG. 2). In at least one embodiment, processors or processor components in FIG. 34 can include or communicate with controller 205 illustrated in FIG. 3. In at least one embodiment, processors or processor components in FIG. 34 can perform processes 400 and 500 (FIGS. 4 and 5). In at least one embodiment, processors or processor components in FIG. 34 can call or perform part or all of APIs disclosed in FIGS. 6-17. In at least one embodiment, processors or processor components in FIG. 34 can perform examples in FIGS. 18 and 19.

Figure 35:
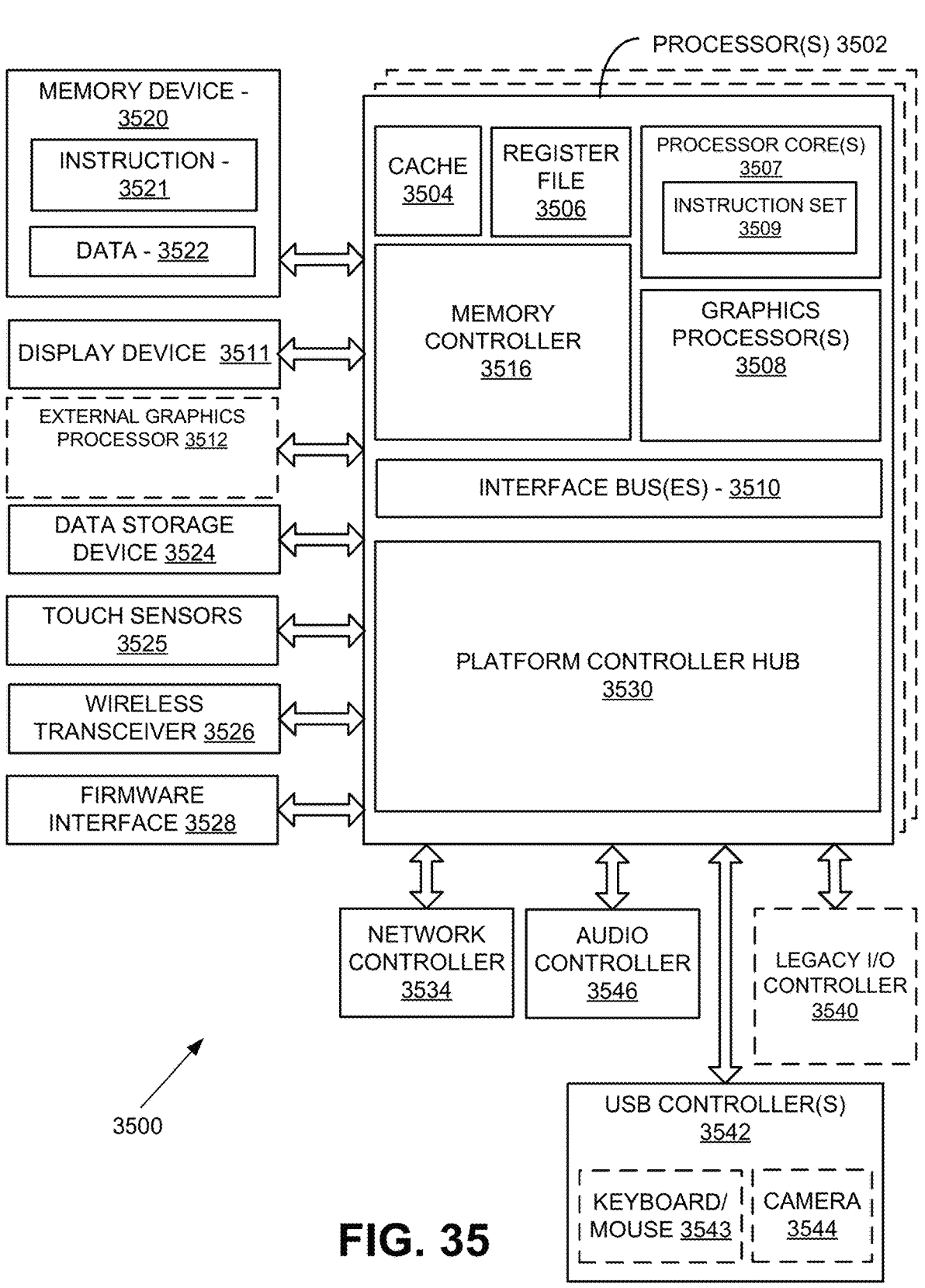
FIG. 35 illustrates at least portions of a graphics processor, according to one or more embodiments.

FIG. 35 is a block diagram of a processing system, according to at least one embodiment. In at least one embodiment, system 3500 includes one or more processors 3502 and one or more graphics processors 3508, and may be a single processor desktop system, a multiprocessor workstation system, or a server system having a large number of processors 3502 or processor cores 3507. In at least one embodiment, system 3500 is a processing platform incorporated within a system-on-a-chip (SoC) integrated circuit for use in mobile, handheld, or embedded devices.

In at least one embodiment, system 3500 can include, or be incorporated within a server-based gaming platform, a game console, including a game and media console, a mobile gaming console, a handheld game console, or an online game console. In at least one embodiment, system 3500 is a mobile phone, smart phone, tablet computing device or mobile Internet device. In at least one embodiment, processing system 3500 can also include, couple with, or be integrated within a wearable device, such as a smart watch wearable device, smart eyewear device, augmented reality device, or virtual reality device. In at least one embodiment, processing system 3500 is a television or set top box device having one or more processors 3502 and a graphical interface generated by one or more graphics processors 3508.

In at least one embodiment, one or more processors 3502 each include one or more processor cores 3507 to process instructions which, when executed, perform operations for system and user software. In at least one embodiment, each of one or more processor cores 3507 is configured to process a specific instruction set 3509. In at least one embodiment, instruction set 3509 may facilitate Complex Instruction Set Computing (CISC), Reduced Instruction Set Computing (RISC), or computing via a Very Long Instruction Word (VLIW). In at least one embodiment, processor cores 3507 may each process a different instruction set 3509, which may include instructions to facilitate emulation of other instruction sets. In at least one embodiment, processor core 3507 may also include other processing devices, such a Digital Signal Processor (DSP).

In at least one embodiment, processor 3502 includes cache memory 3504. In at least one embodiment, processor 3502 can have a single internal cache or multiple levels of internal cache. In at least one embodiment, cache memory is shared among various components of processor 3502. In at least one embodiment, processor 3502 also uses an external cache (e.g., a Level-3 (L3) cache or Last Level Cache (LLC)) (not shown), which may be shared among processor cores 3507 using known cache coherency techniques. In at least one embodiment, register file 3506 is additionally included in processor 3502 which may include different types of registers for storing different types of data (e.g., integer registers, floating point registers, status registers, and an instruction pointer register). In at least one embodiment, register file 3506 may include general-purpose registers or other registers.

In at least one embodiment, one or more processor(s) 3502 are coupled with one or more interface bus (es) 3510 to transmit communication signals such as address, data, or control signals between processor 3502 and other components in system 3500. In at least one embodiment interface bus 3510, in one embodiment, can be a processor bus, such as a version of a Direct Media Interface (DMI) bus. In at least one embodiment, interface 3510 is not limited to a DMI bus, and may include one or more Peripheral Component Interconnect buses (e.g., PCI, PCI Express), memory busses, or other types of interface busses. In at least one embodiment processor(s) 3502 include an integrated memory controller 3516 and a platform controller hub 3530. In at least one embodiment, memory controller 3516 facilitates communication between a memory device and other components of system 3500, while platform controller hub (PCH) 3530 provides connections to I/O devices via a local I/O bus.

In at least one embodiment, memory device 3520 can be a dynamic random access memory (DRAM) device, a static random access memory (SRAM) device, flash memory device, phase-change memory device, or some other memory device having suitable performance to serve as process memory. In at least one embodiment memory device 3520 can operate as system memory for system 3500, to store data 3522 and instructions 3521 for use when one or more processors 3502 executes an application or process. In at least one embodiment, memory controller 3516 also couples with an optional external graphics processor 3512, which may communicate with one or more graphics processors 3508 in processors 3502 to perform graphics and media operations. In at least one embodiment, a display device 3511 can connect to processor(s) 3502. In at least one embodiment display device 3511 can include one or more of an internal display device, as in a mobile electronic device or a laptop device or an external display device attached via a display interface (e.g., DisplayPort, etc.). In at least one embodiment, display device 3511 can include a head mounted display (HMD) such as a stereoscopic display device for use in virtual reality (VR) applications or augmented reality (AR) applications.

In at least one embodiment, platform controller hub 3530 enables peripherals to connect to memory device 3520 and processor 3502 via a high-speed I/O bus. In at least one embodiment, I/O peripherals include, but are not limited to, an audio controller 3546, a network controller 3534, a firmware interface 3528, a wireless transceiver 3526, touch sensors 3525, a data storage device 3524 (e.g., hard disk drive, flash memory, etc.). In at least one embodiment, data storage device 3524 can connect via a storage interface (e.g., SATA) or via a peripheral bus, such as a Peripheral Component Interconnect bus (e.g., PCI, PCI Express). In at least one embodiment, touch sensors 3525 can include touch screen sensors, pressure sensors, or fingerprint sensors. In at least one embodiment, wireless transceiver 3526 can be a Wi-Fi transceiver, a Bluetooth transceiver, or a mobile network transceiver such as a 3G, 4G, or Long Term Evolution (LTE) transceiver. In at least one embodiment, firmware interface 3528 enables communication with system firmware, and can be, for example, a unified extensible firmware interface (UEFI). In at least one embodiment, network controller 3534 can enable a network connection to a wired network. In at least one embodiment, a high-performance network controller (not shown) couples with interface bus 3510. In at least one embodiment, audio controller 3546 is a multi-channel high definition audio controller. In at least one embodiment, system 3500 includes an optional legacy I/O controller 3540 for coupling legacy (e.g., Personal System 2 (PS/2)) devices to system. In at least one embodiment, platform controller hub 3530 can also connect to one or more Universal Serial Bus (USB) controllers 3542 connect input devices, such as keyboard and mouse 3543 combinations, a camera 3544, or other USB input devices.

In at least one embodiment, an instance of memory controller 3516 and platform controller hub 3530 may be integrated into a discreet external graphics processor, such as external graphics processor 3512. In at least one embodiment, platform controller hub 3530 and/or memory controller 3516 may be external to one or more processor(s) 3502. For example, in at least one embodiment, system 3500 can include an external memory controller 3516 and platform controller hub 3530, which may be configured as a memory controller hub and peripheral controller hub within a system chipset that is in communication with processor(s) 3502.

In at least one embodiment, processors or processor components in FIG. 35 can be integrated into or included in computing environment 100 (FIG. 1) and computing environment 200 (FIG. 2). In at least one embodiment, processors or processor components in FIG. 35 can include or communicate with controller 205 illustrated in FIG. 3. In at least one embodiment, processors or processor components in FIG. 35 can perform processes 400 and 500 (FIGS. 4 and 5). In at least one embodiment, processors or processor components in FIG. 35 can call or perform part or all of APIs disclosed in FIGS. 6-17. In at least one embodiment, processors or processor components in FIG. 35 can perform examples in FIGS. 18 and 19.

Figure 36:
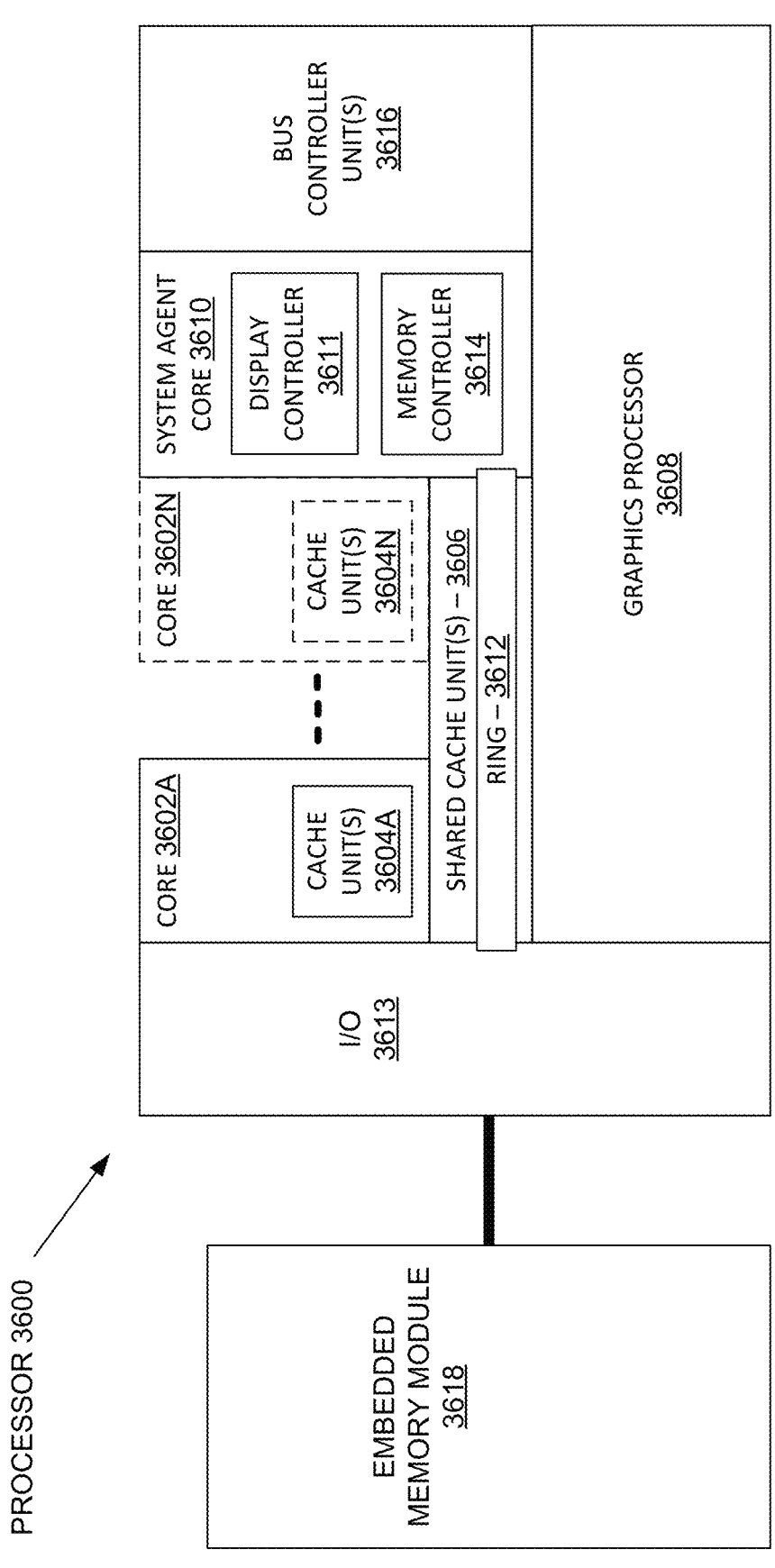
FIG. 36 illustrates at least portions of a graphics processor, according to one or more embodiments.

FIG. 36 is a block diagram of a processor 3600 having one or more processor cores 3602A-3602N, an integrated memory controller 3614, and an integrated graphics processor 3608, according to at least one embodiment. In at least one embodiment, processor 3600 can include additional cores up to and including additional core 3602N represented by dashed lined boxes. In at least one embodiment, each of processor cores 3602A-3602N includes one or more internal cache units 3604A-3604N. In at least one embodiment, each processor core also has access to one or more shared cached units 3606.

In at least one embodiment, internal cache units 3604A-3604N and shared cache units 3606 represent a cache memory hierarchy within processor 3600. In at least one embodiment, cache memory units 3604A-3604N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 3606 and 3604A-3604N.

In at least one embodiment, processor 3600 may also include a set of one or more bus controller units 3616 and a system agent core 3610. In at least one embodiment, one or more bus controller units 3616 manage a set of peripheral buses, such as one or more PCI or PCI express busses. In at least one embodiment, system agent core 3610 provides management functionality for various processor components. In at least one embodiment, system agent core 3610 includes one or more integrated memory controllers 3614 to manage access to various external memory devices (not shown).

In at least one embodiment, one or more of processor cores 3602A-3602N include support for simultaneous multi-threading. In at least one embodiment, system agent core 3610 includes components for coordinating and operating cores 3602A-3602N during multi-threaded processing. In at least one embodiment, system agent core 3610 may additionally include a power control unit (PCU), which includes logic and components to regulate one or more power states of processor cores 3602A-3602N and graphics processor 3608.

In at least one embodiment, processor 3600 additionally includes graphics processor 3608 to execute graphics processing operations. In at least one embodiment, graphics processor 3608 couples with shared cache units 3606, and system agent core 3610, including one or more integrated memory controllers 3614. In at least one embodiment, system agent core 3610 also includes a display controller 3611 to drive graphics processor output to one or more coupled displays. In at least one embodiment, display controller 3611 may also be a separate module coupled with graphics processor 3608 via at least one interconnect, or may be integrated within graphics processor 3608.

In at least one embodiment, a ring based interconnect unit 3612 is used to couple internal components of processor 3600. In at least one embodiment, an alternative interconnect unit may be used, such as a point-to-point interconnect, a switched interconnect, or other techniques. In at least one embodiment, graphics processor 3608 couples with ring interconnect 3612 via an I/O link 3613.

In at least one embodiment, I/O link 3613 represents at least one of multiple varieties of I/O interconnects, including an on package I/O interconnect which facilitates communication between various processor components and a high-performance embedded memory module 3618, such as an eDRAM module. In at least one embodiment, each of processor cores 3602A-3602N and graphics processor 3608 use embedded memory modules 3618 as a shared Last Level Cache.

In at least one embodiment, processor cores 3602A-3602N are homogenous cores executing a common instruction set architecture. In at least one embodiment, processor cores 3602A-3602N are heterogeneous in terms of instruction set architecture (ISA), where one or more of processor cores 3602A-3602N execute a common instruction set, while one or more other cores of processor cores 3602A-36-02N executes a subset of a common instruction set or a different instruction set. In at least one embodiment, processor cores 3602A-3602N are heterogeneous in terms of microarchitecture, where one or more cores having a relatively higher power consumption couple with one or more power cores having a lower power consumption. In at least one embodiment, processor 3600 can be implemented on one or more chips or as an SoC integrated circuit.

In at least one embodiment, processors or processor components in FIG. 36 can be integrated into or included in computing environment 100 (FIG. 1) and computing environment 200 (FIG. 2). In at least one embodiment, processors or processor components in FIG. 36 can include or communicate with controller 205 illustrated in FIG. 3. In at least one embodiment, processors or processor components in FIG. 36 can perform processes 400 and 500 (FIGS. 4 and 5). In at least one embodiment, processors or processor components in FIG. 36 can call or perform part or all of APIs disclosed in FIGS. 6-17. In at least one embodiment, processors or processor components in FIG. 36 can perform examples in FIGS. 18 and 19.

Figure 37:
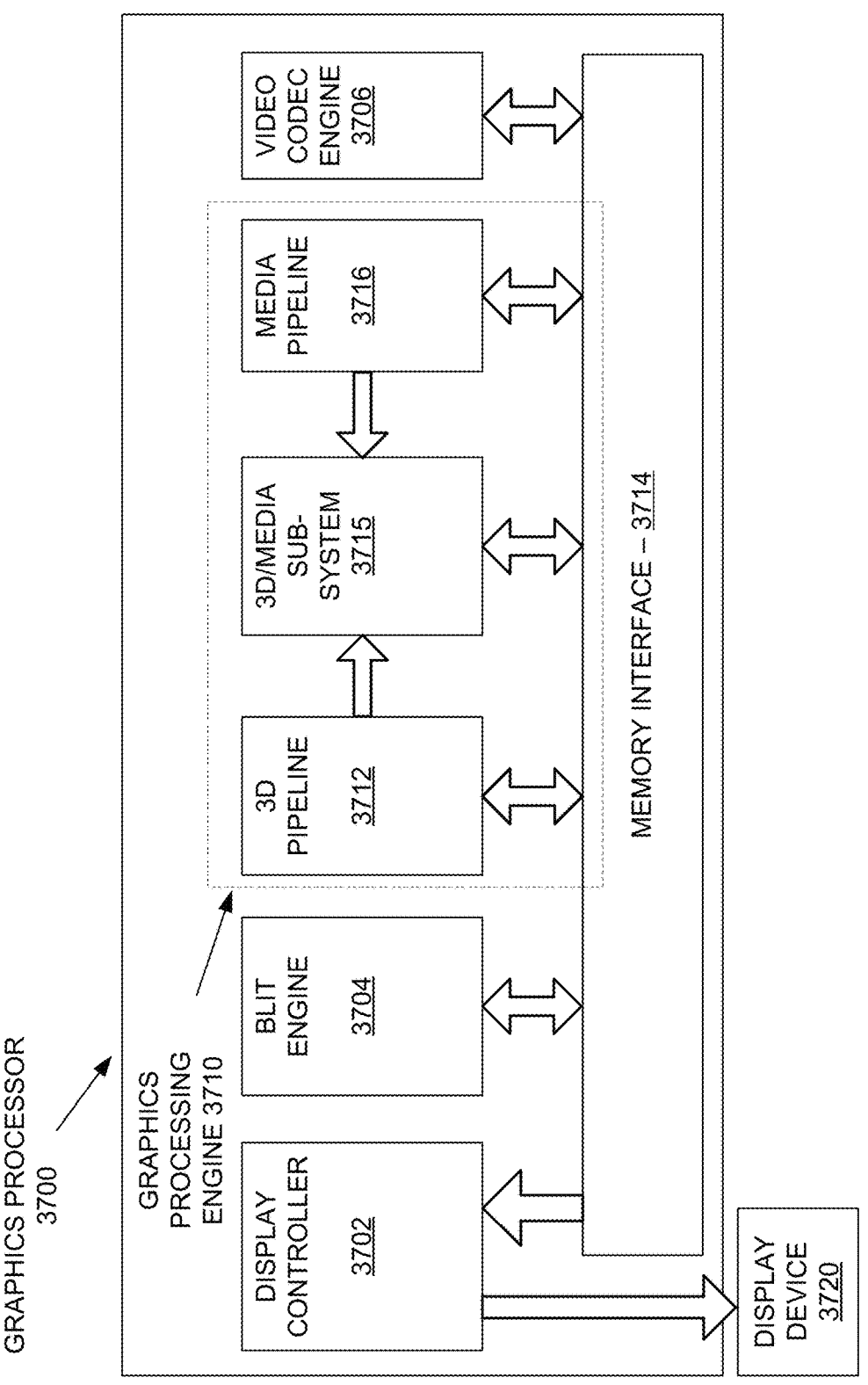
FIG. 37 illustrates at least portions of a graphics processor, according to one or more embodiments.

FIG. 37 is a block diagram of a graphics processor 3700, which may be a discrete graphics processing unit, or may be a graphics processor integrated with a plurality of processing cores. In at least one embodiment, graphics processor 3700 communicates via a memory mapped I/O interface to registers on graphics processor 3700 and with commands placed into memory. In at least one embodiment, graphics processor 3700 includes a memory interface 3714 to access memory. In at least one embodiment, memory interface 3714 is an interface to local memory, one or more internal caches, one or more shared external caches, and/or to system memory.

In at least one embodiment, graphics processor 3700 also includes a display controller 3702 to drive display output data to a display device 3720. In at least one embodiment, display controller 3702 includes hardware for one or more overlay planes for display device 3720 and composition of multiple layers of video or user interface elements. In at least one embodiment, display device 3720 can be an internal or external display device. In at least one embodiment, display device 3720 is a head mounted display device, such as a virtual reality (VR) display device or an augmented reality (AR) display device. In at least one embodiment, graphics processor 3700 includes a video codec engine 3706 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In at least one embodiment, graphics processor 3700 includes a block image transfer (BLIT) engine 3704 to perform two-dimensional (2D) rasterizer operations including, for example, bit-boundary block transfers. However, in at least one embodiment, 2D graphics operations are performed using one or more components of graphics processing engine (GPE) 3710. In at least one embodiment, GPE 3710 is a compute engine for performing graphics operations, including three-dimensional (3D) graphics operations and media operations.

In at least one embodiment, GPE 3710 includes a 3D pipeline 3712 for performing 3D operations, such as rendering three-dimensional images and scenes using processing functions that act upon 3D primitive shapes (e.g., rectangle, triangle, etc.). 3D pipeline 3712 includes programmable and fixed function elements that perform various tasks and/or spawn execution threads to a 3D/Media subsystem 3715. While 3D pipeline 3712 can be used to perform media operations, in at least one embodiment, GPE 3710 also includes a media pipeline 3716 that is used to perform media operations, such as video post-processing and image enhancement.

In at least one embodiment, media pipeline 3716 includes fixed function or programmable logic units to perform one or more specialized media operations, such as video decode acceleration, video de-interlacing, and video encode acceleration in place of, or on behalf of video codec engine 3706. In at least one embodiment, media pipeline 3716 additionally includes a thread spawning unit to spawn threads for execution on 3D/Media sub-system 3715. In at least one embodiment, spawned threads perform computations for media operations on one or more graphics execution units included in 3D/Media sub-system 3715.

In at least one embodiment, 3D/Media subsystem 3715 includes logic for executing threads spawned by 3D pipeline 3712 and media pipeline 3716. In at least one embodiment, 3D pipeline 3712 and media pipeline 3716 send thread execution requests to 3D/Media subsystem 3715, which includes thread dispatch logic for arbitrating and dispatching various requests to available thread execution resources. In at least one embodiment, execution resources include an array of graphics execution units to process 3D and media threads. In at least one embodiment, 3D/Media subsystem 3715 includes one or more internal caches for thread instructions and data. In at least one embodiment, subsystem 3715 also includes shared memory, including registers and addressable memory, to share data between threads and to store output data.

In at least one embodiment, processors or processor components in FIG. 37 can be integrated into or included in computing environment 100 (FIG. 1) and computing environment 200 (FIG. 2). In at least one embodiment, processors or processor components in FIG. 36 can include or communicate with controller 205 illustrated in FIG. 3. In at least one embodiment, processors or processor components in FIG. 37 can perform processes 400 and 500 (FIGS. 4 and 5). In at least one embodiment, processors or processor components in FIG. 37 can call or perform part or all of APIs disclosed in FIGS. 6-17. In at least one embodiment, processors or processor components in FIG. 37 can perform examples in FIGS. 18 and 19.

Figure 38:
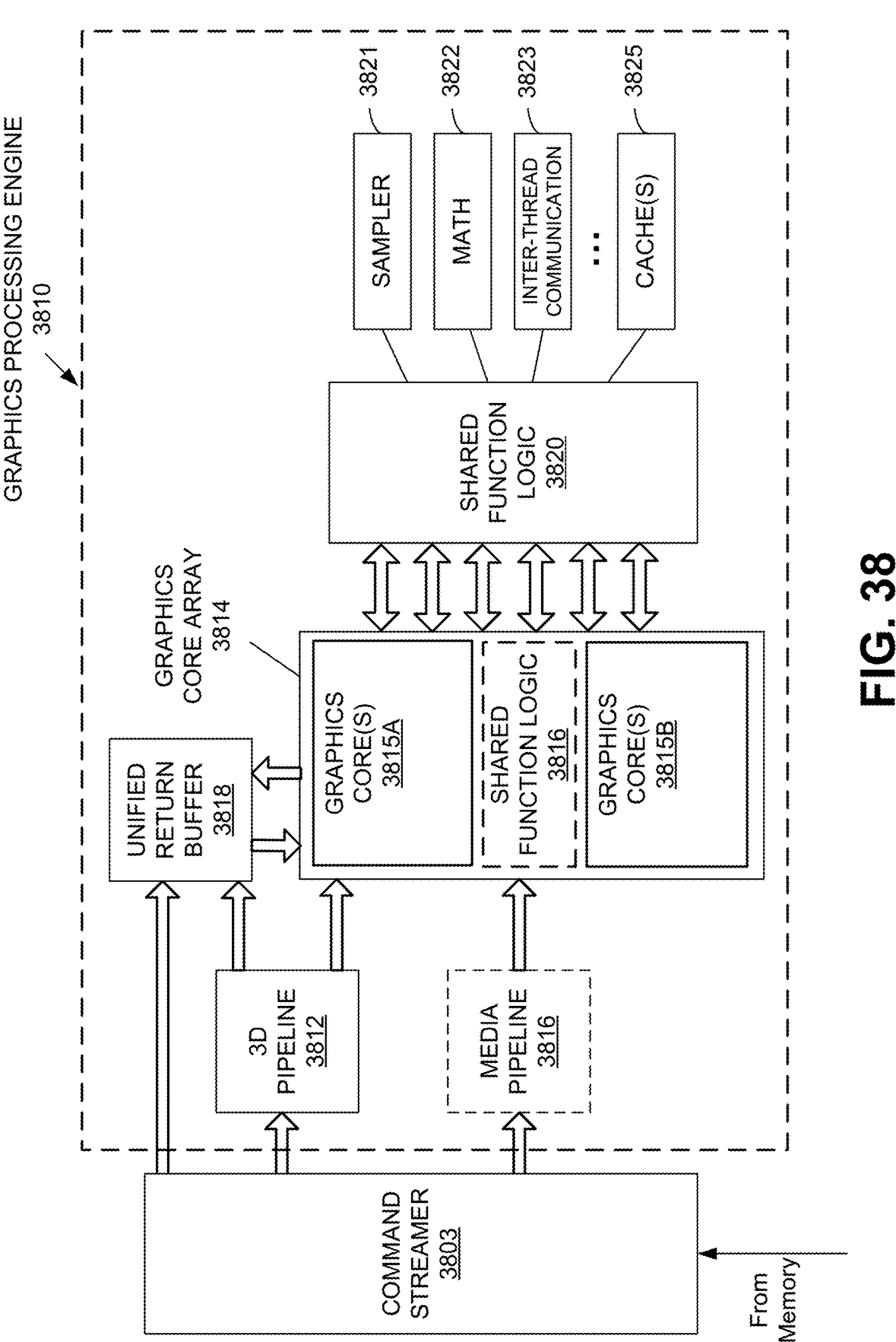
FIG. 38 is a block diagram of a graphics processing engine of a graphics processor in accordance with at least one embodiment.

FIG. 38 is a block diagram of a graphics processing engine 3810 of a graphics processor in accordance with at least one embodiment. In at least one embodiment, graphics processing engine (GPE) 3810 is a version of GPE 3710 shown in FIG. 37. In at least one embodiment, media pipeline 3816 is optional and may not be explicitly included within GPE 3810. In at least one embodiment, a separate media and/or image processor is coupled to GPE 3810.

In at least one embodiment, GPE 3810 is coupled to or includes a command streamer 3803, which provides a command stream to 3D pipeline 3812 and/or media pipelines 3816. In at least one embodiment, command streamer 3803 is coupled to memory, which can be system memory, or one or more of internal cache memory and shared cache memory. In at least one embodiment, command streamer 3803 receives commands from memory and sends commands to 3D pipeline 3812 and/or media pipeline 3816. In at least one embodiment, commands are instructions, primitives, or micro-operations fetched from a ring buffer, which stores commands for 3D pipeline 3812 and media pipeline 3816. In at least one embodiment, a ring buffer can additionally include batch command buffers storing batches of multiple commands. In at least one embodiment, commands for 3D pipeline 3812 can also include references to data stored in memory, such as but not limited to vertex and geometry data for 3D pipeline 3812 and/or image data and memory objects for media pipeline 3816. In at least one embodiment, 3D pipeline 3812 and media pipeline 3816 process commands and data by performing operations or by dispatching one or more execution threads to a graphics core array 3814. In at least one embodiment graphics core array 3814 includes one or more blocks of graphics cores (e.g., graphics core(s) 3815A, graphics core(s) 3815B), each block including one or more graphics cores. In at least one embodiment, each graphics core includes a set of graphics execution resources that includes general-purpose and graphics specific execution logic to perform graphics and compute operations, as well as fixed function texture processing and/or machine learning and artificial intelligence acceleration logic.

In at least one embodiment, 3D pipeline 3812 includes fixed function and programmable logic to process one or more shader programs, such as vertex shaders, geometry shaders, pixel shaders, fragment shaders, compute shaders, or other shader programs, by processing instructions and dispatching execution threads to graphics core array 3814. In at least one embodiment, graphics core array 3814 provides a unified block of execution resources for use in processing shader programs. In at least one embodiment, multi-purpose execution logic (e.g., execution units) within graphics core(s) 3815A-3815B of graphic core array 3814 includes support for various 3D API shader languages and can execute multiple simultaneous execution threads associated with multiple shaders.

In at least one embodiment, graphics core array 3814 also includes execution logic to perform media functions, such as video and/or image processing. In at least one embodiment, execution units additionally include general-purpose logic that is programmable to perform parallel general-purpose computational operations, in addition to graphics processing operations.

In at least one embodiment, output data generated by threads executing on graphics core array 3814 can output data to memory in a unified return buffer (URB) 3818. URB 3818 can store data for multiple threads. In at least one embodiment, URB 3818 may be used to send data between different threads executing on graphics core array 3814. In at least one embodiment, URB 3818 may additionally be used for synchronization between threads on graphics core array 3814 and fixed function logic within shared function logic 3820.

In at least one embodiment, graphics core array 3814 is scalable, such that graphics core array 3814 includes a variable number of graphics cores, each having a variable number of execution units based on a target power and performance level of GPE 3810. In at least one embodiment, execution resources are dynamically scalable, such that execution resources may be enabled or disabled as needed.

In at least one embodiment, graphics core array 3814 is coupled to shared function logic 3820 that includes multiple resources that are shared between graphics cores in graphics core array 3814. In at least one embodiment, shared functions performed by shared function logic 3820 are embodied in hardware logic units that provide specialized supplemental functionality to graphics core array 3814. In at least one embodiment, shared function logic 3820 includes but is not limited to sampler 3821, math 3822, and inter-thread communication (ITC) 3823 logic. In at least one embodiment, one or more cache(s) 3825 are in included in or couple to shared function logic 3820.

In at least one embodiment, a shared function is used if demand for a specialized function is insufficient for inclusion within graphics core array 3814. In at least one embodiment, a single instantiation of a specialized function is used in shared function logic 3820 and shared among other execution resources within graphics core array 3814. In at least one embodiment, specific shared functions within shared function logic 3820 that are used extensively by graphics core array 3814 may be included within shared function logic 3816 within graphics core array 3814. In at least one embodiment, shared function logic 3816 within graphics core array 3814 can include some or all logic within shared function logic 3820. In at least one embodiment, all logic elements within shared function logic 3820 may be duplicated within shared function logic 3816 of graphics core array 3814. In at least one embodiment, shared function logic 3820 is excluded in favor of shared function logic 3816 within graphics core array 3814.

In at least one embodiment, processors or processor components in FIG. 38 can be integrated into or included in computing environment 100 (FIG. 1) and computing environment 200 (FIG. 2). In at least one embodiment, processors or processor components in FIG. 38 can include or communicate with controller 205 illustrated in FIG. 3. In at least one embodiment, processors or processor components in FIG. 37 can perform processes 400 and 500 (FIGS. 4 and 5). In at least one embodiment, processors or processor components in FIG. 38 can call or perform part or all of APIs disclosed in FIGS. 6-17. In at least one embodiment, processors or processor components in FIG. 38 can perform examples in FIGS. 18 and 19.

Figure 39:
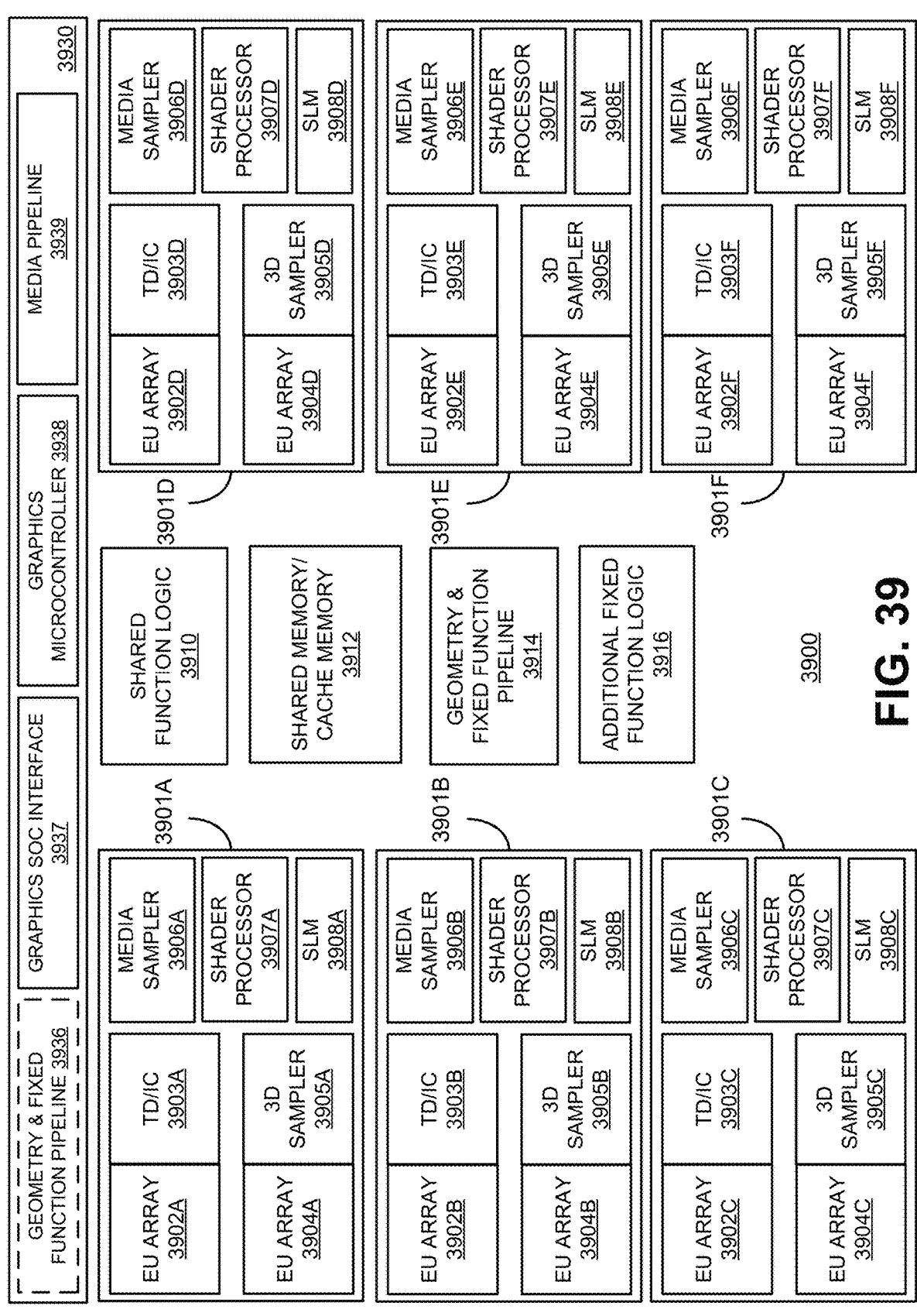
FIG. 39 is a block diagram of at least portions of a graphics processor core, according to at least one embodiment.

FIG. 39 is a block diagram of hardware logic of a graphics processor core 3900, according to at least one embodiment described herein. In at least one embodiment, graphics processor core 3900 is included within a graphics core array. In at least one embodiment, graphics processor core 3900, sometimes referred to as a core slice, can be one or multiple graphics cores within a modular graphics processor. In at least one embodiment, graphics processor core 3900 is exemplary of one graphics core slice, and a graphics processor as described herein may include multiple graphics core slices based on target power and performance envelopes. In at least one embodiment, each graphics core 3900 can include a fixed function block 3930 coupled with multiple sub-cores 3901A-3901F, also referred to as sub-slices, that include modular blocks of general-purpose and fixed function logic.

In at least one embodiment, fixed function block 3930 includes a geometry/fixed function pipeline 3936 that can be shared by all sub-cores in graphics processor 3900, for example, in lower performance and/or lower power graphics processor implementations. In at least one embodiment, geometry/fixed function pipeline 3936 includes a 3D fixed function pipeline, a video front-end unit, a thread spawner and thread dispatcher, and a unified return buffer manager, which manages unified return buffers.

In at least one embodiment fixed function block 3930 also includes a graphics SoC interface 3937, a graphics microcontroller 3938, and a media pipeline 3939. Graphics SoC interface 3937 provides an interface between graphics core 3900 and other processor cores within a system on a chip integrated circuit. In at least one embodiment, graphics microcontroller 3938 is a programmable sub-processor that is configurable to manage various functions of graphics processor 3900, including thread dispatch, scheduling, and pre-emption. In at least one embodiment, media pipeline 3939 includes logic to facilitate decoding, encoding, pre-processing, and/or post-processing of multimedia data, including image and video data. In at least one embodiment, media pipeline 3939 implements media operations via requests to compute or sampling logic within sub-cores 3901-3901F.

In at least one embodiment, SoC interface 3937 enables graphics core 3900 to communicate with general-purpose application processor cores (e.g., CPUs) and/or other components within an SoC, including memory hierarchy elements such as a shared last level cache memory, system RAM, and/or embedded on-chip or on-package DRAM. In at least one embodiment, SoC interface 3937 can also enable communication with fixed function devices within an SoC, such as camera imaging pipelines, and enables use of and/or implements global memory atomics that may be shared between graphics core 3900 and CPUs within an SoC. In at least one embodiment, SoC interface 3937 can also implement power management controls for graphics core 3900 and enable an interface between a clock domain of graphic core 3900 and other clock domains within an SoC. In at least one embodiment, SoC interface 3937 enables receipt of command buffers from a command streamer and global thread dispatcher that are configured to provide commands and instructions to each of one or more graphics cores within a graphics processor. In at least one embodiment, commands and instructions can be dispatched to media pipeline 3939, when media operations are to be performed, or a geometry and fixed function pipeline (e.g., geometry and fixed function pipeline 3936, geometry and fixed function pipeline 3914) when graphics processing operations are to be performed.

In at least one embodiment, graphics microcontroller 3938 can be configured to perform various scheduling and management tasks for graphics core 3900. In at least one embodiment, graphics microcontroller 3938 can perform graphics and/or compute workload scheduling on various graphics parallel engines within execution unit (EU) arrays 3902A-3902F, 3904A-3904F within sub-cores 3901A-3901F. In at least one embodiment, host software executing on a CPU core of an SoC including graphics core 3900 can submit workloads one of multiple graphic processor doorbells, which invokes a scheduling operation on an appropriate graphics engine. In at least one embodiment, scheduling operations include determining which workload to run next, submitting a workload to a command streamer, pre-empting existing workloads running on an engine, monitoring progress of a workload, and notifying host software when a workload is complete. In at least one embodiment, graphics microcontroller 3938 can also facilitate low-power or idle states for graphics core 3900, providing graphics core 3900 with an ability to save and restore registers within graphics core 3900 across low-power state transitions independently from an operating system and/or graphics driver software on a system.

In at least one embodiment, graphics core 3900 may have greater than or fewer than illustrated sub-cores 3901A-3901F, up to N modular sub-cores. For each set of N sub-cores, in at least one embodiment, graphics core 3900 can also include shared function logic 3910, shared and/or cache memory 3912, a geometry/fixed function pipeline 3914, as well as additional fixed function logic 3916 to accelerate various graphics and compute processing operations. In at least one embodiment, shared function logic 3910 can include logic units (e.g., sampler, math, and/or inter-thread communication logic) that can be shared by each N sub-cores within graphics core 3900. Shared and/or cache memory 3912 can be a last-level cache for N sub-cores 3901A-3901F within graphics core 3900 and can also serve as shared memory that is accessible by multiple sub-cores. In at least one embodiment, geometry/fixed function pipeline 3914 can be included instead of geometry/fixed function pipeline 3936 within fixed function block 3930 and can include same or similar logic units.

In at least one embodiment, graphics core 3900 includes additional fixed function logic 3916 that can include various fixed function acceleration logic for use by graphics core 3900. In at least one embodiment, additional fixed function logic 3916 includes an additional geometry pipeline for use in position only shading. In position-only shading, at least two geometry pipelines exist, whereas in a full geometry pipeline within geometry/fixed function pipeline 3916, 3936, and a cull pipeline, which is an additional geometry pipeline which may be included within additional fixed function logic 3916. In at least one embodiment, cull pipeline is a trimmed down version of a full geometry pipeline. In at least one embodiment, a full pipeline and a cull pipeline can execute different instances of an application, each instance having a separate context. In at least one embodiment, position only shading can hide long cull runs of discarded triangles, enabling shading to be completed earlier in some instances. For example, in at least one embodiment, cull pipeline logic within additional fixed function logic 3916 can execute position shaders in parallel with a main application and generally generates critical results faster than a full pipeline, as cull pipeline fetches and shades position attribute of vertices, without performing rasterization and rendering of pixels to a frame buffer. In at least one embodiment, cull pipeline can use generated critical results to compute visibility information for all triangles without regard to whether those triangles are culled. In at least one embodiment, full pipeline (which in this instance may be referred to as a replay pipeline) can consume visibility information to skip culled triangles to shade only visible triangles that are finally passed to a rasterization phase.

In at least one embodiment, additional fixed function logic 3916 can also include machine-learning acceleration logic, such as fixed function matrix multiplication logic, for implementations including optimizations for machine learning training or inferencing.

In at least one embodiment, within each graphics sub-core 3901A-3901F includes a set of execution resources that may be used to perform graphics, media, and compute operations in response to requests by graphics pipeline, media pipeline, or shader programs. In at least one embodiment, graphics sub-cores 3901A-3901F include multiple EU arrays 3902A-3902F, 3904A-3904F, thread dispatch and inter-thread communication (TD/IC) logic 3903A-3903F, a 3D (e.g., texture)

sampler 3905A-3905F, a media sampler 3906A-3906F, a shader processor 3907A-3907F, and shared local memory (SLM) 3908A-3908F. EU arrays 3902A-3902F, 3904A-3904F each include multiple execution units, which are general-purpose graphics processing units capable of performing floating-point and integer/fixed-point logic operations in service of a graphics, media, or compute operation, including graphics, media, or compute shader programs. In at least one embodiment, TD/IC logic 3903A-3903F performs local thread dispatch and thread control operations for execution units within a sub-core and facilitate communication between threads executing on execution units of a sub-core. In at least one embodiment, 3D sampler 3905A-3905F can read texture or other 3D graphics related data into memory. In at least one embodiment, 3D sampler can read texture data differently based on a configured sample state and texture format associated with a given texture. In at least one embodiment, media sampler 3906A-3906F can perform similar read operations based on a type and format associated with media data. In at least one embodiment, each graphics sub-core 3901A-3901F can alternately include a unified 3D and media sampler. In at least one embodiment, threads executing on execution units within each of sub-cores 3901A-3901F can make use of shared local memory 3908A-3908F within each sub-core, to enable threads executing within a thread group to execute using a common pool of on-chip memory.

In at least one embodiment, processors or processor components in FIG. 39 can be integrated into or included in computing environment 100 (FIG. 1) and computing environment 200 (FIG. 2). In at least one embodiment, processors or processor components in FIG. 39 can include or communicate with controller 205 illustrated in FIG. 3. In at least one embodiment, processors or processor components in FIG. 39 can perform processes 400 and 500 (FIGS. 4 and 5). In at least one embodiment, processors or processor components in FIG. 39 can call or perform part or all of APIs disclosed in FIGS. 6-17. In at least one embodiment, processors or processor components in FIG. 39 can perform examples in FIGS. 18 and 19.

Figure 40A:
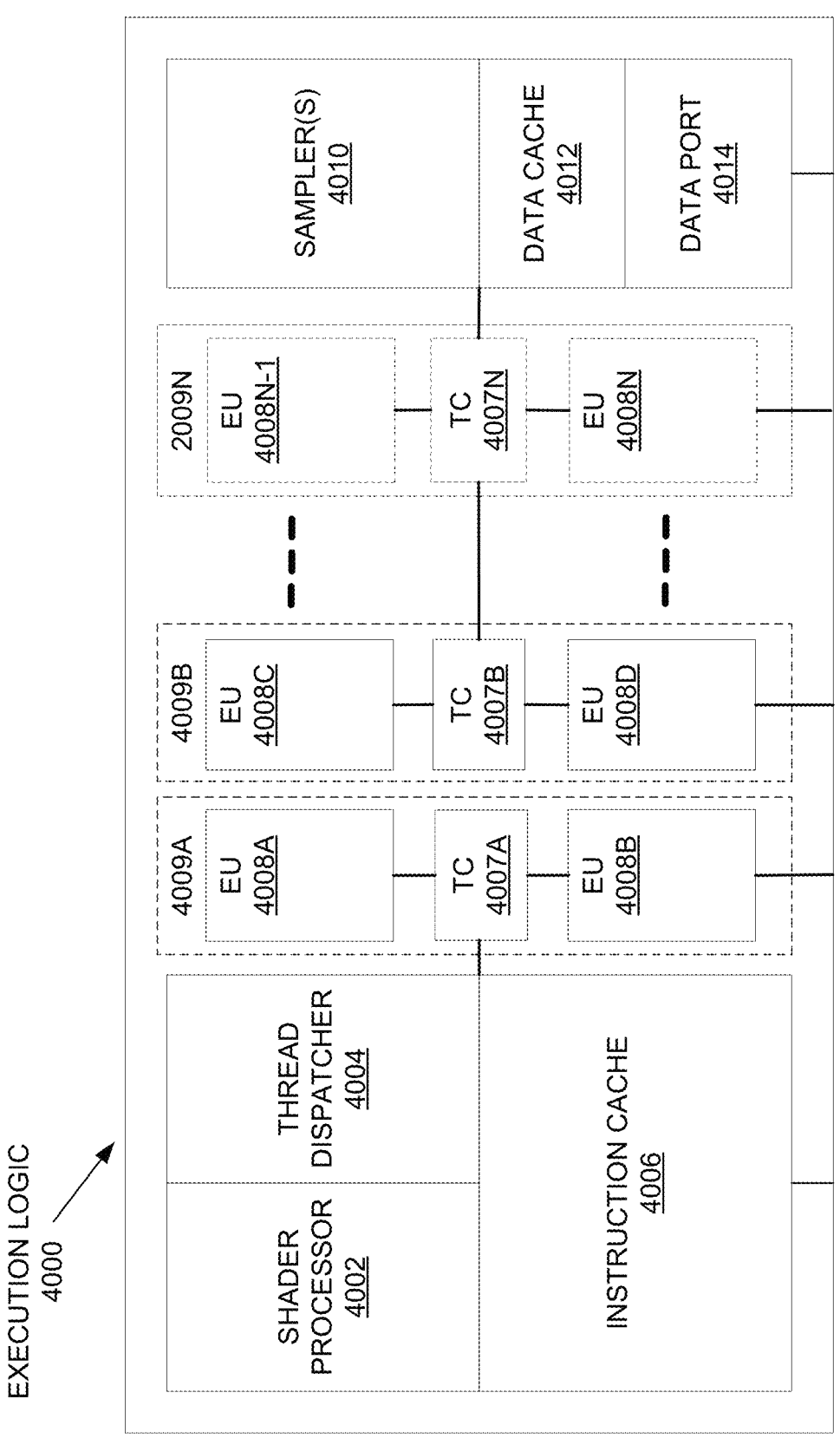
FIGS. 40A and 40B illustrate thread execution logic including an array of processing elements of a graphics processor core according to at least one embodiment.
Figure 40B:
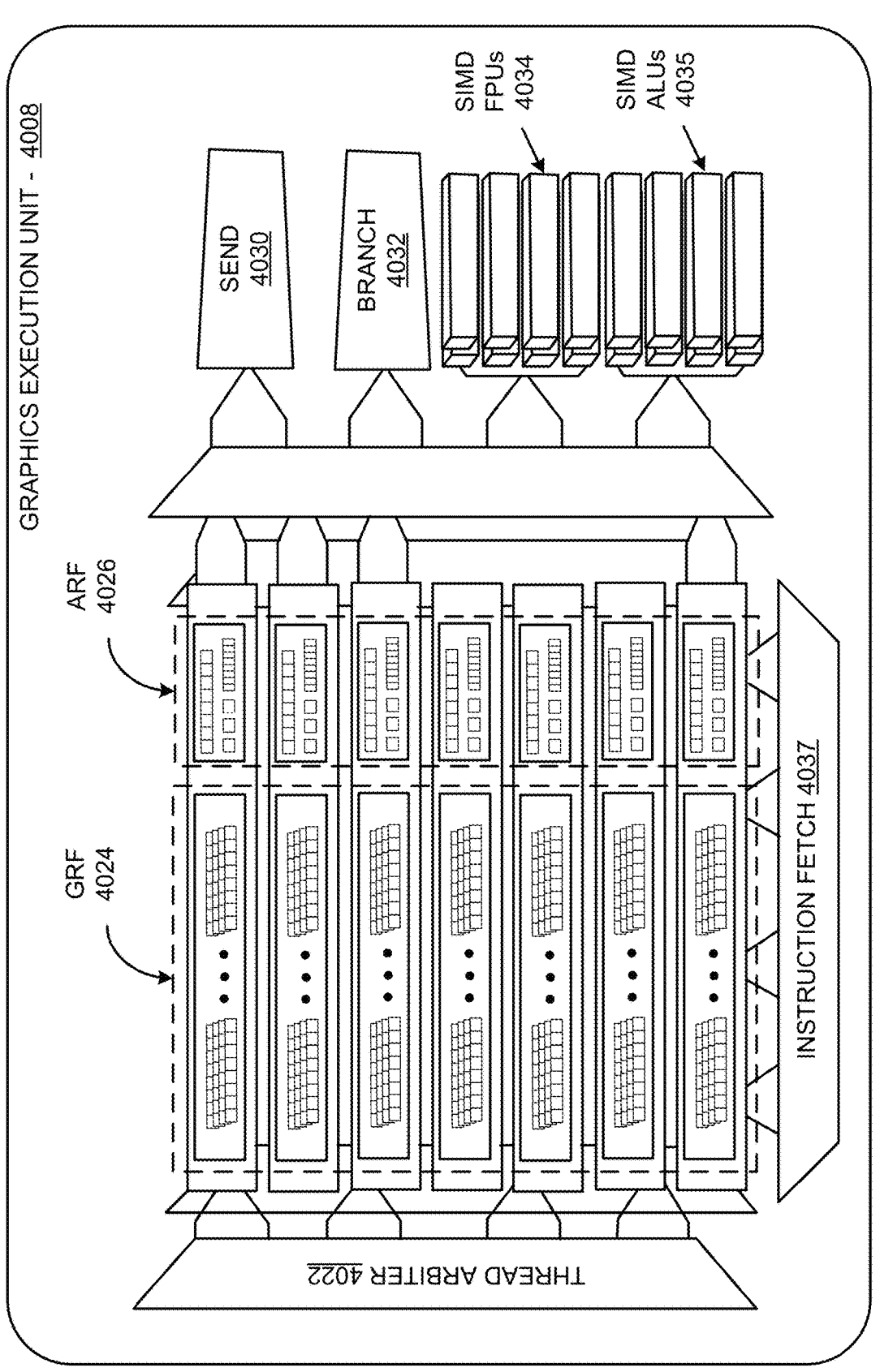

FIGS. 40A-40B illustrate thread execution logic 4000 including an array of processing elements of a graphics processor core according to at least one embodiment. FIG. 40A illustrates at least one embodiment, in which thread execution logic 4000 is used. FIG. 40B illustrates exemplary internal details of an execution unit, according to at least one embodiment.

As illustrated in FIG. 40A, in at least one embodiment, thread execution logic 4000 includes a shader processor 4002, a thread dispatcher 4004, instruction cache 4006, a scalable execution unit array including a plurality of execution units 4008A-4008N, a sampler 4010, a data cache 4012, and a data port 4014. In at least one embodiment a scalable execution unit array can dynamically scale by enabling or disabling one or more execution units (e.g., any of execution unit 4008A, 4008B, 4008C, 4008D, through 4008N-1 and 4008N) based on computational requirements of a workload, for example. In at least one embodiment, scalable execution units are interconnected via an interconnect fabric that links to each of execution unit. In at least one embodiment, thread execution logic 4000 includes one or more connections to memory, such as system memory or cache memory, through one or more of instruction cache 4006, data port 4014, sampler 4010, and execution units 4008A-4008N. In at least one embodiment, each execution unit (e.g., 4008A) is a stand-alone programmable general-purpose computational unit that is capable of executing multiple simultaneous hardware threads while processing multiple data elements in parallel for each thread. In at least one embodiment, array of execution units 4008A-4008N is scalable to include any number individual execution units.

In at least one embodiment, execution units 4008A-4008N are primarily used to execute shader programs. In at least one embodiment, shader processor 4002 can process various shader programs and dispatch execution threads associated with shader programs via a thread dispatcher 4004. In at least one embodiment, thread dispatcher 4004 includes logic to arbitrate thread initiation requests from graphics and media pipelines and instantiate requested threads on one or more execution units in execution units 4008A-4008N. For example, in at least one embodiment, a geometry pipeline can dispatch vertex, tessellation, or geometry shaders to thread execution logic for processing. In at least one embodiment, thread dispatcher 4004 can also process runtime thread spawning requests from executing shader programs.

In at least one embodiment, execution units 4008A-4008N support an instruction set that includes native support for many standard 3D graphics shader instructions, such that shader programs from graphics libraries (e.g., Direct 3D and OpenGL) are executed with a minimal translation. In at least one embodiment, execution units support vertex and geometry processing (e.g., vertex programs, geometry programs, vertex shaders), pixel processing (e.g., pixel shaders, fragment shaders) and general-purpose processing (e.g., compute and media shaders). In at least one embodiment, each of execution units 4008A-4008N, which include one or more arithmetic logic units (ALUs), is capable of multi-issue single instruction multiple data (SID) execution and multi-threaded operation enables an efficient execution environment despite higher latency memory accesses. In at least one embodiment, each hardware thread within each execution unit has a dedicated high-bandwidth register file and associated independent thread-state. In at least one embodiment, execution is multi-issue per clock to pipelines capable of integer, single and double precision floating point operations, SIMD branch capability, logical operations, transcendental operations, and other miscellaneous operations. In at least one embodiment, while waiting for data from memory or one of shared functions, dependency logic within execution units 4008A-4008N causes a waiting thread to sleep until requested data has been returned. In at least one embodiment, while a waiting thread is sleeping, hardware resources may be devoted to processing other threads. For example, in at least one embodiment, during a delay associated with a vertex shader operation, an execution unit can perform operations for a pixel shader, fragment shader, or another type of shader program, including a different vertex shader.

In at least one embodiment, each execution unit in execution units 4008A-4008N operates on arrays of data elements. In at least one embodiment, a number of data elements is "execution size," or number of channels for an instruction. In at least one embodiment, an execution channel is a logical unit of execution for data element access, masking, and flow control within instructions. In at least one embodiment, a number of channels may be independent of a number of physical Arithmetic Logic Units (ALUs) or Floating Point Units (FPUs) for a particular graphics processor. In at least one embodiment, execution units 4008A-4008N support integer and floating-point data types.

In at least one embodiment, an execution unit instruction set includes SIMD instructions. In at least one embodiment, various data elements can be stored as a packed data type in a register and execution unit will process various elements based on data size of elements. For example, in at least one embodiment, when operating on a 256-bit wide vector, 256 bits of a vector are stored in a register and an execution unit operates on a vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, in at least one embodiment, different vector widths and register sizes are possible.

In at least one embodiment, one or more execution units can be combined into a fused execution unit 4009A-4009N having thread control logic (4007A-4007N) that is common to fused EUs. In at least one embodiment, multiple EUs can be fused into an EU group. In at least one embodiment, each EU in fused EU group can be configured to execute a separate SIMD hardware thread. The number of EUs in a fused EU group can vary according to various embodiments. In at least one embodiment, various SIMD widths can be performed per-EU, including but not limited to SIMD8, SIMD16, and SIMD32. In at least one embodiment, each fused graphics execution unit 4009A-4009N includes at least two execution units. For example, in at least one embodiment, fused execution unit 4009A includes a first EU 4008A, second EU 4008B, and thread control logic 4007A that is common to first EU 4008A and second EU 4008B. In at least one embodiment, thread control logic 4007A controls threads executed on fused graphics execution unit 4009A, allowing each EU within fused execution units 4009A-4009N to execute using a common instruction pointer register.

In at least one embodiment, one or more internal instruction caches (e.g., 4006) are included in thread execution logic 4000 to cache thread instructions for execution units. In at least one embodiment, one or more data caches (e.g., 4012) are included to cache thread data during thread execution. In at least one embodiment, a sampler 4010 is included to provide texture sampling for 3D operations and media sampling for media operations. In at least one embodiment, sampler 4010 includes specialized texture or media sampling functionality to process texture or media data during sampling process before providing sampled data to an execution unit.

During execution, in at least one embodiment, graphics and media pipelines send thread initiation requests to thread execution logic 4000 via thread spawning and dispatch logic. In at least one embodiment, once a group of geometric objects has been processed and rasterized into pixel data, pixel processor logic (e.g., pixel shader logic, fragment shader logic, etc.) within shader processor 4002 is invoked to further compute output information and cause results to be written to output surfaces (e.g., color buffers, depth buffers, stencil buffers, etc.). In at least one embodiment, a pixel shader or fragment shader calculates values of various vertex attributes that are to be interpolated across a rasterized object. In at least one embodiment, pixel processor logic within shader processor 4002 then executes an application programming interface (API)-supplied pixel or fragment shader program. In at least one embodiment, to execute a shader program, shader processor 4002 dispatches threads to an execution unit (e.g., 4008A) via thread dispatcher 4004. In at least one embodiment, shader processor 4002 uses texture sampling logic in sampler 4010 to access texture data in texture maps stored in memory. In at least one embodiment, arithmetic operations on texture data and input geometry data compute pixel color data for each geometric fragment, or discards one or more pixels from further processing.

In at least one embodiment, data port 4014 provides a memory access mechanism for thread execution logic 4000 to output processed data to memory for further processing on a graphics processor output pipeline. In at least one embodiment, data port 4014 includes or couples to one or more cache memories (e.g., data cache 4012) to cache data for memory access via a data port.

As illustrated in FIG. 40B, in at least one embodiment, a graphics execution unit 4008 can include an instruction fetch unit 4037, a general register file array (GRF) 4024, an architectural register file array (ARF) 4026, a thread arbiter 4022, a send unit 4030, a branch unit 4032, a set of SIMD floating point units (FPUs) 4034, and In at least one embodiment a set of dedicated integer SIMD ALUs 4035. In at least one embodiment, GRF 4024 and ARF 4026 includes a set of general register files and architecture register files associated with each simultaneous hardware thread that may be active in graphics execution unit 4008. In at least one embodiment, per thread architectural state is maintained in ARF 4026, while data used during thread execution is stored in GRF 4024. In at least one embodiment, execution state of each thread, including instruction pointers for each thread, can be held in thread-specific registers in ARF 4026.

In at least one embodiment, graphics execution unit 4008 has an architecture that is a combination of Simultaneous Multi-Threading (SMT) and fine-grained Interleaved Multi-Threading (IMT). In at least one embodiment, architecture has a modular configuration that can be fine-tuned at design time based on a target number of simultaneous threads and number of registers per execution unit, where execution unit resources are divided across logic used to execute multiple simultaneous threads.

In at least one embodiment, graphics execution unit 4008 can co-issue multiple instructions, which may each be different instructions. In at least one embodiment, thread arbiter 4022 of graphics execution unit thread 4008 can dispatch instructions to one of send unit 4030, branch unit 4042, or SIMD FPU(s) 4034 for execution. In at least one embodiment, each execution thread can access 128 general-purpose registers within GRF 4024, where each register can store 32 bytes, accessible as a SIMD 8-element vector of 32-bit data elements. In at least one embodiment, each execution unit thread has access to 4 Kbytes within GRF 4024, although embodiments are not so limited, and greater or fewer register resources may be provided in other embodiments. In at least one embodiment, up to seven threads can execute simultaneously, although a number of threads per execution unit can also vary according to embodiments. In at least one embodiment, in which seven threads may access 4 Kbytes, GRF 4024 can store a total of 28 Kbytes. In at least one embodiment, flexible addressing modes can permit registers to be addressed together to build effectively wider registers or to represent strided rectangular block data structures.

In at least one embodiment, memory operations, sampler operations, and other longer-latency system communications are dispatched via "send" instructions that are executed by message passing send unit 4030. In at least one embodiment, branch instructions are dispatched to a dedicated branch unit 4032 to facilitate SIMD divergence and eventual convergence.

In at least one embodiment graphics execution unit 4008 includes one or more SIMD floating point units (FPU(s)) 4034 to perform floating-point operations. In at least one embodiment, FPU(s) 4034 also support integer computation. In at least one embodiment FPU(s) 4034 can SIMD execute up to M number of 32-bit floating-point (or integer) operations, or SIMD execute up to 2M 16-bit integer or 16-bit floating-point operations. In at least one embodiment, at least one of FPU(s) provides extended math capability to support high-throughput transcendental math functions and double precision 64-bit floating-point. In at least one embodiment, a set of 8-bit integer SIMD ALUs 4035 are also present, and may be specifically optimized to perform operations associated with machine learning computations.

In at least one embodiment, arrays of multiple instances of graphics execution unit 4008 can be instantiated in a graphics sub-core grouping (e.g., a sub-slice). In at least one embodiment execution unit 4008 can execute instructions across a plurality of execution channels. In at least one embodiment, each thread executed on graphics execution unit 4008 is executed on a different channel.

In at least one embodiment, processors or processor components in FIGS. 40A-40B can be integrated into or included in computing environment 100 (FIG. 1) and computing environment 200 (FIG. 2). In at least one embodiment, processors or processor components in FIGS. 40A-40B can include or communicate with controller 205 illustrated in FIG. 3. In at least one embodiment, processors or processor components in FIGS. 40A-40B can perform processes 400 and 500 (FIGS. 4 and 5). In at least one embodiment, processors or processor components in FIGS. 40A-40B can call or perform part or all of APIs disclosed in FIGS. 6-17. In at least one embodiment, processors or processor components in FIGS. 40A-40B can perform examples in FIGS. 18 and 19.

Figure 41:
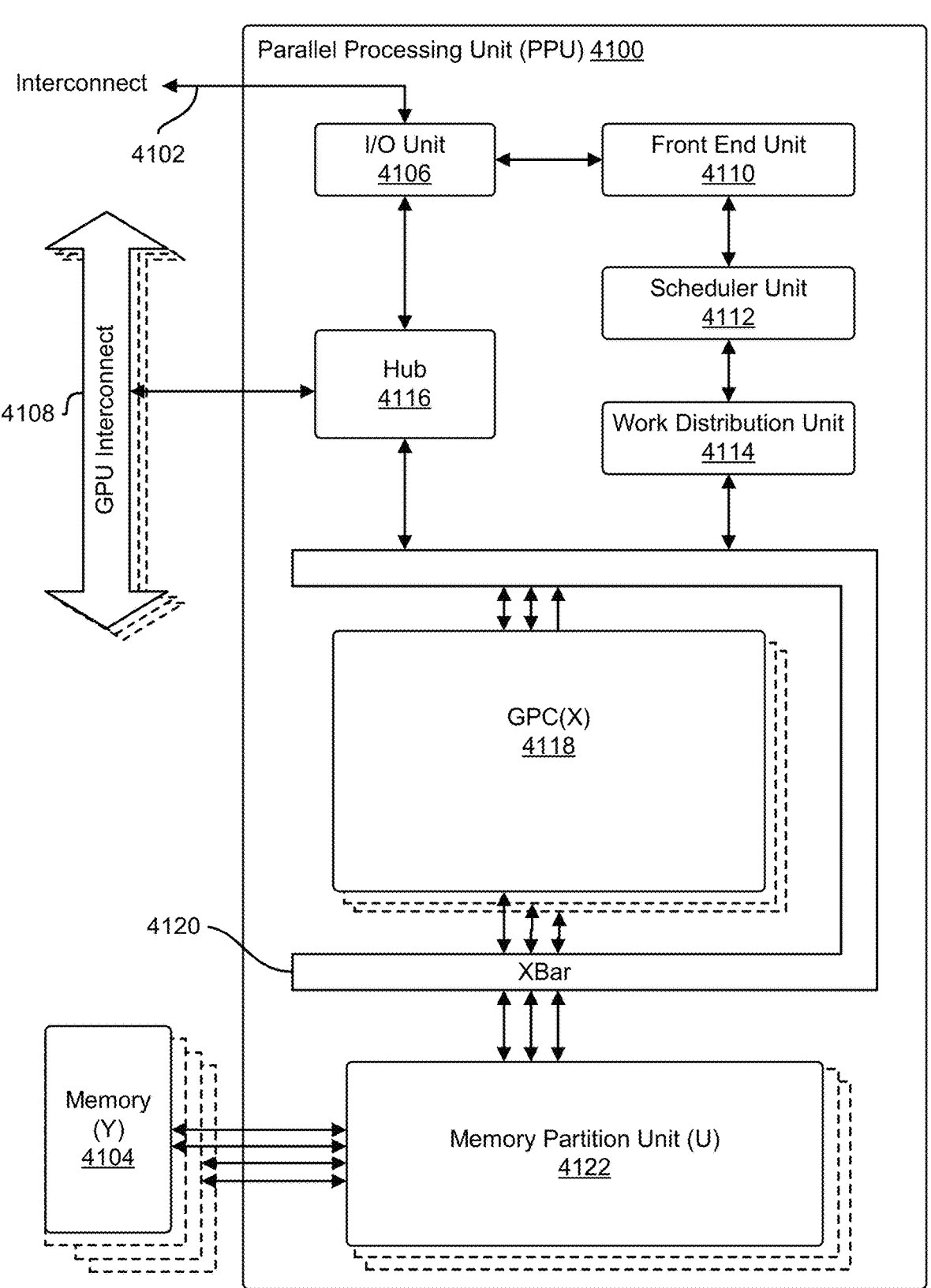
FIG. 41 illustrates a parallel processing unit ("PPU"), according to at least one embodiment.

FIG. 41 illustrates a parallel processing unit ("PPU") 4100, according to at least one embodiment. In at least one embodiment, PPU 4100 is configured with machine-readable code that, if executed by PPU 4100, causes PPU 4100 to perform some or all of processes and techniques described throughout this disclosure. In at least one embodiment, PPU 4100 is a multi-threaded processor that is implemented on one or more integrated circuit devices and that utilizes multithreading as a latency-hiding technique designed to process computer-readable instructions (also referred to as machine-readable instructions or simply instructions) on multiple threads in parallel. In at least one embodiment, a thread refers to a thread of execution and is an instantiation of a set of instructions configured to be executed by PPU 4100. In at least one embodiment, PPU 4100 is a graphics processing unit ("GPU") configured to implement a graphics rendering pipeline for processing three-dimensional ("3D") graphics data in order to generate two-dimensional ("2D") image data for display on a display device such as a liquid crystal display ("LCD") device. In at least one embodiment, PPU 4100 is utilized to perform computations such as linear algebra operations and machine-learning operations. FIG. 41 illustrates an example parallel processor for illustrative purposes only and should be construed as a non-limiting example of processor architectures contemplated within scope of this disclosure and that any suitable processor may be employed to supplement and/or substitute for same.

In at least one embodiment, one or more PPUs 4100 are configured to accelerate High Performance Computing ("HPC"), data center, and machine learning applications. In at least one embodiment, PPU 4100 is configured to accelerate deep learning systems and applications including following non-limiting examples: autonomous vehicle platforms, deep learning, high-accuracy speech, image, text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and more.

In at least one embodiment, PPU 4100 includes, without limitation, an Input/Output ("I/O") unit 4106, a front-end unit 4110, a scheduler unit 4112, a work distribution unit 4114, a hub 4116, a crossbar ("Xbar") 4120, one or more general processing clusters ("GPCs") 4118, and one or more partition units ("memory partition units") 4122. In at least one embodiment, PPU 4100 is connected to a host processor or other PPUs 4100 via one or more high-speed GPU interconnects ("GPU interconnects") 4108. In at least one embodiment, PPU 4100 is connected to a host processor or other peripheral devices via an interconnect 4102. In at least one embodiment, PPU 4100 is connected to a local memory comprising one or more memory devices ("memory") 4104. In at least one embodiment, memory devices 4104 include, without limitation, one or more dynamic random access memory ("DRAM") devices. In at least one embodiment, one or more DRAM devices are configured and/or configurable as high-bandwidth memory ("HBM") subsystems, with multiple DRAM dies stacked within each device.

In at least one embodiment, high-speed GPU interconnect 4108 may refer to a wire-based multi-lane communications link that is used by systems to scale and include one or more PPUs 4100 combined with one or more central processing units ("CPUs"), supports cache coherence between PPUs 4100 and CPUs, and CPU mastering. In at least one embodiment, data and/or commands are transmitted by high-speed GPU interconnect 4108 through hub 4116 to/from other units of PPU 4100 such as one or more copy engines, video encoders, video decoders, power management units, and other components which may not be explicitly illustrated in FIG. 41.

In at least one embodiment, I/O unit 4106 is configured to transmit and receive communications (e.g., commands, data) from a host processor (not illustrated in FIG. 41) over system bus 4102. In at least one embodiment, I/O unit 4106 communicates with host processor directly via system bus 4102 or through one or more intermediate devices such as a memory bridge. In at least one embodiment, I/O unit 4106 may communicate with one or more other processors, such as one or more of PPUs 4100 via system bus 4102. In at least one embodiment, I/O unit 4106 implements a Peripheral Component Interconnect Express ("PCIe") interface for communications over a PCIe bus. In at least one embodiment, I/O unit 4106 implements interfaces for communicating with external devices.

In at least one embodiment, I/O unit 4106 decodes packets received via system bus 4102. In at least one embodiment, at least some packets represent commands configured to cause PPU 4100 to perform various operations. In at least one embodiment, I/O unit 4106 transmits decoded commands to various other units of PPU 4100 as specified by commands. In at least one embodiment, commands are transmitted to front-end unit 4110 and/or transmitted to hub 4116 or other units of PPU 4100 such as one or more copy engines, a video encoder, a video decoder, a power management unit, etc. (not explicitly illustrated in FIG. 41). In at least one embodiment, I/O unit 4106 is configured to route communications between and among various logical units of PPU 4100.

In at least one embodiment, a program executed by host processor encodes a command stream in a buffer that provides workloads to PPU 4100 for processing. In at least one embodiment, a workload comprises instructions and data to be processed by those instructions. In at least one embodiment, buffer is a region in a memory that is accessible (e.g., read/write) by both host processor and PPU 4100—a host interface unit may be configured to access buffer in a system memory connected to system bus 4102 via memory requests transmitted over system bus 4102 by I/O unit 4106. In at least one embodiment, host processor writes command stream to buffer and then transmits a pointer to start of command stream to PPU 4100 such that front-end unit 4110 receives pointers to one or more command streams and manages one or more command streams, reading commands from command streams and forwarding commands to various units of PPU 4100.

In at least one embodiment, front-end unit 4110 is coupled to scheduler unit 4112 that configures various GPCs 4118 to process tasks defined by one or more command streams. In at least one embodiment, scheduler unit 4112 is configured to track state information related to various tasks managed by scheduler unit 4112 where state information may indicate which of GPCs 4118 a task is assigned to, whether task is active or inactive, a priority level associated with task, and so forth. In at least one embodiment, scheduler unit 4112 manages execution of a plurality of tasks on one or more of GPCs 4118.

In at least one embodiment, scheduler unit 4112 is coupled to work distribution unit 4114 that is configured to dispatch tasks for execution on GPCs 4118. In at least one embodiment, work distribution unit 4114 tracks a number of scheduled tasks received from scheduler unit 4112 and work distribution unit 4114 manages a pending task pool and an active task pool for each of GPCs 4118. In at least one embodiment, pending task pool comprises a number of slots (e.g., 32 slots) that contain tasks assigned to be processed by a particular GPC 4118; active task pool may comprise a number of slots (e.g., 4 slots) for tasks that are actively being processed by GPCs 4118 such that as one of GPCs 4118 completes execution of a task, that task is evicted from active task pool for GPC 4118 and one of other tasks from pending task pool is selected and scheduled for execution on GPC 4118. In at least one embodiment, if an active task is idle on GPC 4118, such as while waiting for a data dependency to be resolved, then active task is evicted from GPC 4118 and returned to pending task pool while another task in pending task pool is selected and scheduled for execution on GPC 4118.

In at least one embodiment, work distribution unit 4114 communicates with one or more GPCs 4118 via XBar 4120. In at least one embodiment, XBar 4120 is an interconnect network that couples many of units of PPU 4100 to other units of PPU 4100 and can be configured to couple work distribution unit 4114 to a particular GPC 4118. In at least one embodiment, one or more other units of PPU 4100 may also be connected to XBar 4120 via hub 4116.

In at least one embodiment, tasks are managed by scheduler unit 4112 and dispatched to one of GPCs 4118 by work distribution unit 4114. GPC 4118 is configured to process task and generate results. In at least one embodiment, results may be consumed by other tasks within GPC 4118, routed to a different GPC 4118 via XBar 4120, or stored in memory 4104. In at least one embodiment, results can be written to memory 4104 via partition units 4122, which implement a memory interface for reading and writing data to/from memory 4104. In at least one embodiment, results can be transmitted to another PPU 4104 or CPU via high-speed GPU interconnect 4108. In at least one embodiment, PPU 4100 includes, without limitation, a number U of partition units 4122 that is equal to number of separate and distinct memory devices 4104 coupled to PPU 4100. In at least one embodiment, partition unit 4122 will be described in more detail herein in conjunction with FIG. 43.

In at least one embodiment, a host processor executes a driver kernel that implements an application programming interface ("API") that enables one or more applications executing on host processor to schedule operations for execution on PPU 4100. In at least one embodiment, multiple compute applications are simultaneously executed by PPU 4100 and PPU 4100 provides isolation, quality of service ("QoS"), and independent address spaces for multiple compute applications. In at least one embodiment, an application generates instructions (e.g., in form of API calls) that cause driver kernel to generate one or more tasks for execution by PPU 4100 and driver kernel outputs tasks to one or more streams being processed by PPU 4100. In at least one embodiment, each task comprises one or more groups of related threads, which may be referred to as a warp. In at least one embodiment, a warp comprises a plurality of related threads (e.g., 32 threads) that can be executed in parallel. In at least one embodiment, cooperating threads can refer to a plurality of threads including instructions to perform task and that exchange data through shared memory. In at least one embodiment, threads and cooperating threads are described in more detail, in accordance with at least one embodiment, in conjunction with FIG. 43.

In at least one embodiment, processors or processor components in FIG. 41 can be integrated into or included in computing environment 100 (FIG. 1) and computing environment 200 (FIG. 2). In at least one embodiment, processors or processor components in FIG. 41 can include or communicate with controller 205 illustrated in FIG. 3. In at least one embodiment, processors or processor components in FIG. 41 can perform processes 400 and 500 (FIGS. 4 and 5). In at least one embodiment, processors or processor components in FIG. 41 can call or perform part or all of APIs disclosed in FIGS. 6-17. In at least one embodiment, processors or processor components in FIG. 41 can perform examples in FIGS. 18 and 19.

Figure 42:
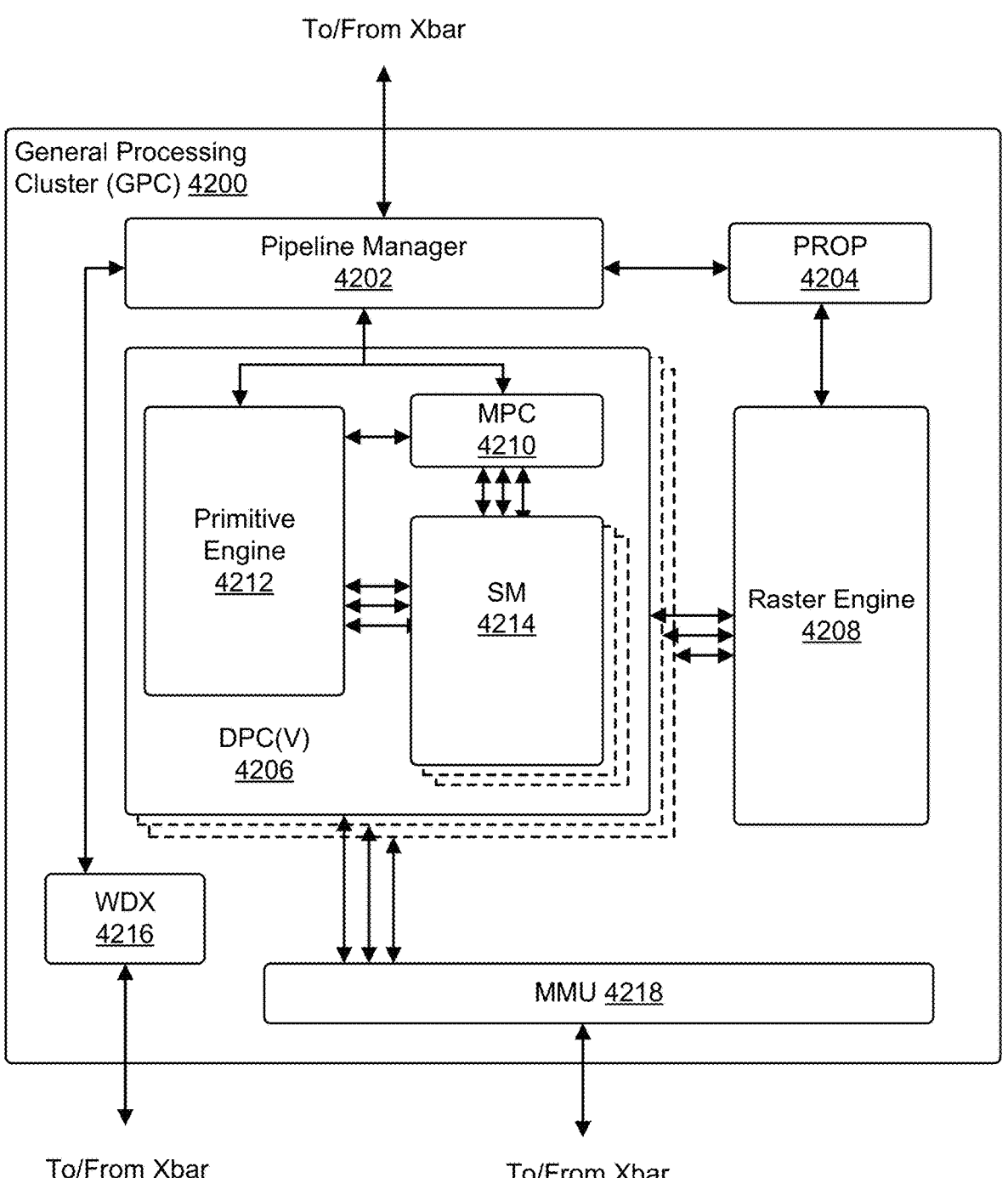
FIG. 42 illustrates a general processing cluster ("GPC"), according to at least one embodiment.

FIG. 42 illustrates a general processing cluster ("GPC") 4200, according to at least one embodiment. In at least one embodiment, GPC 4200 is GPC 4118 of FIG. 41. In at least one embodiment, each GPC 4200 includes, without limitation, a number of hardware units for processing tasks and each GPC 4200 includes, without limitation, a pipeline manager 4202, a pre-raster operations unit ("PROP") 4204, a raster engine 4208, a work distribution crossbar ("WDX") 4216, a memory management unit ("MMU") 4218, one or more Data Processing Clusters ("DPCs") 4206, and any suitable combination of parts.

In at least one embodiment, operation of GPC 4200 is controlled by pipeline manager 4202. In at least one embodiment, pipeline manager 4202 manages configuration of one or more DPCs 4206 for processing tasks allocated to GPC 4200. In at least one embodiment, pipeline manager 4202 configures at least one of one or more DPCs 4206 to implement at least a portion of a graphics rendering pipeline. In at least one embodiment, DPC 4206 is configured to execute a vertex shader program on a programmable streaming multi-processor ("SM") 4214. In at least one embodiment, pipeline manager 4202 is configured to route packets received from a work distribution unit to appropriate logical units within GPC 4200, in at least one embodiment, and some packets may be routed to fixed function hardware units in PROP 4204 and/or raster engine 4208 while other packets may be routed to DPCs 4206 for processing by a primitive engine 4212 or SM 4214. In at least one embodiment, pipeline manager 4202 configures at least one of DPCs 4206 to implement a neural network model and/or a computing pipeline.

In at least one embodiment, PROP unit 4204 is configured, in at least one embodiment, to route data generated by raster engine 4208 and DPCs 4206 to a Raster Operations ("ROP") unit in partition unit 4122, described in more detail above in conjunction with FIG. 41. In at least one embodiment, PROP unit 4204 is configured to perform optimizations for color blending, organize pixel data, perform address translations, and more. In at least one embodiment, raster engine 4208 includes, without limitation, a number of fixed function hardware units configured to perform various raster operations, in at least one embodiment, and raster engine 4208 includes, without limitation, a setup engine, a coarse raster engine, a culling engine, a clipping engine, a fine raster engine, a tile coalescing engine, and any suitable combination thereof. In at least one embodiment, setup engine receives transformed vertices and generates plane equations associated with geometric primitive defined by vertices; plane equations are transmitted to coarse raster engine to generate coverage information (e.g., an x, y coverage mask for a tile) for primitive; output of coarse raster engine is transmitted to culling engine where fragments associated with primitive that fail a z-test are culled, and transmitted to a clipping engine where fragments lying outside a viewing frustum are clipped. In at least one embodiment, fragments that survive clipping and culling are passed to fine raster engine to generate attributes for pixel fragments based on plane equations generated by setup engine. In at least one embodiment, output of raster engine 4208 comprises fragments to be processed by any suitable entity such as by a fragment shader implemented within DPC 4206.

In at least one embodiment, each DPC 4206 included in GPC 4200 comprise, without limitation, an M-Pipe Controller ("MPC") 4210; primitive engine 4212; one or more SMs 4214; and any suitable combination thereof. In at least one embodiment, MPC 4210 controls operation of DPC 4206, routing packets received from pipeline manager 4202 to appropriate units in DPC 4206. In at least one embodiment, packets associated with a vertex are routed to primitive engine 4212, which is configured to fetch vertex attributes associated with vertex from memory; in contrast, packets associated with a shader program may be transmitted to SM 4214.

In at least one embodiment, SM 4214 comprises, without limitation, a programmable streaming processor that is configured to process tasks represented by a number of threads. In at least one embodiment, SM 4214 is multi-threaded and configured to execute a plurality of threads (e.g., 32 threads) from a particular group of threads concurrently and implements a Single-Instruction, Multiple-Data ("SIMD") architecture where each thread in a group of threads (e.g., a warp) is configured to process a different set of data based on same set of instructions. In at least one embodiment, all threads in group of threads execute same instructions. In at least one embodiment, SM 4214 implements a Single-Instruction, Multiple Thread ("SIMT") architecture wherein each thread in a group of threads is configured to process a different set of data based on same set of instructions, but where individual threads in group of threads are allowed to diverge during execution. In at least one embodiment, a program counter, call stack, and execution state is maintained for each warp, enabling concurrency between warps and serial execution within warps when threads within warp diverge.

In another embodiment, a program counter, call stack, and execution state is maintained for each individual thread, enabling equal concurrency between all threads, within and between warps. In at least one embodiment, execution state is maintained for each individual thread and threads executing same instructions may be converged and executed in parallel for better efficiency. At least one embodiment of SM 4214 are described in more detail herein.

In at least one embodiment, MMU 4218 provides an interface between GPC 4200 and memory partition unit (e.g., partition unit 4122 of FIG. 41) and MMU 4218 provides translation of virtual addresses into physical addresses, memory protection, and arbitration of memory requests. In at least one embodiment, MMU 4218 provides one or more translation lookaside buffers ("TLBs") for performing translation of virtual addresses into physical addresses in memory.

In at least one embodiment, processors or processor components in FIG. 42 can be integrated into or included in computing environment 100 (FIG. 1) and computing environment 200 (FIG. 2). In at least one embodiment, processors or processor components in FIG. 42 can include or communicate with controller 205 illustrated in FIG. 3. In at least one embodiment, processors or processor components in FIG. 42 can perform processes 400 and 500 (FIGS. 4 and 5). In at least one embodiment, processors or processor components in FIG. 42 can call or perform part or all of APIs disclosed in FIGS. 6-17. In at least one embodiment, processors or processor components in FIG. 42 can perform examples in FIGS. 18 and 19.

Figure 43:
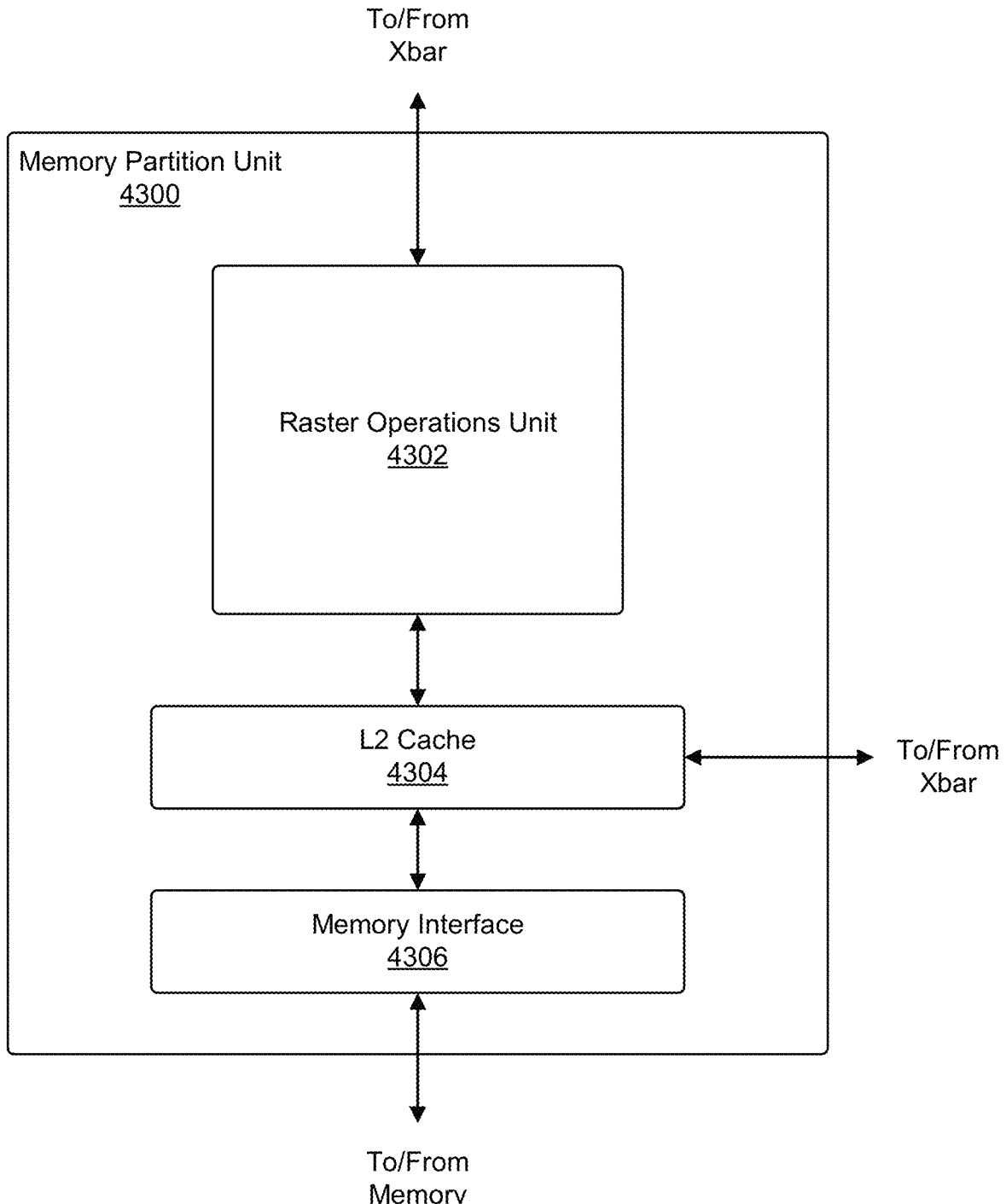
FIG. 43 illustrates a memory partition unit of a parallel processing unit ("PPU"), according to at least one embodiment.

FIG. 43 illustrates a memory partition unit 4300 of a parallel processing unit ("PPU"), in accordance with at least one embodiment. In at least one embodiment, memory partition unit 4300 includes, without limitation, a Raster Operations ("ROP") unit 4302; a level two ("L2") cache 4304; a memory interface 4306; and any suitable combination thereof. In at least one embodiment, memory interface 4306 is coupled to memory. In at least one embodiment, memory interface 4306 may implement 32, 64, 128, 1024-bit data buses, or like, for high-speed data transfer. In at least one embodiment, PPU incorporates U memory interfaces 4306, one memory interface 4306 per pair of partition units 4300, where each pair of partition units 4300 is connected to a corresponding memory device. For example, in at least one embodiment, PPU may be connected to up to Y memory devices, such as high bandwidth memory stacks or graphics double-data-rate, version 5, synchronous dynamic random access memory ("GDDR5 SDRAM").

In at least one embodiment, memory interface 4306 implements a high bandwidth memory second generation ("HBM2") memory interface and Y equals half U. In at least one embodiment, HBM2 memory stacks are located on same physical package as PPU, providing substantial power and area savings compared with conventional GDDR5 SDRAM systems. In at least one embodiment, each HBM2 stack includes, without limitation, four memory dies and Y equals 4, with each HBM2 stack including two 128-bit channels per die for a total of 8 channels and a data bus width of 1024 bits. In at least one embodiment, memory supports Single-Error Correcting Double-Error Detecting ("SECDED") Error Correction Code ("ECC") to protect data. ECC provides higher reliability for compute applications that are sensitive to data corruption.

In at least one embodiment, PPU implements a multi-level memory hierarchy. In at least one embodiment, memory partition unit 4300 supports a unified memory to provide a single unified virtual address space for central processing unit ("CPU") and PPU memory, enabling data sharing between virtual memory systems. In at least one embodiment frequency of accesses by a PPU to memory located on other processors is traced to ensure that memory pages are moved to physical memory of PPU that is accessing pages more frequently. In at least one embodiment, high-speed GPU interconnect 4108 supports address translation services allowing PPU to directly access a CPU's page tables and providing full access to CPU memory by PPU.

In at least one embodiment, copy engines transfer data between multiple PPUs or between PPUs and CPUs. In at least one embodiment, copy engines can generate page faults for addresses that are not mapped into page tables and memory partition unit 4300 then services page faults, mapping addresses into page table, after which copy engine performs transfer. In at least one embodiment, memory is pinned (i.e., non-pageable) for multiple copy engine operations between multiple processors, substantially reducing available memory. In at least one embodiment, with hardware page faulting, addresses can be passed to copy engines without regard as to whether memory pages are resident, and copy process is transparent.

Data from memory 4104 of FIG. 41 or other system memory is fetched by memory partition unit 4300 and stored in L2 cache 4304, which is located on-chip and is shared between various GPCs, in accordance with at least one embodiment. Each memory partition unit 4300, in at least one embodiment, includes, without limitation, at least a portion of L2 cache associated with a corresponding memory device. In at least one embodiment, lower level caches are implemented in various units within GPCs. In at least one embodiment, each of SMs 4214 may implement a level one ("L1") cache wherein L1 cache is private memory that is dedicated to a particular SM 4214 and data from L2 cache 4304 is fetched and stored in each of L1 caches for processing in functional units of SMs 4214. In at least one embodiment, L2 cache 4304 is coupled to memory interface 4306 and XBar 4120.

ROP unit 4302 performs graphics raster operations related to pixel color, such as color compression, pixel blending, and more, in at least one embodiment. ROP unit 4302, in at least one embodiment, implements depth testing in conjunction with raster engine 4208, receiving a depth for a sample location associated with a pixel fragment from culling engine of raster engine 4208. In at least one embodiment, depth is tested against a corresponding depth in a depth buffer for a sample location associated with fragment. In at least one embodiment, if fragment passes depth test for sample location, then ROP unit 4302 updates depth buffer and transmits a result of depth test to raster engine 4208. It will be appreciated that number of partition units 4300 may be different than number of GPCs and, therefore, each ROP unit 4302 can, in at least one embodiment, be coupled to each of GPCs. In at least one embodiment, ROP unit 4302 tracks packets received from different GPCs and determines which that a result generated by ROP unit 4302 is routed to through XBar 4120.

Figure 44:
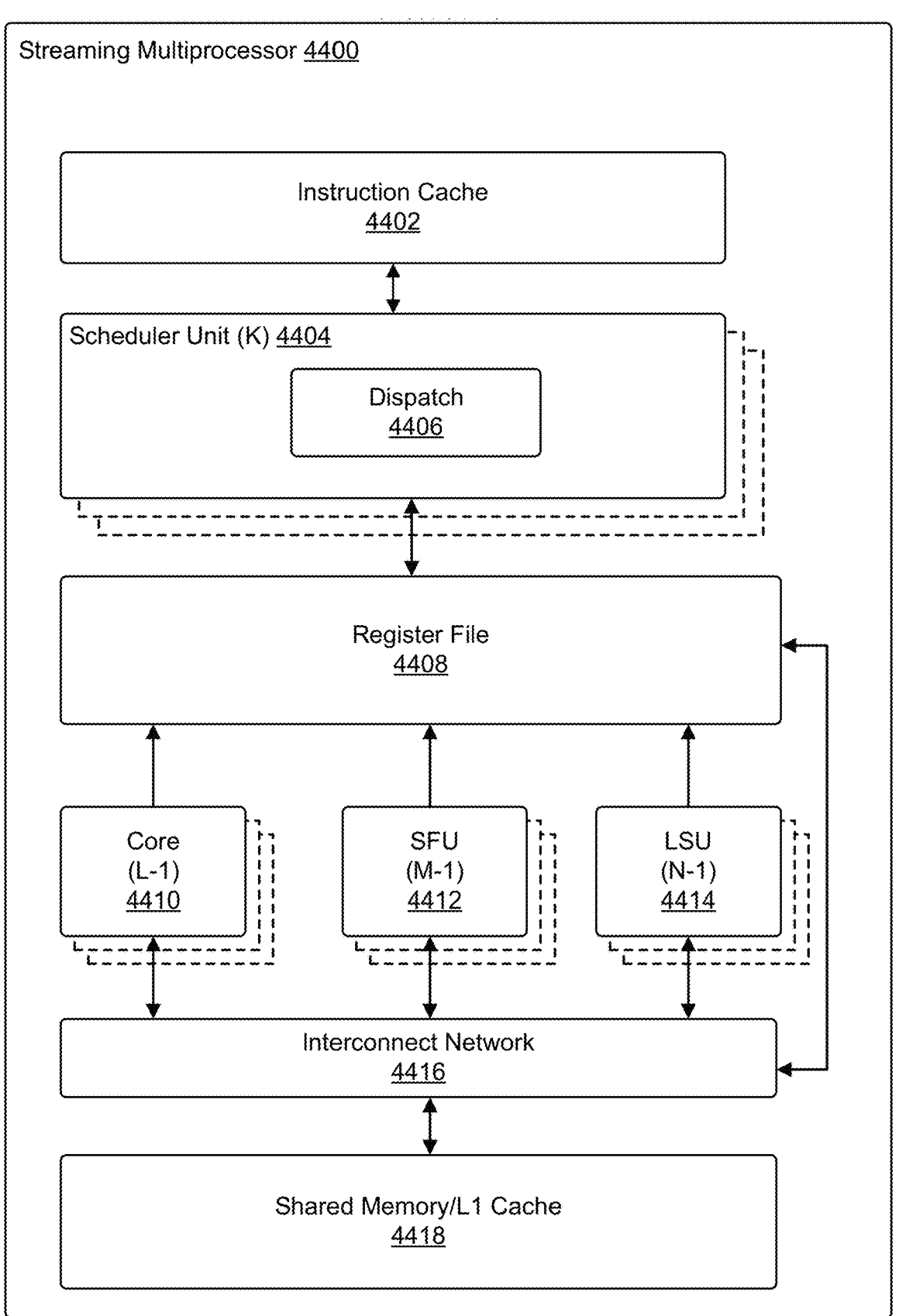
FIG. 44 illustrates a streaming multi-processor, according to at least one embodiment.

FIG. 44 illustrates a streaming multi-processor ("SM") 4400, according to at least one embodiment. In at least one embodiment, SM 4400 is SM of FIG. 42. In at least one embodiment, SM 4400 includes, without limitation, an instruction cache 4402; one or more scheduler units 4404; a register file 4408; one or more processing cores ("cores") 4410; one or more special function units ("SFUs") 4412; one or more load/store units ("LSUs") 4414; an interconnect network 4416; a shared memory/level one ("L1") cache 4418; and any suitable combination thereof. In at least one embodiment, a work distribution unit dispatches tasks for execution on general processing clusters ("GPCs") of parallel processing units ("PPUs") and each task is allocated to a particular Data Processing Cluster ("DPC") within a GPC and, if task is associated with a shader program, task is allocated to one of SMs 4400. In at least one embodiment, scheduler unit 4404 receives tasks from work distribution unit and manages instruction scheduling for one or more thread blocks assigned to SM 4400. In at least one embodiment, scheduler unit 4404 schedules thread blocks for execution as warps of parallel threads, wherein each thread block is allocated at least one warp. In at least one embodiment, each warp executes threads. In at least one embodiment, scheduler unit 4404 manages a plurality of different thread blocks, allocating warps to different thread blocks and then dispatching instructions from plurality of different cooperative groups to various functional units (e.g., processing cores 4410, SFUs 4412, and LSUs 4414) during each clock cycle.

In at least one embodiment, Cooperative Groups may refer to a programming model for organizing groups of communicating threads that allows developers to express granularity at which threads are communicating, enabling expression of richer, more efficient parallel decompositions. In at least one embodiment, cooperative launch APIs support synchronization amongst thread blocks for execution of parallel algorithms. In at least one embodiment, applications of conventional programming models provide a single, simple construct for synchronizing cooperating threads: a barrier across all threads of a thread block (e.g., syncthreads( ) function). However, in at least one embodiment, programmers may define groups of threads at smaller than thread block granularities and synchronize within defined groups to enable greater performance, design flexibility, and software reuse in form of collective group-wide function interfaces. In at least one embodiment, Cooperative Groups enables programmers to define groups of threads explicitly at sub-block (i.e., as small as a single thread) and multi-block granularities, and to perform collective operations such as synchronization on threads in a cooperative group. In at least one embodiment, programming model supports clean composition across software boundaries, so that libraries and utility functions can synchronize safely within their local context without having to make assumptions about convergence. In at least one embodiment, Cooperative Groups primitives enable new patterns of cooperative parallelism, including, without limitation, producer-consumer parallelism, opportunistic parallelism, and global synchronization across an entire grid of thread blocks.

In at least one embodiment, a dispatch unit 4406 is configured to transmit instructions to one or more of functional units and scheduler unit 4404 includes, without limitation, two dispatch units 4406 that enable two different instructions from same warp to be dispatched during each clock cycle. In at least one embodiment, each scheduler unit 4404 includes a single dispatch unit 4406 or additional dispatch units 4406.

In at least one embodiment, each SM 4400, in at least one embodiment, includes, without limitation, register file 4408 that provides a set of registers for functional units of SM 4400. In at least one embodiment, register file 4408 is divided between each of functional units such that each functional unit is allocated a dedicated portion of register file 4408. In at least one embodiment, register file 4408 is divided between different warps being executed by SM 4400 and register file 4408 provides temporary storage for operands connected to data paths of functional units. In at least one embodiment, each SM 4400 comprises, without limitation, a plurality of L processing cores 4410. In at least one embodiment, SM 4400 includes, without limitation, a large number (e.g., 128 or more) of distinct processing cores 4410. In at least one embodiment, each processing core 4410, in at least one embodiment, includes, without limitation, a fully-pipelined, single-precision, double-precision, and/or mixed precision processing unit that includes, without limitation, a floating point arithmetic logic unit and an integer arithmetic logic unit. In at least one embodiment, floating point arithmetic logic units implement IEEE 754-2008 standard for floating point arithmetic. In at least one embodiment, processing cores 4410 include, without limitation, 64 single-precision (32-bit) floating point cores, 64 integer cores, 32 double-precision (64-bit) floating point cores, and 8 tensor cores.

Tensor cores are configured to perform matrix operations in accordance with at least one embodiment. In at least one embodiment, one or more tensor cores are included in processing cores 4410. In at least one embodiment, tensor cores are configured to perform deep learning matrix arithmetic, such as convolution operations for neural network training and inferencing. In at least one embodiment, each tensor core operates on a 4×4 matrix and performs a matrix multiply and accumulate operation D=A×B+C, where A, B, C, and D are 4×4 matrices.

In at least one embodiment, matrix multiply inputs A and B are 16-bit floating point matrices and accumulation matrices C and D are 16-bit floating point or 32-bit floating point matrices. In at least one embodiment, tensor cores operate on 16-bit floating point input data with 32-bit floating point accumulation. In at least one embodiment, 16-bit floating point multiply uses 64 operations and results in a full precision product that is then accumulated using 32-bit floating point addition with other intermediate products for a 4×4×4 matrix multiply. Tensor cores are used to perform much larger two-dimensional or higher dimensional matrix operations, built up from these smaller elements, in at least one embodiment. In at least one embodiment, an API, such as CUDA 9 C++ API, exposes specialized matrix load, matrix multiply and accumulate, and matrix store operations to efficiently use tensor cores from a CUDA-C++ program. In at least one embodiment, at CUDA level, warp-level interface assumes 16×16 size matrices spanning all 32 threads of warp.

In at least one embodiment, each SM 4400 comprises, without limitation, M SFUs 4412 that perform special functions (e.g., attribute evaluation, reciprocal square root, and like). In at least one embodiment, SFUs 4412 include, without limitation, a tree traversal unit configured to traverse a hierarchical tree data structure. In at least one embodiment, SFUs 4412 include, without limitation, a texture unit configured to perform texture map filtering operations. In at least one embodiment, texture units are configured to load texture maps (e.g., a 2D array of texels) from memory and sample texture maps to produce sampled texture values for use in shader programs executed by SM 4400. In at least one embodiment, texture maps are stored in shared memory/L1 cache 4418. In at least one embodiment, texture units implement texture operations such as filtering operations using mip-maps (e.g., texture maps of varying levels of detail), in accordance with at least one embodiment. In at least one embodiment, each SM 4400 includes, without limitation, two texture units.

Each SM 4400 comprises, without limitation, N LSUs 4414 that implement load and store operations between shared memory/L1 cache 4418 and register file 4408, in at least one embodiment. Each SM 4400 includes, without limitation, interconnect network 4416 that connects each of functional units to register file 4408 and LSU 4414 to register file 4408 and shared memory/L1 cache 4418 in at least one embodiment. In at least one embodiment, interconnect network 4416 is a crossbar that can be configured to connect any of functional units to any of registers in register file 4408 and connect LSUs 4414 to register file 4408 and memory locations in shared memory/L1 cache 4418.

In at least one embodiment, shared memory/L1 cache 4418 is an array of on-chip memory that allows for data storage and communication between SM 4400 and primitive engine and between threads in SM 4400, in at least one embodiment. In at least one embodiment, shared memory/ L1 cache 4418 comprises, without limitation, 128 KB of storage capacity and is in path from SM 4400 to partition unit. In at least one embodiment, shared memory/L1 cache 4418, in at least one embodiment, is used to cache reads and writes. In at least one embodiment, one or more of shared memory/L1 cache 4418, L2 cache, and memory are backing stores.

Combining data cache and shared memory functionality into a single memory block provides improved performance for both types of memory accesses, in at least one embodiment. In at least one embodiment, capacity is used or is usable as a cache by programs that do not use shared memory, such as if shared memory is configured to use half of capacity, texture and load/store operations can use remaining capacity. Integration within shared memory/L1 cache 4418 enables shared memory/L1 cache 4418 to function as a high-throughput conduit for streaming data while simultaneously providing high-bandwidth and low-latency access to frequently reused data, in accordance with at least one embodiment. In at least one embodiment, when configured for general purpose parallel computation, a simpler configuration can be used compared with graphics processing. In at least one embodiment, fixed function graphics processing units are bypassed, creating a much simpler programming model. In general purpose parallel computation configuration, work distribution unit assigns and distributes blocks of threads directly to DPCs, in at least one embodiment. In at least one embodiment, threads in a block execute same program, using a unique thread ID in calculation to ensure each thread generates unique results, using SM 4400 to execute program and perform calculations, shared memory/L1 cache 4418 to communicate between threads, and LSU 4414 to read and write global memory through shared memory/L1 cache 4418 and memory partition unit. In at least one embodiment, when configured for general purpose parallel computation, SM 4400 writes commands that scheduler unit 4404 can use to launch new work on DPCs.

In at least one embodiment, PPU is included in or coupled to a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, and more. In at least one embodiment, PPU is embodied on a single semiconductor substrate. In at least one embodiment, PPU is included in a system-on-a-chip ("SoC") along with one or more other devices such as additional PPUs, memory, a reduced instruction set computer ("RISC") CPU, a memory management unit ("MMU"), a digital-to-analog converter ("DAC"), and like. In at least one embodiment, PPU may be included on a graphics card that includes one or more memory devices. In at least one embodiment, graphics card may be configured to interface with a PCIe slot on a motherboard of a desktop computer. In at least one embodiment, PPU may be an integrated graphics processing unit ("iGPU") included in chipset of motherboard.

In at least one embodiment, processors or processor components in FIG. 44 can be integrated into or included in computing environment 100 (FIG. 1) and computing environment 200 (FIG. 2). In at least one embodiment, processors or processor components in FIG. 44 can include or communicate with controller 205 illustrated in FIG. 3. In at least one embodiment, processors or processor components in FIG. 44 can perform processes 400 and 500 (FIGS. 4 and 5). In at least one embodiment, processors or processor components in FIG. 42 can call or perform part or all of APIs disclosed in FIGS. 6-17. In at least one embodiment, processors or processor components in FIG. 44 can perform examples in FIGS. 18 and 19.

In at least one embodiment, a single semiconductor platform may refer to a sole unitary semiconductor-based integrated circuit or chip. In at least one embodiment, multi-chip modules may be used with increased connectivity which simulate on-chip operation, and make substantial improvements over utilizing a conventional central processing unit ("CPU") and bus implementation. In at least one embodiment, various modules may also be situated separately or in various combinations of semiconductor platforms per desires of user.

In at least one embodiment, computer programs in form of machine-readable executable code or computer control logic algorithms are stored in main memory 2404 and/or secondary storage. Computer programs, if executed by one or more processors, enable system 2400 to perform various functions in accordance with at least one embodiment. In at least one embodiment, memory 2404, storage, and/or any other storage are possible examples of computer-readable media. In at least one embodiment, secondary storage may refer to any suitable storage device or system such as a hard disk drive and/or a removable storage drive, representing a floppy disk drive, a magnetic tape drive, a compact disk drive, digital versatile disk ("DVD") drive, recording device, universal serial bus ("USB") flash memory, etc. In at least one embodiment, architecture and/or functionality of various previous figures are implemented in context of CPU 2402; parallel processing system 2412; an integrated circuit capable of at least a portion of capabilities of both CPU 2402; parallel processing system 2412; a chipset (e.g., a group of integrated circuits designed to work and sold as a unit for performing related functions, etc.); and any suitable combination of integrated circuit(s).

In at least one embodiment, architecture and/or functionality of various previous figures are implemented in context of a general computer system, a circuit board system, a game console system dedicated for entertainment purposes, an application-specific system, and more. In at least one embodiment, computer system 2400 may take form of a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, a mobile phone device, a television, workstation, game consoles, embedded system, and/or any other type of logic.

In at least one embodiment, parallel processing system 2412 includes, without limitation, a plurality of parallel processing units ("PPUs") 2414 and associated memories 2416. In at least one embodiment, PPUs 2414 are connected to a host processor or other peripheral devices via an interconnect 2418 and a switch 2420 or multiplexer. In at least one embodiment, parallel processing system 2412 distributes computational tasks across PPUs 2414 which can be parallelizable for example, as part of distribution of computational tasks across multiple graphics processing unit ("GPU") thread blocks. In at least one embodiment, memory is shared and accessible (e.g., for read and/or write access) across some or all of PPUs 2414, although such shared memory may incur performance penalties relative to use of local memory and registers resident to a PPU 2414. In at least one embodiment, operation of PPUs 2414 is synchronized through use of a command such as syncthreads( ), wherein all threads in a block (e.g., executed across multiple PPUs 2414) to reach a certain point of execution of code before proceeding.

Networks

Figure 45:
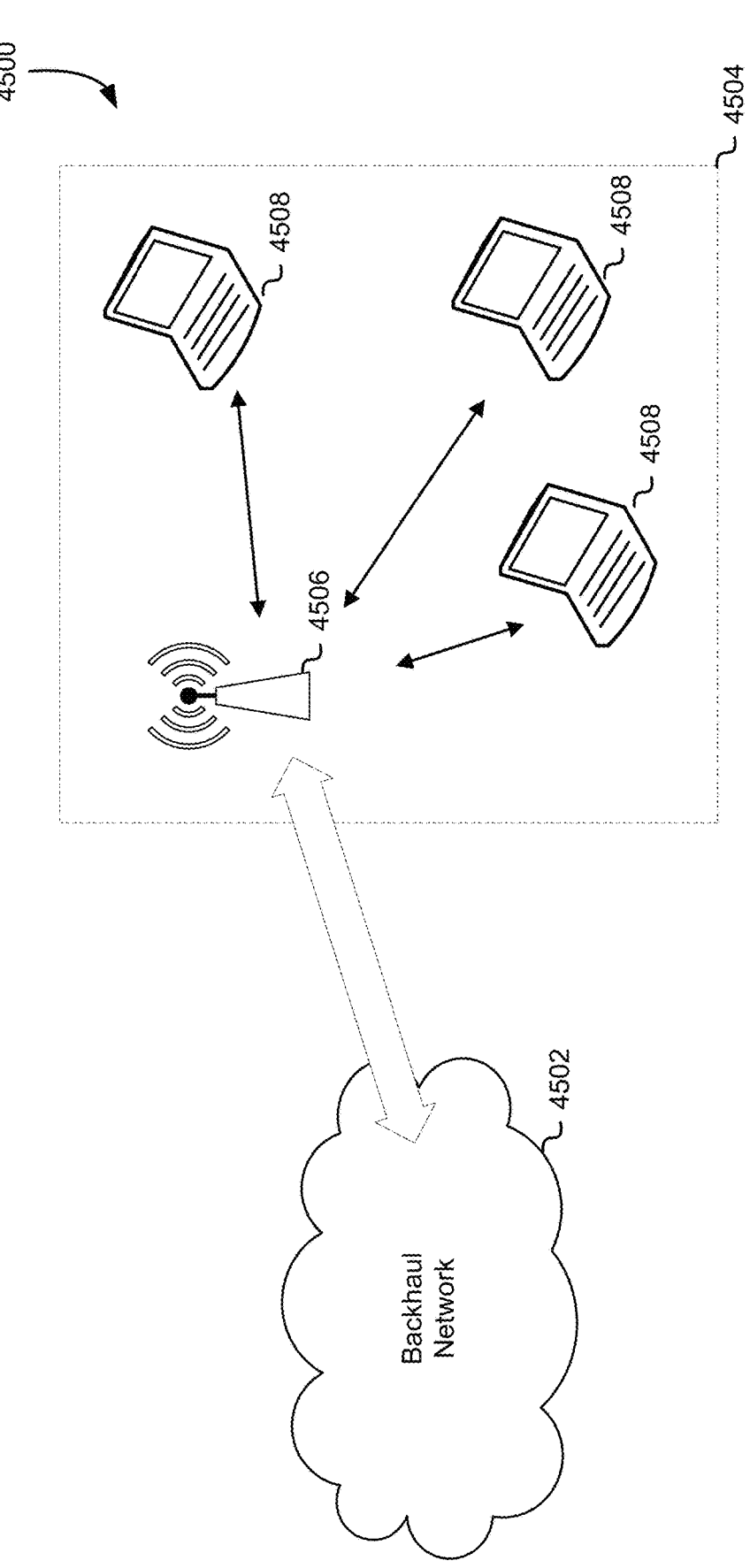
FIG. 45 illustrates a network for communicating data within a 5G wireless communications network, according to at least one embodiment.

FIG. 45 illustrates a network 4500 for communicating data within a 5G wireless communications network, in accordance with at least one embodiment. In at least one embodiment, network 4500 comprises a base station 4506 having a coverage area 4504, a plurality of mobile devices 4508, and a backhaul network 4502. In at least one embodiment, as shown, base station 4506 establishes uplink and/or downlink connections with mobile devices 4508, which serve to carry data from mobile devices 4508 to base station 4506 and vice-versa. In at least one embodiment, data carried over uplink/downlink connections may include data communicated between mobile devices 4508, as well as data communicated to/from a remote-end (not shown) by way of backhaul network 4502. In at least one embodiment, term "base station" refers to any component (or collection of components) configured to provide wireless access to a network, such as an enhanced base station (eNB), a macrocell, a femtocell, a Wi-Fi access point (AP), or other wirelessly enabled devices. In at least one embodiment, base stations may provide wireless access in accordance with one or more wireless communication protocols, e.g., long term evolution (LTE), LTE advanced (LTE-A), High Speed Packet Access (HSPA), Wi-Fi 802.11 a/b/g/n/ac, etc. In at least one embodiment, term "mobile device" refers to any component (or collection of components) capable of establishing a wireless connection with a base station, such as a user equipment (UE), a mobile station (STA), and other wirelessly enabled devices. In some embodiments, network 4500 may comprise various other wireless devices, such as relays, low power nodes, etc.

In at least one embodiment, components in FIG. 45 can be integrated into or included in computing environment 100 (FIG. 1) and computing environment 200 (FIG. 2). In at least one embodiment, components in FIG. 45 can include or communicate with controller 205 illustrated in FIG. 3. In at least one embodiment, components in FIG. 45 can perform processes 400 and 500 (FIGS. 4 and 5). In at least one embodiment, components in FIG. 45 can call or perform part or all of APIs disclosed in FIGS. 6-17. In at least one embodiment, components in FIG. 45 can perform examples in FIGS. 18 and 19.

Figure 46:
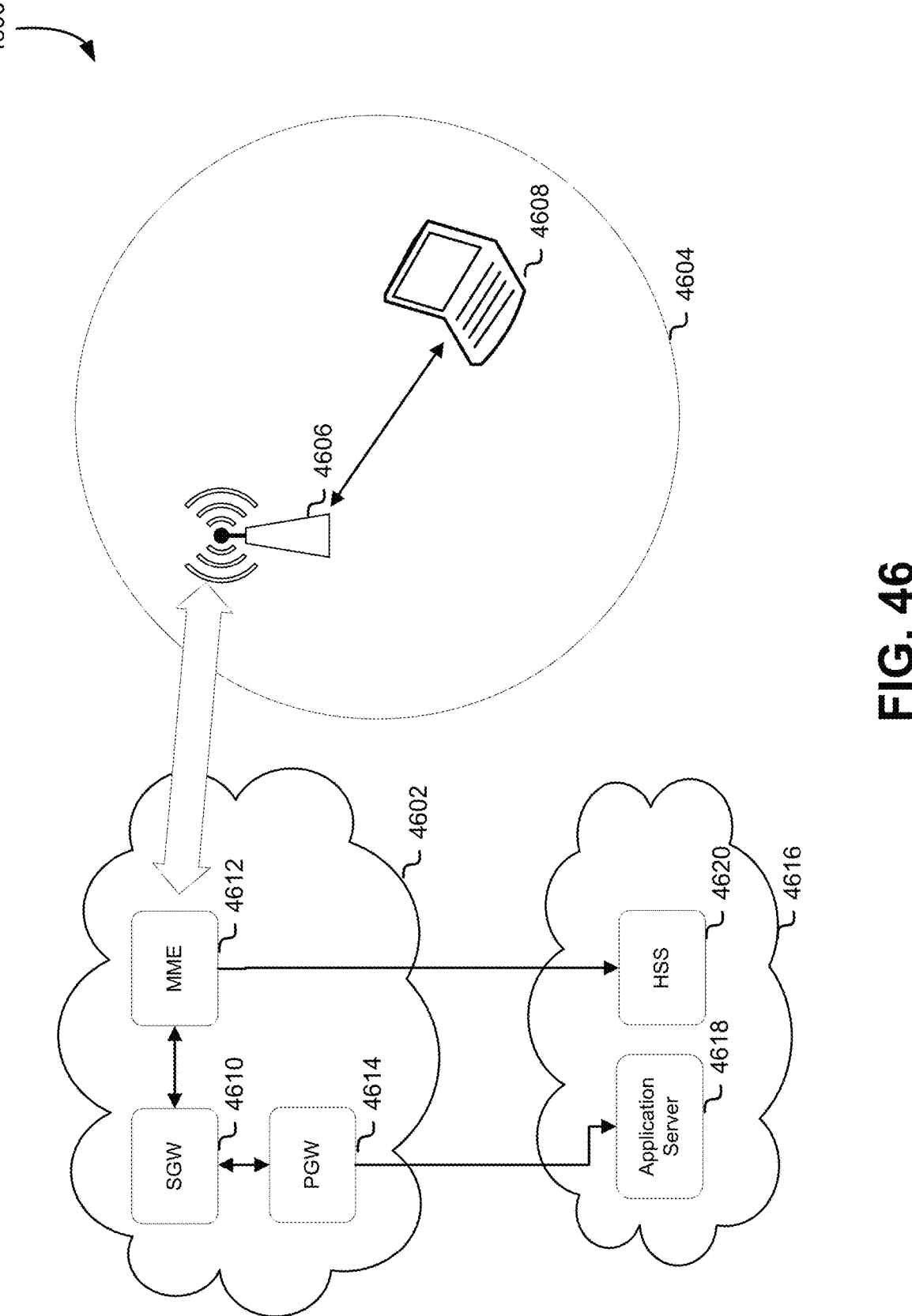
FIG. 46 illustrates a network architecture for a 5G LTE wireless network, according to at least one embodiment.

FIG. 46 illustrates a network architecture 4600 for a 5G wireless network, in accordance with at least one embodiment. In at least one embodiment, as shown, network architecture 4600 includes a radio access network (RAN) 4604, an evolved packet core (EPC) 4602, which may be referred to as a core network, and a home network 4616 of a UE 4608 attempting to access RAN 4604. In at least one embodiment, RAN 4604 and EPC 4602 form a serving wireless network. In at least one embodiment, RAN 4604 includes a base station 4606, and EPC 4602 includes a mobility management entity (MME) 4612, a serving gateway (SGW) 4610, and a packet data network (PDN) gateway (PGW) 4614. In at least one embodiment, home network 4616 includes an application server 4618 and a home subscriber server (HSS) 4620. In at least one embodiment, HSS 4620 may be part of home network 4616, EPC 4602, and/or variations thereof.

In at least one embodiment, MME 4612 is a termination point in a network for ciphering/integrity protection for NAS signaling and handles security key management. In at least one embodiment, it should be appreciated that term "MME" is used in 4G LTE networks, and that 5G LTE networks may include a Security Anchor Node (SEAN) or a Security Access Function (SEAF) that performs similar functions. In at least one embodiment, terms "MME," "SEAN," and "SEAF" may be used interchangeably. In at least one embodiment, MME 4612 also provides control plane function for mobility between LTE and 2G/3G access networks, as well as an interface to home networks of roaming UEs. In at least one embodiment, SGW 4610 routes and forwards user data packets, while also acting as a mobility anchor for a user plane during handovers. In at least one embodiment, PGW 4614 provides connectivity from UEs to external packet data networks by being a point of exit and entry of traffic for UEs. In at least one embodiment, HSS 4620 is a central database that contains user-related and subscription-related information. In at least one embodiment, application server 4618 is a central database that contains user-related information regarding various applications that may utilize and communicate via network architecture 4600.

In at least one embodiment, components in FIG. 46 can be integrated into or included in computing environment 100 (FIG. 1) and computing environment 200 (FIG. 2). In at least one embodiment, components in FIG. 46 can include or communicate with controller 205 illustrated in FIG. 3. In at least one embodiment, components in FIG. 46 can perform processes 400 and 500 (FIGS. 4 and 5). In at least one embodiment, components in FIG. 46 can call or perform part or all of APIs disclosed in FIGS. 6-17. In at least one embodiment, components in FIG. 46 can perform examples in FIGS. 18 and 19.

Figure 47:
FIG. 47 is a diagram illustrating some basic functionality of a mobile telecommunications network/system operating in accordance with LTE and 5G principles, according to at least one embodiment.

FIG. 47 is a diagram illustrating some basic functionality of a mobile telecommunications network/system operating in accordance with LTE and 5G principles, in accordance with at least one embodiment. In at least one embodiment, a mobile telecommunications system 4700 includes infrastructure equipment comprising base stations 4714 which are connected to a core network 4702, which operates in accordance with a conventional arrangement which will be understood by those acquainted with communications technology. In at least one embodiment, infrastructure equipment 4714 may also be referred to as a base station, network element, enhanced NodeB (eNodeB) or a coordinating entity for example, and provides a wireless access interface to one or more communications devices within a coverage area or cell represented by a broken line 4704, which may be referred to as a radio access network. In at least one embodiment, one or more mobile communications devices 4706 may communicate data via transmission and reception of signals representing data using a wireless access interface. In at least one embodiment, core network 4702 may also provide functionality including authentication, mobility management, charging and so on for communications devices served by a network entity.

In at least one embodiment, mobile communications devices of FIG. 47 may also be referred to as communications terminals, user equipment (UE), terminal devices and so forth, and are configured to communicate with one or more other communications devices served by a same or a different coverage area via a network entity. In at least one embodiment, these communications may be performed by transmitting and receiving signals representing data using a wireless access interface over two way communications links.

In at least one embodiment, as shown in FIG. 47, one of eNodeBs 4714a is shown in more detail to include a transmitter 4712 for transmitting signals via a wireless access interface to one or more communications devices or UEs 4706, and a receiver 4710 to receive signals from one or more UEs within coverage area 4704. In at least one embodiment, controller 4708 controls transmitter 4712 and receiver 4710 to transmit and receive signals via a wireless access interface. In at least one embodiment, controller 4708 may perform a function of controlling allocation of communications resource elements of a wireless access interface and may in some examples include a scheduler for scheduling transmissions via a wireless access interface for both uplink and downlink.

In at least one embodiment, an example UE 4706a is shown in more detail to include a transmitter 4720 for transmitting signals on an uplink of a wireless access interface to eNodeB 4714 and a receiver 4718 for receiving signals transmitted by eNodeB 4714 on a downlink via a wireless access interface. In at least one embodiment, transmitter 4720 and receiver 4718 are controlled by a controller 4716.

In at least one embodiment, components in FIG. 47 can be integrated into or included in computing environment 100 (FIG. 1) and computing environment 200 (FIG. 2). In at least one embodiment, components in FIG. 47 can include or communicate with controller 205 illustrated in FIG. 3. In at least one embodiment, components in FIG. 47 can perform processes 400 and 500 (FIGS. 4 and 5). In at least one embodiment, components in FIG. 47 can call or perform part or all of APIs disclosed in FIGS. 6-17. In at least one embodiment, components in FIG. 47 can perform examples in FIGS. 18 and 19.

Figure 48:
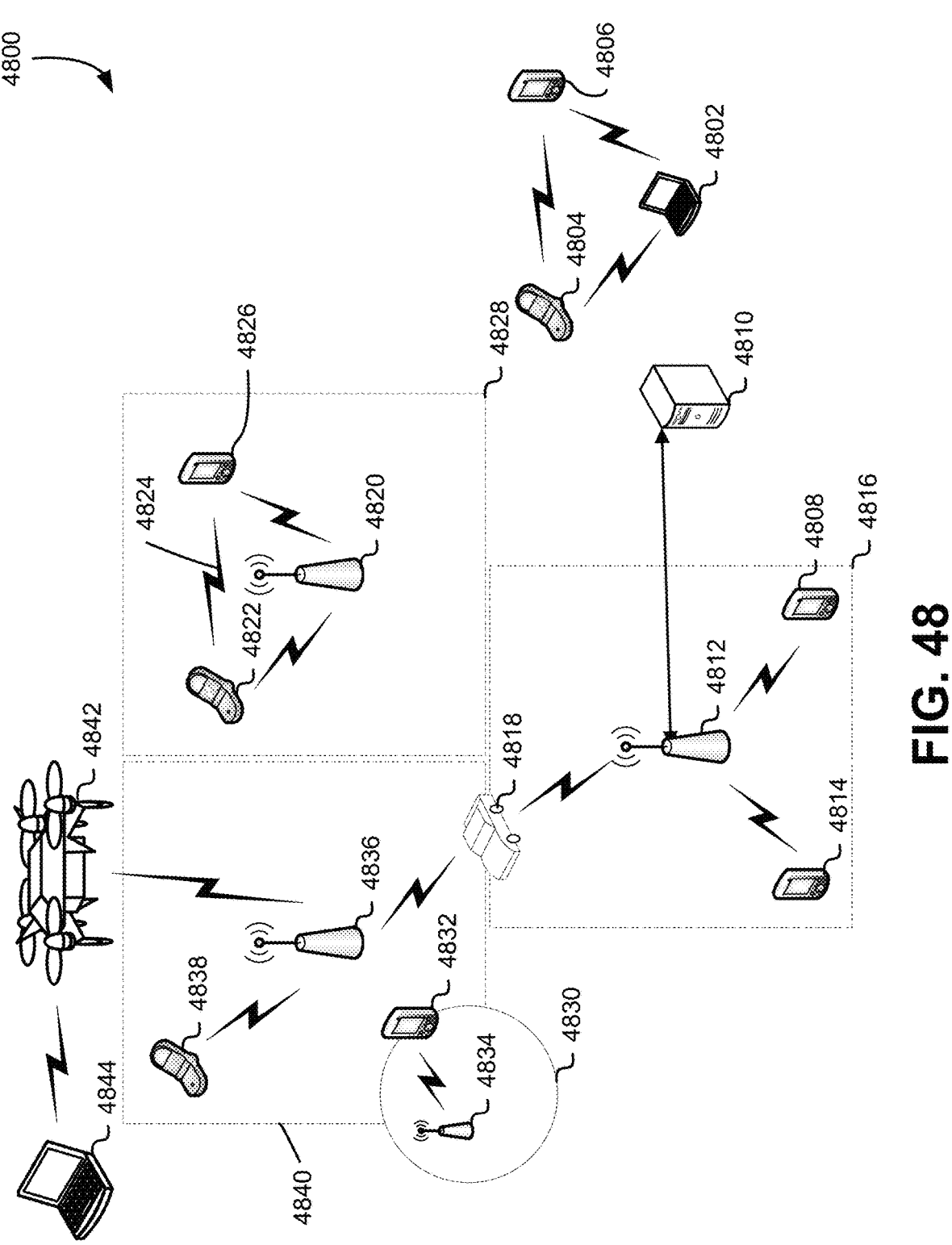
FIG. 48 illustrates a radio access network which may be part of a 5G network architecture, according to at least one embodiment.

FIG. 48 illustrates a radio access network 4800, which may be part of a 5G network architecture, in accordance with at least one embodiment. In at least one embodiment, radio access network 4800 covers a geographic region divided into a number of cellular regions (cells) that can be uniquely identified by a user equipment (UE) based on an identification broadcasted over a geographical area from one access point or base station. In at least one embodiment, macrocells 4840, 4828, and 4816, and a small cell 4830, may include one or more sectors. In at least one embodiment, a sector is a sub-area of a cell and all sectors within one cell are served by a same base station. In at least one embodiment, a single logical identification belonging to that sector can identify a radio link within a sector. In at least one embodiment, multiple sectors within a cell can be formed by groups of antennas with each antenna responsible for communication with UEs in a portion of a cell.

In at least one embodiment, each cell is served by a base station (BS). In at least one embodiment, a base station is a network element in a radio access network responsible for radio transmission and reception in one or more cells to or from a UE. In at least one embodiment, a base station may also be referred to as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology. In at least one embodiment, base stations may include a backhaul interface for communication with a backhaul portion of a network. In at least one embodiment, a base station has an integrated antenna or is connected to an antenna or remote radio head (RRH) by feeder cables.

In at least one embodiment, a backhaul may provide a link between a base station and a core network, and in some examples, a backhaul may provide interconnection between respective base stations. In at least one embodiment, a core network is a part of a wireless communication system that is generally independent of radio access technology used in a radio access network. In at least one embodiment, various types of backhaul interfaces, such as a direct physical connection, a virtual network, or like using any suitable transport network, may be employed. In at least one embodiment, some base stations may be configured as integrated access and backhaul (IAB) nodes, where a wireless spectrum may be used both for access links (i.e., wireless links with UEs), and for backhaul links, which is sometimes referred to as wireless self-backhauling. In at least one embodiment, through wireless self-backhauling, a wireless spectrum utilized for communication between a base station and UE may be leveraged for backhaul communication, enabling fast and easy deployment of highly dense small cell networks, as opposed to requiring each new base station deployment to be outfitted with its own hard-wired backhaul connection.

In at least one embodiment, high-power base stations 4836 and 4820 are shown in cells 4840 and 4828, and a high-power base station 4810 is shown controlling a remote radio head (RRH) 4812 in cell 4816. In at least one embodiment, cells 4840, 4828, and 4816 may be referred to as large size cells or macrocells. In at least one embodiment, a low-power base station 4834 is shown in small cell 4830 (e.g., a microcell, picocell, femtocell, home base station, home Node B, home eNode B, etc.) which may overlap with one or more macrocells, and may be referred to as a small cell or small size cell. In at least one embodiment, cell sizing can be done according to system design as well as component constraints. In at least one embodiment, a relay node may be deployed to extend size or coverage area of a given cell. In at least one embodiment, radio access network 4800 may include any number of wireless base stations and cells. In at least one embodiment, base stations 4836, 4820, 4810, 4834 provide wireless access points to a core network for any number of mobile apparatuses.

In at least one embodiment, a quadcopter or drone 4842 may be configured to function as a base station. In at least one embodiment, a cell may not necessarily be stationary, and a geographic area of a cell may move according to a location of a mobile base station such as quadcopter 4842.

In at least one embodiment, radio access network 4800 supports wireless communications for multiple mobile apparatuses. In at least one embodiment, a mobile apparatus is commonly referred to as user equipment (UE), but may also be referred to as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In at least one embodiment, a UE may be an apparatus that provides a user with access to network services.

In at least one embodiment, a "mobile" apparatus need not necessarily have a capability to move and may be stationary. In at least one embodiment, mobile apparatus or mobile device broadly refers to a diverse array of devices and technologies. In at least one embodiment, a mobile apparatus may be a mobile, a cellular (cell) phone, a smart phone, a session initiation protocol (SIP) phone, a laptop, a personal computer (PC), a notebook, a netbook, a smartbook, a tablet, a personal digital assistant (PDA), a broad array of embedded systems, e.g., corresponding to an "Internet of things" (IoT), an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, a digital home or smart home device such as a home audio, video, and/or multimedia device, an appliance, a vending machine, intelligent lighting, a home security system, a smart meter, a security device, a solar panel or solar array, a municipal infrastructure device controlling electric power (e.g., a smart grid), lighting, water, etc., an industrial automation and enterprise device, a logistics controller, agricultural equipment, military defense equipment, vehicles, aircraft, ships, and weaponry, etc. In at least one embodiment, a mobile apparatus may provide for connected medicine or telemedicine support, i.e., health care at a distance. In at least one embodiment, telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

In at least one embodiment, cells of radio access network 4800 may include UEs that may be in communication with one or more sectors of each cell. In at least one embodiment, UEs 4814 and 4808 may be in communication with base station 4810 by way of RRH 4812; UEs 4822 and 4826 may be in communication with base station 4820; UE 4832 may be in communication with low-power base station 4834; UEs 4838 and 4818 may be in communication with base station 4836; and UE 4844 may be in communication with mobile base station 4842. In at least one embodiment, each base station 4810, 4820, 4834, 4836, and 4842 may be configured to provide an access point to a core network (not shown) for all UEs in respective cells and transmissions from a base station (e.g., base station 4836) to one or more UEs (e.g., UEs 4838 and 4818) may be referred to as downlink (DL) transmission, while transmissions from a UE (e.g., UE 4838) to a base station may be referred to as uplink (UL) transmissions. In at least one embodiment, downlink may refer to a point-to-multipoint transmission, which may be referred to as broadcast channel multiplexing. In at least one embodiment, uplink may refer to a point-to-point transmission.

In at least one embodiment, quadcopter 4842, which may be referred to as a mobile network node, may be configured to function as a UE within cell 4840 by communicating with base station 4836. In at least one embodiment, multiple UEs (e.g., UEs 4822 and 4826) may communicate with each other using peer to peer (P2P) or sidelink signals 4824, which may bypass a base station such as base station 4820.

In at least one embodiment, ability for a UE to communicate while moving, independent of its location, is referred to as mobility. In at least one embodiment, a mobility management entity (MME) sets up, maintains, and releases various physical channels between a UE and a radio access network. In at least one embodiment, DL-based mobility or UL-based mobility may be utilized by a radio access network 4800 to enable mobility and handovers (i.e., transfer of a UE's connection from one radio channel to another). In at least one embodiment, a UE, in a network configured for DL-based mobility, may monitor various parameters of a signal from its serving cell as well as various parameters of neighboring cells, and, depending on a quality of these parameters, a UE may maintain communication with one or more neighboring cells. In at least one embodiment, if signal quality from a neighboring cell exceeds that from a serving cell for a given amount of time, or if a UE moves from one cell to another, a UE may undertake a handoff or handover from a serving cell to a neighboring (target) cell. In at least one embodiment, UE 4818 (illustrated as a vehicle, although any suitable form of UE may be used) may move from a geographic area corresponding to a cell, such as serving cell 4840, to a geographic area corresponding to a neighbor cell, such as neighbor cell 4816. In at least one embodiment, UE 4818 may transmit a reporting message to its serving base station 4836 indicating its condition when signal strength or quality from a neighbor cell 4816 exceeds that of its serving cell 4840 for a given amount of time. In at least one embodiment, UE 4818 may receive a handover command, and may undergo a handover to cell 4816.

In at least one embodiment, UL reference signals from each UE may be utilized by a network configured for UL-based mobility to select a serving cell for each UE. In at least one embodiment, base stations 4836, 4820, and 4810/4812 may broadcast unified synchronization signals (e.g., unified Primary Synchronization Signals (PSSs), unified Secondary Synchronization Signals (SSSs) and unified Physical Broadcast Channels (PBCH)). In at least one embodiment, UEs 4838, 4818, 4822, 4826, 4814, and 4808 may receive unified synchronization signals, derive a carrier frequency and slot timing from synchronization signals, and in response to deriving timing, transmit an uplink pilot or reference signal. In at least one embodiment, two or more cells (e.g., base stations 4836 and 4810/4812) within radio access network 4800 may concurrently receive an uplink pilot signal transmitted by a UE (e.g., UE 4818). In at least one embodiment, cells may measure a strength of a pilot signal, and a radio access network (e.g., one or more of base stations 4836 and 4810/4812 and/or a central node within a core network) may determine a serving cell for UE 4818. In at least one embodiment, a network may continue to monitor an uplink pilot signal transmitted by UE 4818 as UE 4818 moves through radio access network 4800. In at least one embodiment, a network 4800 may handover UE 4818 from a serving cell to a neighboring cell, with or without informing UE 4818, when a signal strength or quality of a pilot signal measured by a neighboring cell exceeds that of a signal strength or quality measured by a serving cell.

In at least one embodiment, synchronization signals transmitted by base stations 4836, 4820, and 4810/4812 may be unified, but may not identify a particular cell and rather may identify a zone of multiple cells operating on a same frequency and/or with a same timing. In at least one embodiment, zones in 5G networks or other next generation communication networks enable uplink-based mobility framework and improves efficiency of both a UE and a network, since amounts of mobility messages that need to be exchanged between a UE and a network may be reduced.

In at least one embodiment, air interface in a radio access network 4800 may utilize unlicensed spectrum, licensed spectrum, or shared spectrum. In at least one embodiment, unlicensed spectrum provides for shared use of a portion of a spectrum without need for a government-granted license, however, while compliance with some technical rules is generally still required to access an unlicensed spectrum, generally, any operator or device may gain access. In at least one embodiment, licensed spectrum provides for exclusive use of a portion of a spectrum, generally by virtue of a mobile network operator purchasing a license from a government regulatory body. In at least one embodiment, shared spectrum may fall between licensed and unlicensed spectrum, wherein technical rules or limitations may be required to access a spectrum, but a spectrum may still be shared by multiple operators and/or multiple RATs. In at least one embodiment, for example, a holder of a license for a portion of licensed spectrum may provide licensed shared access (LSA) to share that spectrum with other parties, e.g., with suitable licensee-determined conditions to gain access.

In at least one embodiment, components in FIG. 48 can be integrated into or included in computing environment 100 (FIG. 1) and computing environment 200 (FIG. 2). In at least one embodiment, components in FIG. 48 can include or communicate with controller 205 illustrated in FIG. 3. In at least one embodiment, components in FIG. 48 can perform processes 400 and 500 (FIGS. 4 and 5). In at least one embodiment, components in FIG. 48 can call or perform part or all of APIs disclosed in FIGS. 6-17. In at least one embodiment, components in FIG. 48 can perform examples in FIGS. 18 and 19.

Figure 49:
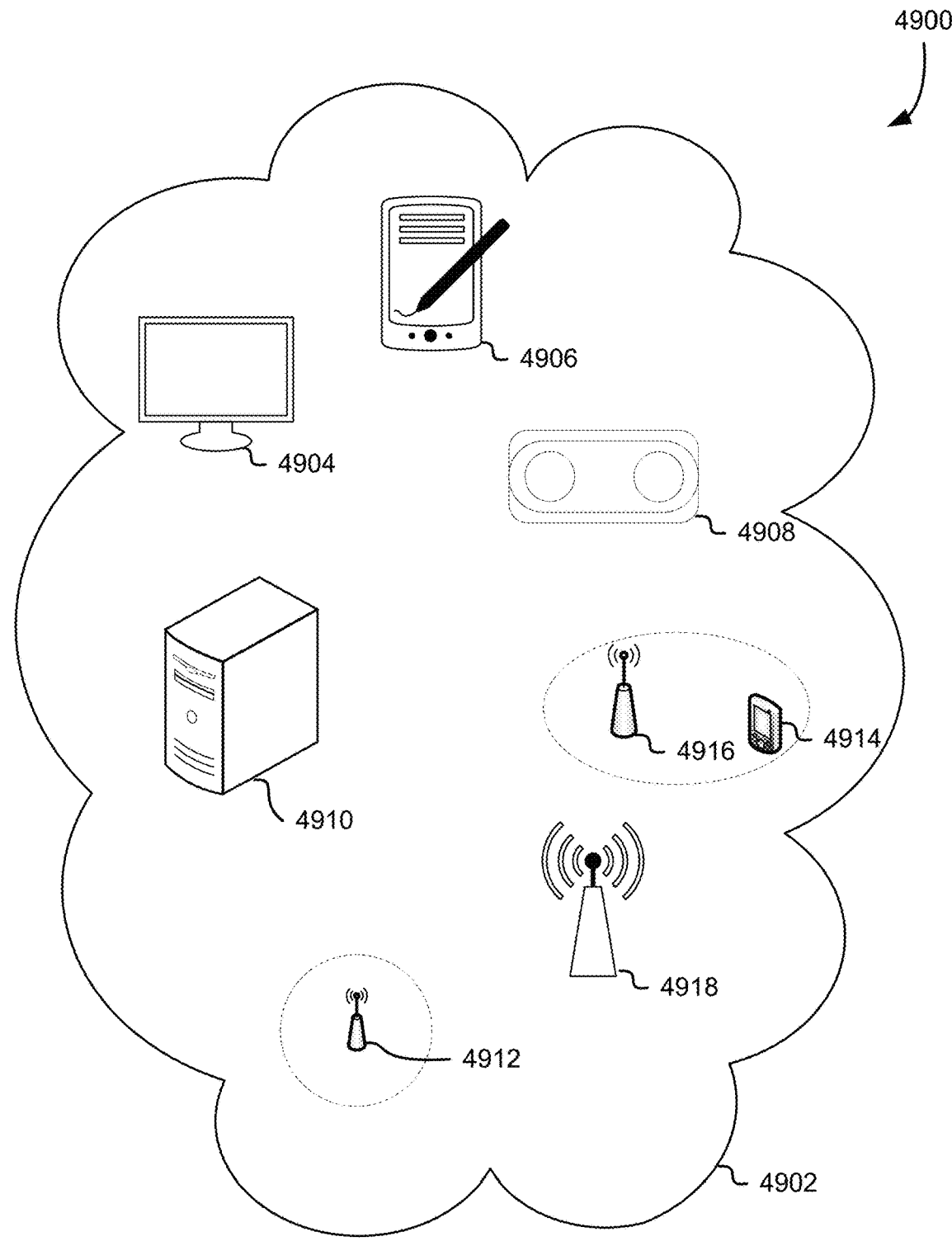
FIG. 49 provides an example illustration of a 5G mobile communications system in which a plurality of different types of devices is used, according to at least one embodiment.

FIG. 49 provides an example illustration of a 5G mobile communications system 4900 in which a plurality of different types of devices 4902 is used, in accordance with at least one embodiment. In at least one embodiment, as shown in FIG. 49, a first base station 4918 may be provided to a large cell or macro cell in which transmission of signals is over several kilometers. In at least one embodiment, however, system may also support transmission via a very small cell such as transmitted by a second infrastructure equipment 4916 which transmits and receives signals over a distance of hundreds of meters thereby forming a so called "Pico" cell. In at least one embodiment, a third type of infrastructure equipment 4912 may transmit and receive signals over a distance of tens of meters and therefore can be used to form a so called "Femto" cell.

In at least one embodiment, also shown in FIG. 49, different types of communications devices may be used to transmit and receive signals via different types of infrastructure equipment 4912, 4916, 4918 and communication of data may be adapted in accordance with different types of infrastructure equipment using different communications parameters. In at least one embodiment, conventionally, a mobile communications device may be configured to communicate data to and from a mobile communications network via available communication resources of network. In at least one embodiment, a wireless access system is configured to provide highest data rates to devices such as smart phones 4906. In at least one embodiment, "internet of things" may be provided in which low power machine type communications devices transmit and receive data at very low power, low bandwidth and may have a low complexity. In at least one embodiment, an example of such a machine type communication device 4914 may communicate via a Pico cell 4916. In at least one embodiment, a very high data rate and a low mobility may be characteristic of communications with, for example, a television 4904 which may be communicating via a Pico cell. In at least one embodiment, a very high data rate and low latency may be required by a virtual reality headset 4908. In at least one embodiment, a relay device 4910 may be deployed to extend size or coverage area of a given cell or network.

In at least one embodiment, components in FIG. 49 can be integrated into or included in computing environment 100 (FIG. 1) and computing environment 200 (FIG. 2). In at least one embodiment, components in FIG. 49 can include or communicate with controller 205 illustrated in FIG. 3. In at least one embodiment, components in FIG. 49 can perform processes 400 and 500 (FIGS. 4 and 5). In at least one embodiment, components in FIG. 49 can call or perform part or all of APIs disclosed in FIGS. 6-17. In at least one embodiment, components in FIG. 49 can perform examples in FIGS. 18 and 19.

Figure 50:
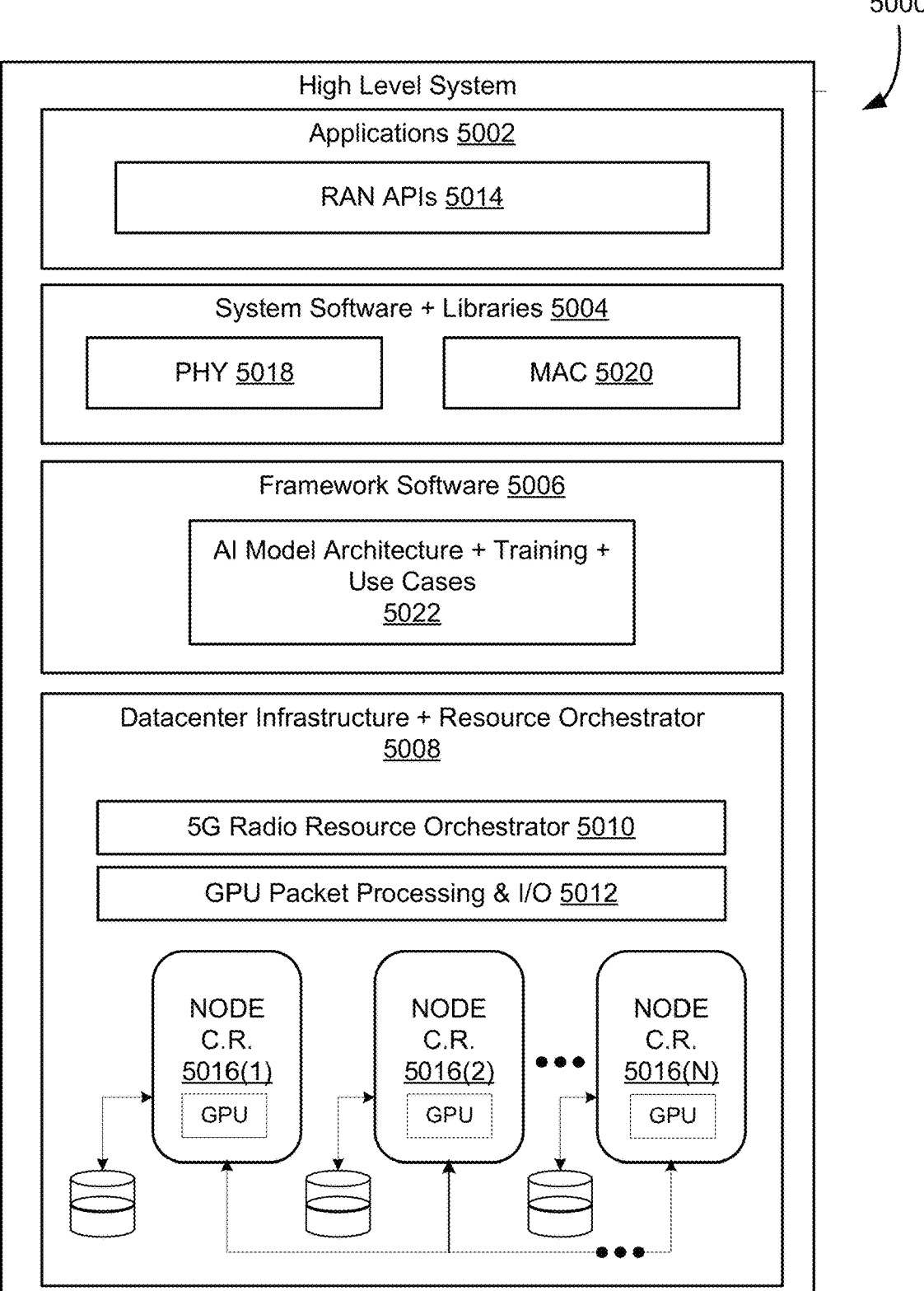
FIG. 50 illustrates an example high-level system, according to at least one embodiment.

FIG. 50 illustrates an example high level system 5000, in which at least one embodiment may be used. In at least one embodiment, high level system 5000 includes applications 5002, system software+libraries 5004, framework software 5006 and a datacenter infrastructure+resource orchestrator 5008. In at least one embodiment, high level system 5000 may be implemented as a cloud service, physical service, virtual service, network service, and/or variations thereof.

In at least one embodiment, as shown in FIG. 50, datacenter infrastructure+resource orchestrator 5008 may include 5G radio resource orchestrator 5010, GPU packet processing & I/O 5012, and node computing resources ("node C.R.s") 5016(1)-5016(N), where "N" represents any whole, positive integer. In at least one embodiment, node C.R.s 5016(1)-5016(N) may include, but are not limited to, any number of central processing units ("CPUs") or other processors (including accelerators, field programmable gate arrays (FPGAs), graphics processors ("GPUs"), etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 5016(1)-5016(N) may be a server having one or more of above-mentioned computing resources.

In at least one embodiment, 5G radio resource orchestrator 5010 may configure or otherwise control one or more node C.R.s 5016(1)-5016(N) and/or other various components and resources a 5G network architecture may comprise. In at least one embodiment, 5G radio resource orchestrator 5010 may include a software design infrastructure ("SDI") management entity for high level system 5000. In at least one embodiment, 5G radio resource orchestrator 5010 may include hardware, software, or some combination thereof. In at least one embodiment, 5G radio resource orchestrator 5010 may be utilized to configure or otherwise control various medium access control sublayers, radio access networks, physical layers or sublayers, and/or variations thereof, which may be part of a 5G network architecture. In at least one embodiment, 5G radio resource orchestrator 5010 may configure or allocate grouped compute, network, memory or storage resources to support one or more workloads which may be executed as part of a 5G network architecture.

In at least one embodiment, GPU packet processing & I/O 5012 may configure or otherwise process various inputs and outputs, as well as packets such as data packets, which may be transmitted/received as part of a 5G network architecture, which may be implemented by high level system 5000. In at least one embodiment, a packet may be data formatted to be provided by a network and may be typically divided into control information and payload (i.e., user data). In at least one embodiment, types of packets may include Internet Protocol version 4 (IPv4) packets, Internet Protocol version 6 (IPv6) packets, and Ethernet II frame packets. In at least one embodiment, control data of a data packet may be classified into data integrity fields and semantic fields. In at least one embodiment, network connections that a data packet may be received upon include a local area network, a wide-area network, a virtual private network, Internet, an intranet, an extranet, a public switched telephone network, an infrared network, a wireless network, a satellite network, and any combination thereof.

In at least one embodiment, framework software 5006 includes an AI Model Architecture+Training+Use Cases 5022. In at least one embodiment, AI Model Architecture+Training+Use Cases 5022 may include tools, services, software, or other resources to train one or more machine learning models or predict or infer information using one or more machine learning models according to one or more embodiments. For example, in at least one embodiment, a machine learning model may be trained by calculating weight parameters according to a neural network architecture using software and computing resources described above with respect to high level system 5000. In at least one embodiment, trained machine learning models corresponding to one or more neural networks may be used to infer or predict information using resources described above with respect to high level system 5000 by using weight parameters calculated through one or more training techniques. In at least one embodiment, framework software 5006 may include a framework to support system software+libraries 5004 and applications 5002.

In at least one embodiment, system software+libraries 5004 or applications 5002 may respectively include web-based service software or applications, such as those provided by Amazon Web Services, Google Cloud and Microsoft Azure. In at least one embodiment, framework software 5006 may include, but is not limited to, a type of free and open-source software web application framework such as Apache Spark™ (hereinafter "Spark"). In at least one embodiment, system software+libraries 5004 may include software used by at least portions of node C.R.s 5016(1)-5016(N). In at least one embodiment, one or more types of software may include, but are not limited to, Internet web page search software, e-mail virus scan software, database software, and streaming video content software.

In at least one embodiment, PHY 5018 is a set of system software and libraries configured to provide an interface with a physical layer of a wireless technology, which may be a physical layer such as a 5G New Radio (NR) physical layer. In at least one embodiment, an NR physical layer utilizes a flexible and scalable design and may comprise various components and technologies, such as modulation schemes, waveform structures, frame structures, reference signals, multi-antenna transmission and channel coding.

In at least one embodiment, an NR physical layer supports quadrature phase shift keying (QPSK), 16 quadrature amplitude modulation (QAM), 64 QAM and 256 QAM modulation formats. In at least one embodiment, different modulation schemes for different user entity (UE) categories may also be included in a NR physical layer. In at least one embodiment, a NR physical layer may utilize cyclic prefix orthogonal frequency division multiplexing (CP-OFDM) with a scalable numerology (subcarrier spacing, cyclic prefix) in both uplink (UL) and downlink (DL) up to at least 52.6 GHz. In at least one embodiment, a NR physical layer may support discrete Fourier transform spread orthogonal frequency division multiplexing (DFT-SOFDM) in UL for coverage-limited scenarios, with single stream transmissions (that is, without spatial multiplexing).

In at least one embodiment, a NR frame supports time division duplex (TDD) and frequency division duplex (FDD) transmissions and operation in both licensed and unlicensed spectrum, which enables very low latency, fast hybrid automatic repeat request (HARQ) acknowledgements, dynamic TDD, coexistence with LTE and transmissions of variable length (for example, short duration for ultra-reliable low-latency communications (URLLC) and long duration for enhanced mobile broadband (eMBB)). In at least one embodiment, NR frame structure follows three key design principles to enhance forward compatibility and reduce interactions between different features.

In at least one embodiment, a first principle is that transmissions are self-contained, which can refer to a scheme in which data in a slot and in a beam are decodable on its own without dependency on other slots and beams. In at least one embodiment, this implies that reference signals required for demodulation of data are included in a given slot and a given beam. In at least one embodiment, a second principle is that transmissions are well confined in time and frequency, which results in a scheme in which new types of transmissions in parallel with legacy transmissions may be introduced. In at least one embodiment, a third principle is avoiding static and/or strict timing relations across slots and across different transmission directions. In at least one embodiment, usage of a third principle can entail utilizing asynchronous hybrid automatic repeat request (HARQ) instead of predefined retransmission time.

In at least one embodiment, NR frame structure also allows for rapid HARQ acknowledgement, in which decoding is performed during reception of DL data and HARQ acknowledgement is prepared by a UE during a guard period, when switching from DL reception to UL transmission. In at least one embodiment, to obtain low latency, a slot (or a set of slots in case of slot aggregation) is front-loaded with control signals and reference signals at a beginning of a slot (or set of slots).

In at least one embodiment, NR has an ultra-lean design that minimizes always-on transmissions to enhance network energy efficiency and ensure forward compatibility. In at least one embodiment, reference signals in NR are transmitted only when necessary. In at least one embodiment, four main reference signals are demodulation reference signal (DMRS), phase-tracking reference signal (PTRS), sounding reference signal (SRS) and channel-state information reference signal (CSI-RS).

In at least one embodiment, DMRS is used to estimate a radio channel for demodulation. In at least one embodiment, DMRS is UE-specific, can be beamformed, confined in a scheduled resource, and transmitted only when necessary, both in DL and UL. In at least one embodiment, to support multiple-layer multiple-input, multiple-output (MIMO) transmission, multiple orthogonal DMRS ports can be scheduled, one for each layer. In at least one embodiment, a basic DMRS pattern is front loaded, as a DMRS design takes into account an early decoding requirement to support low-latency applications. In at least one embodiment, for low-speed scenarios, DMRS uses low density in a time domain. In at least one embodiment, however, for high-speed scenarios, a time density of DMRS is increased to track fast changes in a radio channel.

In at least one embodiment, PTRS is introduced in NR to enable compensation of oscillator phase noise. In at least one embodiment, typically, phase noise increases as a function of oscillator carrier frequency. In at least one embodiment, PTRS can therefore be utilized at high carrier frequencies (such as mmWave) to mitigate phase noise. In at least one embodiment, PTRS is UE-specific, confined in a scheduled resource and can be beamformed. In at least one embodiment, PTRS is configurable depending on a quality of oscillators, carrier frequency, OFDM sub-carrier spacing, and modulation and coding schemes used for transmission.

In at least one embodiment, SRS is transmitted in UL to perform channel state information (CSI) measurements mainly for scheduling and link adaptation. In at least one embodiment, for NR, SRS is also utilized for reciprocity-based precoder design for massive MIMO and UL beam management. In at least one embodiment, SRS has a modular and flexible design to support different procedures and UE capabilities. In at least one embodiment, an approach for channel state information reference signal (CSI-RS) is similar.

In at least one embodiment, NR employs different antenna solutions and techniques depending on which part of a spectrum is used for its operation. In at least one embodiment, for lower frequencies, a low to moderate number of active antennas (up to around 32 transmitter chains) is assumed and FDD operation is common. In at least one embodiment, acquisition of CSI requires transmission of CSI-RS in a DL and CSI reporting in an UL. In at least one embodiment, limited bandwidths available in this frequency region require high spectral efficiency enabled by multi-user MIMO (MU-MIMO) and higher order spatial multiplexing, which is achieved via higher resolution CSI reporting compared with LTE.

In at least one embodiment, for higher frequencies, a larger number of antennas can be employed in a given aperture, which increases a capability for beamforming and multiuser (MU)-MIMO. In at least one embodiment, here, spectrum allocations are of TDD type and reciprocity-based operation is assumed. In at least one embodiment, high-resolution CSI in a form of explicit channel estimations is acquired by UL channel sounding. In at least one embodiment, such high-resolution CSI enables sophisticated precoding algorithms to be employed at a base station (BS). In at least one embodiment, for even higher frequencies (in mmWave range) an analog beamforming implementation is typically required currently, which limits transmission to a single beam direction per time unit and radio chain. In at least one embodiment, since an isotropic antenna element is very small in this frequency region owing to a short carrier wavelength, a great number of antenna elements is required to maintain coverage. In at least one embodiment, beamforming needs to be applied at both transmitter and receiver ends to combat increased path loss, even for control channel transmission.

In at least one embodiment, to support these diverse use cases, NR features a highly flexible but unified CSI framework, in which there is reduced coupling between CSI measurement, CSI reporting and an actual DL transmission in NR compared with LTE. In at least one embodiment, NR also supports more advanced schemes such as multi-point transmission and coordination. In at least one embodiment, control and data transmissions follow a self-contained principle, where all information required to decode a transmission (such as accompanying DMRS) is contained within a transmission itself. In at least one embodiment, as a result, a network can seamlessly change a transmission point or beam as a UE moves in a network.

In at least one embodiment, MAC 5020 is a set of system software and libraries configured to provide an interface with a medium access control (MAC) layer, which may be part of a 5G network architecture. In at least one embodiment, a MAC layer controls hardware responsible for interaction with a wired, optical, or wireless transmission medium. In at least one embodiment, MAC provides flow control and multiplexing for a transmission medium.

In at least one embodiment, a MAC sublayer provides an abstraction of a physical layer such that complexities of a physical link control are invisible to a logical link control (LLC) and upper layers of a network stack. In at least one embodiment, any LLC sublayer (and higher layers) may be used with any MAC. In at least one embodiment, any MAC can be used with any physical layer, independent of transmission medium. In at least one embodiment, a MAC sublayer, when sending data to another device on a network, encapsulates higher-level frames into frames appropriate for a transmission medium, adds a frame check sequence to identify transmission errors, and then forwards data to a physical layer as soon as appropriate channel access method permits it. In at least one embodiment, MAC is also responsible for compensating for collisions if a jam signal is detected, in which a MAC may initiate retransmission.

In at least one embodiment, applications 5002 may include one or more types of applications used by at least portions of node C.R.s 5016(1)-5016(N) and/or framework software 5006. In at least one embodiment, one or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, RAN APIs 5014 may be a set of subroutine definitions, communication protocols, and/or software tools that provide a method of communication with components of a radio access network (RAN) which may be part of a 5G network architecture. In at least one embodiment, a radio access network is part of a network communications system and may implement a radio access technology. In at least one embodiment, radio access network functionality is typically provided by a silicon chip residing in both a core network as well as user equipment. Further information regarding a radio access network can be found in the description of FIG. 48.

In at least one embodiment, high level system 5000 may use CPUs, application-specific integrated circuits (ASICs), GPUs, FPGAs, or other hardware to perform training, inferencing, and/or other various processes using above-described resources. In at least one embodiment, moreover, one or more software and/or hardware resources described above may be configured as a service to allow users to train or performing inferencing of information, such as image recognition, speech recognition, or other artificial intelligence services, as well as other services such as services that allow users to configure and implement various aspects of a 5G network architecture.

In at least one embodiment, system 5000 can be integrated into or included in computing environment 100 (FIG. 1) and computing environment 200 (FIG. 2). In at least one embodiment, system 5000 can include or communicate with controller 205 illustrated in FIG. 3. In at least one embodiment, system 5000 can perform processes 400 and 500

(FIGS. 4 and 5). In at least one embodiment, system 5000 can call or perform part or all of APIs disclosed in FIGS. 6-17. In at least one embodiment, system 5000 can perform examples in FIGS. 18 and 19.

Figure 51:
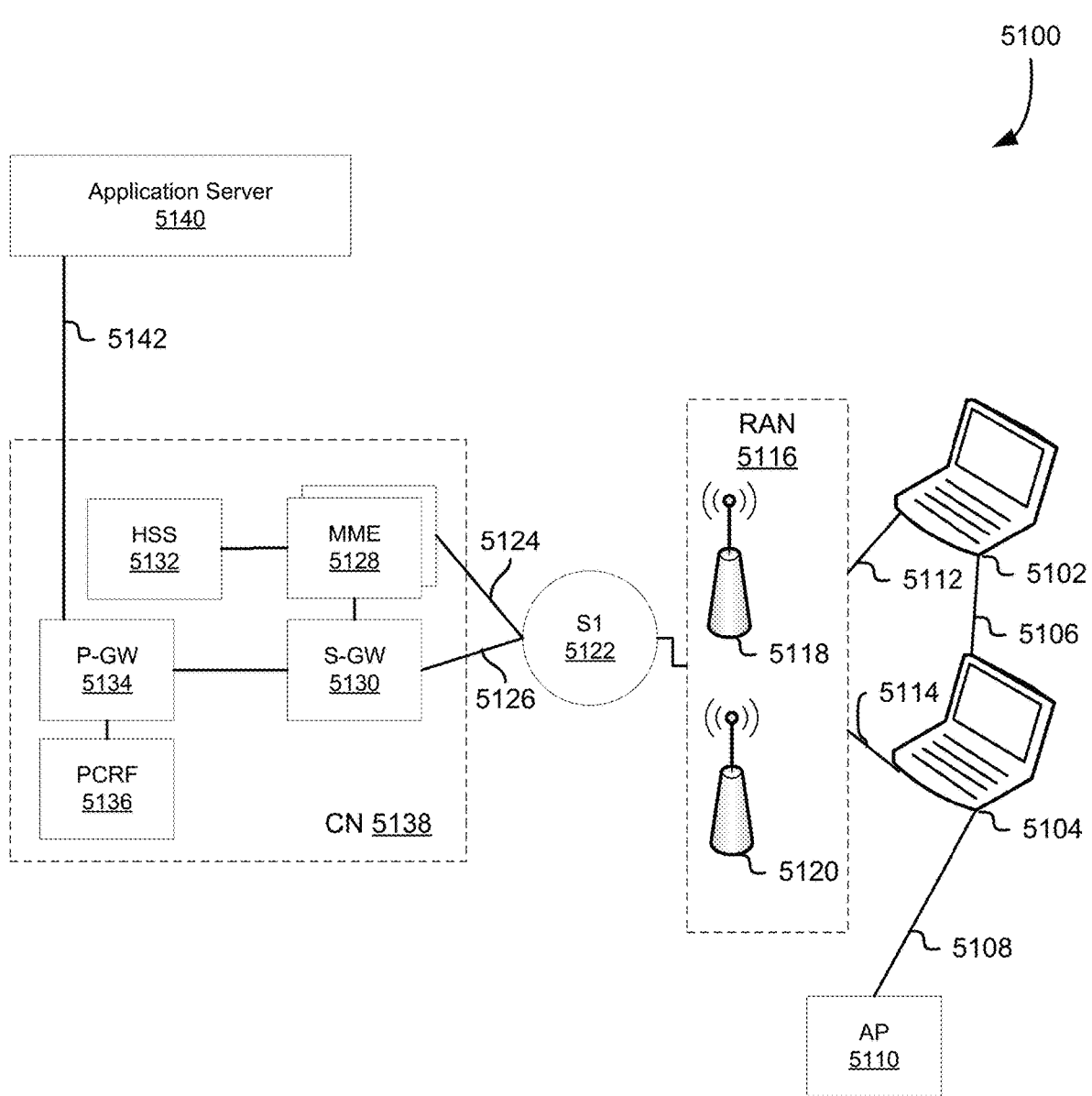
FIG. 51 illustrates an architecture of a system of a network, according to at least one embodiment.

FIG. 51 illustrates an architecture of a system 5100 of a network, in accordance with at least one embodiment. In at least one embodiment, system 5100 is shown to include a user equipment (UE) 5102 and a UE 5104. In at least one embodiment, UEs 5102 and 5104 are illustrated as smartphones (e.g., handheld touchscreen mobile computing devices connectable to one or more cellular networks) but may also comprise any mobile or non-mobile computing device, such as Personal Data Assistants (PDAs), pagers, laptop computers, desktop computers, wireless handsets, or any computing device including a wireless communications interface.

In at least one embodiment, any of UEs 5102 and 5104 can comprise an Internet of Things (IoT) UE, which can comprise a network access layer designed for low-power IoT applications utilizing short-lived UE connections. In at least one embodiment, an IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. In at least one embodiment, a M2M or MTC exchange of data may be a machine-initiated exchange of data. In at least one embodiment, an IoT network describes interconnecting IoT UEs, which may include uniquely identifiable embedded computing devices (within Internet infrastructure), with short-lived connections. In at least one embodiment, an IoT UEs may execute background applications (e.g., keep alive messages, status updates, etc.) to facilitate connections of an IoT network.

In at least one embodiment, UEs 5102 and 5104 may be configured to connect, e.g., communicatively couple, with a radio access network (RAN) 5116. In at least one embodiment, RAN 5116 may be, for example, an Evolved Universal Mobile Telecommunications System (UMTS) Terrestrial Radio Access Network (E-UTRAN), a NextGen RAN (NG RAN), or some other type of RAN. In at least one embodiment, UEs 5102 and 5104 utilize connections 5112 and 5114, respectively, each of which comprises a physical communications interface or layer. In at least one embodiment, connections 5112 and 5114 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and variations thereof.

In at least one embodiment, UEs 5102 and 5104 may further directly exchange communication data via a ProSe interface 5106. In at least one embodiment, ProSe interface 5106 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

In at least one embodiment, UE 5104 is shown to be configured to access an access point (AP) 5110 via connection 5108. In at least one embodiment, connection 5108 can comprise a local wireless connection, such as a connection consistent with any IEEE 802.11 protocol, wherein AP 5110 would comprise a wireless fidelity (WiFi®) router. In at least one embodiment, AP 5110 is shown to be connected to an Internet without connecting to a core network of a wireless system.

In at least one embodiment, RAN 5116 can include one or more access nodes that enable connections 5112 and 5114. In at least one embodiment, these access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). In at least one embodiment, RAN 5116 may include one or more RAN nodes for providing macrocells, e.g., macro RAN node 5118, and one or more RAN nodes for providing femtocells or picocells (e.g., cells having smaller coverage areas, smaller user capacity, or higher bandwidth compared to macrocells), e.g., low power (LP) RAN node 5120.

In at least one embodiment, any of RAN nodes 5118 and 5120 can terminate an air interface protocol and can be a first point of contact for UEs 5102 and 5104. In at least one embodiment, any of RAN nodes 5118 and 5120 can fulfill various logical functions for RAN 5116 including, but not limited to, radio network controller (RNC) functions such as radio bearer management, uplink and downlink dynamic radio resource management and data packet scheduling, and mobility management.

In at least one embodiment, UEs 5102 and 5104 can be configured to communicate using Orthogonal Frequency-Division Multiplexing (OFDM) communication signals with each other or with any of RAN nodes 5118 and 5120 over a multi-carrier communication channel in accordance various communication techniques, such as, but not limited to, an Orthogonal Frequency Division Multiple Access (OFDMA) communication technique (e.g., for downlink communications) or a Single Carrier Frequency Division Multiple Access (SC-FDMA) communication technique (e.g., for uplink and ProSe or sidelink communications), and/or variations thereof. In at least one embodiment, OFDM signals can comprise a plurality of orthogonal subcarriers.

In at least one embodiment, a downlink resource grid can be used for downlink transmissions from any of RAN nodes 5118 and 5120 to UEs 5102 and 5104, while uplink transmissions can utilize similar techniques. In at least one embodiment, a grid can be a time frequency grid, called a resource grid or time-frequency resource grid, which is a physical resource in a downlink in each slot. In at least one embodiment, such a time frequency plane representation is a common practice for OFDM systems, which makes it intuitive for radio resource allocation. In at least one embodiment, each column and each row of a resource grid corresponds to one OFDM symbol and one OFDM subcarrier, respectively. In at least one embodiment, a duration of a resource grid in a time domain corresponds to one slot in a radio frame. In at least one embodiment, a smallest time-frequency unit in a resource grid is denoted as a resource element. In at least one embodiment, each resource grid comprises a number of resource blocks, which describe a mapping of certain physical channels to resource elements. In at least one embodiment, each resource block comprises a collection of resource elements. In at least one embodiment, in a frequency domain, this may represent a smallest quantity of resources that currently can be allocated. In at least one embodiment, there are several different physical downlink channels that are conveyed using such resource blocks.

In at least one embodiment, a physical downlink shared channel (PDSCH) may carry user data and higher-layer signaling to UEs 5102 and 5104. In at least one embodiment, a physical downlink control channel (PDCCH) may carry information about a transport format and resource allocations related to PDSCH channel, among other things. In at least one embodiment, it may also inform UEs 5102 and 5104 about a transport format, resource allocation, and HARQ (Hybrid Automatic Repeat Request) information related to an uplink shared channel. In at least one embodiment, typically, downlink scheduling (assigning control and shared channel resource blocks to UE 5102 within a cell) may be performed at any of RAN nodes 5118 and 5120 based on channel quality information fed back from any of UEs 5102 and 5104. In at least one embodiment, downlink resource assignment information may be sent on a PDCCH used for (e.g., assigned to) each of UEs 5102 and 5104.

In at least one embodiment, a PDCCH may use control channel elements (CCEs) to convey control information. In at least one embodiment, before being mapped to resource elements, PDCCH complex valued symbols may first be organized into quadruplets, which may then be permuted using a sub-block interleaver for rate matching. In at least one embodiment, each PDCCH may be transmitted using one or more of these CCEs, where each CCE may correspond to nine sets of four physical resource elements known as resource element groups (REGs). In at least one embodiment, four Quadrature Phase Shift Keying (QPSK) symbols may be mapped to each REG. In at least one embodiment, PDCCH can be transmitted using one or more CCEs, depending on a size of a downlink control information (DCI) and a channel condition. In at least one embodiment, there can be four or more different PDCCH formats defined in LTE with different numbers of CCEs (e.g., aggregation level, L=1, 2, 4, or 8).

In at least one embodiment, an enhanced physical downlink control channel (EPDCCH) that uses PDSCH resources may be utilized for control information transmission. In at least one embodiment, EPDCCH may be transmitted using one or more enhanced control channel elements (ECCEs). In at least one embodiment, each ECCE may correspond to nine sets of four physical resource elements known as an enhanced resource element group (EREG). In at least one embodiment, an ECCE may have other numbers of EREGs in some situations.

In at least one embodiment, RAN 5116 is shown to be communicatively coupled to a core network (CN) 5138 via an S1 interface 5122. In at least one embodiment, CN 5138 may be an evolved packet core (EPC) network, a NextGen Packet Core (NPC) network, or some other type of CN. In at least one embodiment, S1 interface 5122 is split into two parts: S1-U interface 5126, which carries traffic data between RAN nodes 5118 and 5120 and serving gateway (S-GW) 5130, and a S1-mobility management entity (MME) interface 5124, which is a signaling interface between RAN nodes 5118 and 5120 and MMEs 5128.

In at least one embodiment, CN 5138 comprises MMEs 5128, S-GW 5130, Packet Data Network (PDN) Gateway (P-GW) 5134, and a home subscriber server (HSS) 5132. In at least one embodiment, MMEs 5128 may be similar in function to a control plane of legacy Serving General Packet Radio Service (GPRS) Support Nodes (SGSN). In at least one embodiment, MMEs 5128 may manage mobility aspects in access such as gateway selection and tracking area list management. In at least one embodiment, HSS 5132 may comprise a database for network users, including subscription related information to support a network entity's handling of communication sessions. In at least one embodiment, CN 5138 may comprise one or several HSSs 5132, depending on a number of mobile subscribers, on a capacity of an equipment, on an organization of a network, etc. In at least one embodiment, HSS 5132 can provide support for routing/roaming, authentication, authorization, naming/addressing resolution, location dependencies, etc.

In at least one embodiment, S-GW 5130 may terminate a S1 interface 5122 towards RAN 5116, and routes data packets between RAN 5116 and CN 5138. In at least one embodiment, S-GW 5130 may be a local mobility anchor point for inter-RAN node handovers and also may provide an anchor for inter-3GPP mobility. In at least one embodiment, other responsibilities may include lawful intercept, charging, and some policy enforcement.

In at least one embodiment, P-GW 5134 may terminate an SGi interface toward a PDN. In at least one embodiment, P-GW 5134 may route data packets between an EPC network 5138 and external networks such as a network including application server 5140 (alternatively referred to as application function (AF)) via an Internet Protocol (IP) interface 5142. In at least one embodiment, application server 5140 may be an element offering applications that use IP bearer resources with a core network (e.g., UMTS Packet Services (PS) domain, LTE PS data services, etc.). In at least one embodiment, P-GW 5134 is shown to be communicatively coupled to an application server 5140 via an IP communications interface 5142. In at least one embodiment, application server 5140 can also be configured to support one or more communication services (e.g., Voice-over-Internet Protocol (VoIP) sessions, PTT sessions, group communication sessions, social networking services, etc.) for UEs 5102 and 5104 via CN 5138.

In at least one embodiment, P-GW 5134 may further be a node for policy enforcement and charging data collection. In at least one embodiment, policy and Charging Enforcement Function (PCRF) 5136 is a policy and charging control element of CN 5138. In at least one embodiment, in a non-roaming scenario, there may be a single PCRF in a Home Public Land Mobile Network (HPLMN) associated with a UE's Internet Protocol Connectivity Access Network (IP-CAN) session. In at least one embodiment, in a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). In at least one embodiment, PCRF 5136 may be communicatively coupled to application server 5140 via P-GW 5134. In at least one embodiment, application server 5140 may signal PCRF 5136 to indicate a new service flow and select an appropriate Quality of Service (QoS) and charging parameters. In at least one embodiment, PCRF 5136 may provision this rule into a Policy and Charging Enforcement Function (PCEF) (not shown) with an appropriate traffic flow template (TFT) and QoS class of identifier (QCI), which commences a QoS and charging as specified by application server 5140.

In at least one embodiment, architecture of a system 5100 can be integrated into or included in computing environment 100 (FIG. 1) and computing environment 200 (FIG. 2). In at least one embodiment, architecture of a system 5100 can include or communicate with controller 205 illustrated in FIG. 3. In at least one embodiment, architecture of a system 5100 can perform processes 400 and 500 (FIGS. 4 and 5). In at least one embodiment, architecture of a system 5100 can call or perform part or all of APIs disclosed in FIGS. 6-17. In at least one embodiment, architecture of a system 5100 can perform examples in FIGS. 18 and 19.

Figure 52:
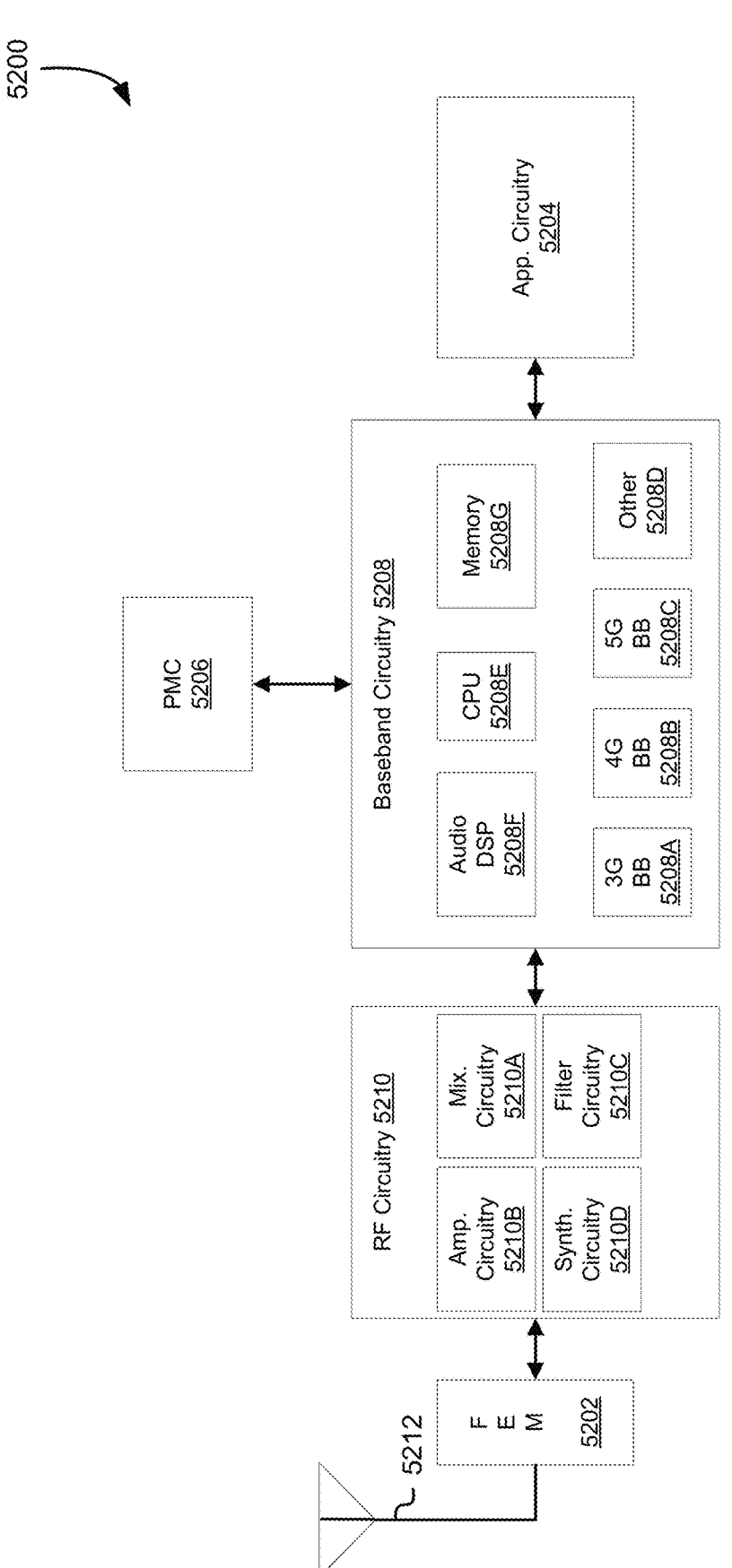
FIG. 52 illustrates example components of a device, according to at least one embodiment.

FIG. 52 illustrates example components of a device 5200 in accordance with at least one embodiment. In at least one embodiment, device 5200 may include application circuitry 5204, baseband circuitry 5208, Radio Frequency (RF) circuitry 5210, front-end module (FEM) circuitry 5202, one or more antennas 5212, and power management circuitry (PMC) 5206 coupled together at least as shown. In at least one embodiment, components of illustrated device 5200 may be included in a UE or a RAN node. In at least one embodiment, device 5200 may include less elements (e.g., a RAN node may not utilize application circuitry 5204, and instead include a processor/controller to process IP data received from an EPC). In at least one embodiment, device 5200 may include additional elements such as, for example, memory/storage, display, camera, sensor, or input/output (I/O) interface. In at least one embodiment, components described below may be included in more than one device (e.g., said circuitries may be separately included in more than one device for Cloud-RAN (C-RAN) implementations).

In at least one embodiment, application circuitry 5204 may include one or more application processors. In at least one embodiment, application circuitry 5204 may include circuitry such as, but not limited to, one or more single-core or multi-core processors. In at least one embodiment, processor(s) may include any combination of general purpose processors and dedicated processors (e.g., graphics processors, application processors, etc.). In at least one embodiment, processors may be coupled with or may include memory/storage and may be configured to execute instructions stored in memory/storage to enable various applications or operating systems to run on device 5200. In at least one embodiment, processors of application circuitry 5204 may process IP data packets received from an EPC.

In at least one embodiment, baseband circuitry 5208 may include circuitry such as, but not limited to, one or more single-core or multi-core processors. In at least one embodiment, baseband circuitry 5208 may include one or more baseband processors or control logic to process baseband signals received from a receive signal path of RF circuitry 5210 and to generate baseband signals for a transmit signal path of RF circuitry 5210. In at least one embodiment, baseband processing circuitry 5208 may interface with application circuitry 5204 for generation and processing of baseband signals and for controlling operations of RF circuitry 5210. In at least one embodiment, baseband circuitry 5208 may include a third generation (3G) baseband processor 5208A, a fourth generation (4G) baseband processor 5208B, a fifth generation (5G) baseband processor 5208C, or other baseband processor(s) 5208D for other existing generations, generations in development or to be developed (e.g., second generation (2G), sixth generation (6G), etc.). In at least one embodiment, baseband circuitry 5208 (e.g., one or more of base-band processors 5208A-D) may handle various radio control functions that enable communication with one or more radio networks via RF circuitry 5210. In at least one embodiment, some, or all of a functionality of baseband processors 5208A-D may be included in modules stored in memory 5208G and executed via a Central Processing Unit (CPU) 5208E. In at least one embodiment, radio control functions may include, but are not limited to, signal modulation/demodulation, encoding/decoding, radio frequency shifting, etc. In at least one embodiment, modulation/demodulation circuitry of baseband circuitry 5208 may include Fast-Fourier Transform (FFT), precoding, or constellation mapping/demapping functionality. In at least one embodiment, encoding/decoding circuitry of baseband circuitry 5208 may include convolution, tail biting convolution, turbo, Viterbi, or Low Density Parity Check (LDPC) encoder/decoder functionality.

In at least one embodiment, baseband circuitry 5208 may include one or more audio digital signal processor(s) (DSP) 5208F. In at least one embodiment, audio DSP(s) 5208F may be include elements for compression/decompression and echo cancellation and may include other suitable processing elements in other embodiments. In at least one embodiment, components of baseband circuitry may be suitably combined in a single chip, a single chipset, or disposed on a same circuit board in some embodiments. In at least one embodiment, some, or all of constituent components of baseband circuitry 5208 and application circuitry 5204 may be implemented together such as, for example, on a system on a chip (SOC).

In at least one embodiment, baseband circuitry 5208 may provide for communication compatible with one or more radio technologies. In at least one embodiment, baseband circuitry 5208 may support communication with an evolved universal terrestrial radio access network (EUTRAN) or other wireless metropolitan area networks (WMAN), a wireless local area network (WLAN), a wireless personal area network (WPAN). In at least one embodiment, baseband circuitry 5208 is configured to support radio communications of more than one wireless protocol and may be referred to as multimode baseband circuitry.

In at least one embodiment, RF circuitry 5210 may enable communication with wireless networks using modulated electromagnetic radiation through a non-solid medium. In at least one embodiment, RF circuitry 5210 may include switches, filters, amplifiers, etc. to facilitate communication with a wireless network. In at least one embodiment, RF circuitry 5210 may include a receive signal path which may include circuitry to down-convert RF signals received from FEM circuitry 5202 and provide baseband signals to baseband circuitry 5208. In at least one embodiment, RF circuitry 5210 may also include a transmit signal path which may include circuitry to up-convert baseband signals provided by baseband circuitry 5208 and provide RF output signals to FEM circuitry 5202 for transmission.

In at least one embodiment, receive signal path of RF circuitry 5210 may include mixer circuitry 5210a, amplifier circuitry 5210b and filter circuitry 5210c. In at least one embodiment, a transmit signal path of RF circuitry 5210 may include filter circuitry 5210c and mixer circuitry 5210a. In at least one embodiment, RF circuitry 5210 may also include synthesizer circuitry 5210d for synthesizing a frequency for use by mixer circuitry 5210a of a receive signal path and a transmit signal path. In at least one embodiment, mixer circuitry 5210a of a receive signal path may be configured to down-convert RF signals received from FEM circuitry 5202 based on a synthesized frequency provided by synthesizer circuitry 5210d. In at least one embodiment, amplifier circuitry 5210b may be configured to amplify down-converted signals and filter circuitry 5210c may be a low-pass filter (LPF) or band-pass filter (BPF) configured to remove unwanted signals from down-converted signals to generate output baseband signals. In at least one embodiment, output baseband signals may be provided to baseband circuitry 5208 for further processing. In at least one embodiment, output baseband signals may be zero-frequency baseband signals, although this is not a requirement. In at least one embodiment, mixer circuitry 5210a of a receive signal path may comprise passive mixers.

In at least one embodiment, mixer circuitry 5210a of a transmit signal path may be configured to up-convert input baseband signals based on a synthesized frequency provided by synthesizer circuitry 5210d to generate RF output signals for FEM circuitry 5202. In at least one embodiment, baseband signals may be provided by baseband circuitry 5208 and may be filtered by filter circuitry 5210c.

In at least one embodiment, mixer circuitry 5210a of a receive signal path and mixer circuitry 5210a of a transmit signal path may include two or more mixers and may be arranged for quadrature down conversion and up conversion, respectively. In at least one embodiment, mixer circuitry 5210a of a receive signal path and mixer circuitry 5210a of a transmit signal path may include two or more mixers and may be arranged for image rejection (e.g., Hartley image rejection). In at least one embodiment, mixer circuitry 5210a of a receive signal path and mixer circuitry 5210a may be arranged for direct down conversion and direct up conversion, respectively. In at least one embodiment, mixer circuitry 5210a of a receive signal path and mixer circuitry 5210a of a transmit signal path may be configured for super-heterodyne operation.

In at least one embodiment, output baseband signals and input baseband signals may be analog baseband signals. In at least one embodiment, output baseband signals and input baseband signals may be digital baseband signals. In at least one embodiment, RF circuitry 5210 may include analog-to-digital converter (ADC) and digital-to-analog converter (DAC) circuitry and baseband circuitry 5208 may include a digital baseband interface to communicate with RF circuitry 5210.

In at least one embodiment, a separate radio IC circuitry may be provided for processing signals for each spectrum In at least one embodiment, synthesizer circuitry 5210d may be a fractional-N synthesizer or a fractional N/N+1 synthesizer. In at least one embodiment, synthesizer circuitry 5210d may be a delta-sigma synthesizer, a frequency multiplier, or a synthesizer comprising a phase-locked loop with a frequency divider.

In at least one embodiment, synthesizer circuitry 5210d may be configured to synthesize an output frequency for use by mixer circuitry 5210a of RF circuitry 5210 based on a frequency input and a divider control input. In at least one embodiment, synthesizer circuitry 5210d may be a fractional N/N+1 synthesizer.

In at least one embodiment, frequency input may be provided by a voltage-controlled oscillator (VCO). In at least one embodiment, divider control input may be provided by either baseband circuitry 5208 or applications processor 5204 depending on a desired output frequency. In at least one embodiment, a divider control input (e.g., N) may be determined from a look-up table based on a channel indicated by applications processor 5204.

In at least one embodiment, synthesizer circuitry 5210d of RF circuitry 5210 may include a divider, a delay-locked loop (DLL), a multiplexer and a phase accumulator. In at least one embodiment, divider may be a dual modulus divider (DMD) and phase accumulator may be a digital phase accumulator (DPA). In at least one embodiment, DMD may be configured to divide an input signal by either N or N+1 (e.g., based on a carry out) to provide a fractional division ratio. In at least one embodiment, DLL may include a set of cascaded, tunable, delay elements, a phase detector, a charge pump, and a D-type flip-flop. In at least one embodiment, delay elements may be configured to break a VCO period up into Nd equal packets of phase, where Nd is a number of delay elements in a delay line. In at least one embodiment, in this way, DLL provides negative feedback to help ensure that total delay through a delay line is one VCO cycle.

In at least one embodiment, synthesizer circuitry 5210d may be configured to generate a carrier frequency as an output frequency, while in other embodiments, output frequency may be a multiple of a carrier frequency (e.g., twice a carrier frequency, four times a carrier frequency) and used in conjunction with quadrature generator and divider circuitry to generate multiple signals at a carrier frequency with multiple different phases with respect to each other. In at least one embodiment, output frequency may be a LO frequency (fLO). In at least one embodiment, RF circuitry 5210 may include an IQ/polar converter.

In at least one embodiment, FEM circuitry 5202 may include a receive signal path which may include circuitry configured to operate on RF signals received from one or more antennas 5212, amplify received signals and provide amplified versions of received signals to RF circuitry 5210 for further processing. In at least one embodiment, FEM circuitry 5202 may also include a transmit signal path which may include circuitry configured to amplify signals for transmission provided by RF circuitry 5210 for transmission by one or more of one or more antennas 5212. In at least one embodiment, amplification through a transmit or receive signal paths may be done solely in RF circuitry 5210, solely in FEM 5202, or in both RF circuitry 5210 and FEM 5202.

In at least one embodiment, FEM circuitry 5202 may include a TX/RX switch to switch between transmit mode and receive mode operation. In at least one embodiment, FEM circuitry may include a receive signal path and a transmit signal path. In at least one embodiment, a receive signal path of FEM circuitry may include an LNA to amplify received RF signals and provide amplified received RF signals as an output (e.g., to RF circuitry 5210). In at least one embodiment, a transmit signal path of FEM circuitry 5202 may include a power amplifier (PA) to amplify input RF signals (e.g., provided by RF circuitry 5210), and one or more filters to generate RF signals for subsequent transmission (e.g., by one or more of one or more antennas 5212).

In at least one embodiment, PMC 5206 may manage power provided to baseband circuitry 5208. In at least one embodiment, PMC 5206 may control power-source selection, voltage scaling, battery charging, or DC-to-DC conversion. In at least one embodiment, PMC 5206 may often be included when device 5200 is capable of being powered by a battery, for example, when device is included in a UE. In at least one embodiment, PMC 5206 may increase power conversion efficiency while providing desirable implementation size and heat dissipation characteristics.

In at least one embodiment, PMC 5206 may be additionally or alternatively coupled with, and perform similar power management operations for, other components such as, but not limited to, application circuitry 5204, RF circuitry 5210, or FEM 5202.

In at least one embodiment, PMC 5206 may control, or otherwise be part of, various power saving mechanisms of device 5200. In at least one embodiment, if device 5200 is in an RRC Connected state, where it is still connected to a RAN node as it expects to receive traffic shortly, then it may enter a state known as Discontinuous Reception Mode (DRX) after a period of inactivity. In at least one embodiment, during this state, device 5200 may power down for brief intervals of time and thus save power.

In at least one embodiment, if there is no data traffic activity for an extended period of time, then device 5200 may transition off to an RRC Idle state, where it disconnects from a network and does not perform operations such as channel quality feedback, handover, etc. In at least one embodiment, device 5200 goes into a very low power state and it performs paging where again it periodically wakes up to listen to a network and then powers down again. In at least one embodiment, device 5200 may not receive data in this state, in order to receive data, it must transition back to RRC Connected state.

In at least one embodiment, an additional power saving mode may allow a device to be unavailable to a network for periods longer than a paging interval (ranging from seconds to a few hours). In at least one embodiment, during this time, a device is totally unreachable to a network and may power down completely. In at least one embodiment, any data sent during this time incurs a large delay and it is assumed delay is acceptable.

In at least one embodiment, processors of application circuitry 5204 and processors of baseband circuitry 5208 may be used to execute elements of one or more instances of a protocol stack. In at least one embodiment, processors of baseband circuitry 5208, alone or in combination, may be used execute Layer 3, Layer 2, or Layer 1 functionality, while processors of application circuitry 5208 may utilize data (e.g., packet data) received from these layers and further execute Layer 4 functionality (e.g., transmission communication protocol (TCP) and user datagram protocol (UDP) layers). In at least one embodiment, layer 3 may comprise a radio resource control (RRC) layer. In at least one embodiment, Layer 2 may comprise a medium access control (MAC) layer, a radio link control (RLC) layer, and a packet data convergence protocol (PDCP) layer. In at least one embodiment, Layer 1 may comprise a physical (PHY) layer of a UE/RAN node.

In at least one embodiment, device 5200 can be integrated into or included in computing environment 100 (FIG. 1) and computing environment 200 (FIG. 2). In at least one embodiment, device 5200 can include or communicate with controller 205 illustrated in FIG. 3. In at least one embodiment, device 5200 can perform processes 400 and 500 (FIGS. 4 and 5). In at least one embodiment, device 5200 can call or perform part or all of APIs disclosed in FIGS. 6-17. In at least one embodiment, device 5200 can perform examples in FIGS. 18 and 19.

Figure 53:
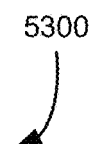
FIG. 53 illustrates example interfaces of baseband circuitry, according to at least one embodiment.
Figure 53:
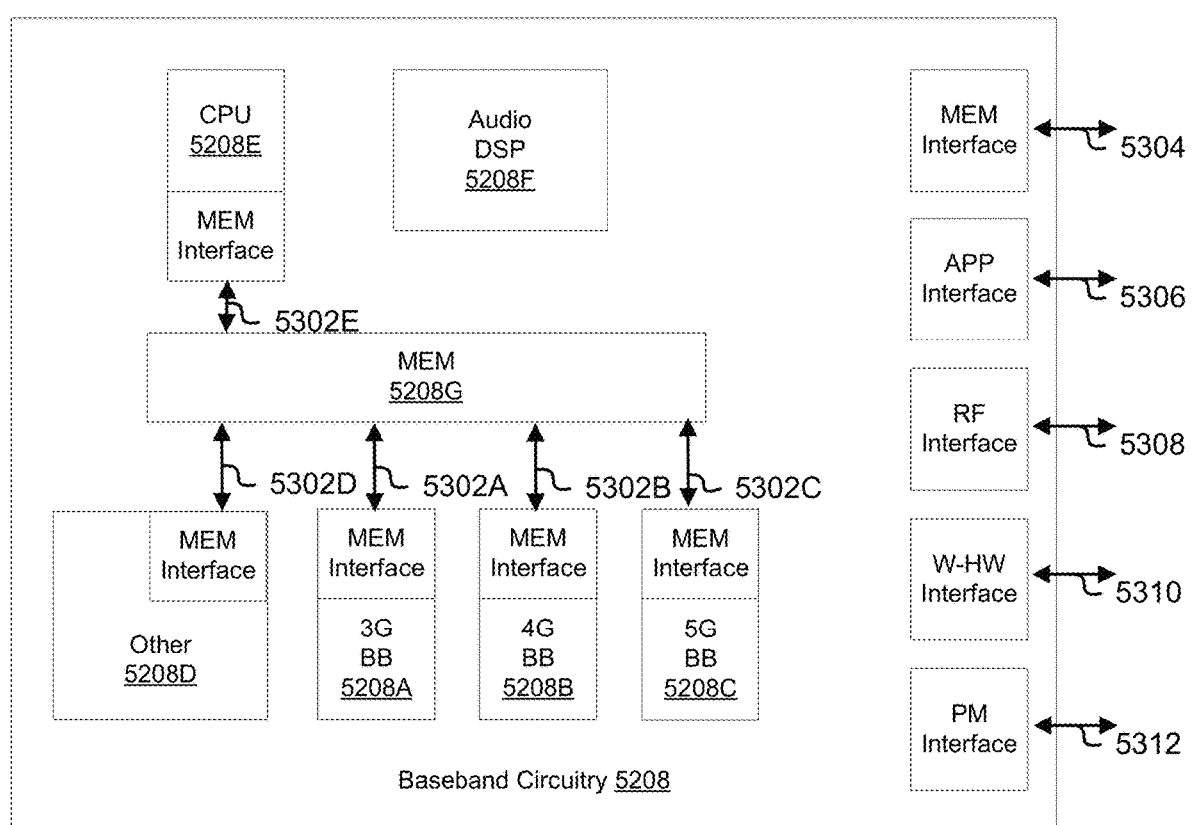

FIG. 53 illustrates example interfaces of baseband circuitry, in accordance with at least one embodiment. In at least one embodiment, as discussed above, baseband circuitry 5208 of FIG. 52 may comprise processors 5208A-5208E and a memory 5208G utilized by said processors. In at least one embodiment, each of processors 5208A-5208E may include a memory interface, 5302A-5302E, respectively, to send/receive data to/from memory 5208G.

In at least one embodiment, baseband circuitry 5208 may further include one or more interfaces to communicatively couple to other circuitries/devices, such as a memory interface 5304 (e.g., an interface to send/receive data to/from memory external to baseband circuitry 5208), an application circuitry interface 5306 (e.g., an interface to send/receive data to/from application circuitry 5204 of FIG. 52), an RF circuitry interface 5308 (e.g., an interface to send/receive data to/from RF circuitry 5210 of FIG. 52), a wireless hardware connectivity interface 5310 (e.g., an interface to send/receive data to/from Near Field Communication (NFC) components, Bluetooth® components (e.g., Bluetooth® Low Energy), Wi-Fi® components, and other communication components), and a power management interface 5312 (e.g., an interface to send/receive power or control signals to/from PMC 5206).

In at least one embodiment, components of FIG. 53 can be integrated into or included in computing environment 100 (FIG. 1) and computing environment 200 (FIG. 2). In at least one embodiment, components of FIG. 53 can include or communicate with controller 205 illustrated in FIG. 3. In at least one embodiment, components of FIG. 53 can perform processes 400 and 500 (FIGS. 4 and 5). In at least one embodiment, components of FIG. 53 can call or perform part or all of APIs disclosed in FIGS. 6-17. In at least one embodiment, components of FIG. 53 can perform examples in FIGS. 18 and 19.

Figure 54:
FIG. 54 illustrates an example of an uplink channel, according to at least one embodiment.
Figure 54:
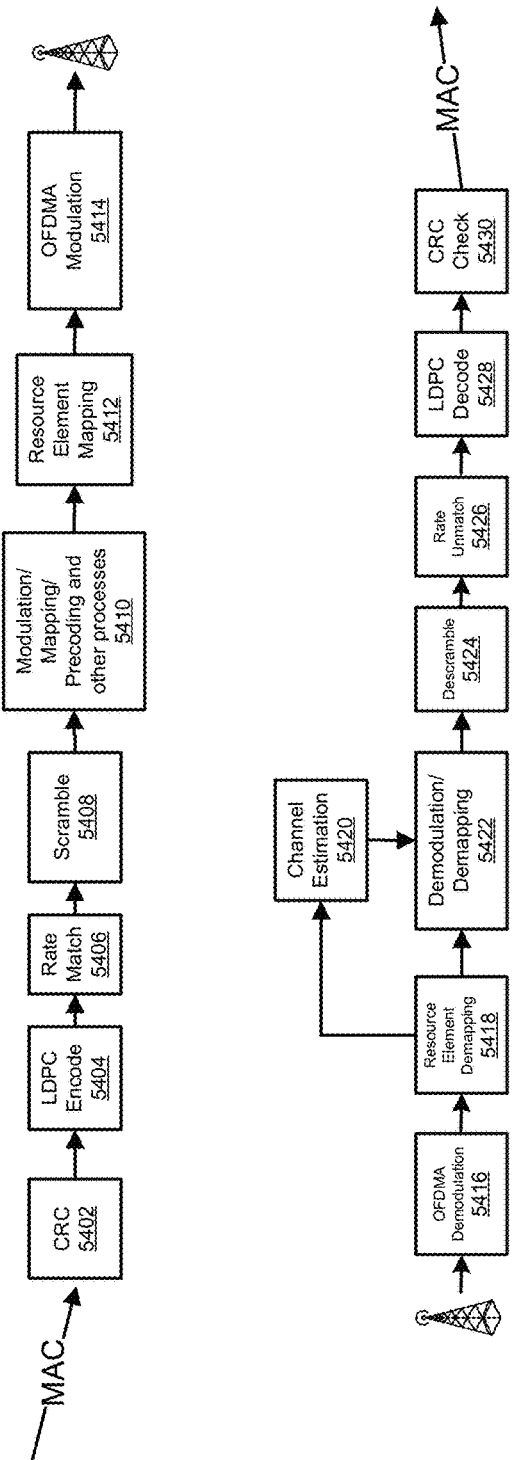

FIG. 54 illustrates an example of an uplink channel, in accordance with at least one embodiment. In at least one embodiment, FIG. 54 illustrates transmitting and receiving data within a physical uplink shared channel (PUSCH) in 5G NR, which may be part of a physical layer of a mobile device network.

In at least one embodiment, Physical Uplink Shared Channel (PUSCH) in 5G NR is designated to carry multiplexed control information and user application data. In at least one embodiment, 5G NR provides much more flexibility and reliability comparing to its predecessor, which in some examples may be referred to as 4G LTE, including more elastic pilot arrangements and support for both cyclic prefix (CP)-OFDM and Discrete Fourier Transform spread (DFT-s)-OFDM waveforms. In at least one embodiment, standard introduced filtered OFDM (f-OFDM) technique is utilized to add additional filtering to reduce Out-of-Band emission and improve performance at higher modulation orders. In at least one embodiment, modifications in Forward Error Correction (FEC) were imposed to replace Turbo Codes used in 4G LTE by Quasi-Cyclic Low Density Parity Check (QC-LDPC) codes, which were proven to achieve better transmission rates and provide opportunities for more efficient hardware implementations.

In at least one embodiment, transmission of 5G NR downlink and uplink data is organized into frames of 10 ms duration, each divided into 10 subframes of 1 ms each. In at least one embodiment, subframes are composed of a variable number of slots, depending on a selected subcarrier spacing which is parameterized in 5G NR. In at least one embodiment, a slot is built from 14 OFDMA symbols, each prepended with a cyclic prefix. In at least one embodiment, a subcarrier that is located within a passband and is designated for transmission is called a Resource Element (RE). In at least one embodiment, a group of 12 neighboring RE in a same symbol form a Physical Resource Block (PRB).

In at least one embodiment, 5G NR standard defined two types of reference signals associated with transmission within a PUSCH channel. In at least one embodiment, Demodulation Reference Signal (DMRS) is a user specific reference signal with high frequency density. In at least one embodiment, DMRS is transmitted within dedicated orthogonal frequency-division multiple access (OFDMA) symbols only and designated for frequency-selective channel estimation. In at least one embodiment, a number of DMRS symbols within a slot may vary between 1 and 4 depending on configuration, where a denser DMRS symbol spacing in time is designated for fast time-varying channels to obtain more accurate estimates within a coherence time of a channel. In at least one embodiment, in a frequency domain, DMRS PRB are mapped within a whole transmission allocation. In at least one embodiment, spacing between a DMRS resource element (RE) assigned for a same Antenna Port (AP) may be chosen between 2 and 3. In at least one embodiment, in a case of 2-2 multiple-input, multiple-output (MIMO), a standard allows for orthogonal assignment of RE between AP. In at least one embodiment, a receiver may perform partial single input, multiple output (SIMO) channel estimation based on a DMRS RE prior to MIMO equalization, neglecting spatial correlation.

In at least one embodiment, a second type of reference signal is a Phase Tracking Reference Signal (PTRS). In at least one embodiment, PTRS subcarriers are arranged in a comb structure having high density in a time domain. In at least one embodiment, it is used mainly in mmWave frequency bands to track and correct phase noise, which is a considerable source of performance losses. In at least one embodiment, usage of PTRS is optional, as it may lower a total spectral efficiency of a transmission when effects of phase noise are negligible.

In at least one embodiment, for transmission of data, a transport block may be generated from a MAC layer and given to a physical layer. In at least one embodiment, a transport block may be data that is intended to be transmitted. In at least one embodiment, a transmission in a physical layer starts with grouped resource data, which may be referred to as transport blocks. In at least one embodiment, a transport block is received by a cyclic redundancy check (CRC) 5402. In at least one embodiment, a cyclic redundancy check is appended to each transport block for error detection. In at least one embodiment, a cyclic redundancy check is used for error detection in transport blocks. In at least one embodiment, an entire transport block is used to calculate CRC parity bits and these parity bits are then attached to an end of a transport block. In at least one embodiment, minimum and maximum code block sizes are specified so blocks sizes are compatible with further processes. In at least one embodiment, an input block is segmented when an input block is greater than a maximum code block size.

In at least one embodiment, a transport block is received and encoded by a low-density parity-check (LDPC) encode 5404. In at least one embodiment, NR employs low-density parity-check (LDPC) codes for a data channel and polar codes for a control channel. In at least one embodiment, LDPC codes are defined by their parity-check matrices, with each column representing a coded bit, and each row representing a parity-check equation. In at least one embodiment, LDPC codes are decoded by exchanging messages between variables and parity checks in an iterative manner. In at least one embodiment, LDPC codes proposed for NR use a quasi-cyclic structure, where a parity-check matrix is defined by a smaller base matrix. In at least one embodiment, each entry of the base matrix represents either a Z×Z zero matrix or a shifted Z×Z identity matrix.

In at least one embodiment, an encoded transport block is received by rate match 5406. In at least one embodiment, an encoded block is used to create an output bit stream with a desired code rate. In at least one embodiment, rate match 5406 is utilized to create an output bit stream to be transmitted with a desired code rate. In at least one embodiment, bits are selected and pruned from a buffer to create an output bit stream with a desired code rate. In at least one embodiment, a Hybrid Automatic Repeat Request (HARQ) error correction scheme is incorporated.

In at least one embodiment, output bits are scrambled, which may aid in privacy, in scramble 5408. In at least one embodiment, codewords are bit-wise multiplied with an orthogonal sequence and a UE-specific scrambling sequence. In at least one embodiment, output of scramble

5408 may be input into modulation/mapping/precoding and other processes 5410. In at least one embodiment, various modulation, mapping, and precoding processes are performed. In at least one embodiment, other processes 5410 can include layer mapping, which can include generating parallel and/or separate signals to be transmitted to different units (e.g., different antennas or different radio units). In at least one embodiment, layer mapping includes each codeword being mapped to one or more multiple layers. For example, layer mapping includes a process where layer data is allocated to multiple antenna ports (e.g., logical antenna ports). In at least one embodiment, other processes 5410 can include generating signals to meet a standard such as 5G. In at least one embodiment, other processes 5410 includes generating signals that are compatible with MIMO.

In at least one embodiment, bits output from scramble 5408 are modulated with a modulation scheme, resulting in blocks of modulation symbols. In at least one embodiment, scrambled codewords undergo modulation using one of modulation schemes QPSK, 16 QAM, 64 QAM, resulting in a block of modulation symbols. In at least one embodiment, a channel interleaver process may be utilized that implements a first time mapping of modulation symbols onto a transmit waveform while ensuring that HARQ information is present on both slots. In at least one embodiment, modulation symbols are mapped to various layers based on transmit antennas. In at least one embodiment, symbols may be precoded, in which they are divided into sets, and an Inverse Fast Fourier Transform may be performed. In at least one embodiment, transport data and control multiplexing may be performed such that HARQ acknowledge (ACK) information is present in both slots and is mapped to resources around demodulation reference signals. In at least one embodiment, various precoding processes are performed.

In at least one embodiment, symbols are mapped to allocated physical resource elements in resource element mapping 5412. In at least one embodiment, allocation sizes may be limited to values whose prime factors are 2, 3 and 5. In at least one embodiment, symbols are mapped in increasing order beginning with subcarriers. In at least one embodiment, subcarrier mapped modulation symbols data are orthogonal frequency-division multiple access (OFDMA) modulated through IFFT operation in OFDMA modulation 5414. In at least one embodiment, time domain representations of each symbol are concatenated and filtered using transmit FIR filter to attenuate unwanted Out of Band emission to adjacent frequency bands caused by phase discontinuities and utilization of different numerologies. In at least one embodiment, an output of OFDMA modulation 5414 may be transmitted to be received and processed by another system.

In at least one embodiment, a transmission may be received by OFDMA demodulation 5416. In at least one embodiment, a transmission may originate from user mobile devices over a cellular network, although other contexts may be present. In at least one embodiment, a transmission may be demodulated through IFFT processing. In at least one embodiment, once OFDMA demodulation through IFFT processing has been accomplished, an estimation and correction of residual Sample Time Offset (STO) and Carrier Frequency Offset (CFO) may be performed. In at least one embodiment, both CFO and STO corrections have to be performed in frequency domain, because a received signal can be a superposition of transmissions coming from multiple UEs multiplexed in frequency, each suffering from a specific residual synchronization error. In at least one embodiment, residual CFO is estimated as a phase rotation between pilot subcarriers belonging to different OFDM symbols and corrected by a circular convolution operation in frequency domain.

In at least one embodiment, output of OFDMA demodulation 5416 may be received by resource element demapping 5418. In at least one embodiment, resource element demapping 5418 may determine symbols and demap symbols from allocated physical resource elements. In at least one embodiment, a channel estimation and equalization is performed in channel estimation 5420 in order to compensate for effects of multipath propagation. In at least one embodiment, channel estimation 5420 may be utilized to minimize effects of noise originating from various transmission layers and antennae. In at least one embodiment, channel estimation 5420 may generate equalized symbols from an output of resource element demapping 5418. In at least one embodiment, demodulation/demapping 5422 may receive equalized symbols from channel estimation 5420. In at least one embodiment, equalized symbols are demapped and permuted through a layer demapping operation. In at least one embodiment, a Maximum A Posteriori Probability (MAP) demodulation approach may be utilized to produce values representing beliefs regarding a received bit being 0 or 1, expressed in a form of Log-Likelihood Ratio (LLR).

In at least one embodiment, soft-demodulated bits are processed using various operations, including descrambling, deinterleaving and rate unmatching with LLR soft-combining using a circular buffer prior to LDPC decoding. In at least one embodiment, descramble 5424 may involve processes that reverse one or more processes of scramble 5408. In at least one embodiment, rate unmatch 5426 may involve processes that reverse one or more processes of rate match 5406. In at least one embodiment, descramble 5424 may receive output from demodulation/demapping 5422, and descramble received bits. In at least one embodiment, rate unmatch 5426 may receive descrambled bits, and utilize LLR soft-combining utilizing a circular buffer prior to LDPC decode 5428.

In at least one embodiment, decoding of LDPC codes in practical applications is done based on iterative belief propagation algorithms. In at least one embodiment, an LDPC code can be represented in a form of a bipartite graph with parity check matrix H of size M×N being a biadjacency matrix defining connections between graph nodes. In at least one embodiment, M rows of matrix H corresponds to parity check nodes, whereas N columns corresponds to variable nodes, i.e., received codeword bits. In at least one embodiment, a principle of belief propagation algorithms is based on iterative message exchange, in which A Posteriori probabilities between a variable and check nodes are updated, until a valid codeword is obtained. In at least one embodiment, LDPC decode 5428 may output a transport block comprising data.

In at least one embodiment, CRC check 5430 may determine errors and perform one or more actions based on parity bits attached to a received transport block. In at least one embodiment, CRC check 5430 may analyze and process parity bits attached to a received transport block, or otherwise any information associated with a CRC. In at least one embodiment, CRC check 5430 may transmit a processed transport block to a MAC layer for further processing.

It should be noted that, in various embodiments, transmitting and receiving data, which may be a transport block or other variation thereof, may include various processes not depicted in FIG. 54. In at least one embodiment, processes depicted in FIG. 54 are not intended to be exhaustive and further processes such as additional modulation, mapping, multiplexing, precoding, constellation mapping/demapping, MIMO detection, detection, decoding and variations thereof may be utilized in transmitting and receiving data as part of a network.

In at least one embodiment, components of FIG. 54 can be integrated into or included in computing environment 100 (FIG. 1) and computing environment 200 (FIG. 2). In at least one embodiment, components of FIG. 54 can include or communicate with controller 205 illustrated in FIG. 3. In at least one embodiment, components of FIG. 54 can perform processes 400 and 500 (FIGS. 4 and 5). In at least one embodiment, components of FIG. 54 can call or perform part or all of APIs disclosed in FIGS. 6-17. In at least one embodiment, components of FIG. 54 can perform examples in FIGS. 18 and 19.

Figure 55:
FIG. 55 illustrates an architecture of a system of a network, according to at least one embodiment.
Figure 55:
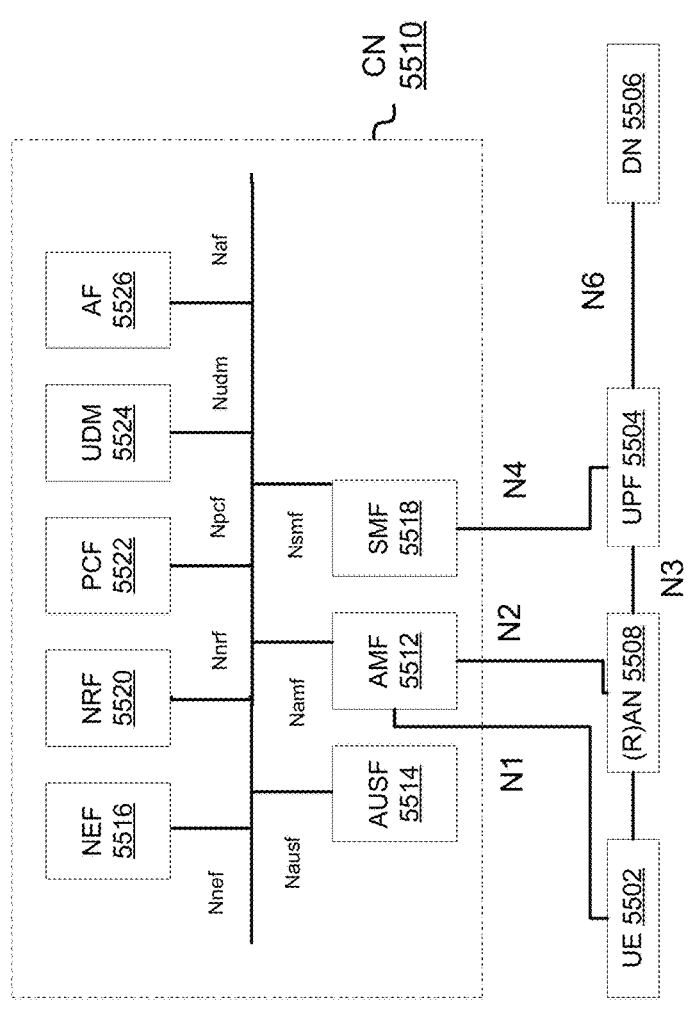

FIG. 55 illustrates an architecture of a system 5500 of a network in accordance with some embodiments. In at least one embodiment, system 5500 is shown to include a UE 5502, a 5G access node or RAN node (shown as (R)AN node 5508), a User Plane Function (shown as UPF 5504), a Data Network (DN 5506), which may be, for example, operator services, Internet access or 3rd party services, and a 5G Core Network (5GC) (shown as CN 5510).

In at least one embodiment, CN 5510 includes an Authentication Server Function (AUSF 5514); a Core Access and Mobility Management Function (AMF 5512); a Session Management Function (SMF 5518); a Network Exposure Function (NEF 5516); a Policy Control Function (PCF 5522); a Network Function (NF) Repository Function (NRF 5520); a Unified Data Management (UDM 5524); and an Application Function (AF 5526). In at least one embodiment, CN 5510 may also include other elements that are not shown, such as a Structured Data Storage network function (SDSF), an Unstructured Data Storage network function (UDSF), and variations thereof.

In at least one embodiment, UPF 5504 may act as an anchor point for intra-RAT and inter-RAT mobility, an external PDU session point of interconnect to DN 5506, and a branching point to support multi-homed PDU session. In at least one embodiment, UPF 5504 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in uplink and downlink, and downlink packet buffering and downlink data notification triggering. In at least one embodiment, UPF 5504 may include an uplink classifier to support routing traffic flows to a data network. In at least one embodiment, DN 5506 may represent various network operator services, Internet access, or third party services.

In at least one embodiment, AUSF 5514 may store data for authentication of UE 5502 and handle authentication related functionality. In at least one embodiment, AUSF 5514 may facilitate a common authentication framework for various access types.

In at least one embodiment, AMF 5512 may be responsible for registration management (e.g., for registering UE 5502, etc.), connection management, reachability management, mobility management, and lawful interception of AMF-related events, and access authentication and authorization. In at least one embodiment, AMF 5512 may provide transport for SM messages for SMF 5518, and act as a transparent proxy for routing SM messages. In at least one embodiment, AMF 5512 may also provide transport for short message service (SMS) messages between UE 5502 and an SMS function (SMSF) (not shown by FIG. 55). In at least one embodiment, AMF 5512 may act as Security Anchor Function (SEA), which may include interaction with AUSF 5514 and UE 5502 and receipt of an intermediate key that was established as a result of UE 5502 authentication process. In at least one embodiment, where USIM based authentication is used, AMF 5512 may retrieve security material from AUSF 5514. In at least one embodiment, AMF 5512 may also include a Security Context Management (SCM) function, which receives a key from SEA that it uses to derive access-network specific keys. In at least one embodiment, furthermore, AMF 5512 may be a termination point of RAN CP interface (N2 reference point), a termination point of NAS (NI) signaling, and perform NAS ciphering and integrity protection.

In at least one embodiment, AMF 5512 may also support NAS signaling with a UE 5502 over an N3 interworking-function (IWF) interface. In at least one embodiment, N3IWF may be used to provide access to untrusted entities. In at least one embodiment, N3IWF may be a termination point for N2 and N3 interfaces for control plane and user plane, respectively, and as such, may handle N2 signaling from SMF and AMF for PDU sessions and QoS, encapsulate/de-encapsulate packets for IPSec and N3 tunneling, mark N3 user-plane packets in uplink, and enforce QoS corresponding to N3 packet marking taking into account QoS requirements associated to such marking received over N2. In at least one embodiment, N3IWF may also relay uplink and downlink control-plane NAS (NI) signaling between UE 5502 and AMF 5512, and relay uplink and downlink user-plane packets between UE 5502 and UPF 5504. In at least one embodiment, N3IWF also provides mechanisms for IPsec tunnel establishment with UE 5502.

In at least one embodiment, SMF 5518 may be responsible for session management (e.g., session establishment, modify and release, including tunnel maintain between UPF and AN node); UE IP address allocation & management (including optional Authorization); Selection and control of UP function; Configures traffic steering at UPF to route traffic to proper destination; termination of interfaces towards Policy control functions; control part of policy enforcement and QoS; lawful intercept (for SM events and interface to LI System); termination of SM parts of NAS messages; downlink Data Notification; initiator of AN specific SM information, sent via AMF over N2 to AN; determine SSC mode of a session. In at least one embodiment, SMF 5518 may include following roaming functionality: handle local enforcement to apply QoS SLAB (VPLMN); charging data collection and charging interface (VPLMN); lawful intercept (in VPLMN for SM events and interface to LI System); support for interaction with external DN for transport of signaling for PDU session authorization/authentication by external DN.

In at least one embodiment, NEF 5516 may provide means for securely exposing services and capabilities provided by 3GPP network functions for third party, internal exposure/re-exposure, Application Functions (e.g., AF 5526), edge computing or fog computing systems, etc. In at least one embodiment, NEF 5516 may authenticate, authorize, and/or throttle AFs. In at least one embodiment, NEF 5516 may also translate information exchanged with AF 5526 and information exchanged with internal network functions. In at least one embodiment, NEF 5516 may translate between an AF-Service-Identifier and an internal 5GC information. In at least one embodiment, NEF 5516 may also receive information from other network functions (NFs) based on exposed capabilities of other network functions. In at least one embodiment, this information may be stored at NEF 5516 as structured data, or at a data storage NF using a standardized interface. In at least one embodiment, stored information can then be re-exposed by NEF 5516 to other NFs and AFs, and/or used for other purposes such as analytics.

In at least one embodiment, NRF 5520 may support service discovery functions, receive NF Discovery Requests from NF instances, and provide information of discovered NF instances to NF instances. In at least one embodiment, NRF 5520 also maintains information of available NF instances and their supported services.

In at least one embodiment, PCF 5522 may provide policy rules to control plane function(s) to enforce them, and may also support unified policy framework to govern network behavior. In at least one embodiment, PCF 5522 may also implement a front end (FE) to access subscription information relevant for policy decisions in a UDR of UDM 5524.

In at least one embodiment, UDM 5524 may handle subscription-related information to support a network entity's handling of communication sessions, and may store subscription data of UE 5502. In at least one embodiment, UDM 5524 may include two parts, an application FE and a User Data Repository (UDR). In at least one embodiment, UDM may include a UDM FE, which is in charge of processing of credentials, location management, subscription management and so on. In at least one embodiment, several different front ends may serve a same user in different transactions. In at least one embodiment, UDM-FE accesses subscription information stored in an UDR and performs authentication credential processing; user identification handling; access authorization; registration/mobility management; and subscription management. In at least one embodiment, UDR may interact with PCF 5522. In at least one embodiment, UDM 5524 may also support SMS management, wherein an SMS-FE implements a similar application logic as discussed previously.

In at least one embodiment, AF 5526 may provide application influence on traffic routing, access to a Network Capability Exposure (NCE), and interact with a policy framework for policy control. In at least one embodiment, NCE may be a mechanism that allows a 5GC and AF 5526 to provide information to each other via NEF 5516, which may be used for edge computing implementations. In at least one embodiment, network operator and third party services may be hosted close to UE 5502 access point of attachment to achieve an efficient service delivery through a reduced end-to-end latency and load on a transport network. In at least one embodiment, for edge computing implementations, 5GC may select a UPF 5504 close to UE 5502 and execute traffic steering from UPF 5504 to DN 5506 via N6 interface. In at least one embodiment, this may be based on UE subscription data, UE location, and information provided by AF 5526. In at least one embodiment, AF 5526 may influence UPF (re)selection and traffic routing. In at least one embodiment, based on operator deployment, when AF 5526 is considered to be a trusted entity, a network operator may permit AF 5526 to interact directly with relevant NFs.

In at least one embodiment, CN 5510 may include an SMSF, which may be responsible for SMS subscription checking and verification, and relaying SM messages to/from UE 5502 to/from other entities, such as an SMS-GMSC/IWMSC/SMS-router. In at least one embodiment, SMS may also interact with AMF 5512 and UDM 5524 for notification procedure that UE 5502 is available for SMS transfer (e.g., set a UE not reachable flag, and notifying UDM 5524 when UE 5502 is available for SMS).

In at least one embodiment, system 5500 may include following service-based interfaces: Namf: Service-based interface exhibited by AMF; Nsmf: Service-based interface exhibited by SMF; Nnef: Service-based interface exhibited by NEF; Npcf: Service-based interface exhibited by PCF; Nudm: Service-based interface exhibited by UDM; Naf: Service-based interface exhibited by AF; Nnrf: Service-based interface exhibited by NRF; and Nausf: Service-based interface exhibited by AUSF.

In at least one embodiment, system 5500 may include following reference points: N1: Reference point between UE and AMF; N2: Reference point between (R)AN and AMF; N3: Reference point between (R)AN and UPF; N4: Reference point between SMF and UPF; and N6: Reference point between UPF and a Data Network. In at least one embodiment, there may be many more reference points and/or service-based interfaces between a NF services in NFs, however, these interfaces and reference points have been omitted for clarity. In at least one embodiment, an NS reference point may be between a PCF and AF; an N7 reference point may be between PCF and SMF; an N11 reference point between AMF and SMF; etc. In at least one embodiment, CN 5510 may include an Nx interface, which is an inter-CN interface between MME and AMF 5512 in order to enable interworking between CN 5510 and CN 7255.

In at least one embodiment, system 5500 may include multiple RAN nodes (such as (R)AN node 5508) wherein an Xn interface is defined between two or more (R)AN node 5508 (e.g., gNBs) that connecting to 5GC 410, between a (R)AN node 5508 (e.g., gNB) connecting to CN 5510 and an eNB (e.g., a macro RAN node), and/or between two eNBs connecting to CN 5510.

In at least one embodiment, Xn interface may include an Xn user plane (Xn-U) interface and an Xn control plane (Xn-C) interface. In at least one embodiment, Xn-U may provide non-guar-anteed delivery of user plane PDUs and support/provide data forwarding and flow control function-ality. In at least one embodiment, Xn-C may provide man-agement and error handling functionality, functionality to manage a Xn-C interface; mobility support for UE 5502 in a connected mode (e.g., CM-CONNECTED) including functionality to manage UE mobility for connected mode between one or more (R)AN node 5508. In at least one embodiment, mobility support may include context transfer from an old (source) serving (R)AN node 5508 to new (target) serving (R)AN node 5508; and control of user plane tunnels between old (source) serving (R)AN node 5508 to new (target) serving (R)AN node 5508.

In at least one embodiment, a protocol stack of a Xn-U may include a transport network layer built on Internet Protocol (IP) transport layer, and a GTP-U layer on top of a UDP and/or IP layer(s) to carry user plane PDUs. In at least one embodiment, Xn-C protocol stack may include an application layer signaling protocol (referred to as Xn Appli-cation Protocol (Xn-AP)) and a transport network layer that is built on an SCTP layer. In at least one embodiment, SCTP layer may be on top of an IP layer. In at least one embodi-ment, SCTP layer provides a guaranteed delivery of appli-cation layer messages. In at least one embodiment, in a transport IP layer point-to-point transmission is used to deliver signaling PDUs. In at least one embodiment, Xn-U protocol stack and/or a Xn-C protocol stack may be same or similar to a user plane and/or control plane protocol stack(s) shown and described herein.

In at least one embodiment, components of FIG. 55 can be integrated into or included in computing environment 100 (FIG. 1) and computing environment 200 (FIG. 2). In at least one embodiment, components of FIG. 55 can include or communicate with controller 205 illustrated in FIG. 3. In at least one embodiment, components of FIG. 55 can perform processes 400 and 500 (FIGS. 4 and 5). In at least one embodiment, components of FIG. 55 can call or perform part or all of APIs disclosed in FIGS. 6-17. In at least one embodiment, components of FIG. 55 can perform examples in FIGS. 18 and 19.

Figure 56:
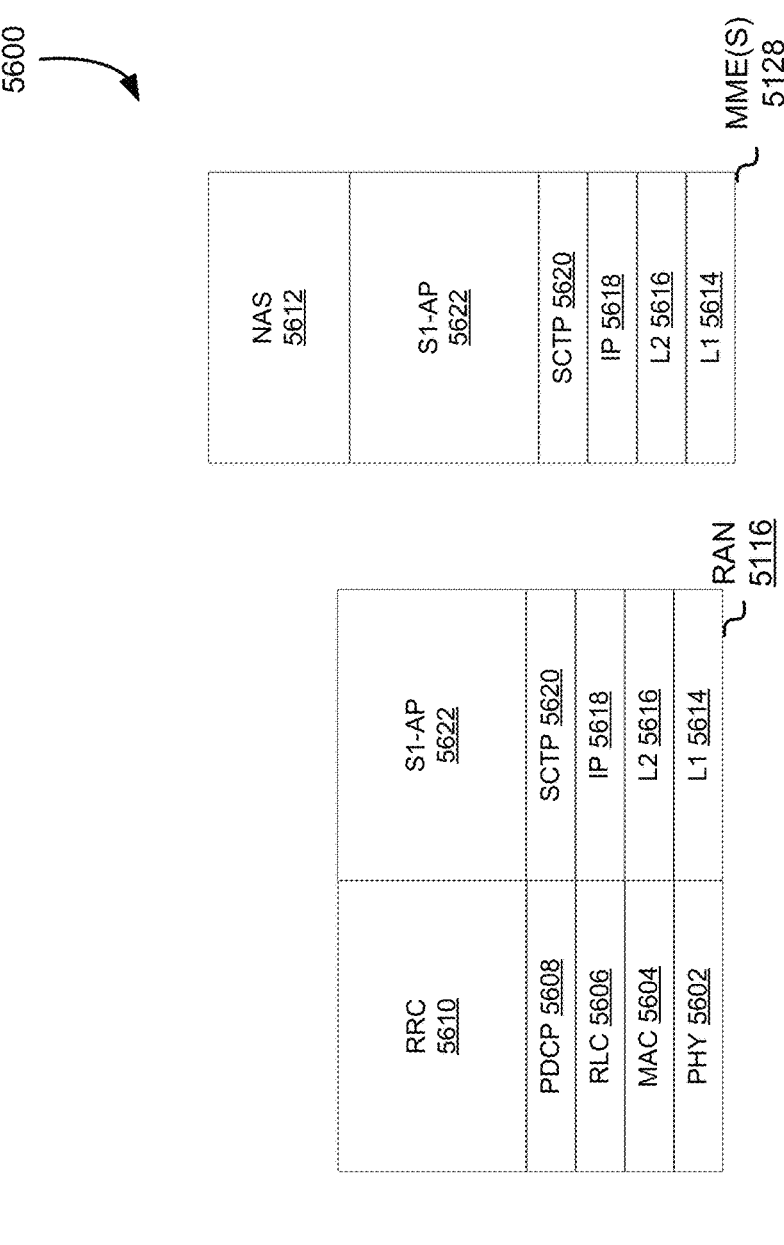
FIG. 56 illustrates a control plane protocol stack, according to at least one embodiment.
Figure 56:
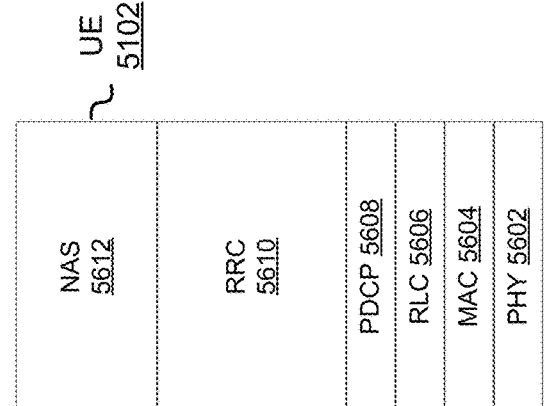

FIG. 56 is an illustration of a control plane protocol stack in accordance with some embodiments. In at least one embodiment, a control plane 5600 is shown as a communi-cations protocol stack between UE 5102 (or alternatively, UE 5104), RAN 5116, and MME(s) 5128.

In at least one embodiment, PHY layer 5602 may transmit or receive information used by MAC layer 5604 over one or more air interfaces. In at least one embodiment, PHY layer 5602 may further perform link adaptation or adaptive modu-lation and coding (AMC), power control, cell search (e.g., for initial synchronization and handover purposes), and other measurements used by higher layers, such as an RRC layer 5610. In at least one embodiment, PHY layer 5602 may still further perform error detection on transport chan-nels, forward error correction (FEC) coding/de-coding of transport channels, modulation/demodulation of physical channels, interleaving, rate matching, mapping onto physi-cal channels, and Multiple Input Multiple Output (MIMO) antenna processing.

In at least one embodiment, MAC layer 5604 may per-form mapping between logical channels and transport chan-nels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from PHY via transport channels, multiplexing MAC SDUs onto TBs, scheduling information reporting, error correction through hybrid automatic repeat request (HARD), and logical channel prioritization.

In at least one embodiment, RLC layer 5606 may operate in a plurality of modes of operation, including: Transparent Mode (TM), Unacknowledged Mode (UM), and Acknowl-edged Mode (AM). In at least one embodiment, RLC layer 5606 may execute transfer of upper layer protocol data units (PDUs), error correction through automatic repeat request (ARQ) for AM data transfers, and concatenation, segmen-tation and reassembly of RLC SDUs for UM and AM data transfers. In at least one embodiment, RLC layer 5606 may also execute re-segmentation of RLC data PDUs for AM data transfers, reorder RLC data PDUs for UM and AM data transfers, detect duplicate data for UM and AM data trans-fers, discard RLC SDUs for UM and AM data transfers, detect protocol errors for AM data transfers, and perform RLC re-establishment.

In at least one embodiment, PDCP layer 5608 may execute header compression and decompression of IP data, maintain PDCP Sequence Numbers (SNs), perform in-se-quence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

In at least one embodiment, main services and functions of a RRC layer 5610 may include broadcast of system information (e.g., included in Master Information Blocks (MIBs) or System Information Blocks (SIBs) related to a non-access stratum (NAS)), broadcast of system information related to an access stratum (AS), paging, establishment, maintenance and release of an RRC connection between an UE and E-UTRAN (e.g., RRC connection paging, RRC connection establishment, RRC connection modification, and RRC connection release), establishment, configuration, maintenance and release of point-to-point radio bearers, security functions including key management, inter radio access technology (RAT) mobility, and measurement configuration for UE measurement reporting. In at least one embodiment, said MIBs and SIBs may comprise one or more information elements (IEs), which may each comprise individual data fields or data structures.

In at least one embodiment, UE 5102 and RAN 5116 may utilize a Uu interface (e.g., an LTE-Uu interface) to exchange control plane data via a protocol stack comprising PHY layer 5602, MAC layer 5604, RLC layer 5606, PDCP layer 5608, and RRC layer 5610.

In at least one embodiment, non-access stratum (NAS) protocols (NAS protocols 5612) form a highest stratum of a control plane between UE 5102 and MME(s) 5128. In at least one embodiment, NAS protocols 5612 support mobility of UE 5102 and session management procedures to establish and maintain IP connectivity between UE 5102 and P-GW 5134.

In at least one embodiment, Si Application Protocol (S1-AP) layer (Si-AP layer 5622) may support functions of a Si interface and comprise Elementary Procedures (EPs). In at least one embodiment, an EP is a unit of interaction between RAN 5116 and CN 5128. In at least one embodiment, S1-AP layer services may comprise two groups: UE-associated services and non UE-associated services. In at least one embodiment, these services perform functions including, but not limited to: E-UTRAN Radio Access Bearer (E-RAB) management, UE capability indication, mobility, NAS signaling transport, RAN Information Management (RIM), and configuration transfer.

In at least one embodiment, Stream Control Transmission Protocol (SCTP) layer (alternatively referred to as a stream control transmission protocol/internet protocol (SCTP/IP) layer) (SCTP layer 5620) may ensure reliable delivery of signaling messages between RAN 5116 and MME(s) 5128 based, in part, on an IP protocol, supported by an IP layer 5618. In at least one embodiment, L2 layer 5616 and an L1 layer 5614 may refer to communication links (e.g., wired or wireless) used by a RAN node and MME to exchange information.

In at least one embodiment, RAN 5116 and MME(s) 5128 may utilize an S1-MME interface to exchange control plane data via a protocol stack comprising a L1 layer 5614, L2 layer 5616, IP layer 5618, SCTP layer 5620, and Si-AP layer 5622.

In at least one embodiment, components of FIG. 56 can be integrated into or included in computing environment 100 (FIG. 1) and computing environment 200 (FIG. 2). In at least one embodiment, components of FIG. 56 can include or communicate with controller 205 illustrated in FIG. 3. In at least one embodiment, components of FIG. 56 can perform processes 400 and 500 (FIGS. 4 and 5). In at least one embodiment, components of FIG. 56 can call or perform part or all of APIs disclosed in FIGS. 6-17. In at least one embodiment, components of FIG. 56 can perform examples in FIGS. 18 and 19.

Figure 57:
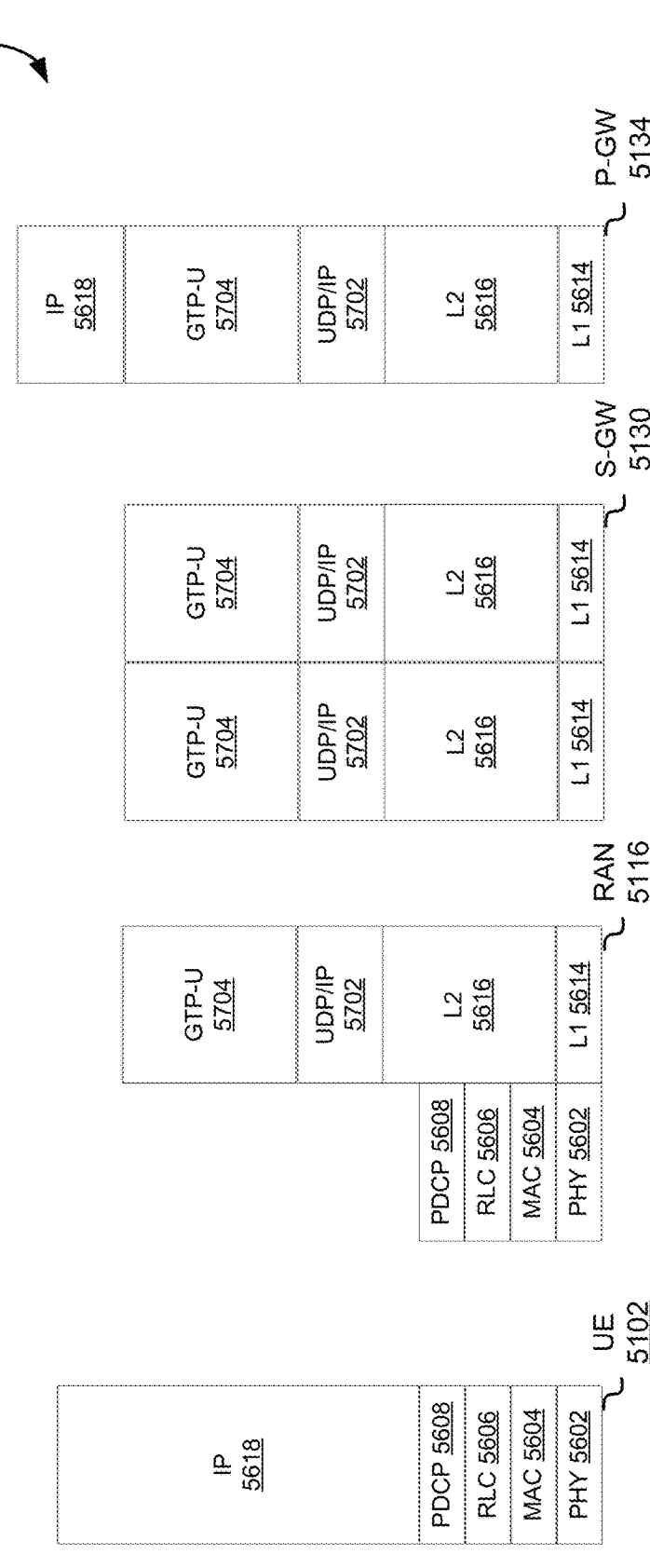
FIG. 57 illustrates a user plane protocol stack, according to at least one embodiment.

FIG. 57 is an illustration of a user plane protocol stack in accordance with at least one embodiment. In at least one embodiment, a user plane 5700 is shown as a communications protocol stack between a UE 5102, RAN 5116, S-GW 5130, and P-GW 5134. In at least one embodiment, user plane 5700 may utilize a same protocol layers as control plane 5600. In at least one embodiment, for example, UE 5102 and RAN 5116 may utilize a Uu interface (e.g., an LTE-Uu interface) to exchange user plane data via a protocol stack comprising PHY layer 5602, MAC layer 5604, RLC layer 5606, PDCP layer 5608.

In at least one embodiment, General Packet Radio Service (GPRS) Tunneling Protocol for a user plane (GTP-U) layer (GTP-U layer 5704) may be used for carrying user data within a GPRS core network and between a radio access network and a core network. In at least one embodiment, user data transported can be packets in any of IPv4, IPv6, or PPP formats, for example. In at least one embodiment, UDP and IP security (UDP/IP) layer (UDP/IP layer 5702) may provide checksums for data integrity, port numbers for addressing different functions at a source and destination, and encryption and authentication on selected data flows. In at least one embodiment, RAN 5116 and S-GW 5130 may utilize an S1-U interface to exchange user plane data via a protocol stack comprising L1 layer 5614, L2 layer 5616, UDP/IP layer 5702, and GTP-U layer 5704. In at least one embodiment, S-GW 5130 and P-GW 5134 may utilize an S5/S8a interface to exchange user plane data via a protocol stack comprising L1 layer 5614, L2 layer 5616, UDP/IP layer 5702, and GTP-U layer 5704. In at least one embodiment, as discussed above with respect to FIG. 56, NAS protocols support a mobility of UE 5102 and session management procedures to establish and maintain IP connectivity between UE 5102 and P-GW 5134.

In at least one embodiment, components of FIG. 57 can be integrated into or included in computing environment 100 (FIG. 1) and computing environment 200 (FIG. 2). In at least one embodiment, components of FIG. 57 can include or communicate with controller 205 illustrated in FIG. 3. In at least one embodiment, components of FIG. 57 can perform processes 400 and 500 (FIGS. 4 and 5). In at least one embodiment, components of FIG. 57 can call or perform part or all of APIs disclosed in FIGS. 6-17. In at least one embodiment, components of FIG. 57 can perform examples in FIGS. 18 and 19.

Figure 58:
FIG. 58 illustrates components of a core network, according to at least one embodiment.
Figure 58:
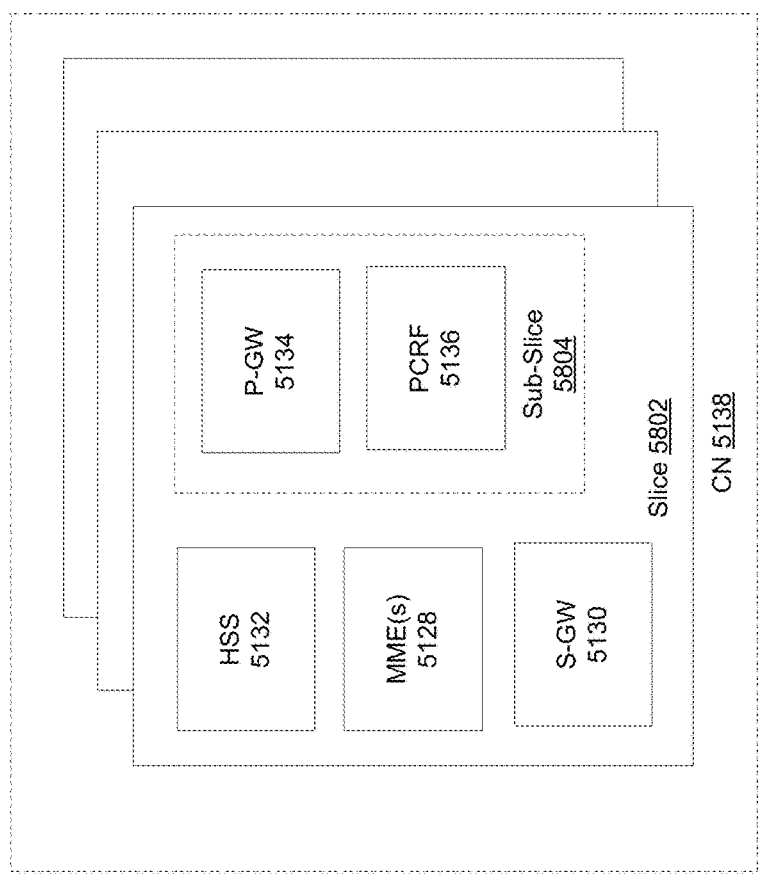

FIG. 58 illustrates components 5800 of a core network in accordance with at least one embodiment. In at least one embodiment, components of CN 5138 may be implemented in one physical node or separate physical nodes including components to read and execute instructions from a machine-readable or computer-readable medium (e.g., a non-transitory machine-readable storage medium). In at least one embodiment, Network Functions Virtualization (NFV) is utilized to virtualize any or all of above described network node functions via executable instructions stored in one or more computer readable storage mediums (described in further detail below). In at least one embodiment, a logical instantiation of CN 5138 may be referred to as a network slice 5802 (e.g., network slice 5802 is shown to include HSS 5132, MME(s) 5128, and S-GW 5130). In at least one embodiment, a logical instantiation of a portion of CN 5138 may be referred to as a network sub-slice 5804 (e.g., network sub-slice 5804 is shown to include P-GW 5134 and PCRF 5136).

In at least one embodiment, NFV architectures and infrastructures may be used to virtualize one or more network functions, alternatively performed by proprietary hardware, onto physical resources comprising a combination of industry-standard server hardware, storage hardware, or switches. In at least one embodiment, NFV systems can be used to execute virtual or reconfigurable implementations of one or more EPC components/functions.

In at least one embodiment, components 5800 of FIG. 58 can be integrated into or included in computing environment 100 (FIG. 1) and computing environment 200 (FIG. 2). In at least one embodiment, components of FIG. 58 can include or communicate with controller 205 illustrated in FIG. 3. In at least one embodiment, components 5800 of FIG. 58 can perform processes 400 and 500 (FIGS. 4 and 5). In at least one embodiment, components 5800 of FIG. 58 can call or perform part or all of APIs disclosed in FIGS. 6-17. In at least one embodiment, components 5800 of FIG. 58 can perform examples in FIGS. 18 and 19.

Figure 59:
FIG. 59 illustrates components of a system to support network function virtualization (NFV), according to at least one embodiment.
Figure 59:
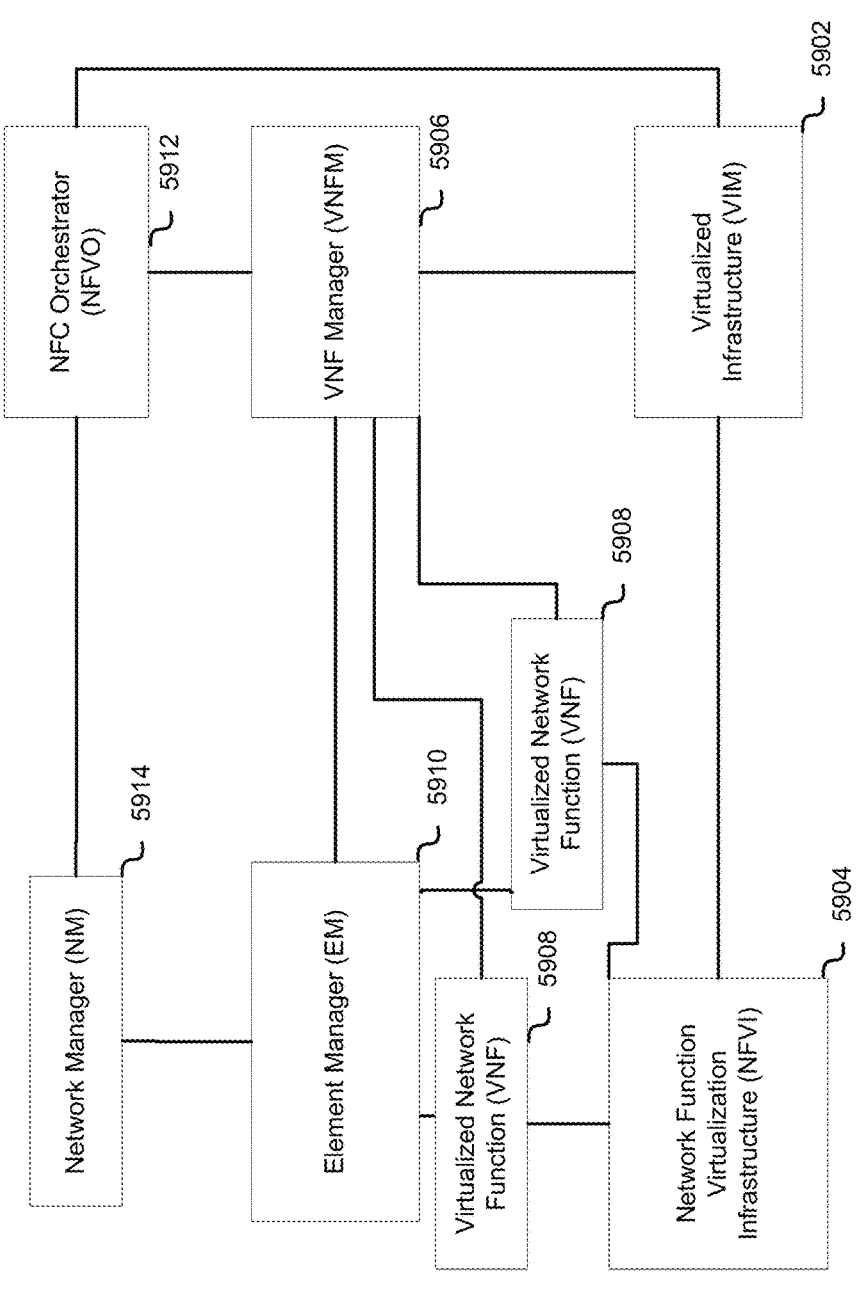

FIG. 59 is a block diagram illustrating components, according to at least one embodiment, of a system 5900 to support network function virtualization (NFV). In at least one embodiment, system 5900 is illustrated as including a virtualized infrastructure manager (shown as VIM 5902), a network function virtualization infrastructure (shown as NFVI 5904), a VNF manager (shown as VNFM 5906), virtualized network functions (shown as VNF 5908), an element manager (shown as EM 5910), an NFV Orchestrator (shown as NFVO 5912), and a network manager (shown as NM 5914).

In at least one embodiment, VIM 5902 manages resources of NFVI 5904. In at least one embodiment, NFVI 5904 can include physical or virtual resources and applications (including hypervisors) used to execute system 5900. In at least one embodiment, VIM 5902 may manage a life cycle of virtual resources with NFVI 5904 (e.g., creation, maintenance, and tear down of virtual machines (VMs) associated with one or more physical resources), track VM instances, track performance, fault and security of VM instances and associated physical resources, and expose VM instances and associated physical resources to other management systems.

In at least one embodiment, VNFM 5906 may manage VNF 5908. In at least one embodiment, VNF 5908 may be used to execute EPC components/functions. In at least one embodiment, VNFM 5906 may manage a life cycle of VNF 5908 and track performance, fault and security of virtual aspects of VNF 5908. In at least one embodiment, EM 5910 may track performance, fault and security of functional aspects of VNF 5908. In at least one embodiment, tracking data from VNFM 5906 and EM 5910 may comprise, for example, performance measurement (PM) data used by VIM 5902 or NFVI 5904. In at least one embodiment, both VNFM 5906 and EM 5910 can scale up/down a quantity of VNFs of system 5900.

In at least one embodiment, NFVO 5912 may coordinate, authorize, release and engage resources of NFVI 5904 in order to provide a requested service (e.g., to execute an EPC function, component, or slice). In at least one embodiment, NM 5914 may provide a package of end-user functions with responsibility for a management of a network, which may include network elements with VNFs, non-virtualized network functions, or both (management of the VNFs may occur via the EM 5910).

In at least one embodiment, components of FIG. 59 can be integrated into or included in computing environment 100 (FIG. 1) and computing environment 200 (FIG. 2). In at least one embodiment, components of FIG. 59 can include or communicate with controller 205 illustrated in FIG. 3. In at least one embodiment, components of FIG. 59 can perform processes 400 and 500 (FIGS. 4 and 5). In at least one embodiment, components of FIG. 59 can call or perform part or all of APIs disclosed in FIGS. 6-17. In at least one embodiment, components of FIG. 59 can perform examples in FIGS. 18 and 19.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

At least one embodiment of the disclosure can be described in view of the following clauses, which include twelve sets of clauses that can be combined.

Clauses Set One

Clause 1. A processor comprising: one or more circuits to perform an application programming interface (API) to indicate one or more devices within one or more fifth generation new radio (5G-NR) access networks, with which one or more devices within one or more 5G transport networks is to share information.

Clause 2. The processor of any of the preceding clauses, wherein the information includes analytic information of performance of the one or more 5G transport networks.

Clause 3. The processor of any of the preceding clauses, wherein to indicate includes to provide an internet protocol (IP) address of the one or more devices within the one or more 5G-NR access networks to one or more devices within the one or more 5G transport networks.

Clause 4. The processor of any of the preceding clauses, wherein the API is callable to subscribe to the information.

Clause 5. The processor of any of the preceding clauses, wherein the one or more circuits are to further adjust one or more settings of the one or more 5G-NR access networks based, at least in part, on the analytic data.

Clause 6. The processor of any of the preceding clauses, wherein the processor is to call the API in response to an event occurring.

Clause 7. The processor of any of the preceding clauses, wherein the one or more devices within the one or more 5G-NR access networks are to use the information to modify a modulation scheme of the one or more 5G-NR access networks.

Clause 8. A system, comprising memory to store instructions that, as a result of performance by one or more processors, cause the system to perform an application programming interface (API) to indicate one or more devices within one or more fifth generation new radio (5G-NR) access networks, with which one or more devices within one or more 5G transport networks is to share information.

Clause 9. The system of any of the preceding clauses, wherein the information includes analytic information of performance of the one or more 5G transport networks.

Clause 10. The system of any of the preceding clauses, wherein to indicate includes to provide an internet protocol (IP) address of the one or more devices within the one or more 5G-NR access networks to one or more devices within the one or more 5G transport networks.

Clause 11. The system of any of the preceding clauses, wherein the API is callable to subscribe to the information.

Clause 12. The system of any of the preceding clauses, wherein the information includes analytic data, wherein the one or more circuits are to further adjust one or more settings of the one or more 5G-NR access networks based, at least in part, on the analytic data.

Clause 13. The system of any of the preceding clauses, wherein the processor is to call the API in response to an event occurring.

Clause 14. The system of any of the preceding clauses, wherein the one or more devices within the one or more 5G-NR access networks are to use the information to modify a modulation scheme of the one or more 5G-NR access networks.

Clause 15. A method comprising: performing an application programming interface (API) to indicate one or more devices within one or more fifth generation new radio (5G-NR) access networks, with which one or more devices within one or more 5G transport networks is to share information.

Clause 16. The method of any of the preceding clauses, wherein the information includes analytic information of performance of the one or more 5G transport networks.

Clause 17. The method of any of the preceding clauses, wherein the API is callable to subscribe to the information.

Clause 18. The method of any of the preceding clauses, wherein to indicate further comprises: providing an internet protocol (IP) address of the one or more devices within one or more 5G-NR access networks.

Clause 19. The method of any of the preceding clauses, wherein the information includes analytic data that, where the method further comprises: using the analytic data to adjust network settings of the one or more 5G-NR access networks.

Clause 20. The method of any of the preceding clauses, the method further comprises: modifying, by the one or more devices within the one or more 5G-NR access networks, a modulation scheme of the one or more 5G-NR access networks based, at least in part, on the shared information.

Clauses Set Two

Clause 1. A processor comprising: one or more circuits to perform an application programming interface (API) to indicate one or more devices within one or more fifth generation new radio (5G-NR) access networks, with which one or more devices within one or more 5G core networks is to share information.

Clause 2. The processor of any of the preceding clauses, wherein the information includes analytic information of performance of the one or more 5G core networks.

Clause 3. The processor of any of the preceding clauses, wherein to indicate includes to provide an internet protocol (IP) address of the one or more devices within the one or more 5G-NR access networks to one or more devices within the 5G core networks.

Clause 4. The processor of any of the preceding clauses, wherein the API is callable to subscribe to the information.

Clause 5. The processor of any of the preceding clauses, wherein the information includes analytic data, wherein the one or more circuits are to further adjust one or more settings of the one or more 5G access networks based, at least in part, on the analytic data.

Clause 6. The processor of any of the preceding clauses, wherein the processor is to call the API in response to an event occurring.

Clause 7. The processor of any of the preceding clauses, wherein the one or more devices within the one or more 5G-NR access networks are to use the shared information to modify a modulation scheme of the one or more 5G-NR access networks.

Clause 8. A system, comprising memory to store instructions that, as a result of performance by one or more processors, cause the system to perform an application programming interface (API) to indicate one or more devices within one or more fifth generation new radio (5G-NR) access networks, with which one or more devices within one or more 5G core networks is to share information.

Clause 9. The system of any of the preceding clauses, wherein the information includes analytic information of performance of the one or more 5G core networks.

Clause 10. The system of any of the preceding clauses, wherein to indicate includes to provide an internet protocol (IP) address of the one or more devices within the one or more 5G-NR access networks.

Clause 11. The system of any of the preceding clauses, wherein the API is callable to subscribe to the information.

Clause The system of any of the preceding clauses, wherein the information includes analytic data, wherein the one or more devices within the one or more 5G-NR access networks adjust network settings of the one or more 5G-NR access networks based, at least in part, on the analytic data.

Clause 13. The system of any of the preceding clauses, wherein the processor is to call the API in response to an event occurring.

Clause 14. The system of any of the preceding clauses, wherein the one or more devices within the one or more 5G-NR access networks are to use the information to modify a modulation scheme of the one or more 5G-NR access networks.

Clause 15. A method comprising: performing an application programming interface (API) to indicate one or more devices within one or more fifth generation new radio (5G-NR) access networks, with which one or more devices within one or more 5G core networks is to share information.

Clause 16. The method of any of the preceding clauses, wherein the information includes analytic information of performance of the one or more 5G core networks.

Clause 17. The method of any of the preceding clauses, the method further comprises: calling, by the one or more devices within the 5G-NR access networks, the API to initiate a subscription service, wherein the subscription service performed by one or more processors is to periodically provide analytic information of the one or more 5G core networks to the 5G-NR access network wherein the information includes quality of service information of the one or more 5G core networks.

Clause 18. The method of any of the preceding clauses, wherein to indicate further comprises: providing an internet protocol (IP) address of the one or more devices within one or more 5G-NR access networks.

Clause 19. The method of any of the preceding clauses, wherein the information includes analytic data, wherein the one or more devices within the one or more 5G-NR access networks adjust network settings of the one or more 5G-NR access networks based, at least in part, on the analytic data.

Clause 20. The method of any of the preceding clauses, the method further comprises: modifying a modulation scheme of the one or more 5G-NR access networks based, at least in part on, the information.

Clauses Set Three

Clause 1. A processor comprising: one or more circuits to perform an application programming interface (API) to indicate one or more devices within one or more fifth generation new radio (5G-NR) transport networks, with which one or more devices within one or more 5G access networks is to share information.

Clause 2. The processor of any of the preceding clauses, wherein the information includes analytic information of performance of the one or more 5G access networks.

Clause 3. The processor of any of the preceding clauses, wherein to indicate includes to provide an internet protocol (IP) address of the one or more devices within the one or more 5G-NR transport networks to the one or more devices within one or more 5G access networks.

Clause 4. The processor of any of the preceding clauses, wherein the API is callable to subscribe to the information.

Clause 5. The processor of any of the preceding clauses, wherein the information includes analytic data, wherein the one or more circuits are to further adjust one or more settings of the one or more 5G transport networks based, at least in part, on the analytic data.

Clause 6. The processor of any of the preceding clauses, wherein the processor is to call the API in response to an event occurring.

Clause 7. The processor of any of the preceding clauses, wherein the one or more devices within the one or more 5G-NR transport networks are to use the information to modify a routing table of one or more devices within the one or more 5G-NR transport networks.

Clause 8. A system, comprising memory to store instructions that, as a result of performance by one or more processors, cause the system to perform an application programming interface (API) to indicate one or more devices within one or more fifth generation new radio (5G-NR) transport networks, with which one or more devices within one or more 5G access networks is to share information.

Clause 9. The system of any of the preceding clauses, wherein the information includes analytic information of performance of the one or more 5G access networks.

Clause 10. The system of any of the preceding clauses, wherein to indicate includes to provide an internet protocol (IP) address of the one or more devices within the one or more 5G-NR transport networks to the one or more devices within one or more 5G access networks.

Clause 11. The system of any of the preceding clauses, wherein the one or more devices within the one or more 5G-NR transport networks call the API to initiate a subscription service, wherein the subscription service performed by one or more processors is to periodically provide analytic information of the one or more 5G access networks to the one or more 5G-NR transport networks.

Clause 12. The system of any of the preceding clauses, wherein the information includes analytic data that the one or more devices within the one or more 5G-NR access networks use to adjust settings of the one or more 5G-NR access network.

Clause 13. The system of any of the preceding clauses, wherein the processor is to call the API in response to an event occurring.

Clause 14. The system of any of the preceding clauses, wherein the one or more devices within the one or more 5G-NR transport networks are to use the information to modify a routing table of one or more devices within the one or more 5G-NR transport networks.

Clause 15. A method comprising: performing an application programming interface (API) to indicate one or more devices within one or more fifth generation new radio (5G-NR) transport networks, with which one or more devices within one or more 5G access networks is to share information.

Clause 16. The method of any of the preceding clauses, wherein the information includes analytic information of performance of the one or more 5G access networks.

Clause 17. The method of any of the preceding clauses, wherein to indicate includes to provide an internet protocol (IP) address of the one or more devices within one or more fifth generation new radio (5G-NR) transport networks.

Clause 18. The method of any of the preceding clauses, wherein the one or more devices within the one or more 5G-NR transport networks call the API to initiate a subscription service, wherein the subscription service performed by one or more processors is to periodically provide analytic information of the one or more 5G access networks to the one or more 5G-NR transport networks.

Clause 19. The method of any of the preceding clauses, wherein the information includes analytic data the method further comprises: modifying settings of the one or more 5G-NR transport networks based, at least in part, on the analytic data.

Clause 20. The method of any of the preceding clauses, the method further comprising: using, by the one or more devices within the one or more 5G-NR transport networks, the information to modify a routing table of the one or more devices within the one or more 5G-NR transport networks.

Clauses Set Four

Clause 1. A processor comprising: one or more circuits to perform an application programming interface (API) to indicate one or more devices within one or more fifth generation new radio (5G-NR) transport networks, with which one or more devices within one or more 5G core networks is to share information.

Clause 2. The processor of any of the preceding clauses, wherein the information includes analytic information of performance of the one or more 5G core networks.

Clause 3. The processor of any of the preceding clauses, wherein to indicate includes to provide an internet protocol (IP) address of the one or more devices within the one or more 5G-NR transport networks to the one or more devices within the one or more 5G core networks.

Clause 4. The processor of any of the preceding clauses, wherein the API is callable to subscribe to the information.

Clause 5. The processor of any of the preceding clauses, wherein the information includes analytic data, wherein the one or more circuits are to further adjust one or more settings of the one or more 5G-NR transport networks based, at least in part, on the analytic data.

Clause 6. The processor of any of the preceding clauses, wherein the processor is to call the API in response to an event occurring.

Clause 7. The processor of any of the preceding clauses, wherein the one or more devices within the one or more 5G-NR transport networks are to use the information to modify a routing table of the one or more devices within the one or more 5G-NR transport networks.

Clause 8. A system, comprising memory to store instructions that, as a result of performance by one or more processors, cause the system to perform an application programming interface (API) to indicate one or more devices within one or more fifth generation new radio (5G-NR) transport networks, with which one or more devices within one or more 5G access networks is to share information.

Clause 9. The system of any of the preceding clauses, wherein the information includes analytic information of performance of the one or more 5G core networks.

Clause 10. The system of any of the preceding clauses, wherein to indicate includes to provide an internet protocol (IP) address of the one or more devices within the one or more 5G-NR transport networks.

Clause 11. The system of any of the preceding clauses, wherein the API is callable to subscribe to the information.

Clause 12. The system of any of the preceding clauses, wherein the information includes analytic data that the one or more devices within the one or more 5G-NR access networks use to adjust settings of the one or more 5G-NR access network.

Clause 13. The system of any of the preceding clauses, wherein the information includes analytic data, wherein the one or more devices within the one or more 5G transport networks are to adjust settings of the one or more 5G transport networks based, at least in part, on the analytic data.

Clause 14. The system of any of the preceding clauses, wherein the one or more devices within the one or more 5G-NR transport networks are to use the information to modify a routing table of the one or more devices within the one or more 5G-NR transport networks.

Clause 15. A method comprising: performing an application programming interface (API) to indicate one or more devices within one or more fifth generation new radio (5G-NR) transport networks, with which one or more devices within one or more 5G access networks is to share information.

Clause 16. The method of any of the preceding clauses, wherein the information includes analytic information of performance of the one or more 5G core networks.

Clause 17. The method of any of the preceding clauses, wherein to indicate includes to provide an internet protocol (IP) address of the one or more devices within the one or more 5G-NR transport networks.

Clause 18. The method of any of the preceding clauses, wherein to indicate includes to provide an internet protocol (IP) address of the one or more devices within one or more fifth generation new radio (5G-NR) transport networks.

Clause 19. The method of any of the preceding clauses, wherein the API is callable to subscribe to the information.

Clause 20. The method of any of the preceding clauses, the method further comprises: modifying a routing table of the one or more devices within the one or more 5G-NR transport networks based, at least in part, on the information.

Clauses Set Five

Clause 1. A processor comprising: one or more circuits to perform an application programming interface (API) to indicate one or more devices within one or more fifth generation new radio (5G-NR) core networks, with which one or more devices within one or more 5G access networks is to share information.

Clause 2. The processor of any of the preceding clauses, wherein the information includes analytic information of performance of the one or more 5G access networks.

Clause 3. The processor of any of the preceding clauses, wherein to indicate includes to provide an internet protocol (IP) address of the one or more devices within the one or more 5G-NR core networks to the one or more devices within one or more 5G access networks.

Clause 4. The processor of any of the preceding clauses, wherein the API is callable to subscribe to the information.

Clause 5. The processor of any of the preceding clauses, wherein the information includes analytic data, wherein the one or more circuits are to further adjust one or more settings of the one or more 5G-NR core networks based, at least in part, on the analytic data.

Clause 6. The processor of any of the preceding clauses, wherein the processor is to call the API in response to an event occurring.

Clause 7. The processor of any of the preceding clauses, wherein the one or more devices within the one or more 5G-NR core networks are to modify performance settings of an application based, at least in part, on the information, and wherein the application is performed in the one or more 5G-NR core networks.

Clause 8. A system, comprising memory to store instructions that, as a result of performance by one or more processors, cause the system to perform an application programming interface (API) to indicate one or more devices within one or more fifth generation new radio (5G-NR) core networks, with which one or more devices within one or more 5G access networks is to share information.

Clause 9. The system of any of the preceding clauses, wherein the information includes analytic information of performance of the one or more 5G access networks.

Clause 10. The system of any of the preceding clauses, wherein to indicate includes to provide an internet protocol (IP) address of the one or more devices within the one or more 5G-NR core networks.

Clause 11. The system of any of the preceding clauses, wherein the API is callable to subscribe to the information.

Clause 12. The system of any of the preceding clauses, wherein the information includes analytic data, wherein the one or more devices within the one or more 5G core networks are to adjust settings of the one or more 5G core networks based, at least in part, on the analytic data.

Clause 13. The system of any of the preceding clauses, wherein the processor is to call the API in response to an event occurring.

Clause 14. The system of any of the preceding clauses, wherein the one or more devices within the one or more 5G-NR core networks are to modify performance settings of an application based, at least in part, on the information, and wherein the application is performed in the one or more 5G-NR core networks.

Clause 15. A method comprising: performing an application programming interface (API) to indicate one or more devices within one or more fifth generation new radio (5G-NR) core networks, with which one or more devices within one or more 5G access networks is to share information.

Clause 16. The method of any of the preceding clauses, wherein the information includes analytic information of performance of the one or more 5G access networks.

Clause 17. The method of any of the preceding clauses, wherein to indicate includes to provide an internet protocol (IP) address of the one or more devices within the one or more 5G-NR core networks.

Clause 18. The method of any of the preceding clauses, wherein the API is callable to subscribe to the information.

Clause 19. The method of any of the preceding clauses, wherein the information includes analytic data, wherein the one or more devices within the one or more 5G core networks are to adjust settings of the one or more 5G core networks based, at least in part, on the analytic data.

Clause 20. The method of any of the preceding clauses, the method further comprises: modifying performance settings of an application based, at least in part, on the information, and wherein the application is performed in the one or more 5G-NR core networks.

Clauses Set Six

Clause 1. A processor comprising: one or more circuits to perform an application programming interface (API) to indicate one or more devices within one or more fifth generation new radio (5G-NR) core networks, with which one or more devices within one or more 5G transport networks is to share information.

Clause 2. The processor of any of the preceding clauses, wherein the information includes analytic information of performance of the one or more 5G transport networks.

Clause 3. The processor of any of the preceding clauses, wherein to indicate includes to provide an internet protocol (IP) address of the one or more devices within the one or more 5G-NR core networks to the one or more devices within one or more 5G transport networks.

Clause 4. The processor of any of the preceding clauses, wherein the API is callable to subscribe to the information.

Clause 5. The processor of any of the preceding clauses, wherein the information includes analytic data, wherein the one or more circuits are to further adjust one or more settings of the one or more 5G-NR core networks based, at least in part, on the analytic data.

Clause 6. The processor of any of the preceding clauses, wherein the processor is to call the API in response to an event occurring.

Clause 7. The processor of any of the preceding clauses, wherein the one or more devices within the one or more 5G-NR core networks are to modify performance settings of an application based, at least in part, on the information, and wherein the application is performed by one or more devices in the one or more 5G-NR core networks.

Clause 8. A system, comprising memory to store instructions that, as a result of performance by one or more processors, cause the system to perform an application programming interface (API) to indicate one or more devices within one or more fifth generation new radio (5G-NR) core networks, with which one or more devices within one or more 5G transport networks is to share information.

Clause 9. The system of any of the preceding clauses, wherein the information includes analytic information of performance of the one or more 5G transport networks.

Clause 10. The system of any of the preceding clauses, wherein to indicate includes to provide an internet protocol (IP) address of the one or more devices within the one or more 5G-NR core networks to the one or more devices within one or more 5G transport networks.

Clause 11. The system of any of the preceding clauses, wherein the API is callable to subscribe to the information.

Clause 12. The system of any of the preceding clauses, wherein the processor is to call the API in response to an event occurring.

Clause 13. The system of any of the preceding clauses, wherein the one or more devices within the one or more 5G-NR core networks are to modify performance settings of an application based, at least in part, on the information, and wherein the application is performed in the one or more 5G-NR core networks.

Clause 14. The system of any of the preceding clauses, wherein to indicate includes to provide an internet protocol (IP) address of the one or more devices within the one or more 5G-NR core networks.

Clause 15. A method comprising: performing an application programming interface (API) to indicate one or more devices within one or more fifth generation new radio (5G-NR) core networks, with which one or more devices within one or more 5G transport networks is to share information.

Clause 16. The method of any of the preceding clauses, the method further comprises: calling the API to initiate a subscription service, wherein the subscription service performed by one or more processors is to periodically provide analytic information of the one or more 5G transport networks to the one or more 5G-NR core networks.

Clause 17. The method of any of the preceding clauses, wherein the information includes analytic data, wherein the method further comprises: adjusting settings of the one or more 5G core networks based, at least in part, on the analytic data.

Clause 18. The method of any of the preceding clauses, wherein to indicate includes to provide an internet protocol (IP) address of the one or more devices within the one or more 5G-NR core networks.

Clause 19. The method of any of the preceding clauses, the method further comprises: modifying performance settings of an application based, at least in part, on the information, and wherein the application is performed in the one or more 5G-NR core networks.

Clause 20. The method of any of the preceding clauses, wherein the information includes analytic information of performance of the one or more 5G transport networks.

Clauses Set Seven

Clause 1. A processor comprising: one or more circuits to perform an application programming interface (API) to indicate one or more controllers to control one or more devices within one or more 5G access networks.

Clause 2. The processor of any of the preceding clauses, wherein the one or more controllers are outside of the one or more 5G access networks.

Clause 3. The processor of any of the preceding clauses, wherein the one or more controllers are to receive analytic information from the one or more 5G access networks.

Clause 4. The processor of any of the preceding clauses, wherein the one or more controllers are to receive analytic information from the one or more 5G access networks, one or more 5G transport networks, and one or more 5G core networks.

Clause 5. The processor of any of the preceding clauses, wherein the one or more controllers are to generate one or more control signals to transmit to the one or more 5G access networks based, at least in part, on analytic information received from the one or more 5G access networks.

Clause 6. The processor of any of the preceding clauses, wherein the one or more controllers are to generate one or more control signals to transmit to the one or more 5G access networks based, at least in part, on analytic information received from the one or more 5G access networks, one or more 5G transport networks, and one or more 5G core networks.

Clause 7. The processor of any of the preceding clauses, wherein one or more controllers include one or more processors to perform a neural network to generate network settings of the one or more 5G access networks.

Clause 8. A system, comprising memory to store instructions that, as a result of performance by one or more processors, cause the system to perform an application programming interface (API) to indicate one or more controllers to control one or more devices within one or more 5G access networks.

Clause 9. The system of any of the preceding clauses, wherein the one or more controllers are outside of the one or more 5G access networks.

Clause 10. The system of any of the preceding clauses, wherein the one or more controllers are to receive analytic information from the one or more 5G access networks.

Clause 11. The system of any of the preceding clauses, wherein the one or more controllers are to receive analytic information from the one or more 5G access networks, one or more 5G transport networks, and one or more 5G core networks.

Clause 12. The system of any of the preceding clauses, wherein the one or more controllers are to generate one or more control signals to transmit to the one or more 5G access networks based, at least in part, on analytic information received from the one or more 5G access networks.

Clause 13. The system of any of the preceding clauses, wherein one or more controllers include one or more processors to perform a neural network to generate network settings of the one or more 5G access networks.

Clause 14. The system of any of the preceding clauses, wherein the one or more controllers are to generate one or more control signals to transmit to the one or more 5G access networks based, at least in part, on analytic information received from the one or more 5G access networks, one or more 5G transport networks, and one or more 5G core networks.

Clause 15. A method comprising: performing an application programming interface (API) to indicate one or more controllers to control one or more devices within one or more 5G access networks.

Clause 16. The method of any of the preceding clauses, wherein the one or more controllers are outside of the one or more 5G access networks.

Clause 17. The method of any of the preceding clauses, the method further comprising:

receiving, by the one or more controllers, analytic information from the one or more 5G access networks.

Clause 18. The method of any of the preceding clauses, further comprising: receiving, by the one or more controllers, analytic information from the one or more 5G access networks, one or more 5G transport networks, and one or more 5G core networks.

Clause 19. The method of any of the preceding clauses, wherein the method further comprises: generating one or more control signals to transmit to the one or more 5G access networks based, at least in part, on analytic information received from the one or more 5G access networks.

Clause 20. The method of any of the preceding clauses, wherein the method further comprises: generating one or more control signals to transmit to the one or more 5G access networks based, at least in part, on analytic information received from the one or more 5G access networks, one or more 5G transport networks, and one or more 5G core networks.

Clauses Set Eight

Clause 1. A processor comprising: one or more circuits to perform an application programming interface (API) to indicate one or more controllers to control one or more devices within one or more 5G transport networks.

Clause 2. The processor of any of the preceding clauses, wherein the one or more controllers are external to the one or more 5G transport networks.

Clause 3. The processor of any of the preceding clauses, wherein the one or more controllers are to receive analytic information from the one or more 5G transport networks.

Clause 4. The processor of any of the preceding clauses, wherein the one or more controllers are to receive analytic information from the one or more 5G transport networks, one or more 5G access networks, and one or more 5G core networks.

Clause 5. The processor of any of the preceding clauses, wherein the one or more controllers are to generate one or more control signals to transmit to the one or more 5G transport networks based, at least in part, on analytic information received from the one or more 5G transport networks.

Clause 6. The processor of any of the preceding clauses, wherein the one or more controllers are to generate one or more control signals to transmit to the one or more 5G transport networks based, at least in part, on analytic information received from one or more 5G access networks, the one or more 5G transport networks, and one or more 5G core networks.

Clause 7. The processor of any of the preceding clauses, wherein one or more controllers include one or more processors to perform a neural network to generate network settings of the one or more 5G access networks.

Clause 8. A system, comprising memory to store instructions that, as a result of performance by one or more processors, cause the system to perform an application programming interface (API) to indicate one or more controllers to control one or more devices within one or more 5G transport networks.

Clause 9. The system of any of the preceding clauses, wherein the one or more controllers are external to the one or more 5G transport networks.

Clause 10. The system of any of the preceding clauses, wherein the one or more controllers are to receive analytic information from the one or more 5G transport networks.

Clause 11. The system of any of the preceding clauses, wherein the one or more controllers are to receive analytic information from the one or more 5G transport networks, one or more 5G access networks, and one or more 5G core networks.

Clause 12. The system of any of the preceding clauses, wherein the one or more controllers are to generate one or more control signals to transmit to the one or more 5G transport networks based, at least in part, on analytic information received from the one or more 5G transport networks.

Clause 13. The system of any of the preceding clauses, wherein the one or more controllers are to generate one or more control signals to transmit to the one or more 5G transport networks based, at least in part, on analytic information received from one or more 5G access networks, the one or more 5G transport networks, and one or more 5G core networks.

Clause 14. The system of any of the preceding clauses, wherein one or more controllers include one or more processors to perform a neural network to generate network settings of the one or more 5G access networks.

Clause 15. A method comprising: performing an application programming interface (API) to indicate one or more controllers to control one or more devices within one or more 5G transport networks.

Clause 16. The method of any of the preceding clauses, wherein the one or more controllers are external to the one or more 5G transport networks.

Clause 17. The method of any of the preceding clauses, the method further comprising: receiving analytic information from the one or more 5G transport networks.

Clause 18. The method of any of the preceding clauses, the method further comprising: receiving analytic information from the one or more 5G transport networks, one or more 5G access networks, and one or more 5G core networks.

Clause 19. The method of any of the preceding clauses, wherein the method further comprises: generating one or more control signals to transmit to the one or more 5G transport networks based, at least in part, on analytic information received from the one or more 5G transport networks.

Clause 20. The method of any of the preceding clauses, wherein the method further comprises: generating one or more control signals to transmit to the one or more 5G transport networks based, at least in part, on analytic information received from one or more 5G access networks, the one or more 5G transport networks, and one or more 5G core networks.

Clauses Set Nine

Clause 1. A processor comprising: one or more circuits to perform an application programming interface (API) to indicate one or more controllers to control one or more devices within one or more 5G core networks.

Clause 2. The processor of any of the preceding clauses, wherein the one or more controllers are external to the one or more 5G core networks.

Clause 3. The processor of any of the preceding clauses, wherein the one or more controllers are to receive analytic information from one or more multi-access edge computing networks (MEC), and wherein the one or more controllers are to use the received analytic information to generate network settings of the one or more MECs.

Clause 4. The processor of any of the preceding clauses, wherein the one or more controllers are to receive analytic information from the one or more 5G core networks, one or more 5G access networks, and one or more 5G transport networks.

Clause 5. The processor of any of the preceding clauses, wherein the one or more controllers are to generate one or more control signals to transmit to the one or more 5G core networks based, at least in part, on analytic information received from the one or more 5G core networks.

Clause 6. The processor of any of the preceding clauses, wherein the one or more controllers are to generate one or more control signals to transmit to the one or more 5G core networks based, at least in part, on analytic information received from one or more 5G access networks, one or more 5G transport networks, and the one or more 5G core networks.

Clause 7. The processor of any of the preceding clauses, wherein one or more controllers include one or more processors to perform a neural network to generate network settings of the one or more 5G core networks.

Clause 8. A system, comprising memory to store instructions that, as a result of performance by one or more processors, cause the system to perform an application programming interface (API) to indicate one or more controllers to control one or more devices within one or more 5G core networks.

Clause 9. The system of any of the preceding clauses, wherein the one or more controllers are external to the one or more 5G core networks.

Clause 10. The system of any of the preceding clauses, wherein the one or more controllers are to receive analytic information from the one or more 5G core networks.

Clause 11. The system of any of the preceding clauses, wherein the one or more controllers are to receive analytic information from the one or more 5G core networks, one or more 5G access networks, and one or more 5G transport networks.

Clause 12. The system of any of the preceding clauses, wherein the one or more controllers are to generate one or more control signals to transmit to the one or more 5G core networks based, at least in part, on analytic information received from the one or more 5G core networks.

Clause 13. The system of any of the preceding clauses, wherein the one or more controllers are to generate one or more control signals to transmit to the one or more 5G core networks based, at least in part, on analytic information received from one or more 5G access networks, one or more 5G transport networks, and the one or more 5G core networks.

Clause 14. The system of any of the preceding clauses, wherein one or more controllers include one or more processors to perform a neural network to generate network settings of the one or more 5G core networks.

Clause 15. A method comprising: performing an application programming interface (API) to indicate one or more controllers to control one or more devices within one or more 5G core networks.

Clause 16. The method of any of the preceding clauses, wherein the one or more controllers are external to the one or more 5G core networks.

Clause 17. The method of any of the preceding clauses, the method further comprising: receiving analytic information from the one or more 5G core networks.

Clause 18. The method of any of the preceding clauses, the method further comprising: receiving analytic information from the one or more 5G core networks, one or more 5G access networks, and one or more 5G transport networks.

Clause 19. The method of any of the preceding clauses, wherein the method further comprises: generating one or more control signals to transmit to the one or more 5G core networks based, at least in part, on analytic information received from the one or more 5G core networks.

Clause 20. The method of any of the preceding clauses, wherein the method further comprises: performing a neural network to generate network settings of the one or more 5G core networks.

Clauses Set Ten

Clause 1. A processor comprising: one or more circuits to perform an application programming interface (API) to cause one or more indications of one or more devices within one or more 5G access networks to be stored.

Clause 2. The processor of any of the preceding clauses, wherein the one or more devices include one or more controllers performed by one or more processors.

Clause 3. The processor of any of the preceding clauses, wherein the one or more devices include one or more controllers outside of the one or more 5G access networks.

Clause 4. The processor of any of the preceding clauses, wherein the one or more devices include one or more controllers outside of the one or more 5G access networks, wherein the one or more controllers are performed by one or more virtual machines.

Clause 5. The processor of any of the preceding clauses, wherein the or more indications include an internet protocol (IP) address of one or more controllers outside the one or more 5G access networks.

Clause 6. The processor of any of the preceding clauses, wherein the processor performs the API based, at least in part, on an event.

Clause 7. The processor of any of the preceding clauses, wherein the one or more indications include network settings generated by one or more controllers outside the one or more 5G access networks.

Clause 8. A system, comprising memory to store instructions that, as a result of performance by one or more processors, cause the system to perform an application programming interface (API) to cause one or more indications of one or more devices within one or more 5G access networks to be stored.

Clause 9. The system of any of the preceding clauses, wherein the one or more devices including one or more controllers performed by one or more processors.

Clause 10. The system of any of the preceding clauses, wherein the one or more devices are one or more controllers outside of the one or more 5G access networks.

Clause 11. The system of any of the preceding clauses, wherein the one or more devices are one or more controllers outside of the one or more 5G access networks, wherein the one or more controllers are performed by one or more virtual machines.

Clause 12. The system of any of the preceding clauses, wherein the or more indications include an internet protocol (IP) address of one or more controllers outside the one or more 5G access networks.

Clause 13. The system of any of the preceding clauses, wherein the processor performs the API based, at least in part, on an event.

Clause 14. The system of any of the preceding clauses, wherein the one or more indications include network settings generated by one or more controllers outside the one or more 5G access networks.

Clause 15. A method comprising: performing an application programming interface (API) to cause one or more indications of one or more devices within one or more 5G access networks to be stored.

Clause 16. The method of any of the preceding clauses, wherein the one or more devices include one or more controllers performed by one or more processors.

Clause 17. The method of any of the preceding clauses, wherein the one or more devices include one or more controllers outside of the one or more 5G access networks.

Clause 18. The method of any of the preceding clauses, wherein the one or more devices are one or more controllers outside of the one or more 5G access networks, wherein the one or more controllers are performed by one or more virtual machines.

Clause 19. The method of any of the preceding clauses, wherein the or more indications include an internet protocol (IP) address of one or more controllers outside the one or more 5G access networks.

Clause 20. The method of any of the preceding clauses, wherein the one or more indications include network settings generated by one or more controllers outside the one or more 5G access networks.

Clauses Set Eleven

Clause 1. A processor comprising: one or more circuits to perform an application programming interface (API) to cause one or more indications of one or more devices within one or more 5G transport networks to be stored.

Clause 2. The processor of any of the preceding clauses, wherein the one or more devices include one or more controllers performed by one or more processors.

Clause 3. The processor of any of the preceding clauses, wherein the one or more devices include one or more controllers outside of the one or more 5G transport networks.

Clause 4. The processor of any of the preceding clauses, wherein the one or more devices include one or more controllers outside of the one or more 5G transport networks, wherein the one or more controllers are performed by one or more virtual machines.

Clause 5. The processor of any of the preceding clauses, wherein the or more indications include an internet protocol (IP) address of one or more controllers outside the one or more 5G access networks.

Clause 6. The processor of any of the preceding clauses, wherein the processor performs the API based, at least in part, on an event.

Clause 7. The processor of any of the preceding clauses, wherein the one or more indications include network settings generated by one or more controllers outside the one or more 5G access networks.

Clause 8. A system, comprising memory to store instructions that, as a result of performance by one or more processors, cause the system to perform an application programming interface (API) to cause one or more indications of one or more devices within one or more 5G transport networks to be stored.

Clause The system of any of the preceding clauses, wherein the one or more devices include one or more controllers performed by one or more processors.

Clause 10. The system of any of the preceding clauses, wherein the one or more devices include one or more controllers outside of the one or more 5G transport networks.

Clause 11. The system of any of the preceding clauses, wherein the one or more devices include one or more controllers outside of the one or more 5G transport networks, wherein the one or more controllers are performed by one or more virtual machines.

Clause 12. The system of any of the preceding clauses, wherein the or more indications include an internet protocol (IP) address of one or more controllers outside the one or more 5G access networks.

Clause 13. The system of any of the preceding clauses, wherein the processor performs the API based, at least in part, on an event.

Clause 14. The system of any of the preceding clauses, wherein the one or more indications include network settings generated by one or more controllers outside the one or more 5G access networks.

Clause 15. A method comprising performing an application programming interface (API) to cause one or more indications of one or more devices within one or more 5G transport networks to be stored.

Clause 16. The method of any of the preceding clauses, wherein the one or more devices include one or more controllers performed by one or more processors.

Clause 17. The method of any of the preceding clauses, wherein the one or more devices include one or more controllers outside of the one or more 5G transport networks.

Clause 18. The method of any of the preceding clauses, wherein the one or more devices include one or more controllers outside of the one or more 5G transport networks, wherein the one or more controllers are performed by one or more virtual machines.

Clause 19. The method of any of the preceding clauses, wherein the or more indications include an internet protocol (IP) address of one or more controllers outside the one or more 5G access networks.

Clause 20. The method of any of the preceding clauses, wherein the one or more indications include network settings generated by one or more controllers outside the one or more 5G access networks.

Clauses Set Twelve

Clause 1. A processor comprising: one or more circuits to perform an application programming interface (API) to cause one or more indications of one or more devices within one or more 5G core networks to be stored.

Clause 2. The processor of any of the preceding clauses, wherein the one or more devices include one or more controllers performed by one or more processors.

Clause 3. The processor of any of the preceding clauses, wherein the one or more devices include one or more controllers outside of the one or more 5G core networks.

Clause 4. The processor of any of the preceding clauses, wherein the one or more devices include one or more controllers outside of the one or more 5G core networks, wherein the one or more controllers are performed by one or more virtual machines.

Clause 5. The processor of any of the preceding clauses, wherein the or more indications include an internet protocol (IP) address of one or more controllers outside the one or more 5G core networks.

Clause 6. The processor of any of the preceding clauses, wherein the processor performs the API based, at least in part, on an event.

Clause 7. The processor of any of the preceding clauses, wherein the one or more indications include network settings generated by one or more controllers outside the one or more 5G access networks.

Clause 8. A system, comprising memory to store instructions that, as a result of performance by one or more processors, cause the system to perform an application programming interface (API) to cause one or more indications of one or more devices within one or more 5G transport networks to be stored.

Clause 9. The system of any of the preceding clauses, wherein the one or more devices include one or more controllers performed by one or more processors.

Clause 10. The system of any of the preceding clauses, wherein the one or more devices include one or more controllers outside of the one or more 5G core networks.

Clause 11. The system of any of the preceding clauses, wherein the one or more devices include one or more controllers outside of the one or more 5G core networks, wherein the one or more controllers are performed by one or more virtual machines.

Clause 12. The system of any of the preceding clauses, wherein the or more indications include an internet protocol (IP) address of one or more controllers outside the one or more 5G core networks.

Clause 13. The system of any of the preceding clauses, wherein the processor performs the API based, at least in part, on an event.

Clause 14. The system of any of the preceding clauses, wherein the one or more indications include network settings generated by one or more controllers outside the one or more 5G access networks.

Clause 15. A method comprising: performing an application programming interface (API) to cause one or more indications of one or more devices within one or more 5G core networks to be stored.

Clause 16. The method of any of the preceding clauses, wherein the one or more devices include one or more controllers performed by one or more processors.

Clause 17. The method of any of the preceding clauses, wherein the one or more devices include one or more controllers outside of the one or more 5G core networks.

Clause 18. The method of any of the preceding clauses, wherein the one or more devices include one or more controllers outside of the one or more 5G core networks, wherein the one or more controllers are performed by one or more virtual machines.

Clause 19. The method of any of the preceding clauses, wherein the or more indications include an internet protocol (TP) address of one or more controllers outside the one or more 5G core networks.

Clause 20. The method of any of the preceding clauses, wherein the one or more indications include network settings generated by one or more controllers outside the one or more 5G access networks.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In at least one embodiment, an arithmetic logic unit is a set of combinational logic circuitry that takes one or more inputs to produce a result. In at least one embodiment, an arithmetic logic unit is used by a processor to implement mathematical operation such as addition, subtraction, or multiplication. In at least one embodiment, an arithmetic logic unit is used to implement logical operations such as logical AND/OR or XOR. In at least one embodiment, an arithmetic logic unit is stateless, and made from physical switching components such as semiconductor transistors arranged to form logical gates. In at least one embodiment, an arithmetic logic unit may operate internally as a stateful logic circuit with an associated clock. In at least one embodiment, an arithmetic logic unit may be constructed as an asynchronous logic circuit with an internal state not maintained in an associated register set. In at least one embodiment, an arithmetic logic unit is used by a processor to combine operands stored in one or more registers of the processor and produce an output that can be stored by the processor in another register or a memory location.

In at least one embodiment, as a result of processing an instruction retrieved by the processor, the processor presents one or more inputs or operands to an arithmetic logic unit, causing the arithmetic logic unit to produce a result based at least in part on an instruction code provided to inputs of the arithmetic logic unit. In at least one embodiment, the instruction codes provided by the processor to the ALU are based at least in part on the instruction executed by the processor. In at least one embodiment combinational logic in the ALU processes the inputs and produces an output which is placed on a bus within the processor. In at least one embodiment, the processor selects a destination register, memory location, output device, or output storage location on the output bus so that clocking the processor causes the results produced by the ALU to be sent to the desired location.

In the scope of this application, the term arithmetic logic unit, or ALU, is used to refer to any computational logic circuit that processes operands to produce a result. For example, in the present document, the term ALU can refer to a floating point unit, a DSP, a tensor core, a shader core, a coprocessor, or a CPU.

In present document, references may be made to obtaining, acquiring, receiving, or inputting analog or digital data into a subsystem, computer system, or computer-implemented machine. A process of obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. One or more processors comprising: circuitry to perform an application programming interface (API) to indicate one or more devices within one or more cellular wireless core networks, with which one or more devices within one or more cellular wireless access networks is to share information, the indication (i) providing an internet protocol (IP) address of the one or more devices within the one or more cellular wireless core networks to the one or more devices within the one or more cellular wireless access networks and (ii) causing the information to be shared from the one or more devices within the one or more cellular wireless access networks to the one or more devices within the one or more cellular wireless core networks.

2. The one or more processors of claim 1, wherein the information includes analytic information of performance of the one or more cellular wireless access networks.

3. The one or more processors of claim 1, wherein the API is callable to subscribe to the information.

4. The one or more processors of claim 1, wherein the information includes analytic data, wherein the circuitry is to further adjust one or more settings of the one or more cellular wireless core networks based, at least in part, on the analytic data.

5. The one or more processors of claim 1, wherein the one or more processors are to call the API in response to an event occurring.

6. The one or more processors of claim 1, wherein the one or more devices within the one or more cellular wireless core networks are to modify performance settings of an application based, at least in part, on the information, and wherein the application is performed in the one or more cellular wireless core networks.

7. A system, comprising memory to store instructions that, as a result of performance by one or more processors, cause the system to perform an application programming interface (API) to indicate one or more devices within one or more cellular wireless core networks, with which one or more devices within one or more cellular wireless access networks is to share information, the indication (i) providing an internet protocol (IP) address of the one or more devices within the one or more cellular wireless core networks to the one or more devices within the one or more cellular wireless access networks and (ii) causing the information to be shared from the one or more devices within the one or more cellular wireless access networks to the one or more devices within the one or more cellular wireless core networks.

8. The system of claim 7, wherein the information includes analytic information of performance of the one or more cellular wireless access networks.

9. The system of claim 7, wherein the API is callable to subscribe to the information.

10. The system of claim 7, wherein the information includes analytic data, wherein the one or more devices within the one or more cellular wireless core networks are to adjust settings of the one or more cellular wireless core networks based, at least in part, on the analytic data.

11. The system of claim 7, wherein the processor is to call the API in response to an event occurring.

12. The system of claim 7, wherein the one or more devices within the one or more cellular wireless core networks are to modify performance settings of an application based, at least in part, on the information, and wherein the application is performed in the one or more cellular wireless core networks.

13. A method comprising:

performing an application programming interface (API) to indicate one or more devices within one or more cellular wireless core networks, with which one or more devices within one or more cellular wireless access networks is to share information, the indication (i) providing an internet protocol (IP) address of the one or more devices within the one or more cellular wireless core networks to the one or more devices within the one or more cellular wireless access networks and (ii) causing the information to be shared from the one or more devices within the one or more cellular wireless access networks to the one or more devices within the one or more cellular wireless core networks.

14. The method of claim 13, wherein the information includes analytic information of performance of the one or more cellular wireless access networks.

15. The method of claim 13, wherein the API is callable to subscribe to the information.

16. The method of claim 13, wherein the information includes analytic data, wherein the one or more devices within the one or more cellular wireless core networks are to adjust settings of the one or more cellular wireless core networks based, at least in part, on the analytic data.

17. The method of claim 13, the method further comprises:

modifying performance settings of an application based, at least in part, on the information, and wherein the application is performed in the one or more cellular wireless core networks.

* * * * *